US009544075B2

(12) United States Patent
Altman et al.

(10) Patent No.: US 9,544,075 B2
(45) Date of Patent: Jan. 10, 2017

(54) PLATFORM FOR WIRELESS IDENTITY TRANSMITTER AND SYSTEM USING SHORT RANGE WIRELESS BROADCAST

(71) Applicant: QUALCOMM Incorporated, San Diego, CA (US)

(72) Inventors: Steven R Altman, San Diego, CA (US); Stephen A Sprigg, Poway, CA (US); Liz Gasser, San Diego, CA (US); Joel Linsky, San Diego, CA (US); Leif Woodahl, Poway, CA (US); Jason Kenagy, La Jolla, CA (US); Jose Menendez, San Diego, CA (US); Charles S Wurster, San Diego, CA (US); Paul Jacobs, San Diego, CA (US); Neville Meijers, San Diego, CA (US); Peggy Johnson, San Diego, CA (US); Dave Wise, San Diego, CA (US); Kevin Hunter, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 13/773,379

(22) Filed: Feb. 21, 2013

(65) Prior Publication Data

US 2013/0217332 A1 Aug. 22, 2013

Related U.S. Application Data

(60) Provisional application No. 61/601,620, filed on Feb. 22, 2012, provisional application No. 61/637,834, (Continued)

(51) Int. Cl.
*H04H 60/90* (2008.01)
*G01S 1/02* (2010.01)
(Continued)

(52) U.S. Cl.
CPC ............. *H04H 60/90* (2013.01); *G01S 1/02* (2013.01); *G06Q 20/3224* (2013.01);
(Continued)

(58) Field of Classification Search
CPC ....... H04H 60/90; H04W 12/02; H04W 12/08; H04W 4/008; H04W 84/18; H04W 64/00; H04L 67/18; G01S 1/02; G06Q 30/02
(Continued)

(56) References Cited

U.S. PATENT DOCUMENTS 5,241,598 A 8/1993 Raith
5,784,028 A 7/1998 Corman et al.
(Continued)

FOREIGN PATENT DOCUMENTS

EP 1626363 A1 2/2006
EP 2200218 A1 6/2010
(Continued)

OTHER PUBLICATIONS

Barahim, M.Z. "Low-Cost Bluetooth Mobile Positioning for Location-based Application," 3rd IEEE/IFIP International Conference in Central Asia on Internet, 2007. ICI 2007. pp. 1-4, Sep. 26-28, 2007, doi: 10.1109/CANET.2007.4401707.
(Continued)

*Primary Examiner* — Thanh Le
(74) *Attorney, Agent, or Firm* — Kevin T. Cheatham

(57) ABSTRACT

Methods, systems and devices for locating a wireless identity transmitter with a central server connected with one or more proximity broadcast receivers, such as stationary receivers or mobile devices operating as wireless receivers. The wireless identity transmitter may be a compact device configured to broadcast messages, such as through Bluetooth® advertisements, including an identification code. When within proximity, a proximity broadcast receiver may
(Continued)

receive broadcast messages from the wireless identity transmitter and relay location information along with the wireless identity transmitter's identification code to a central server as sighting messages. The proximity broadcast receiver's own location may provide an approximate location for the wireless identity transmitter. The central server may process sighting messages, which may include signal strength information, to accurately locate the wireless identity transmitter. The central server may transmit data to third-party devices and/or mobile devices of users in response to receiving sightings messages.

26 Claims, 68 Drawing Sheets

Related U.S. Application Data filed on Apr. 24, 2012, provisional application No. 61/693,169, filed on Aug. 24, 2012, provisional application No. 61/670,226, filed on Jul. 11, 2012, provisional application No. 61/701,457, filed on Sep. 14, 2012, provisional application No. 61/713,239, filed on Oct. 12, 2012, provisional application No. 61/716,373, filed on Oct. 19, 2012, provisional application No. 61/717,964, filed on Oct. 24, 2012, provisional application No. 61/728,677, filed on Nov. 20, 2012, provisional application No. 61/745,395, filed on Dec. 21, 2012, provisional application No. 61/745,308, filed on Dec. 21, 2012.

(51) Int. Cl.
*H04W 12/02* (2009.01)
*G06Q 20/32* (2012.01)
*G06Q 30/02* (2012.01)
*H04L 29/08* (2006.01)
*H04W 64/00* (2009.01)
*H04W 84/18* (2009.01)

(52) U.S. Cl.
CPC .......... *H04W 12/02* (2013.01); *G06Q 30/02* (2013.01); *H04L 67/18* (2013.01); *H04W 64/00* (2013.01); *H04W 84/18* (2013.01)

(58) Field of Classification Search
USPC ............... 455/41.1, 41.2, 41.3, 422.1, 456.1, 457, 455/88.1, 67.11, 550.1, 575.1; 340/10.1, 10.4; 235/375
See application file for complete search history.

(56) References Cited

U.S. PATENT DOCUMENTS

| | | |
|---|---|---|
| 5,812,086 A | 9/1998 | Bertiger et al. |
| 6,052,786 A | 4/2000 | Tsuchida |
| 6,513,015 B2 | 1/2003 | Ogasawara |
| 6,536,658 B1 | 3/2003 | Rantze |
| 6,970,092 B2 | 11/2005 | Hum et al. |
| 7,260,835 B2 | 8/2007 | Bajikar |
| 7,376,583 B1 | 5/2008 | Rolf |
| 7,413,121 B2 | 8/2008 | Goel et al. |
| 7,616,942 B2 | 11/2009 | Karl et al. |
| 7,658,327 B2 | 2/2010 | Tuchman et al. |
| 7,737,861 B2 | 6/2010 | Lea et al. |
| 7,752,329 B1 | 7/2010 | Meenan et al. |
| 7,791,455 B1 | 9/2010 | MacLean, III |
| 7,849,318 B2 | 12/2010 | Zhang et al. |
| 7,880,616 B2 | 2/2011 | Kanagala et al. |
| 7,936,736 B2 | 5/2011 | Proctor, Jr. et al. |
| RE42,435 E | 6/2011 | Katz |
| 7,962,361 B2 | 6/2011 | Ramchandani et al. |
| 8,023,895 B2 | 9/2011 | Smith |
| 8,050,984 B2 | 11/2011 | Bonner et al. |
| 8,090,399 B2 | 1/2012 | Howarter et al. |
| 8,145,125 B2 | 3/2012 | Masoian et al. |
| 8,160,577 B2 | 4/2012 | Bailin et al. |
| 8,253,567 B2 | 8/2012 | Butler et al. |
| 8,285,211 B2 | 10/2012 | Wang et al. |
| 8,332,272 B2 | 12/2012 | Fisher |
| 9,014,963 B1 | 4/2015 | Kolton et al. |
| 9,213,675 B1 | 12/2015 | Kolton et al. |
| 2002/0062251 A1 | 5/2002 | Anandan et al. |
| 2003/0100315 A1 | 5/2003 | Rankin |
| 2003/0143978 A1 | 7/2003 | Cooper et al. |
| 2004/0002897 A1 | 1/2004 | Vishik |
| 2004/0082343 A1 | 4/2004 | Kim et al. |
| 2004/0136527 A1 | 7/2004 | Struik |
| 2004/0198221 A1 | 10/2004 | Bin et al. |
| 2005/0122210 A1 | 6/2005 | Huseth et al. |
| 2005/0143092 A1 | 6/2005 | Tamaki et al. |
| 2006/0032901 A1* | 2/2006 | Sugiyama .......... G07C 9/00103 235/375 |
| 2006/0036485 A1 | 2/2006 | Duri et al. |
| 2006/0178986 A1 | 8/2006 | Giordano et al. |
| 2007/0087682 A1 | 4/2007 | DaCosta |
| 2007/0220545 A1 | 9/2007 | Awano |
| 2008/0107274 A1 | 5/2008 | Worthy |
| 2008/0123683 A1 | 5/2008 | Cheng et al. |
| 2008/0187137 A1 | 8/2008 | Nikander et al. |
| 2009/0052380 A1 | 2/2009 | Espelien |
| 2009/0103722 A1 | 4/2009 | Anderson et al. |
| 2009/0150194 A1 | 6/2009 | Keohane et al. |
| 2009/0185677 A1 | 7/2009 | Bugbee |
| 2009/0210932 A1 | 8/2009 | Balakrishnan et al. |
| 2009/0254416 A1 | 10/2009 | Nomula |
| 2009/0315704 A1 | 12/2009 | Rosing et al. |
| 2010/0027783 A1 | 2/2010 | Yup |
| 2010/0033299 A1 | 2/2010 | Davis |
| 2010/0070369 A1 | 3/2010 | Fenton et al. |
| 2010/0088510 A1 | 4/2010 | Shon et al. |
| 2010/0174596 A1 | 7/2010 | Gilman et al. |
| 2010/0174598 A1 | 7/2010 | Khan et al. |
| 2010/0203833 A1 | 8/2010 | Dorsey |
| 2010/0223120 A1 | 9/2010 | Dragt |
| 2010/0267375 A1 | 10/2010 | Lemmon et al. |
| 2010/0274859 A1 | 10/2010 | Bucuk |
| 2010/0287250 A1 | 11/2010 | Carlson et al. |
| 2011/0032916 A1 | 2/2011 | Lee |
| 2011/0035284 A1 | 2/2011 | Moshfeghi |
| 2011/0138192 A1 | 6/2011 | Kocher et al. |
| 2011/0151898 A1 | 6/2011 | Chandra et al. |
| 2011/0159850 A1 | 6/2011 | Faith et al. |
| 2011/0176465 A1 | 7/2011 | Panta et al. |
| 2011/0179064 A1 | 7/2011 | Russo |
| 2011/0314539 A1 | 12/2011 | Horton |
| 2012/0011566 A1 | 1/2012 | Youm et al. |
| 2012/0029691 A1 | 2/2012 | Mockus et al. |
| 2012/0047011 A1 | 2/2012 | Rippetoe et al. |
| 2012/0077457 A1 | 3/2012 | Howarter et al. |
| 2012/0201383 A1 | 8/2012 | Matsuo |
| 2012/0207302 A1 | 8/2012 | Alexander et al. |
| 2012/0209744 A1 | 8/2012 | Mullen et al. |
| 2012/0220314 A1 | 8/2012 | Altman et al. |
| 2012/0226537 A1 | 9/2012 | Subbarao et al. |
| 2012/0239504 A1 | 9/2012 | Curlander et al. |
| 2012/0260311 A1 | 10/2012 | Kang |
| 2012/0278172 A1 | 11/2012 | Mercuri et al. |
| 2012/0306622 A1 | 12/2012 | Trinh et al. |
| 2013/0159086 A1 | 6/2013 | Richard |
| 2013/0178163 A1 | 7/2013 | Wang |
| 2013/0185133 A1 | 7/2013 | Tong et al. |
| 2013/0214909 A1 | 8/2013 | Meijers et al. |
| 2013/0217333 A1 | 8/2013 | Sprigg et al. |
| 2013/0281110 A1 | 10/2013 | Zelinka et al. |
| 2013/0282438 A1 | 10/2013 | Hunter et al. |
| 2013/0297422 A1 | 11/2013 | Hunter et al. |
| 2014/0039990 A1 | 2/2014 | Georgi |
| 2014/0133656 A1 | 5/2014 | Wurster et al. |
| 2014/0146727 A1 | 5/2014 | Segev et al. |

(56) References Cited

U.S. PATENT DOCUMENTS

| | | |
|---|---|---|
| 2014/0162685 A1 | 6/2014 | Edge |
| 2014/0188592 A1 | 7/2014 | Herberger et al. |
| 2014/0254466 A1 | 9/2014 | Wurster et al. |
| 2014/0258113 A1 | 9/2014 | Gauthier et al. |
| 2014/0274150 A1 | 9/2014 | Marti et al. |
| 2014/0291395 A1 | 10/2014 | Wankmueller et al. |
| 2014/0370879 A1 | 12/2014 | Redding et al. |
| 2015/0254662 A1 | 9/2015 | Radu |
| 2015/0332258 A1 | 11/2015 | Kurabi et al. |

FOREIGN PATENT DOCUMENTS

| | | |
|---|---|---|
| EP | 2521082 A2 | 11/2012 |
| EP | 2693360 A2 | 2/2014 |
| KR | 20090095869 A | 9/2009 |
| WO | 02073864 A2 | 9/2002 |
| WO | 2005025127 A1 | 3/2005 |
| WO | 2007059558 A1 | 5/2007 |
| WO | WO-2009130796 A1 | 10/2009 |
| WO | 2010117364 A1 | 10/2010 |
| WO | 2012035149 A1 | 3/2012 |
| WO | WO-2013034924 A1 | 3/2013 |
| WO | WO-2013109300 A1 | 7/2013 |
| WO | WO-2013126759 A2 | 8/2013 |
| WO | WO-2013163333 A2 | 10/2013 |

OTHER PUBLICATIONS

International Search Report and Written Opinion—PCT/US2013/027392—ISA/EPO—Sep. 13, 2013.
Anonymous: "Stream cipher", Feb. 6, 2012, XP55068934, [retrieved on Jul. 1, 2013].
Chaudhry M A, R., et al., "Protocols Stack and Connection Establishment in Bluetooth, radio", Students Conference, 2002. ISCON '02, 102-104,Proceedings, IEEE Aug. 2002, Piscataway, NJ, USA,IEEE, vol. 1, Aug. 16, 2002, pp. 48-55, XP010647264, ISBN: 978-0-7803-7505-5.
Kim, H.W., et al., "Symmetric Encryption in RFID Authentication Protocol for Strong Location Privacy and Forward-Security", Hybrid Information Technology, 2006. ICHIT '06, IEEE, Piscataway, NJ, USA, Nov. 9, 2006, pp. 718-723, XP032070247, DOI: 10.1109/ICHIT.2006.253688, ISBN: 978-0-7695-2674-4, the whole document.
Partial International Search Report—PCT/US2013/027392—ISA/EPO—Jul. 8, 2013.
Schneider M A., et al., "Efficient Commerce Protocols based on One-time Pads", Computer Security Applications, 2000 ACSAC '00. 16th Annual Conference E New Orleans, LA, USA Dec. 11-15, 2000, Los Alamitos, CA, USA, IEEE Comput. Soc, US, Dec. 11, 2000, pp. 317-326, XP010529829.
Tsudik G., "A Family of Dunces: Trivial RFID Identification and Authentication Protocols", Jun. 20, 2007, Privacy Enhancing Technologies; [Lecture Notes in Computer Science], Springer Berlin Heidelberg, Berlin, Heidelberg, pp. 45-61, XP019073083, ISBN: 978-3-540-75550-0.
Zuo, Y., "Secure and private search protocols for RFID systems", Information Systems Frontiers; A Journal of Research and Innovation, Kluwer Academic Publishers, BO, vol. 12, No. 5, Aug. 28, 2009, pp. 507-519, XP019863478, ISSN: 1572-9419, DOI: 10.1007/S10796-009-9208-6.
System and method of secure and convenient user authentication using associated mobile devices, IP.com Disclosure No. IPCOM000232532D, Nov. 15, 2013, 3 pages.
Carman D.W., et al., "Constraints and Approaches for Distributed Sensor Network Security (FINAL)," NAI Labs Technical Report #00-010, Sep. 1, 2000, 139 pages.
Agarwal A "Edit Hosts File with VB Script (VBS)"Tech Guides, Nov. 30, 2010, XP055191874, 2 Pages. Retrieved from the Internet: URL:http://www.labnol.org/tech/edit-hosts-with-vbs/18258/ [retrieved on May 28, 2015].
International Search Report and Written Opinion—PCT/US2015/042872—ISA/EPO—Oct. 23, 2015.

\* cited by examiner

PLATFORM FOR WIRELESS IDENTITY TRANSMITTER AND SYSTEM USING SHORT RANGE WIRELESS BROADCAST

RELATED APPLICATIONS

The present application claims the benefit of priority to U.S. Provisional Application No. 61/601,620, filed Feb. 22, 2012, U.S. Provisional Application No. 61/637,834, filed Apr. 24, 2012, U.S. Provisional Application No. 61/693,169, filed Aug. 24, 2012, U.S. Provisional Application No. 61/670,226, filed Jul. 11, 2012, U.S. Provisional Application No. 61/701,457, filed Sep. 14, 2012, U.S. Provisional Application No. 61/713,239, filed Oct. 12, 2012, U.S. Provisional Application No. 61/716,373, filed Oct. 19, 2012, U.S. Provisional Application No. 61/717,964, filed Oct. 24, 2012, U.S. Provisional Application No. 61/728,677, filed Nov. 20, 2012, and U.S. Provisional Application No. 61/745,395, filed Dec. 21, 2012, U.S. Provisional Application No. 61/745,308, filed Dec. 21, 2012, the entire contents of all of which are hereby incorporated by reference.

The present application is also related to U.S. patent application Ser. No. 13/773,336, entitled "Preserving Security By Synchronizing a Nonce or Counter Between Systems," filed contemporaneous with the present application, the entire contents of which are hereby incorporated by reference.

BACKGROUND

Cellular and wireless communication devices have seen explosive growth over the past several years. This growth has been fueled by better communications hardware, larger networks, and more reliable protocols. Today's smartphones include cameras, GPS receivers, Bluetooth® transceivers, and of course the cellular communication capabilities (e.g., LTE, 3G and/or 4G network access) to enable the devices to establish data communication links with the Internet. Smartphones are now very widely deployed in society. Additionally, the components and capabilities in smartphones are now very affordable, enabling the capabilities to be deployed in other types of devices.

Numerous solutions have been proposed to facilitate location of persons or assets leveraging cellular and wireless devices. Most of these systems involve the development of a wearable device that communicates the position of the wearer to a server. Others involve establishment of a radio connection between the wearer and a cellular device. Such systems suffer from issues of cost, effectiveness and practicality, which limit their viability. Further, schemes that transmit wireless information indicating user identities or other unique information may be tracked by unintended parties, causing security concerns. For example, nefarious parties may capture radio messages that include user identities, such as by using a packet sniffer, and may determine the origin of the messages by analyzing data transmitting in the clear.

SUMMARY

The various embodiments provide systems, devices, and methods for locating a wireless identity transmitter based on broadcast identification packets. The wireless identity transmitter may be a compact device configured to broadcast a unique and secure identification code using short-range wireless signaling technology, such as Bluetooth® Low Energy (LE). The identification broadcast packets ("broadcast messages") may be received by physically proximate proximity broadcast receivers (PBR), which may be dedicated receivers, smartphones configured with a PBR application, tablet computers configured with a PBR application, and stationary receivers, to name just a few examples. Because the wireless identity transmitter broadcasts its identifier using short-range wireless signals, a proximity broadcast receiver's own location provides an approximate location for the wireless identity transmitter when a broadcast message is received. Using long range wireless networks and/or the Internet, proximity broadcast receivers may report or upload received identifiers along with other associated information, such as time and receiver location, to a central server as sighting messages. The collection and storage of such sighting messages by a central server may form a database of recorded sightings that may can be use to provide current information regarding wireless identity transmitter proximities to receivers and approximate locations, as well as historical information regarding the sightings of wireless identity transmitter. The proximate proximity broadcast receivers may log received broadcast messages and may periodically transmit sighting messages.

In a further embodiment, a community of proximity broadcast receivers, such as wireless smartphones configured with a reporting application, may be configured to listen for broadcasts from wireless identity transmitters and to transmit sighting reports to a central server as they are received. Further embodiment, proximity broadcast receivers may be configured to receive alert messages from the central server and, in response to information included in such alert messages, listen for broadcast messages transmitted by particular wireless identity transmitters (e.g., broadcast including particular identifiers) and/or within particular sectors or locations. The proximity broadcast receivers may promptly report receptions of wireless identity transmitter identifiers, along with their location and the time of reception, to the central server via a long range wireless network (e.g., cellular data networks) and/or the Internet.

Information contained within the sighting messages can be used by the central server for providing a number of useful applications and services. Fundamentally, sighting messages report the fact that the wireless identity transmitter is in proximity to the reporting proximity broadcast receiver. Such proximity information has a wide range of applications where proximity is more important than absolute location. Since broadcast messages have a short range, the location of reporting proximity broadcast receivers can be used to provide approximate locations for the detected wireless identity transmitters, which may be useful for a number of applications, such as tracking, search and rescue, geo-fence systems, etc. for example, by leveraging the capabilities of a large number of mobile proximity broadcast receivers (e.g., smartphones) and stationary proximity broadcast receivers to associate received broadcast messages with the current time and receiver locations, the central server can maintain a location track (like a trail of bread crumbs) for wireless identity transmitters. Such a location track may be used to locate or narrow the search for a person, article or equipment on which a wireless identity transmitter is attached. Location tracks may also be used to obtain information regarding the movements of individuals or articles to which wireless identity transmitters are fixed.

In some embodiments, wireless identity transmitters only broadcast at regular intervals, thus providing a one-way communication path with proximity broadcast receivers and servers. In some embodiments, wireless identity transmitters may also receive for a short duration or periodically, such as to receive settings and configuration data from nearby devices.

To protect privacy and prevent unauthorized tracking of particular wireless identity transmitters, identifiers in broadcast messages may be changed (or "rolled") periodically in a manner that is known to the central server but that is difficult for an unauthorized system to predict. In an embodiment, a wireless identity transmitter may roughly synchronize a nonce or counter between the transmitter and a central server to enable the central server to recognize or decode broadcasts of obscured identification information. Payload data within broadcast messages may be encrypted or randomized to prevent unintended interception, with decrypting capability included in the central server to enable it to process payload data received in sighting messages. In an embodiment, the wireless identity transmitter may encrypt identification information and clock, nonce or counter information using secret keys and functions known only to the wireless identity transmitter and the central server. By maintaining a loosely-synced nonce or counter between the central server and the wireless identity transmitter, the central server may compare expected message contents from the wireless identity transmitter based against received messages. If the central server finds a match between stored information and received message data, the central server may extract or otherwise recognize the identity of the wireless identity transmitter broadcasting the received message. Alternatively, the central server may use a stored secret key, device identity, and nonce or counter information with pseudo-random functions to create and compare data with received messages. The central server may avoid brute-force comparisons to identify the wireless identity transmitter of received messages.

Additionally, the central server may identify appropriate data to share with third-parties based on permissions set by users of wireless identity transmitters. For example, the central server may transmit identifying information, or alternatively anonymous data, for use by a third-party application executing on a user's smartphone in response to receiving a sighting message from a proximity broadcast receiver within a retail store.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
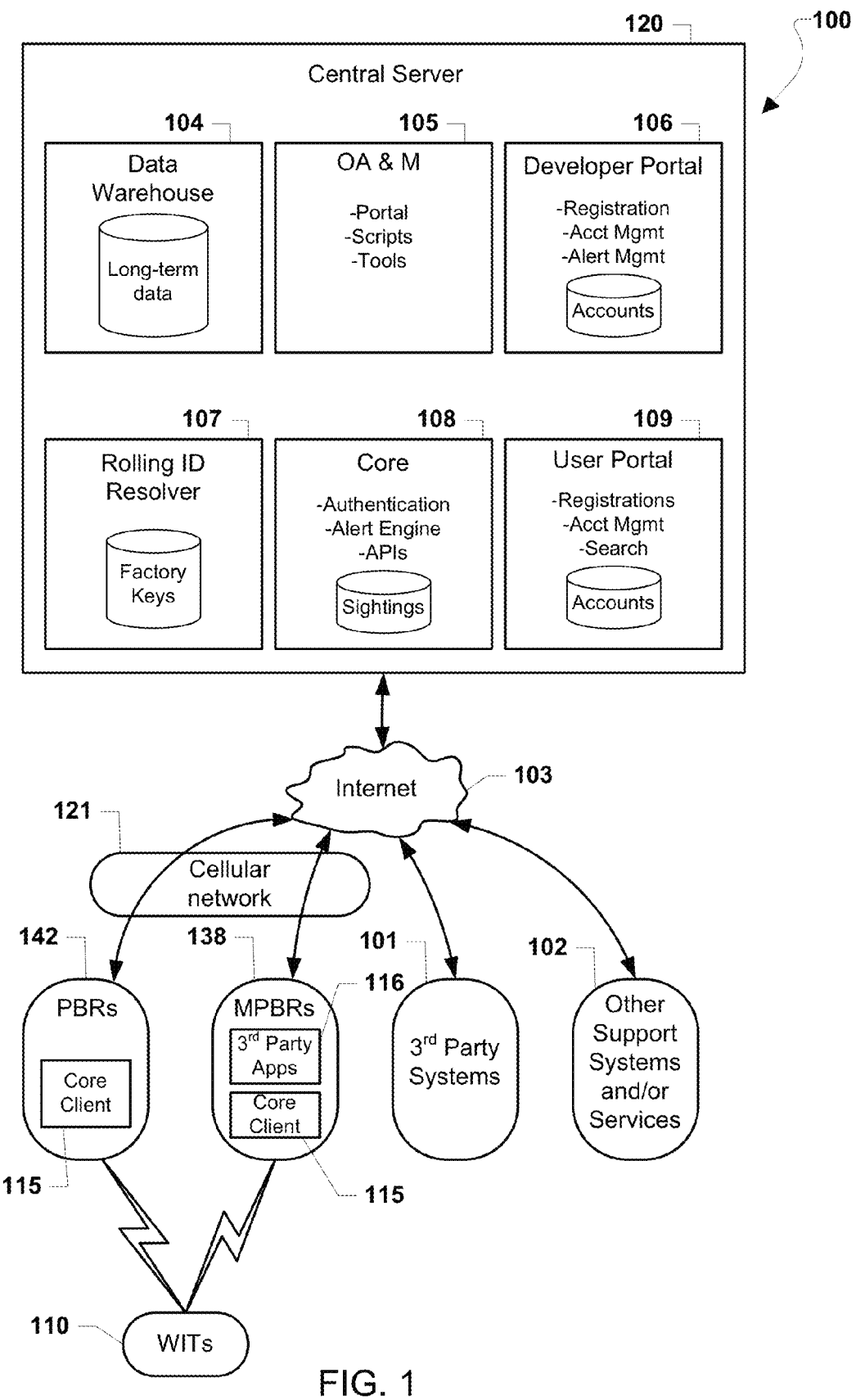
FIG. 1 is a system diagram illustrating network components suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "mobile device" is used herein to refer to any one or all of cellular telephones, smart-phones (e.g., iPhone®), web-pads, tablet computers, Internet enabled cellular telephones, WiFi enabled electronic devices, personal data assistants (PDA's), laptop computers, personal computers, and similar electronic devices equipped with a short-range radio (e.g., a Bluetooth® radio, a Peanut® radio, a WiFi radio, etc.) and a wide area network connection (e.g., an LTE, 3G or 4G wireless wide area network transceiver or a wired connection to the Internet). Reference to a particular type of computing device as being a mobile device is not intended to limit the scope of the claims unless a particular type of mobile device is recited in the claims.

The term "broadcast message" is used herein to refer to short-range wireless broadcast signals broadcast by wireless identity transmitters (defined below) that may include identification information (i.e., identifiers) associated with the wireless identity transmitters and/or their users. Such identifiers may be periodically changed and encrypted (i.e., rolling identifiers) in a manner known to a server. In various embodiments, broadcast messages may include other identifying information, such as Bluetooth® MAC addresses and nonces or counters, which may also be encrypted. Additionally, broadcast messages may include metadata and other data, such as characteristics of the transmitting wireless identity transmitter (e.g., device type), sensor data, and/or commands or other instructions. In various embodiments, broadcast messages may be transmitted via a wireless communication protocol, such as Bluetooth Low Energy, WiFi, WiFi Direct, Zigbee®, Peanut®, and other limited range RF communication protocols. In various embodiments, because of the high unreliability of certain short-range transmission channels, broadcast messages may be single packet transmissions limited to a certain size (e.g., 80 bits, 10 bytes, 20 bytes, etc.). For example, the payload of an embodiment broadcast message may be 80 total bits, including 4 bits that indicate battery status information and 76 bits that indicate a rolling identifier. As another example, an embodiment broadcast message may include 20 bits representing a nonce or counter and 60 bits representing a rolling identifier generated in a manner known to a central server, such as generated based on a unique device ID using a pseudorandom function or an encryption algorithm.

The term "wireless identity transmitter" is used herein to refer to a compact device configured to periodically transmit broadcast messages via a short-range wireless transmitter. Wireless identity transmitters may be mobile, such as when carried or affixed to mobile persons or items, or alternatively may be stationary, such as when installed on fixtures or within buildings. Wireless identity transmitters may store and be associated with a unique device identifier (ID) (i.e., a "deviceID"), such as a factory-assigned ID. In an embodiment, the unique device identifier may be a code that is 56-bits in length. For security purposes, in various embodiments this unique device identifier, along with other data (e.g., nonce or counter values, device battery state, temperature, etc.), may be encoded, encrypted, or otherwise obfuscated when included within broadcast messages. The term "rolling identifier" is used herein to refer to an identifying code, unique to a device or a user of the device, that is periodically change (i.e., "rolled"). The use of a rolling identifier can make it difficult for unauthorized devices to track a particular wireless identity transmitter. Rolling identifier can be created and changed using a variety of encryption and/or encoding techniques. Wireless identity transmitters may be configured to maintain relatively accurate time (e.g., UTC) information, such as by using a 30 ppm 16 kHz crystal oscillator as a clock. Wireless identity transmitters are described throughout the disclosure, in particular with reference to FIGS. 38A-38E. In various figures and diagrams of this disclosure, wireless identity transmitters may be referred to as "WIT" or "WITs".

The terms "proximity broadcast receiver" and "mobile proximity broadcast receivers" are used herein to refer to devices that are configured to receive broadcast messages transmitted by wireless identity transmitters and relay sighting messages or reports to a server. In various embodiments, proximity broadcast receivers may be stationary devices (or "stationary proximity broadcast receivers") permanently positioned throughout places (e.g., buildings, retail stores, etc.) or mobile devices configured to operate as proximity broadcast receivers (or "stationary proximity broadcast receivers"). For example, a smartphone may be configured to receive broadcast messages and operate as a mobile proximity broadcast receiver. Reference to a particular type of computing device as being a proximity broadcast receiver is not intended to limit the scope of the claims unless a particular type of device is recited in the claims. Further, unless otherwise indicated, references to proximity broadcast receivers throughout this disclosure are not intended to limit any method or system to a particular type of proximity broadcast receiver device (e.g., wireless or stationary). Proximity broadcast receivers are described throughout the disclosure, in particular with reference to FIGS. 40A-42C. In various figures and diagrams of this disclosure, proximity broadcast receivers may be referred to as "PBR" or "PBRs," and mobile proximity broadcast receivers are referred to in the figures as "MPBR" or "MPBRs."

The terms "identity transceiver" and "wireless identity transceiver" are used herein to refer to devices that are configured to receive and transmit broadcast messages. In other words, an identity transceiver may function as both a proximity broadcast receiver and an identity transmitter. For example, in addition to receiving broadcast messages from wireless identity transmitters within proximity, a smartphone may be configured to also broadcast short-range signals using its Bluetooth® transceiver that include its unique identifier and thus also function as a wireless identity transmitter. Throughout this disclosure, various operations may be described as being distinctly performed by either a wireless identity transmitter or a proximity broadcast receiver; however, a device configured to operate as an identity transceiver may be configured to perform any or all of the same operations, and thus may be interchangeable with references to either a wireless identity transmitter or a proximity broadcast receiver.

The term "sighting message" is used herein to refer to reports, signals, and/or messages sent by proximity broadcast receivers to a central server in response to receiving broadcast messages from wireless identity transmitters. Sighting messages may be transmissions that include part or all of the information encoded in received broadcast messages, including any obscured or encrypted information, such as identifiers of wireless identity transmitters. Additionally, sighting messages may include metadata and other information (or "associated data"), such as the sending proximity broadcast receivers' identification information (e.g., device ID, third-party affiliations, etc.), whether the proximity broadcast receiver paired with a wireless identity transmitter, transmissions context information (e.g., a code indicating the sighting message is related to an alert or a registered service), information regarding software or applications executing on proximity broadcast receivers (e.g., app IDs), location information, proximity information with respect to known areas within a place, and timestamp data. In an embodiment, sighting messages may also include authentication information (e.g., secret keys, passes, special codes, digital certificates, etc.) that may be used by a central server to confirm the identification (or identification information) of proximity broadcast receivers transmitting the sighting messages. For example, a sighting message may include a code from a hash function that can be decoded by the central server to ensure the sending proximity broadcast receiver is associated with a particular registered service. In various embodiments, sighting messages may be sent immediately after receipt of broadcasts (e.g., when related to an alert), buffered, or scheduled along with other scheduled transmissions.

The terms "permissions" or "permissions settings" are used herein to refer to information that indicates whether users of wireless identity transmitters (or transceivers) authorize to have their identity provided to third-parties associated with a central server, such as merchants registered to receive notifications of user activity. Permissions may be set, provided, or otherwise indicated by users when they register a device (e.g., a wireless identity transmitter) with the central server. Permissions may have several values that indicate various privacy levels or authorizations regarding the disclosure of user identification information to third-parties. For example, a user may set permissions that indicate he/she is willing to receive marketing information from merchants, or alternatively, may set permissions to indicate the user should be anonymous.

The various embodiments provide methods, devices, and systems for recognizing proximity of, locating or tracking a wireless identity transmitter via short-range wireless broadcasts that may be received by proximity broadcast receivers, such as cell phones, mobile devices, or stationary proximity broadcast receivers, which communicate sighting messages to one or more central servers. In the various embodiments, a wireless identity transmitter may be a compact device configured to transmit a packet with an identification code in a format that can be received by any proximity broadcast receiver within range of the short-range wireless broadcast. Since the wireless identity transmitter relies on relatively short-range wireless signaling (e.g., short-range radio signals, Bluetooth Low Energy packets or signals, light signals, sound signals, etc.) to transmit broadcast messages that include its identifier, only proximity broadcast receivers within proximity of the transmitter may receive such broadcast messages. Thus, a proximity broadcast receiver's own location may provide an approximate location for the wireless identity transmitter at the time of receipt of a broadcast message. Each proximity broadcast receiver receiving a broadcast message from a wireless identity transmitter may pass information, such as by transmitting sighting messages including wireless identity transmitter identifiers, to a central server for processing. The central server may decode encrypted or obscured information (e.g., rolling identifiers) within received sighting messages.

The proximity broadcast receivers, in particular mobile proximity broadcast receivers (e.g., smartphones, etc.), may be configured with processor-executable software instructions, such as an application that users may download or that may be incorporated in the device by the manufacturer. By configuring many mobile devices with such an application, a wide spread network of proximity broadcast receivers may be deployed for little or no cost, taking advantage of the popularity of smartphones. Also, stationary proximity broadcast receivers may be deployed in strategic locations, such as on street lights or on commercial vehicles, to supplement the network of smartphones. In an embodiment, the proximity broadcast receivers may be configured with application software to be activated by the central server to listen for transmissions from wireless identity transmitters within particular sectors or locations, and to promptly report to the central server any receptions of device identifiers/identification codes within the designated sectors, such as by transmitting sighting messages that identify the wireless identity transmitter's identifier along with the location (e.g., GPS coordinates) of the proximity broadcast receiver.

In an embodiment, proximity broadcast receivers may transmit sighting messages to a central server that include part or all of the information encoded in received broadcast messages, including any rolling, obscured, or encrypted information related to wireless identity transmitters. In various embodiments, sighting messages may be sent immediately after receipt of broadcast message (e.g., when related to an alert), buffered, scheduled along with other scheduled transmissions, or otherwise based on characteristics of broadcast message. Sighting messages may utilize metadata, header information, or other encodings to indicate various reported data. For example, a sighting message may contain metadata that includes a code for a particular merchant, and may therefore indicate that the sighting message was transmitted by a proximity broadcast receiver within the merchant's store. As another example, a sighting message may contain metadata that includes a code indicating a user's smartphone and therefore the proximity broadcast receiver may be a mobile proximity broadcast receiver belonging to the user.

In an embodiment, the central server may transmit alerts (or search activation messages) to the network of proximity broadcast receivers to listen for broadcast messages including a particular device identifier within particular sectors or locations, and to promptly report any reception events.

In various embodiments, companies, organization and institutions (e.g., schools, stores, parks, airports, shopping malls, office buildings, etc.) may deploy stationary proximity broadcast receivers to receive and relay broadcast messages from users' wireless identity transmitters. Alternatively, places may deploy stationary wireless identity transmitters and users' mobile proximity broadcast receivers may receive and relay broadcast messages. In further embodiments, places may employ both proximity broadcast receivers and wireless identity transmitters to receive, relay, and process data from both users carrying wireless identity transmitters and/or mobile proximity broadcast receivers. Regardless of the source of broadcast messages, the central server (or a local computing device) may determine approximate proximities between a proximity broadcast receiver and a wireless identity transmitter based on received sighting messages.

Additionally, based on identification of the proximity broadcast receiver and the wireless identity transmitter related to a received sighting message, the central server may be configured to determine which device is related to a registered service (e.g., a retail store) and which is related to a user (e.g., a user). The term "registered service" may be used herein to refer to a party or service that is registered, authenticated, valid, or otherwise known to a central server and that may be related with sighting messages. Registered services may include merchants, retailers, services, stores (e.g., big-box retailers, local coffee shops, etc.), and various other third-parties that are registered with the central server. Registered services may also include known routines, actions, or services managed by the central server, such as particular searches or active alerts, or alternatively applications that may be executing on a mobile device (e.g., a third-party app). In an embodiment, registered services may further include any third-parties that have registered as developers with the central server. For example, a registered service may correspond to a merchant that has registered proximity broadcast receivers with the central server. In an embodiment, registered users (e.g., users) employing mobile proximity broadcast receivers that transmit sighting messages in response to receiving broadcast messages from others' wireless identity transmitters (e.g., a merchant's stationary identity transmitter positioned within a retail store) may also be considered registered services by the central server.

For illustration purposes, a mobile proximity broadcast receiver (e.g., a smartphone configured to operate as a proximity broadcast receiver) carried by a user waiting in the check-out line may receive a broadcast message from a wireless identity transmitter positioned on top of the cash register point-of-sale device within the retail store and may transmit a sighting message to the central server. Upon receive of the sighting message, the central server may determine that the wireless identity transmitter belongs to the retail store based on the profile that corresponds to a rolling identifier and that the mobile proximity broadcast receiver is associated with a user profile based on an identifier of the proximity broadcast receiver included within metadata in the sighting message. From this information, the central server may transmit marketing information to the user.

In various embodiments, a wireless identity transmitter may be configured to periodically generate data (referred to as a rolling identifier) that may be decoded by a central server to reveal the unique device identifier and other identifying information of the wireless identity transmitter. For example, a wireless identity transmitter may be configured to periodically broadcast a Bluetooth packet including an encoded version of the wireless identity transmitter's device identifier (i.e., deviceID). Such encryption of identifiers indicated in broadcast messages may be required to enable the central server to reliably identify the wireless identity transmitter that sent the broadcast message while forcing a third-party (e.g., passive attacker) to determine the origin of the broadcast message by guessing. For example, if the identifier was static, the third party could sniff the identifier, such as by impersonating a proximity broadcast receiver, and then use the identifier to track the wireless identity transmitter. Rolling identifiers may make such an attack impossible if the third party lacks the means of generating the encrypted identifiers.

Since a single packet broadcast message may not support a payload that can fit a cipher text of a conventional asymmetric key encryption, standard private/public key pair encryption may not be useable in the various embodiments. Additionally, wireless identity transmitters are generally broadcast-only devices, so there is no back channel that is typically required in conventional encryption schemes. Therefore, the central server in various embodiments may process encrypted message payloads by pre-provisioning a shared secret key unique to each wireless identity transmitter. Such secret keys may be associated with each wireless identity transmitter's unique device identifier at the central server and may be used to decode data (e.g., identifiers) encoded by the each wireless identity transmitter.

Performing an embodiment method, a wireless identity transmitter may use a streaming-like encryption algorithm (e.g., AES-CTR) to encrypt its device identifier, shared secret key, and a nonce or counter, broadcasting a payload that includes the encrypted data with and the nonce or counter in the clear. Performing another embodiment method, a wireless identity transmitter may use a pseudo-random function to encrypt the device identifier, shared secret key, and a nonce or counter, broadcasting a payload that includes the encrypted data without the nonce or counter in the clear. Performing another embodiment method, a wireless identity transmitter may use a combination of a streaming-like encryption and pseudo-random function encryption to generate a payload to broadcast. In an embodiment, the wireless identity transmitter and the central server may each have a cryptographically secure pseudo-random number generator or algorithm that is used to generate identifiers on a common time scale so that any given moment, the central server can calculate the identifier being transmitted by a particular wireless identity transmitter.

In various embodiments, the wireless identity transmitter may maintain a nonce or counter (or clock data) that periodically increments to represent the passage of time and that may be used in various encryption methods. When the wireless identity transmitter is powered on (or the battery is replaced), the nonce or counter may be set to a known initial value, such as 0. As the wireless identity transmitter functions, the nonce or counter may increase periodically (e.g., increment by one every several seconds/minutes/hours). If the wireless identity transmitter encounters inconsistent power (e.g., the battery is taken out or replaced), the nonce or counter may reset. Using such a nonce or counter, a wireless identity transmitter may be configured to periodically broadcast messages with encrypted payloads that include changing and encrypted device identification. In an embodiment, an encrypted payload may contain a concatenation of the device's unique identifier (i.e., the deviceID) and a current nonce or counter value for that wireless identity transmitter. In an embodiment, the wireless identity transmitter may encrypt the concatenated data using a secret key. Payloads may be broadcast at varying frequencies and may be received by proximity broadcast receivers or a central server for processing.

In an embodiment, the central server may be configured to identify wireless identity transmitters by matching received encrypted payloads with pre-generated payloads (or model payloads) corresponding to registered wireless identity transmitters. Based on information obtained during registration operations between the central server and wireless identity transmitters, the central server may store unique information about each wireless identity transmitter. For example, the central server may know the secret key, device identifier (or deviceID), and initial nonce or counter value of a wireless identity transmitter based on registration communications. Using such stored information, the central server may generate a series of model payloads that the wireless identity transmitter is expected (or likely) to broadcast within a time period, such as a 24-hour period. If the central server receives a payload that matches any of these model payloads, the central server may determine the identity of the originating wireless identity transmitter, as well as a loosely-accurate nonce or counter value within the wireless identity transmitter. Model payloads may be generated based off of a current, synched nonce or counter for each registered wireless identity transmitter (i.e., current model payloads). In an embodiment, the central server may also adjust for wireless identity transmitter clock skew by keeping a window of model payloads. For example, the central server may generate payloads using nonce or counter values representing times before and after an expected nonce or counter. The central server may also determine the period of the wireless identity transmitter clock by monitoring the change in the received payloads over time. In an embodiment, the central server may track changes of the reported nonce or counter values of a wireless identity transmitter and may report how inaccurate a device clock is for a particular period of time.

Model payloads may also be generated based off of initial nonce or counter values reported by each registered wireless identity transmitter during registration operations (i.e., initial model payloads). When a wireless identity transmitter is powered off and on again (e.g., rest, battery replaced, etc.), the wireless identity transmitter may reset to the original or initial nonce or counter value. If an encrypted payload received at the central server does not match any current model payload, the central server may compare the received encrypted payload to stored initial model payloads. When the central server finds an initial model payload matches the received encrypted payload (e.g., the wireless identity transmitter was reset), the central server may update a database to indicate the corresponding wireless identity transmitter's nonce or counter was reset, thus resynchronizing with the reset wireless identity transmitter's clock.

In a situation in which a wireless identity transmitter pauses for a period of time but does not reset its nonce or counter used for generating encrypted payloads, payloads subsequently generated by the wireless identity transmitter may not match expected payloads stored in the central server (e.g., current model payloads and initial model payloads). To address this situation, the central server may determine that a pause occurred when model payloads and/or nonce or counter values do not match a received encrypted payload. The central server may identify the wireless identity transmitter by performing a brute-force search of all known and/or registered wireless identity transmitters represented in a database and decode the received encrypted payload based on recorded secret keys and device identifications. In an embodiment, the brute-force search may include only wireless identity transmitters that have not broadcast payloads recently received by the central server.

For the purposes of this disclosure, the various embodiment methods for decoding, decrypting, and otherwise accessing obscured identification information (e.g., rolling identifiers) are described as being performed by a central server to associate such information with registered users and/or registered devices. However, those skilled in the art should appreciate that any computing device with authorization may be configured to perform such operations to decipher obscured identification information broadcast by wireless identity transmitters. For example, a mobile proximity broadcast receiver (e.g., a smartphone) employed by a user may utilize the various methods for decrypting, decoding, and otherwise accessing rolling identifiers that are associated with wireless identity transmitters also owned by that user.

Additional precautions may be important to protect against security breaches, such as hacker attacks against databases associated with a central server, as well as to provide registered users (e.g., merchants, parents, children, etc.) peace of mind and confidence their privacy may be fully protected. Such privacy safeguards may be provided to parties registered with embodiment systems by storing identifying information (e.g., names, addresses, financial information, medical information, etc.) separately from other information related to tracking devices and/or proximity information of users. In particular, to avoid unintended leaking of personal information of registered merchants, customers, children, or individuals, embodiment systems may utilize "double-blind" architectures. For example, such a double-blind architecture may use a first unit (e.g., a server, database, or other computing hub) that stores and has access to information related to the proximity information or other location-based data of registered users' devices (e.g., wireless identity transmitters, proximity broadcast receivers, identity transceivers, mobile devices, etc.). In other words, the first unit may access information associated with sighting messages that indicate approximate locations/proximities of various users' devices. However, the first unit may not store uniquely identifying personal information, such as user names, addresses, and/or social security numbers. Instead, a second unit may store the identifying personal information without being configured to access any location/proximity information as used by the first unit. The first and second units may use anonymous identifiers that connect data stored within the two units without indicating the protected information stored in either unit. In an embodiment, the first and second units may be maintained by separate entities (e.g., service providers), and further, at least one of such entities may be trusted by registered users who provide identifying information.

In a further embodiment, wireless identity transmitters may be configured to receive incoming transmissions from certain transmitters under limited circumstances, such as to permit initial configuration and/or over-the-air updates. Incoming transmissions may include firmware updates or upgrades, software instructions, configuration information, and other data to adjust the behavior of the wireless identity transmitters. Wireless identity transmitters may be configured (or scheduled) to selectively receive incoming transmissions based on clock signals, user input data (e.g., button press), or received signals. For example, a trigger signal received from a proximity broadcast receiver may instruct a wireless identity transmitter to activate its receiver for receiving subsequent messages. In particular, wireless identity transmitters may be configured to receive configuration settings from proximate devices (e.g., proximity broadcast receivers configured to transmit configuration setting values). Such configuration settings may set parameters that vary how often and/or with what transmit power identifiers are broadcast by the wireless identity transmitter.

The various embodiments may leverage a large infrastructure of mobile devices already in place. Many modern mobile devices, such as smartphones, are already equipped with multiple radios, including short-range radios such as Bluetooth® radios, and therefore may be configured to perform as mobile proximity broadcast receivers and receive identification codes from a proximate wireless identity transmitter. Mobile devices are also often equipped with a clock that may provide a current time and a GPS receiver that may provide a current location whenever a wireless identity transmitter identifier is received. The mobile devices may communicate these identification codes, times, and locations via sighting messages to central servers through longer range network connections, such as a cellular radio connection. Thus, many of the large number of mobile devices already in use or soon to be in use may be incorporated as mobile proximity broadcast receivers to extend the reach of various embodiment systems.

By relying on the long range radios and other services of proximity broadcast receivers to report the location and time of received broadcast message (or "sightings") to a central server, wireless identity transmitters can be relatively small, inexpensive, and simple devices, including little more than a short-range radio, such as a Bluetooth® LE transceiver, and a battery. In various embodiments, wireless identity transmitters may also include additional short-range radios, such as Peanut® radios. In various embodiments, the wireless identity transmitters may not include a user interface, multiple radios, global positioning system (GPS) receiver, or other features common on mobile devices. Embodiment wireless identity transmitters may also consume very little power allowing them to be deployed without needing to be frequently recharged or replaced. These characteristics make them ideal for a wide variety of uses and implementation in a variety of physical configurations. For example, wireless identity transmitters may be easily hidden or incorporated into many different personal objects, such as buttons, watches, shoes, briefcases, backpacks, ID badges, clothing, product packaging, etc.

Embodiment methods, devices, and systems may be used for a wide range of purposes. In some embodiments, wireless identity transmitters may be used as low-cost individual identifiers, that can be used for a variety of commercial marketing and authentication applications. Other embodiments may be used to track missing children, mental patients, pets, Alzheimer patients, victims of natural disasters and the first responders who try to rescue them, etc. Further embodiments may be installed on high-value property for tracking such property in logistics systems, monitoring boundary area transits (e.g., into/out of construction sites, and tracking whether the property is ever stolen or reported missing. Embodiments may also be use for monitoring people entering and leaving a controlled area. Various embodiments may assist or complement the Amber Alert system or provide information to police officers. Embodiments may also provide valuable information to private persons or business entities.

Wireless identity transmitters may also serve to communicate information (e.g., sensor data) or prompt proximity broadcast receivers to take particular actions. In some embodiments, wireless identity transmitters may transmit broadcast messages that indicate one or more behaviors to be performed by a proximity broadcast receiver, such as a mobile phone, in which case the broadcast message may also include a secondary segment corresponding to a command (i.e., a command identifier) or the type of the wireless identity transmitter (i.e., a device type identifier or device type information). Proximity broadcast receivers receiving the broadcast message may take an action based on the identification or secondary code. Alternately, the proximity broadcast receivers may transmit the received broadcast message to the central server, which may return instructions or another code to the proximity broadcast receiver to indicate a behavior to be performed.

In further embodiments, wireless identity transmitters may operate as part of a proximity-based content distribution system. In such embodiments, the behavior indicated by the packets broadcast by wireless identity transmitter may be accessing content available via the long-range communication network, such as opening a particular web page or other online resource via a cellular wireless data link to the Internet. The wireless identity transmitter may be associated with content by the owner of the device. In this manner, mobile phones configured with the proper application (i.e., mobile proximity broadcast receivers) that come within range of a wireless identity transmitter may automatically access the content designated by the owner of the wireless identity transmitter.

In various embodiments, proximity information obtained from receiving broadcasts of wireless identity transmitters by proximity broadcast receivers may be combined with the location reported by proximity broadcast receiver to estimate the location of wireless identity transmitters. Further embodiments in signaling, such as alternating signal strengths within broadcasts transmitted over a period of time (or cycle), may enable the central server or the proximity broadcast receivers themselves to determine the proximity broadcast receiver closest to the wireless identity transmitter. In other words, a server may determine the proximity broadcast receiver among a plurality of proximity broadcast receivers that is closest to a wireless identity transmitter. When the proximity broadcast receivers are on equipment, such as a row of exercise equipment, determining the proximity broadcast receiver that is closest to a transmitter possessed by a user may enable a server to determine the particular piece of equipment that the user is most likely attempting to use.

In various embodiments, permissions information may be stored by a central server. Permissions settings may be provided by users at the time of registering devices associated with services or devices (e.g., wireless identity transmitters, proximity broadcast receivers, etc.) associated with or managed by the central server. Such permissions may be used to enable or prohibit the central server from providing personal information to third-parties, such as third-party applications executing on a user's smartphone and/or third-party devices (e.g., merchant proximity broadcast receivers). In an embodiment, anonymous personalization of equipment connected to proximity broadcast receivers may be enabled based on sighting messages from proximity broadcast receivers. Proximity broadcast receivers may relay broadcast messages as sighting messages to the central server, which may identify wireless identity transmitters and return data or other information to the proximity broadcast receivers without disclosing the identities of the wireless identity transmitters. With this anonymous data, proximity broadcast receivers may personalize equipment or services to suit users of wireless identity transmitters. Alternatively, the central server may return the identification information to the proximity broadcast receivers based on stored permissions. In another embodiment, the central server may store and manage configuration data, software instructions, and other proprietary information for facilities associated with the proximity broadcast receivers.

In another embodiment, proximity broadcast receivers may be used to track wireless identity transmitters while associated items, assets, or people are within particular areas. For example, proximity broadcast receivers may be deployed in amusement parks, parks, ski lodges, events, resorts, and spas to track the locations of guests carrying wireless identity transmitters. Groups of wireless identity transmitters may be associated together and may be tracked to determine whether individual wireless identity transmitters leave a particular area without the others, go into out-of-bounds locations (e.g., employees only), show up at particular locations (e.g., a ride or concession), etc. In an embodiment, a particular area or place may track guests by placing proximity broadcast receivers so their reception ranges cover the entire area (e.g., at entrance gates, at access panels, in buildings, etc.), and providing wireless identity transmitters to all entering guests, similar to entrance tickets. For example, at a ski lodge, guests may be provided wireless identity transmitters as part of, along with or in place of lift tickets. The place may track the location of place's assets, such as equipment, merchandise, mascots, and personnel, using similar wireless identity transmitters. In an embodiment, an attraction, amusement park, or other place may sell, offer quick response (QR) codes for software downloads, or otherwise provide proximity broadcast receivers and/or proximity broadcast receiver software to guests so that the guests may use the wireless identity transmitters outside of the amusement park. In an embodiment, a cruise ship may track wireless identity transmitters associated with guests and may utilize a special on-board server and communication network for communicating with proximity broadcast receivers.

In further embodiments, wireless identity transmitters may be used to track items and indicate when assets leave or enter the presence (or proximity) of a proximity broadcast receiver. For example, a personal geofence may be established around a proximity broadcast receiver carried by a user, so that alerts or reminder messages may be transmitted when associated wireless identity transmitters leave or enter the reception range of the proximity broadcast receiver. Such indications of wireless identity transmitter proximity may act like a leash and may be useful for tracking children, luggage, wallets or purses, cars in a parking lot, etc. In another embodiment, the chain of custody of wireless identity transmitters may be determined and recorded within a central server based on determining proximate proximity broadcast receivers and/or input data confirming when tracked items are removed from the reception range of proximity broadcast receivers.

In various embodiments, merchants may employ proximity broadcast receivers and wireless identity transmitters to provide coupons and other customer incentives to consumers. For example, merchants may deploy proximity broadcast receivers in stores that detect broadcast messages from customers' wireless identity transmitters and generate coupons based on previous purchase history or loyalty programs. Also, proximity broadcast receivers may receive broadcast messages and receive identification confirmation (e.g., photos, signature samples, confirmation messages from a server) of customers conducting transactions.

In further embodiments, wireless identity transmitters and proximity broadcast receivers may be configured to exchange transmissions using various wireless technologies, such as LTE-D, peer-to-peer LTE-D, WiFi, and WiFi Direct. In an embodiment, wireless identity transmitters may be configured to broadcast messages via a WiFi radio such that proximity broadcast receivers with WiFi transceivers may receive the broadcast messages. In such embodiments, wireless identity transmitters may utilize WiFi transmissions to broadcast identification information similar to WiFi access point broadcast advertisements. For example, a wireless identity transmitter including a WiFi radio may be configured to transmit broadcast messages via WiFi transmissions with low power so that the reception range is limited, thereby providing a short-range radio signal with a range similar to that of Bluetooth LE transmissions. In utilizing various wireless broadcast technologies and communication protocols with wireless identity transmitters, proximity broadcast receivers with limited capabilities may still be capable of receiving and processing broadcast messages from wireless identity transmitters. For example, a smartphone configured to operate as a mobile proximity broadcast receiver and including a WiFi transceiver but not a Bluetooth LE radio may receive and process broadcast messages from a wireless identity transmitter configured to broadcast short-range signals with a WiFi radio. In an embodiment, wireless identity transmitters may broadcast over multiple radios, such as a Bluetooth LE transceiver and a low-power WiFi transceiver, in order to enable more models of proximity broadcast receivers (e.g., more types of smartphones) to receive and relay sightings.

Wireless identity transmitters and proximity broadcast receivers are described throughout this disclosure as exchanging short-range wireless signals that include short-range RF signals, such as Bluetooth, Bluetooth Low Energy, Peanut, Zigbee, etc. However, such short-range wireless signals are not limited to short-range RF signals, and wireless identity transmitters may broadcast messages using other forms of wireless signaling, such as infrared light, visible light, vibration, heat, inaudible sound, and audible sound, as well as combinations of radio frequency (RF) signals and non-RF signals. For example, wireless identity transmitters may emit heat signals, such as infrared light, using infrared light-emitting diodes or other components capable of emitting infrared radiation. Additionally, wireless identity transmitters may emit vibration signals using vibration motors and other mechanical components capable of generating controlled vibrations. Wireless identity transmitters may also emit light signals from a number of common emitters, such as light emitting diodes, incandescent lights and projectors. Light signals may be received by light sensors (e.g., cameras) on proximity broadcast receivers, and may include visuals, such as lights, colors, and imagery (e.g., photos, projections, videos, symbols, etc.). Wireless identity transmitters may also or alternatively emit audible or inaudible (i.e., infrasonic or ultrasonic) sound signals from a speaker (e.g., a piezoelectric speaker). Sound signals may be received by a microphone of the proximity broadcast receivers, and may include a variety of sounds, such as beeps, voices, noise, clicks, ultrasounds, tones, and musical notes.

Wireless identity transmitters may be configured to broadcast the various short-range wireless signals in particular sequences, patterns, manners, durations, or manifestations such that proximity broadcast receivers may convert the signals into data in a manner similar to how RF signals (e.g., Bluetooth LE signals) are interpreted in embodiments described herein. For example, a wireless identity transmitter may broadcast particular sequences of modulating visible or sound signals, such as strings of differing musical notes, changing images, or flashing lights that a proximity broadcast receiver may receive and convert into data that includes an identity of the wireless identity transmitter. In an embodiment, proximity broadcast receivers may convert such wireless signals into data (and vice versa) based on matching sequences of signals with patterns within predefined protocols. As an illustrative example, a wireless identity transmitter affixed to the outside of a child's clothing may periodically emit a sequence of flashes using an embedded light source (e.g., an LED bulb) that may be received, converted to data, and relayed by a proximity broadcast receiver to a central server for determining identification information related to the child. As another example, a wireless identity transmitter within a business establishment may be mounted on the ceiling and may periodically emit a sequence of flashes using an embedded light source that may be received, converted to data, and relayed by a proximity broadcast receiver to a central server to obtain coupons, announcements or customer-incentives tied to the customer being on the premises.

In another embodiment, to assist in the disambiguation of multiple proximate receivers or transmitters within an area, wireless identity transmitters may be configured to broadcast signals in sequences or patterns of varying signal strengths. For example, a wireless identity transmitter may broadcast signals with a high signal strength and may periodically transmit signals with a low signal strength. Since signals transmitted with a low signal strength will have a shorter reception range than the signals transmitted with high signal strength, a proximity broadcast receiver receiving the low signal strength signals may be necessarily closer to the wireless identity transmitter. Using this additional information, a central server receiving sighting messages from a plurality of proximity broadcast receivers may estimate the location or proximity of the wireless identity transmitter more quickly and/or more accurately.

In various embodiments, proximity broadcast receivers may be configured to be plugged into telephone or Ethernet jacks, and may include dial-up modems or other networking adaptors to enable communicating with a central server via conventional telephone or network communications as well as be powered by these jacks (like a conventional telephone is). Additionally, proximity broadcast receivers may be integrated into other types of devices, such as wireless chargers, electric cars, and vehicles, such as delivery vehicles.

In other embodiments, wireless identity transmitters may include sensors that generate sensor data that may be encoded in broadcast messages. Such sensors data may include microphones, cameras, pressure sensors, heat sensors, accelerometers, humidity sensors, temperature sensors, $CO_2$ sensors, etc. Data from such sensors may be used or stored by proximity broadcast receivers or a central server receiving the data via sighting messages from proximity broadcast receivers.

The various embodiment methods may determine wireless identity transmitters are within proximity of proximity broadcast receivers, and vice versa, based on the receipt of short-range wireless broadcast messages. Further, embodiments may not require determining exact locations for wireless identity transmitters and/or proximity broadcast receivers but instead may determine approximate and/or relative locations of devices between each other. Accordingly, references to determining location and/or distance throughout the disclosure may be for the purpose of determining proximity between signaling devices.

FIG. 1 illustrates a communication system 100 that may be used in various embodiments. In general, a central server 120 may be configured to receive, store, and otherwise process data corresponding to wireless identity transmitters 110. The central server 120 may be configured to exchange communications with various devices via the Internet 103, such as proximity broadcast receivers 142, mobile proximity broadcast receivers 138, third-party systems 101, and other support systems and/or services 102. The wireless identity transmitters (WITs) 110 may broadcast messages that may be received by nearby proximity broadcast receivers 142 and/or the mobile proximity broadcast receivers (MPBRs) 138 via short-range wireless signals. The proximity broadcast receivers 142, 138 may utilize long-range communications to relay received broadcast messages as sighting messages to the central server 120 via the Internet 103. For example, the proximity broadcast receivers 142 and mobile proximity broadcast receivers may utilize a cellular network 121 to transmit sighting messages to the central server 120.

The third-party systems 101 may include merchant servers, retail store computing devices, computing devices associated with emergency services. The other support systems and/or services 102 may include computing devices associated with various technologies, such as computing devices utilized by users to provide registration information, systems that deliver user-relevant content (e.g., Qualcomm Gimbal™), and services that provide location-specific information (e.g., Qualcomm IZat™).

The central server 120 may include several components 104-109 to perform various operations to process data, such as received from proximity broadcast receivers 142, 138, third-party systems 101, or other support systems and/or services 102. In particular, the central server 120 may include a data warehouse component 104 that may store long-term data (e.g., archived user data, past location information, etc.). The central server 120 may also include an operations, administration and management (or OA & M) component 105 that may manage, process and/or store software associated with user portal accesses, scripts, tools (e.g., software utilities, routines, etc.), and any other elements for administering the central server 120. The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The central server 120 may also include a user portal component 109 that may store user account data and perform registration, account management, and search routines associated with users, such as persons associated with wireless identity transmitters 110. The central server 120 may also include a core component 108 that may process sighting messages, execute an alert or notice engine module, handle application programming interface (API) commands, and exchange data with other components within the central server 120. The core component 108 is described below with reference to FIG. 20.

In various embodiments, the components 104-109 may be enabled by computing devices, servers, software, and/or circuitry that is included within, connected to, or otherwise associated with the central server 120. For example, the core component 108 may be a server blade or computing unit included within the central server 120. As another example, the data warehouse component 104 may be a remote cloud storage device that the central server 120 communicates with via Internet protocols.

In an embodiment, the proximity broadcast receivers 142 and mobile proximity broadcast receivers 138 may be configured to execute a core client module 115 that may be software, instructions, routines, applications, operations, or other circuitry that enable the proximity broadcast receivers 142, 138 to process received broadcast messages from proximate wireless identity transmitters 110. The core client module 115 may also handle communications between the proximity broadcast receivers 142, 138 and the central server 120, such as transmitting sighting messages and receiving return messages from the central server 120.

Further, the mobile proximity broadcast receivers 138 may be configured to execute third-party applications module 116 that may related to performing software instructions, routines, applications, or other operations provided by various third-parties (e.g., merchant apps). In an embodiment, when configured as registered services with the central server 120, the third-party applications module 116 may receive various data from the core client module 115. For example, a third-party application that is registered with the central server 120 may be configured to receive notifications from the core client module 115 when the user of the mobile proximity broadcast receiver 138 enters, remains, and/or leaves a particular place (e.g., a geofence, a retail store, etc.).

In another embodiment, the mobile proximity broadcast receivers 138 may be configured to receive and transmit broadcast messages and may also be referred to as "wireless identity transceivers." For example, a user may employ a smartphone that is configured to receive broadcast messages from nearby wireless identity transmitters 110 as well as broadcast signals that include identifying information associated with the user.

Figure 2:
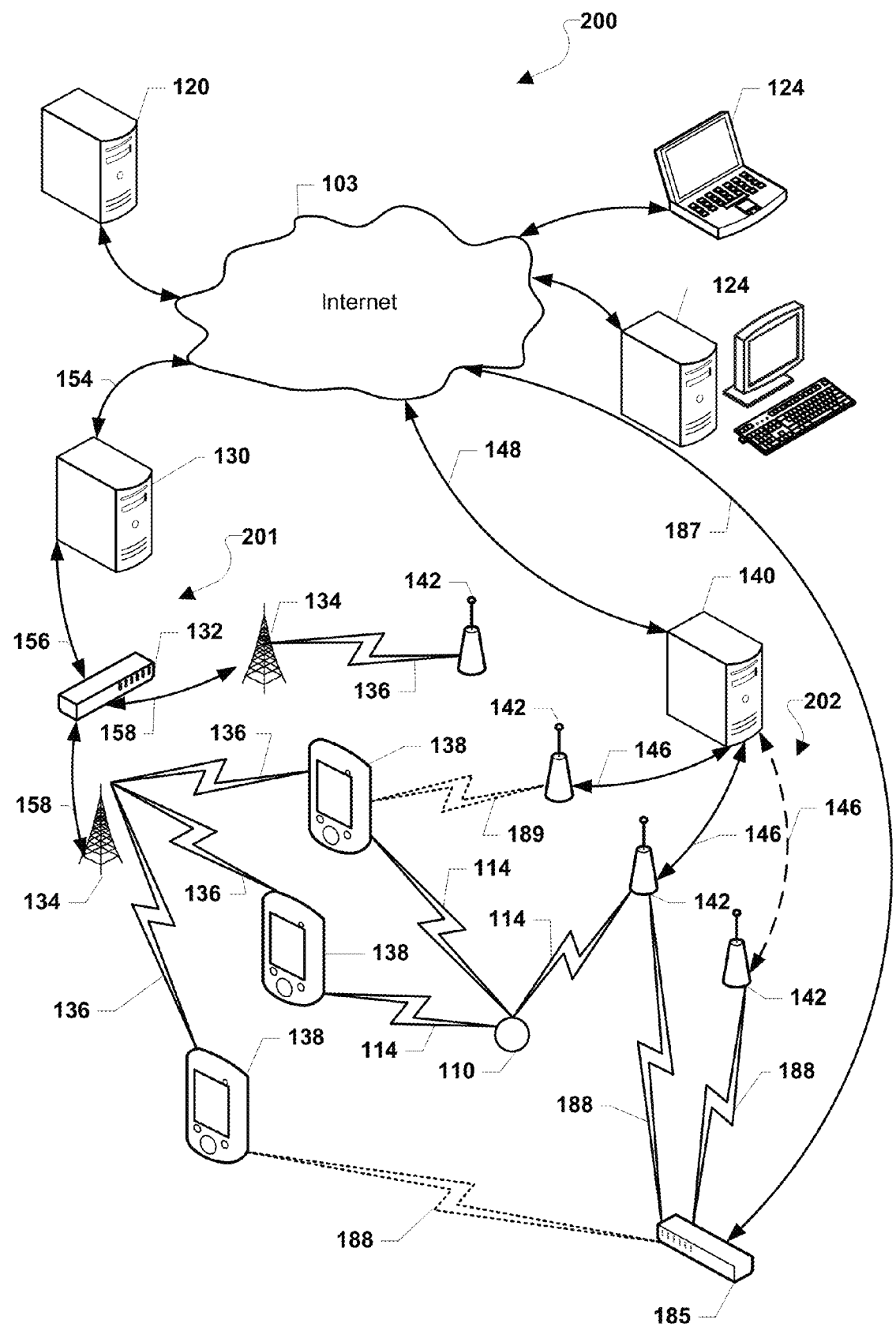
FIG. 2 is communication system diagram illustrating network components of embodiment architectures suitable for use in various embodiments.

FIG. 2 illustrates an exemplary communication system 200 that may be used in various embodiments. The communication system 200 effectively enables wireless identity transmitters 110 (e.g., Bluetooth® LE transmitters) to transmit broadcast messages that include identification information to the central server 120 via a plurality of mobile proximity broadcast receivers 138 and/or stationary proximity broadcast receivers 142, without the need to negotiate a direct communication link. Such broadcast messages may be collected automatically by any proximity broadcast receiver within proximity (or broadcast range) of wireless identity transmitters. For example, a mobile proximity broadcast receiver 138 within a certain proximity may receive a broadcast message transmitted by a Bluetooth® radio within the wireless identity transmitter 110.

The communication system 200 may include a wireless identity transmitter 110. The wireless identity transmitter 110 may be coupled with various objects. For example, it may be embedded in a bracelet. The wireless identity transmitter 110 may transmit a short-range wireless signal 114, such as a broadcast message as described above. For example, this short-range wireless signal 114 may be a periodic broadcast of a packet, which includes the wireless identity transmitter's identification code. The short-range wireless signal 114 may be received by proximate proximity broadcast receivers, such as stationary proximity broadcast receivers 142 and/or mobile proximity broadcast receivers 138.

The short-range wireless signal 114 may be according to any of a variety of communication protocols, such as Bluetooth®, Bluetooth LE®, Wi-Fi, infrared wireless, induction wireless, ultra-wideband (UWB), wireless universal serial bus (USB), Zigbee®, Peanut®, or other short-range wireless technologies or protocols which have or which can be modified (e.g., by restricting transmit power) to limit their effective communication range to relatively short range (e.g., within about 100 meters). In some embodiments, the wireless identity transmitter 110 may use the low energy technology standardized in the Bluetooth® 4.0 protocol (or later versions). For example, in some embodiment systems a wireless identity transmitter 110 may periodically broadcast identification packets configured as an advertiser as described in the Bluetooth® 4.0 protocol, and proximate proximity broadcast receivers 142, 138 may be configured to act as scanners according to that protocol.

The Bluetooth® protocol and Bluetooth® devices (e.g., Bluetooth LE devices) have a relatively short effective communication range, are widely used in deployed communication and computing devices, have standard advertising or pairing procedures that meets the discovery and reporting needs of various embodiments, and exhibit low power consumption, which make the protocol ideal for many applications of the various embodiments. For this reason, Bluetooth® and Bluetooth LE protocols and devices are referred to in many of the examples herein for illustrative purposes. However, the scope of the claims should not be limited to Bluetooth® or Bluetooth LE devices and protocol unless specifically recited in the claims. For example, Peanut® transceivers may be included within wireless identity transmitters 110 and may be used to transmit two-way communications with proximity broadcast receivers 142, 138 also configured to utilize Peanut® short-range radio transmissions.

The communication system 200 may include a plurality of stationary proximity broadcast receivers 142, which may be deployed by authorities, merchants, or various third-parties throughout a region, building, or place. Such stationary proximity broadcast receivers 142 may be designed specifically for wireless identity transmitters 110 (or include such tracking functions in addition to other primary functionality, such as traffic lights, utility transformers, etc.). Stationary proximity broadcast receivers 142 may be located in strategic locations within a locality, such as forming a perimeter about a community and/or being located in high traffic areas (e.g., major intersections and highway on-ramps). The stationary proximity broadcast receivers 142 may be in communication with a local area network 202, such as a WiFi network, that may include an Internet access server 140 that provides a connection 148 to the Internet 103. Stationary proximity broadcast receivers 142 may be connected to the local area network 202 by a wired or wireless link 146. In various embodiments, the stationary proximity broadcast receivers 142 may be contained within or located nearby the Internet access server 140. For example, the stationary proximity broadcast receivers 142 may be components within the Internet access server 140 or alternatively, may be placed on top of or to the sides of the Internet access server 140. In an embodiment, stationary proximity broadcast receivers 142 may be located in strategic places within a locality, such as forming a perimeter about a community and/or being located in high traffic areas (e.g., along aisles of a retail store, at entry ways to buildings, etc.). In an embodiment, stationary proximity broadcast receivers 142 may have additional functionality. For example, stationary proximity broadcast receivers 142 may also function as or be included within cash registers, point-of-sale devices, and/or display units within a retail store.

The communication system 200 may also include one or more mobile devices configured to act as mobile proximity broadcast receivers 138. The mobile proximity broadcast receivers 138 may be typical mobile devices or smartphones communicating with a cellular network 121 via long range wireless links 136 to one or more base stations 134 coupled to one or more network operations centers 132 by a wired or wireless connection 158. Such cellular network 121 may utilize various technologies, such as 3G, 4G, and LTE. The network operations centers 132 may manage voice calls and data traffic through the cellular network 121, and typically may include or may be connected to one or more servers 130 by a wired or wireless connection 156. The servers 130 may provide a connection 154 to the Internet 103. In the various embodiments, the mobile proximity broadcast receivers 138 may be mobile devices configured by an application or other software module to act as proximity broadcast receivers to relay reports of received broadcast messages from wireless identity transmitters 110 (i.e., sighting messages) to the central server 120 by way of the Internet 103. In an embodiment, stationary proximity broadcast receivers 142 may also communicate with the cellular network 121 via long range wireless links 136 to a base station 134.

Proximity broadcast receivers 138, 142 may be configured to report contacts (or sightings) with a wireless identity transmitter 110 to a central server 120 via the Internet 103. For example, the proximity broadcast receivers 142 may transmit a sighting message to the central server 120 that includes a rolling identifier corresponding to the identity of a user of the wireless identity transmitter 110. Each time a proximity broadcast receiver 138, 142 receives an identifier from a wireless identity transmitter 110, the identifier may be associated with the time of the connection and the location of the proximity broadcast receiver 138, 142, and this information may be transmitted to the central server 120, such as within a sighting message. In some embodiments, the identifier, the time, and the location of the contact may be stored in the memory of the proximity broadcast receiver 138, 142 (or an intermediary server 130, 140) for later reporting, such as in response to a query message broadcast or multicast by the central server 120. Also, the central server 120 may store location information reported by sighting messages in a database, which may be used for locating, tracking or otherwise monitoring movements of the wireless identity transmitter 110.

In an embodiment, mobile proximity broadcast receivers 138 may be configured to exchange short-range wireless signals 189 with stationary receiver devices 142. In other words, a mobile proximity broadcast receiver 138 may be configured to operate as a wireless identity transceiver that is capable of receiving short-range wireless signals 114 (i.e., broadcast messages) from the wireless identity transmitter 110 as well as transmitting short-range wireless signals 189 for receipt by proximity broadcast receivers 142.

In an embodiment, proximity broadcast receivers 138, 142 may transmit wireless signals 188 to a wireless router 185, such as part of the local area network 202, which may provide a connection 187 to the Internet 103. For example, the stationary proximity broadcast receivers 142 may transmit sighting messages that include data from broadcast messages transmitted by the wireless identity transmitter 110 to a WiFi wireless router 185.

The central server 120 may also be connected to the Internet 103, thereby allowing communication between proximity broadcast receivers 142, 138 and the central server 120. As described above, the central server 120 may include a plurality of components, blades, or other modules to process sighting messages and data received from proximity broadcast receivers 142, 138. Further embodiments may provide a direct connection (not shown) between the central servers 120 and any of the mobile device network components, such as the network operations centers 132, to more directly connect the proximity broadcast receivers 142, 138 and the central servers 120.

The communication system 200 may also include computing terminals 124, such as personal computers at home or work, through which users may communicate via the Internet 103 with the central server 120. Such terminals 124 may allow users, such as parents, police, fire, medical attendants, and other authorized authorities to register devices (e.g., wireless identity transmitters 110), access tracking records on the central servers 120, and/or to request that the central server 120 initiate a search for a particular wireless identity transmitter 110. In an embodiment, users may use such terminals 124 to register wireless identity transmitters 110, proximity broadcast receivers 142, 138 (e.g., smartphones configured to execute client software associated with the central server), and/or identity transceivers (not shown), such as by accessing web portals and/or user accounts associated with the central server 120. Similarly, third-parties, such as merchants, may use terminals 124 to register wireless identity transmitters 110, proximity broadcast receivers 142, 138 (e.g., stationary receivers configured to execute client software and relay broadcast to the central server), and/or identity transceivers (not shown).

Based on the location of the proximity broadcast receivers 138, 142 within a place, multiple proximity broadcast receivers 138, 142 may be within the broadcast area of the wireless identity transmitter 110 and may concurrently receive broadcast messages. The central server 120 may detect when proximity broadcast receivers 138, 142 concurrently (or within a certain time period) transmit sighting messages that indicate receipt of broadcast messages from the same wireless identity transmitter. Such concurrent sighting messages may be used to determine more precise proximity information relating to the wireless identity transmitter at the time of broadcasting.

The communication system 200 may operate in a passive information gathering mode and/or an active search mode. In the passive information gathering mode, proximity broadcast receivers 138, 142 may continuously listen for broadcasts from any wireless identity transmitters 110, and report all identifier reception events via sighting messages (e.g., transmissions including identifiers, time and location) to the central server 120. When no active search is underway (i.e., no one is looking for a particular wireless identity transmitter 110), sightings of wireless identity transmitters 110 or received broadcast messages from wireless identity transmitters 110 may be stored in memory of the proximity broadcast receivers 138, 142 or the central server 120 for access at a later time. In order to protect privacy, such stored data may be stored for a limited period of time, such as a day, a week or a month, depending upon the person or asset being tracked. Then, if a person or asset is discovered to be missing, the stored data may be instantly accessed to locate and track the associated wireless identity transmitter 110, or at least determine its last reported location.

In a modification of the passive tracking mode, each proximity broadcast receiver 138, 142 may store IDs, times and locations corresponding to received broadcast messages (or contacts) from wireless identity transmitters 110 for a limited period of time. Alternatively, such information may be stored in servers 130, 140 connected to such proximity broadcast receivers 138, 142. Then, if a person or asset associated with a wireless identity transmitter 110 is discovered missing, a search can be initiated by the central server 120 querying the proximity broadcast receivers 138, 142 (or servers 130, 140) to download their stored data (e.g., databases indicating contacts with wireless identity transmitters 110) for analysis and storage in a database of the central server 120.

In an embodiment, in order to limit the demands on civilian mobile devices configured to operate as mobile proximity broadcast receivers 138, the passive tracking mode may only be implemented on the stationary proximity broadcast receivers 142. While the fewer number of such devices means the tracking of wireless identity transmitters 110 may be less effective, this embodiment may nevertheless enable receiving broadcast messages and thus the tracking of wireless identity transmitters 110 through high-traffic zones, such as intersections, highway on/off ramps, bus stations, airports, etc.

In the passive information gathering mode/embodiment, a user may use the communication system 200 to request the location of a particular wireless identity transmitter 110, such as by sending a request from a terminal 124 to the central server 120. For example, a mother may log in on her home computer terminal 124 and request the location of the wireless identity transmitter 110 in her child's backpack. The request may include a serial number, code, or other identifier corresponding to the wireless identity transmitter 110. The central server 120 may search the stored identification messages for the serial number, code, or other identifier and return any reported locations matching entered information, along with the times of such locations were reported via sighting messages. In further embodiments, the serial number or code entered by the parent may be cross-referenced with the identifier that the requested wireless identity transmitter 110 communicates in broadcast messages and that are relayed to the central server 120 in sighting messages submitted by proximity broadcast receivers 138, 142. In this manner only an authorized user (i.e., someone who knows the access code, password, or other secret code associated with a particular wireless identity transmitter 110) can obtain information regarding a given wireless identity transmitter 110 even though data is being gathered continuously.

In the active search mode/embodiment, the server 120 may instruct proximity broadcast receivers 138, 142 to actively search for a particular wireless identity transmitter 110 (i.e., a "targeted" wireless identity transmitter). An active search may be initiated in response to a request received from a terminal 124. Such a request may include the identifier for the particular wireless identity transmitter 110, or an account number/name that is or can be cross-linked to the identifier of the wireless identity transmitter 110. The central server 120 may transmit activation messages, such as via broadcast or multicast, to proximity broadcast receivers 138, 142 that may instruct proximity broadcast receivers 138, 142 to search for a particular wireless identity transmitter 110 and that may include an identifier of the targeted wireless identity transmitter 110 (i.e., target device ID). For example, an activation message corresponding to an active search for a targeted wireless identity transmitter 110 may include a rolling identifier that the wireless identity transmitter 110 changes periodically in a manner known to the central server 120. In an embodiment, activation messages transmitted, broadcast or multicast by the central server 120 may be sent only to proximity broadcast receivers 138, 142 within particular sectors or within a given distance of a particular location. Alternatively, the activation messages may identify particular sectors or a proximity to a particular location to enable the proximity broadcast receivers 138, 142 to determine whether the activation message is applicable to them based on their own known location. In this manner the search can be focused on a given area, such as a sector encompassing the last known location of the wireless identity transmitter 110 or an eye witness sighting. By focusing the search in this manner, proximity broadcast receivers 138, 142 not within the sector of search need not be activated.

In the active search mode/embodiment, in response to receiving activation messages from the central server 120 that include target device IDs and determining that they are within the identified sector of search, proximity broadcast receivers 138, 142 may configure their short-range radios (e.g., Bluetooth® radio) to listen for broadcast messages having the identifiers. In other words, the proximity broadcast receivers 138, 142 may be considered activated for a search and may look for the identifiers included in the activation message (i.e., target device IDs). Proximity broadcast receivers 138, 142 matching an identifier within a received broadcast message to a target device ID within an activation message may promptly report the event to the central server 120 via sighting messages transmitted via wired links 146 or wireless links 136. In the active search mode/embodiment, proximity broadcast receivers 138, 142 receiving the target device ID may promptly report that event to the central server 120 via a wired or wireless link to the Internet 103. As mentioned above, such a report may include the location of the proximity broadcast receiver 138, 142 and the time when the identifier was received if the sighting message is not transmitted immediately. In the active search mode/embodiment, each sighting message received by the central server 120 may be reported to an interested person or authority, such as in the form of a webpage showing an update location indicator on a map.

Further, in the active search mode/embodiment, an authorized user, such as a police, FBI, fire/rescue or other person of authority may use the communication system 200 to activate a search for a particular wireless identity transmitter 110, such as by using a terminal 124 to provide the central server 120 with the target device ID and search location or sectors to be searched. For example, a mother discovering that her child is missing may call the police and provide them with an identifier of the wireless identity transmitter 110 concealed in her child's clothing. With the search activated, the central server 120 may transmit an alert (or message that indicates a search for a wireless identity transmitter has been activated) to proximity broadcast receivers 138, 142 within the initial targeted search sector. The central server 120 may then activate a webpage that presents a map of the search area and that may be maintained in near-real time so, that as relevant sighting messages are received, reported location information is displayed on the map. Authorized users may then access the website (or other information provided by the server) to coordinate in-person search efforts.

Of course, information gathered and stored in proximity broadcast receivers 138, 142 or in a database of the central server in the passive mode may be used upon initiation of an active search, such as to identify an initial search location or sector, track recent locations and movements, and to provide/display a history of locations reported by sighting messages that may be combined with near-real time search reports.

Figure 3:
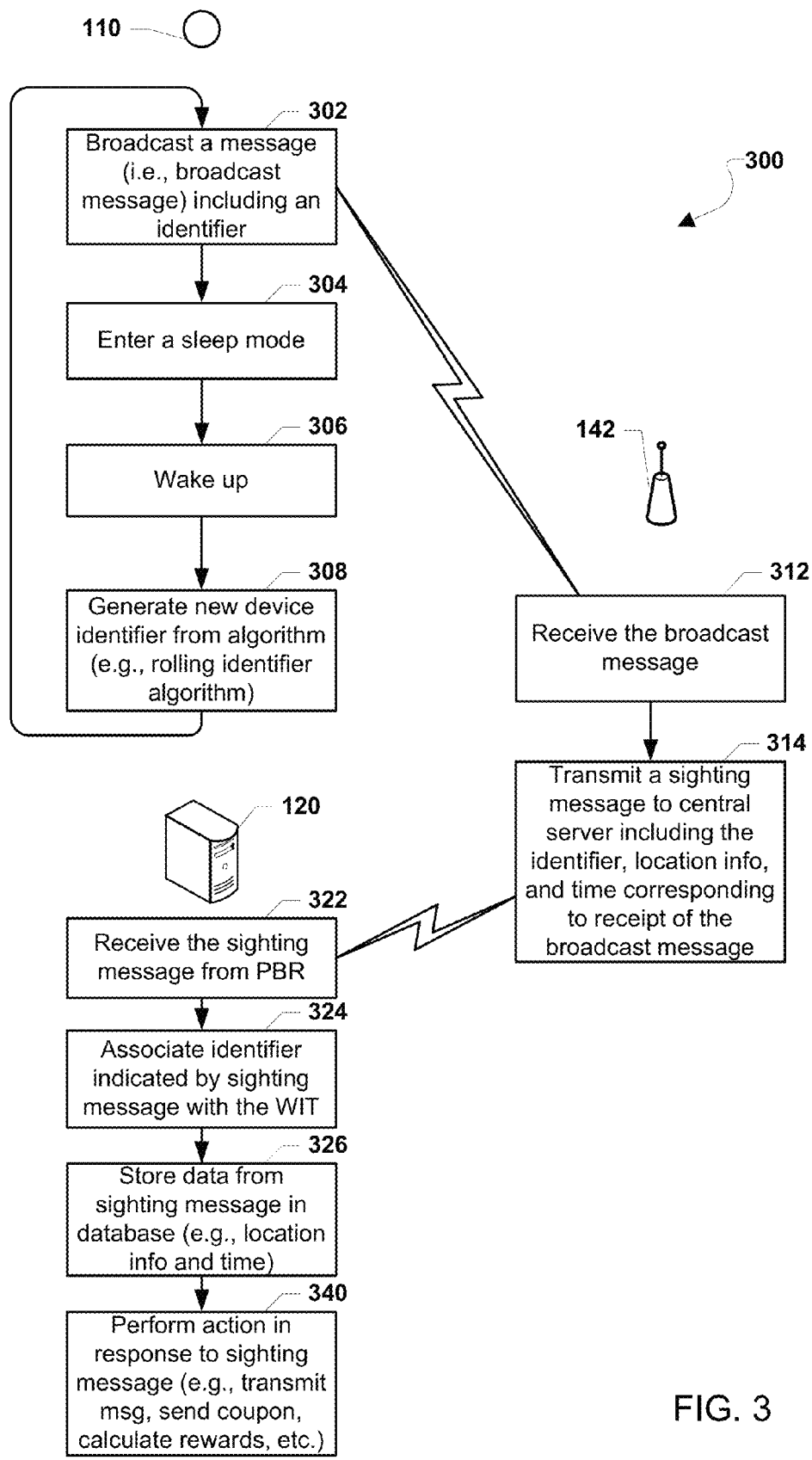
FIG. 3 is a process flow diagram illustrating an embodiment method for broadcasting an identifier from a wireless identity transmitter.

FIG. 3 illustrates an embodiment method 300 for implementation in a wireless identity transmitter 110 (referred to as "WIT" in FIG. 3), a proximity broadcast receiver 142, and a central server 120. In block 302, a wireless identity transmitter 110 may broadcast a message that includes an identifier, such as a broadcast message as described above. For example, the wireless identity transmitter 110 may broadcast a Bluetooth LE advertising packet that includes a rolling identifier as described herein. This may be accomplished in block 302 by a microcontroller within the wireless identity transmitter 110 determining that it is time to broadcast its identifier, configuring a suitable broadcast message (e.g., an advertisement packet as specified for Bluetooth LE devices in the Bluetooth®4.0 protocol), and transmitting that packet via a short-range radio.

In various embodiments, the message broadcast by the wireless identity transmitter (i.e., the broadcast message)

may include an identifier segment, such as a rolling identifier. In various embodiments, the broadcast message may also include additional segments, such as a type segment. The type segment may indicate the type of wireless identity transmitter. For example, wireless identity transmitters may be marketed for various purposes, such as child safety devices, dog collars, or security tags for stores. The wireless identity transmitters may have a different type segment based on the intended purpose (e.g., one code for child safety devices, a second code for dog collars, etc.). Type segments may be static and set by manufacturers, while the remaining portion of the identifier may be unique to each device, and may roll as described below. The type segment may also be changed by a user, such as when a wireless identity transmitter is reset for a different purpose or application.

In other embodiments, a broadcast message may also include one or more static or dynamic segments with instructions or commands to be implemented by a proximity broadcast receiver. Such command segments may also be passed along to instruct a central server or other network device. Command segments may be set or static, similar to type segments, or may vary over time based on various conditions, such as data from one or more proximity broadcast receivers. Such command settings may also be configured by a user of the wireless identity transmitter. Second or additional segments may also indicate the status of the wireless identity transmitter. For example, a second segment may indicate the remaining power or estimated time left before the battery dies. Proximity broadcast receivers or a central server may interpret this status and respond accordingly.

Returning to FIG. 3, in block 304, the wireless identity transmitter 110 may enter a sleep mode. For example, after broadcasting the broadcast message having the identifier, the wireless identity transmitter 110 may be configured to enter a power conservation state that may continue for a predetermined period of time. In various embodiments, the wireless identity transmitter 110 may sleep for a predetermined time, never sleep, or sleep for varying times determined based on various inputs. In block 306, the wireless identity transmitter 110 may wake up from the sleep mode, such as after the predetermined duration expires. In block 308, the wireless identity transmitter 110 may generate a new device identifier from an algorithm, such as based on a unique device identifier of the wireless identity transmitter, a secret key shared with a server, and a counter. For example, the wireless identity transmitter 110 may generate a rolling identifier using a pseudo-random function or a streaming-like encryption algorithm (e.g., AES-CTR), as described below. The wireless identity transmitter 110 may then return to block 302 to broadcast again. In an embodiment, the broadcast message may contain timing, counter, countdown, or scheduling information indicating the availability of the wireless identity transmitter for receiving messages. For example, the broadcast message may indicate that the wireless identity transmitter will accept incoming configuration messages within a specified time window. In various embodiments, the operations in blocks 302-308 may be performed by an identity transceiver (e.g., a smartphone configured to operate as both an identity transmitter and a proximity broadcast receiver).

As mentioned above, the algorithm (or rolling identifier algorithm) used in block 308 may generate a rolling identifier that is very difficult to predict or recognize by a device or system that does not know either an identity of the wireless identity transmitter 110 (e.g., a MAC or Bluetooth ID), a decode key, and/or the algorithm used to generate the rolling identifier. As discussed below with reference to FIG. 26, the server 120, configured with the algorithm (or a decoding algorithm) or a decode key, and in possession of the wireless identity transmitter 110 identities, can use the rolling identifier to determine a corresponding account or device identity. While method 300 shows the rolling identifier changing with every wake and broadcast cycle as one example, in other embodiments the identifier may be changed less frequently, such as once per minute, once per hour, etc. In such embodiments, the operation of generating a new identifier in block 308 may be performed only at the designated interval, so at other times upon waking (i.e., block 306) the wireless identity transmitter 110 may return to block 302 to broadcast the identifier. Various algorithms for generating rolling identifiers or other encoded identifiers, as well as other decoding algorithms, are discussed below as well as in related U.S. patent application Ser. No. 13/773, 336 that is filed concurrently herewith, the entire contents of which are hereby incorporated by reference for purposes of algorithms for generating, transmitting and decoding rolling identifiers and other data.

The method 300 also illustrates operations that may be implemented in the proximity broadcast receiver 142. In block 312, the proximity broadcast receiver 142 may receive the broadcast message from the wireless identity transmitter 110. The proximity broadcast receiver 142 may receive the broadcast message when within proximity of the wireless identity transmitter 110 (i.e., within communication range). When the broadcasted message with included identifier is received, the proximity broadcast receiver 142 may analyze header or metadata within the received broadcast message, as well as parse and evaluate various data within the broadcast message. In an embodiment, the broadcast message may contain encrypted and non-encrypted data that the proximity broadcast receiver 142 may or may not be configured to decrypt or otherwise access. In block 314, the proximity broadcast receiver 142 may transmit a sighting message to the central server 120 including the identifier, location information, and time corresponding to the receipt of the broadcast message. This transmission may be accomplished via a wireless wide area network, such as a cellular data network coupled to the Internet. In various embodiments, the operations in blocks 312 and 314 may be performed by a stationary proximity broadcast receiver, a mobile proximity broadcast receiver, or alternatively, an identity transceiver (e.g., a smartphone configured to operate as both a transmitter and a receiver).

In general, sighting messages may include metadata or header information that may describe received broadcast messages (e.g., message size, indicators of subject matter, etc.), the proximity broadcast receiver 142, such as the proximity broadcast receiver identification (e.g., a code, username, etc.), indications of services with which the proximity broadcast receiver 142 is affiliated regarding the server (e.g., the proximity broadcast receiver 142 participates in a tracking program for a particular vendor, merchant, area, etc.), as well as the conditions at the time of receipt of the broadcast message. For example, the sighting message may include signal strength information of the received broadcast message. In an embodiment, sighting messages may each include codes, flags, or other indicators that describe the general topic, subject matter, or reason for the sighting message. For example, the sighting message may contain a flag that indicates a relation to an active alert.

Additionally, sighting messages may include location information of the proximity broadcast receiver 142. In particular, sighting messages may indicate network-specific information that relates to a location. For example, a sighting message may indicate the cell site (e.g., cell site ID), cellular network tower (e.g., cell tower ID), or other wireless network with which a mobile proximity broadcast receiver was in communication at the time of receipt of the broadcast message. Further, sighting messages may include more refined location information based on data from global positioning systems (GPS) or chips included within the proximity broadcast receiver 142. For example, the proximity broadcast receiver 142 may determine GPS information (i.e., GPS coordinates) of the proximity broadcast receiver 142 at the time of receipt of a broadcast message, including the coordinates in the corresponding sighting message. In an embodiment, sighting messages may also include sensor data from various sensors within the proximity broadcast receiver 142, such as accelerometers, gyroscopes, magnetometers, etc. Further, sighting messages may include authentication information that may confirm the legitimacy of the sighting message as coming from a known, registered, or otherwise valid proximity broadcast receiver 142. For example, authentication information included in a sighting message may include secret codes, certificates, or hash data that is shared between the proximity broadcast receiver and the central server 120.

In various embodiments, the proximity broadcast receiver 142 may generate sighting messages by appending data and various information to broadcast messages received from the wireless identity transmitter 110. In an embodiment, sighting messages may include the entirety of received broadcast messages or, alternatively, only portions of the received broadcast messages that the proximity broadcast receiver 142 determines to be of significance. For example, the proximity broadcast receiver 142 may extract particular header or metadata information from a broadcast message before generating a corresponding sighting message. As another example, the proximity broadcast receiver 142 may compress, abbreviate, truncate and/or summarize data within the broadcast message. In another embodiment, the proximity broadcast receiver 142 may simply redirect, relay, or retransmit received broadcast messages to the central server.

Sighting messages may be transmitted via a wireless or wired communication link, such as a wireless cellular network, a local area network configured to communicate via Internet protocols, a long-range radio communication link, or a short-range radio. For example, the proximity broadcast receiver 142 may transmit sighting messages over a cellular network via the Internet to the central server. As another example, the proximity broadcast receiver 142 may transmit sighting messages via a wired Ethernet connection.

Returning to FIG. 3, the method 300 also illustrates operations that may be implemented in the central server 120. In block 322, the central server 120 may receive the sighting message from the proximity broadcast receiver 142. In block 324, the central server 120 may associate an identifier indicated by the sighting message with the wireless identity transmitter 110. The central server 120 may associate the identifier within the sighting message with an account registered/created by a user. Associating the identifier with a particular wireless identity transmitter 110 or user account may be accomplished by comparing the identifier with a database of codes corresponding to the wireless identity transmitter 110 or user accounts to determine the database record in which information from the sighting message (e.g., location info) should be stored. Since in some embodiments the wireless identity transmitter 110 identifier changes (rolls) frequently, this process may involve comparing the identifier received in the sighting message to several possible serial codes generated by a pseudo-random number generator algorithm, or applying a reverse algorithm which uses the received identifier as a input and outputs the corresponding account number. In block 326, the central server 120 may store data from the sighting message in a database, such as location information and time data. For example, the central server 120 may determine the location of the proximity broadcast receiver 142 when the broadcast message was received based evaluating the received sighting message, and may store that data in a database linked to the wireless identity transmitter 110 or its user/owner.

In block 340, the central server 120 may perform an action in response to the sighting message, such as transmit a message to a recipient, send a coupon, and/or calculate rewards. In an embodiment, the central server 120 may transmit a return message to a recipient, such as the proximity broadcast receiver 142, that includes instructions, software, or codes indicating how the proximity broadcast receiver 142 may respond to the received broadcast message. For example, the return message may direct the proximity broadcast receiver 142 to transmit a link advertisement message. Recipients of such messages from the central server may include various devices and parties, including computing devices of registered services (e.g., merchants, emergency personnel), mobile devices of users, and proximity broadcast receivers (e.g., the proximity broadcast receiver 142 that received the broadcast message). In another embodiment, the central server 120 may use the stored data to identify when the wireless identity transmitter 110 enters, is within, and/or leaves a designated area. In other words, the central server 120 may identify when the wireless identity transmitter 110 comes within proximity, stays within proximity, or leaves proximity of a proximity broadcast receiver 142.

Figure 4A:
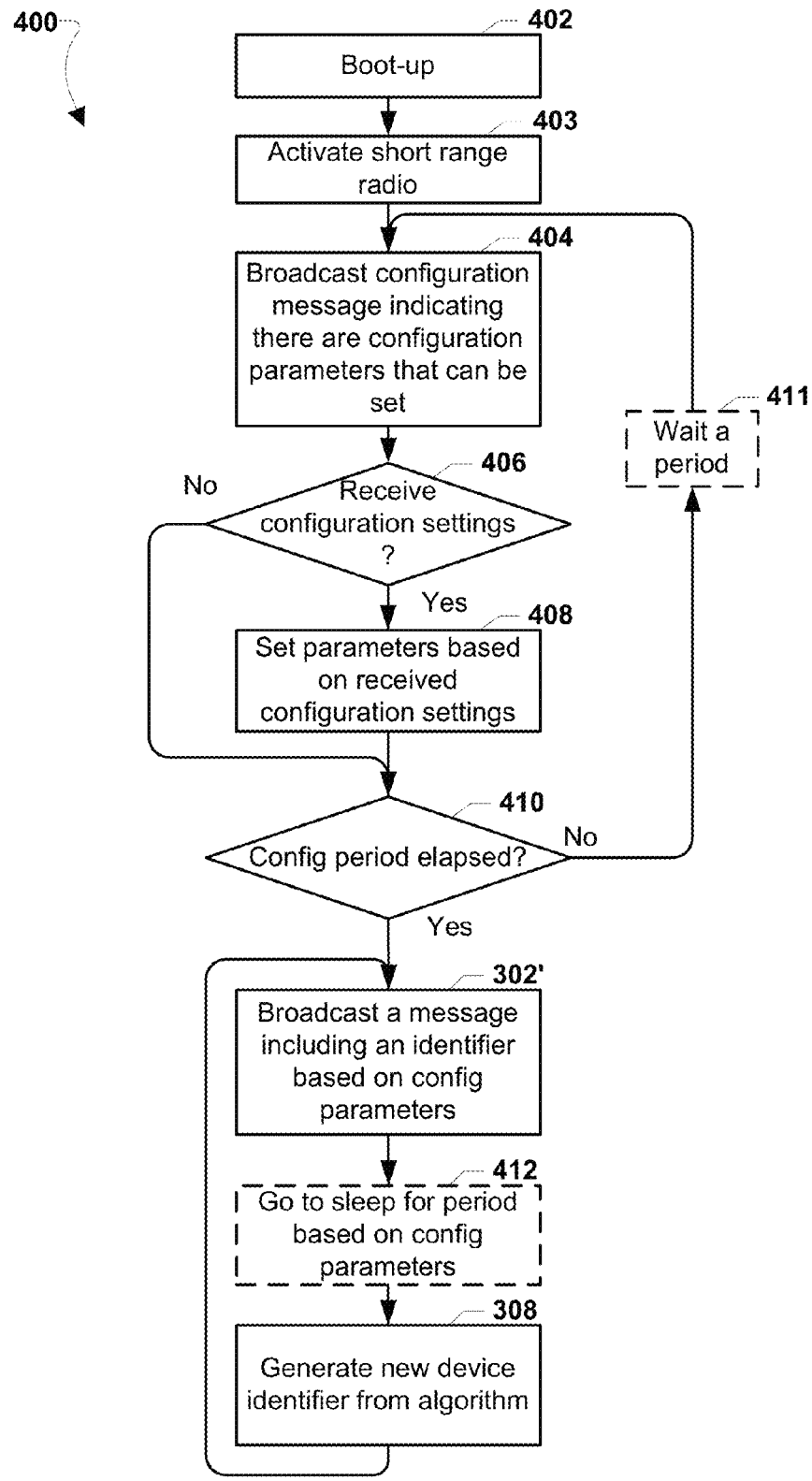
FIG. 4A is a process flow diagram illustrating an embodiment method for a wireless identity transmitter receiving configuration settings after performing boot-up operations.

FIG. 4A illustrates an embodiment method 400 for a wireless identity transmitter (referred to as a "WIT" in FIG. 4A) receiving configuration settings after performing boot-up operations. Typically, wireless identity transmitters may only perform one-way communications, broadcasting signals for receipt by proximity broadcast receivers. However, wireless identity transmitters may be configured to selectively engage in two-way communications with other devices with similar short-range wireless signaling capabilities (e.g., Bluetooth LE transceivers). In particular, upon initialization operations (or "booting-up"), a wireless identity transmitter may be configured to receive incoming short-range wireless communications from proximity broadcast receivers. For example, when a battery is replaced or inserted for the first time, the wireless identity transmitter may accept incoming Bluetooth packets for a predefined period of time, such as sixty seconds. Alternatively, the wireless identity transmitter may receive incoming messages as part of power-cycling (e.g., receive for the sixty seconds after a reboot of the wireless identity transmitter).

Such incoming short-range wireless communications may include instructions, software, firmware, commands, or other code for setting values for configuration parameters utilized by the wireless identity transmitter for performing various functions. In particular, the incoming communications may include configuration settings (or values) the wireless identity transmitter may use to set or modify established configuration parameters associated with transmitting broadcast messages that include identification information of the wireless identity transmitter. In an embodiment, incoming communications that include configuration settings may be Bluetooth signals (e.g., setters or getters) that may not require pairing operations between the sender and receiver (i.e., the wireless identity transmitter). In other words, the incoming communications may be non-pairing Bluetooth advertisements.

Configuration parameters may include the transmit interval for transmitting broadcast messages (i.e., how often the wireless identity transmitter should broadcast packets that include its identity) and the transmit power for transmitting broadcast messages (i.e., what signal strength to use when broadcasting). For example, received configuration settings may vary the intervals (i.e., broadcasting frequency) at which the wireless identity transmitter broadcasts its identifier in a manner configured to facilitate accurate tracking of the wireless identity transmitter while conserving battery power. This may be important as setting transmit power configuration parameters may affect the battery service life of the wireless identity transmitter (e.g., a longer interval may include a longer sleep mode and thus decreased power consumption). In an embodiment, configuration parameters may also include a debug parameter that may be set or modified by a manufacturer or administrative party (e.g., a central server). The debug parameter may be utilized by software or algorithms executed by the wireless identity transmitter and may indicate when the wireless identity transmitter should generate new identifiers to broadcast (e.g., an interval for generating a new rolling identifier or Bluetooth MAC address identifier). In another embodiment, incoming communications with configuration settings may include commands that instruct the wireless identity transmitter to change the data represented within broadcast messages, such as by entering/exiting an encoded mode. Alternatively, incoming communications may include instructions for the wireless identity transmitter to shorten its broadcast signal range to emulate near field communications (NFC).

In block 402, the wireless identity transmitter may boot-up. In other words, the wireless identity transmitter may be energized, initialized, and otherwise configured to operate from a hibernating, sleep, dormant, or otherwise deactivated state. In various embodiments, the boot-up operations may be performed in response to a user input (e.g., a button press), the insertion of a battery in the wireless identity transmitter, or receiving a short-range wireless signal (e.g., an activation signal). In block 403, the wireless identity transmitter's short-range radio may be activated. This activation may be accomplished by a timer or by the microcontroller determining that a duration has expired since the boot-up operations were performed or concurrently with the boot-up operations. In an embodiment, the activation of the short-range radio may be a routine within the boot-up operations in block 402.

In block 404, the wireless identity transmitter may broadcast a configuration message indicating there are configuration parameters that can be set in the wireless identity transmitter. For example, the configuration message may include the wireless identity transmitter's identity (or identifier) as well as an indication that a certain number or type of configuration parameters can be set, modified, or initialized by subsequent short-range wireless signals. In an embodiment, the configuration message may include a list of configuration parameters available to be set, such as the transmit interval.

In an alternative embodiment, the configuration message may include an indicator that the wireless identity transmitter is available to receive configuration settings. In such an embodiment, any responding devices, such as proximate proximity broadcast receivers, may transmit responses (e.g., Bluetooth LE signals) that request the list of configuration parameters. In response to receiving such a request, the mobile proximity broadcast receiver may transmit a second message that includes the list of configuration parameters.

In determination block 406, the wireless identity transmitter may determine whether configuration settings are received, such as in a short-range wireless signal from a proximate proximity broadcast receiver or identity transceiver. The wireless identity transmitter may monitor the short-range radio to determine whether a response is received from a proximate device. A response may be in the form of a simple response packet or pulse that the wireless identity transmitter microcontroller can recognize, or alternatively, an advertisement according to the Bluetooth LE protocol. If configuration settings are received (i.e., determination block 406="Yes"), in block 408 the wireless identity transmitter may set parameters based on the received configuration settings. For example, the wireless identity transmitter may set a value that indicates how often it transmits broadcast messages. If no configuration settings are received (i.e., determination block 406="No"), or if the wireless identity transmitter performs the operations in block 408, in determination block 410 the wireless identity transmitter may determine whether a configuration period has elapsed. For example, the wireless identity transmitter may evaluate a timer to determine whether a predefined number of seconds (e.g., 60 seconds) have elapsed since the boot-up operations were performed. If the configuration period has not elapsed (i.e., determination block 410="No"), in optional block 411 the wireless identity transmitter may wait a period, such as a number of milliseconds, seconds, etc., and then may continue with the operations in block 404.

However, if the configuration period has elapsed (i.e., determination block 410="Yes"), in block 302' the wireless identity transmitter may broadcast a message including an identifier based on the configuration parameters. For example, the wireless identity transmitter may transmit a broadcast message at a signal strength indicated by configuration parameters set in response to receiving configuration settings (or values) from a nearby proximity broadcast receiver. In optional block 412, the wireless identity transmitter may go to sleep for a period based on the configuration parameters, such as a transmit interval configuration parameter. In block 308, the wireless identity transmitter may generate a new device identifier (e.g., rolling identifier) from an algorithm, and may continue with the operations in block 302'.

In alternate embodiments, the wireless identity transmitter may be configured to receive incoming messages from proximity broadcast receivers based on clock timing (or clock signals), detected inputs from a user (e.g., a detected button press), or information within a previously received signal (e.g., a received message from a proximity broadcast receiver may instruct the wireless identity transmitter to become available for subsequent messages at a particular future time).

Figure 4B:
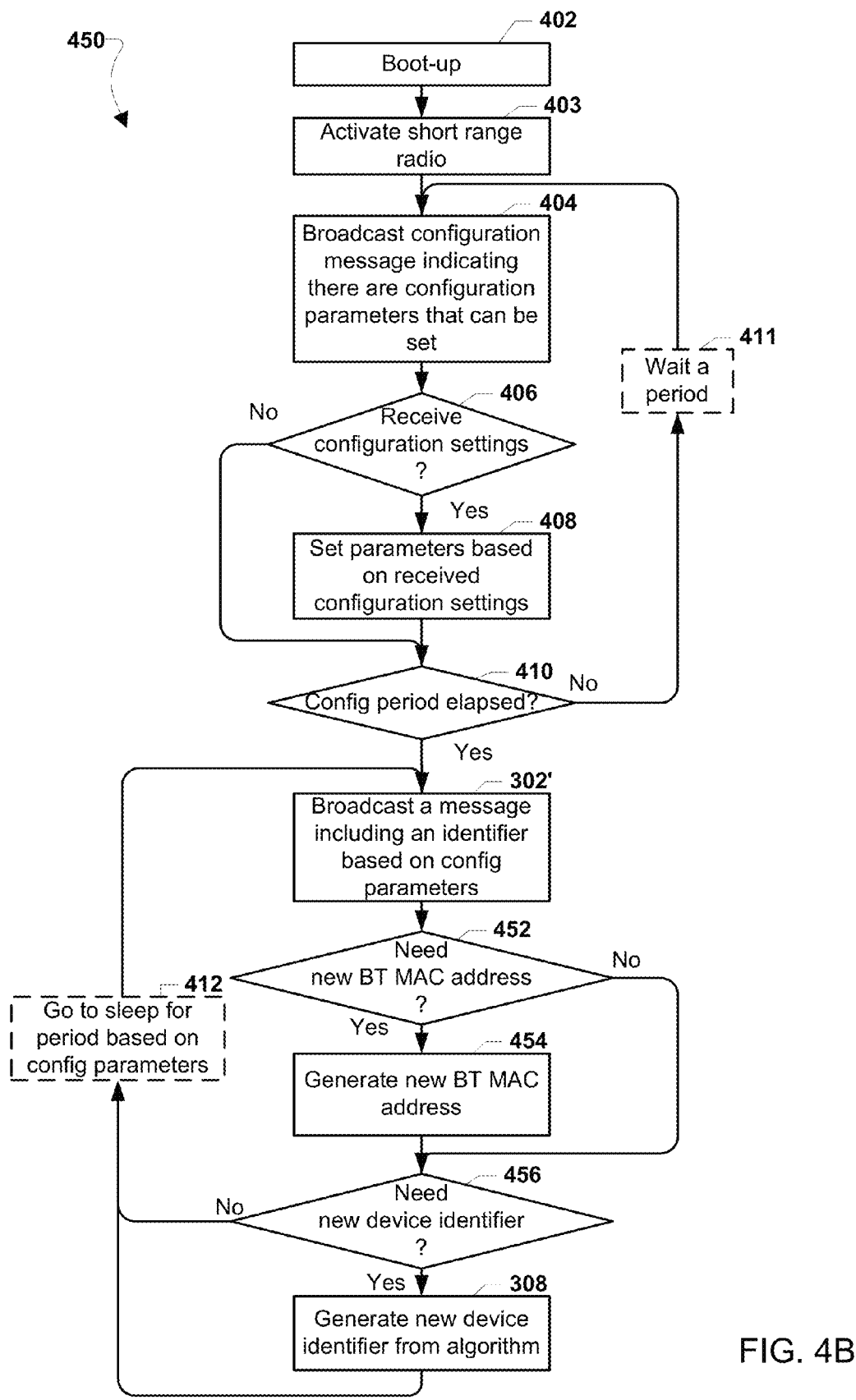
FIG. 4B is a process flow diagram illustrating an embodiment method for a wireless identity transmitter receiving configuration settings after performing boot-up operations and broadcasting messages based on the configuration settings.

FIG. 4B illustrates an embodiment method 450 for a wireless identity transmitter (WIT) receiving configuration settings after performing boot-up operations and broadcasting messages based on the configuration settings. The method 450 is similar to the method 400 described above, except that the wireless identity transmitter may be configured to generate different identifiers (e.g., rolling identifiers) and/or Bluetooth machine addresses (i.e., BT MAC address) based on configuration parameters that may be set by configuration messages from proximate proximity broadcast receivers. In general, when the wireless identity transmitter is configured to transmit broadcast messages via a Bluetooth radio (e.g., Bluetooth LE, etc.), the Bluetooth signals or packets may contain information indicating the Bluetooth equipment used to transmit the signals. Based on debug set values received from proximate proximity broadcast receivers, the wireless identity transmitter may be configured to change the identifiers and/or Bluetooth MAC addresses indicated within broadcast messages at varying intervals.

In block 402, the wireless identity transmitter may boot-up. In block 403, the wireless identity transmitter's short-range radio may be activated. In block 404, the wireless identity transmitter may broadcast a configuration message indicating there are configuration parameters that can be set in the wireless identity transmitter. In determination block 406, the wireless identity transmitter may determine whether configuration settings are received, such as in a short-range wireless signal from a proximate proximity broadcast receiver or identity transceiver. If configuration settings are received (i.e., determination block 406="Yes"), in block 408 the wireless identity transmitter may set parameters based on the received configuration settings. If no configuration settings are received (i.e., determination block 406="No"), or if the wireless identity transmitter performs the operations in block 408, in determination block 410 the wireless identity transmitter may determine whether a configuration period has elapsed. If the configuration period has not elapsed (i.e., determination block 410="No"), in optional block 411 the wireless identity transmitter may wait a period, such as a number of milliseconds, seconds, etc., and then may continue with the operations in block 404. However, if the configuration period has elapsed (i.e., determination block 410="Yes"), in block 302' the wireless identity transmitter may broadcast a message including an identifier based on the configuration parameters.

In determination block 452, the wireless identity transmitter may determine whether it needs a new Bluetooth MAC address. In other words, the wireless identity transmitter may evaluate configuration parameters to determine the frequency it must generate a new Bluetooth MAC address for use with broadcast messages that use a Bluetooth LE protocol. The wireless identity transmitter may thus be configured to utilize rolling Bluetooth MAC addresses. In an embodiment, the wireless identity transmitter may compare stored information that indicates the elapsed time (or number of broadcasts) since the last generated Bluetooth MAC address. Alternatively, the wireless identity transmitter may generate a new Bluetooth MAC address for each broadcast. If a new Bluetooth MAC address is needed (i.e., determination block 452="Yes"), in block 454 the wireless identity transmitter may generate a new Bluetooth MAC address. In an embodiment the wireless identity transmitter may utilize a command provided within Bluetooth protocols (e.g., an API call or command) to generate the new Bluetooth MAC address. Additionally, the new Bluetooth MAC address may be non-resolvable, random, or otherwise lacking information any receiving device may use to contact the wireless identity transmitter. For example, the Bluetooth MAC address when indicated in a broadcast message may not be used by a proximity broadcast receiver to direct a response transmission to the wireless identity transmitter.

If a new Bluetooth MAC address is not needed (i.e., determination block 452="No"), or a new Bluetooth MAC address is generated in block 454, in determination block 456 the wireless identity transmitter device may determine whether a new device identifier (e.g., a rolling identifier) is needed. Similar to the new Bluetooth MAC address, the wireless identity transmitter may evaluate configuration parameters to determine when to generate a new rolling identifier. For example, stored configuration parameters may indicate that a new device rolling identifier is needed every few seconds, minutes, or after an hour. If a new identifier is needed (i.e., determination block 456="Yes"), in block 308, the wireless identity transmitter may generate a new device identifier (e.g., rolling identifier) from an algorithm. If no new device identifier is needed (i.e., determination block 456="No"), or if a new device identifier was generated from the algorithm in block 308, in optional block 412, the wireless identity transmitter may go to sleep for a period based on the configuration parameters and may continue with the operations in block 302'.

Figure 4C:
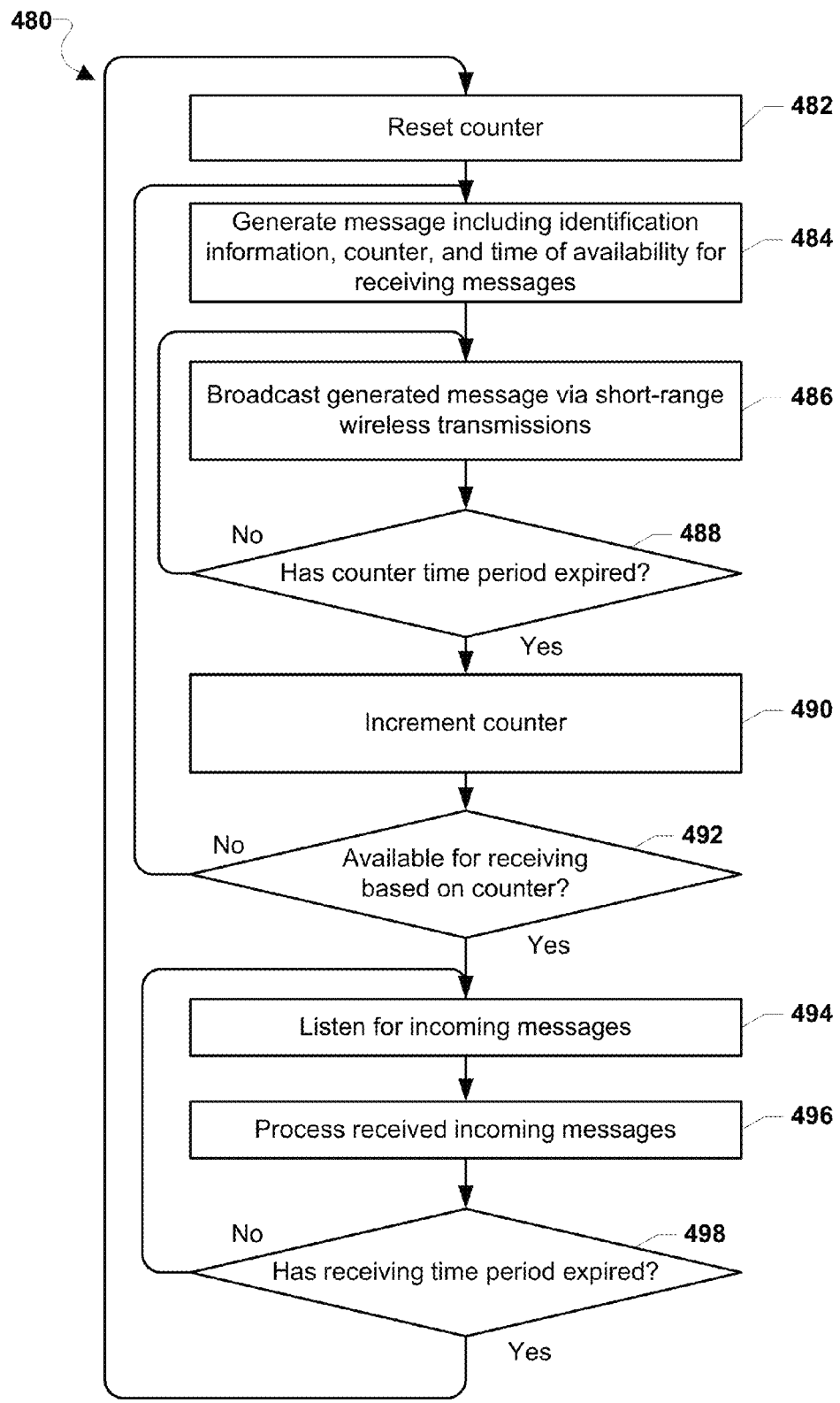
FIG. 4C is a process flow diagram of an embodiment method for a wireless identity transmitter performing two-way wireless communications with a proximity broadcast receiver.

FIG. 4C illustrates an embodiment method 480 for a wireless identity transmitter performing two-way wireless communications with a proximity broadcast receiver. As described above, wireless identity transmitters may typically be used for one-way signaling, such as transmitting broadcast messages for receipt, use, and relay by proximity broadcast receivers. However, wireless identity transmitters may be configured to conduct two-way communications in order to receive firmware, software instructions or trigger signals directing the transmitter to perform certain operations (e.g., activate sensors), configuration data, and other information the wireless identity transmitter may use to transmit broadcast messages. Such two-way communications may be available to wireless identity transmitters that include short-range radio transceivers, such as Bluetooth® radios. However, wireless identity transmitters may be configured to selectively engage in two-way communications with proximity broadcast receivers to minimize power consumption and maximize battery service life. In an embodiment, the wireless identity transmitter may broadcast messages indicating to proximity broadcast receivers a period of time when the wireless identity transmitter may be available for receiving messages from proximity broadcast receivers, and may receive messages for a limited or predefined period of time.

In block 482, the wireless identity transmitter may reset a counter, such as a counter variable to indicate the beginning (or initialization) of a period during which the wireless identity transmitter may not receive messages. The counter may be reset to a zero value and may be incremented up to a predefined number during the operations of the method 480. Alternatively, the counter may be reset or initialized at a predefined number and decremented down to a zero value. The use of a counter variable is merely a non-limiting example technique for the wireless identity transmitter determining when to configure itself for receiving messages. In alternate embodiments, the wireless identity transmitter may instead determine when to be available for receiving incoming messages based on clock timing (or clock signals), detected inputs from a user (e.g., a detected button press), information within a previously received signal (e.g., a received message from a proximity broadcast receiver may instruct the wireless identity transmitter to become available for subsequent messages at a particular future time), or power-cycling (e.g., one such time might be for the sixty seconds after initial boot-up or reboot of the wireless identity transmitter).

In an embodiment, the wireless identity transmitter may be roughly in clock synchronization with or maintain a nonce or counter variable that it is known and roughly tracked by various proximity broadcast receivers (e.g., smartphones, fixed proximity broadcast receivers, etc.) and/or a central server. For example, when the wireless identity transmitter is activated (e.g., turned on, initialized by inserting a battery, etc.), a user may register the wireless identity transmitter with a central server that stores the wireless identity transmitter identification along with information that enables the central server to estimate a nonce or counter value or clock timing within the wireless identity transmitter. In an embodiment, such a nonce or counter variable or clock synchronization may be used to disambiguate wireless identity transmitter identities and/or be used as a decryption key for obfuscated or encoded messages. Such registration and synchronization operations are described further below.

In block 484, the wireless identity transmitter may generate a message including identification information, counter, and time of availability for receiving messages. The generated message may include information about the wireless identity transmitter's identity (e.g., a serial code/number, a username, or a rolling identifier). In an embodiment, the generated message may be encrypted, encoded, or otherwise obscured to prevent proximity broadcast receivers from determining the identity of the wireless identity transmitter and/or the user thereof. For example, the generated message may employ a rolling identifier or code known only to the wireless identity transmitter and a central server but not proximity broadcast receivers.

The generated message may also include information indicating a time or condition when the wireless identity transmitter may be available for accepting communications for proximity broadcast receivers. For example, the message may describe the current value of the counter or indicate a count-down timer showing when the wireless identity transmitter may be available. In another embodiment, the generated message may include instructions for proximity broadcast receivers to enable successful transmissions to the wireless identity transmitter. For example, the generated message may contain specifications (e.g., required codes, content, delivery time, etc.) for any messages transmitted by proximity broadcast receivers to the wireless identity transmitter.

In block 486, the transmitter may broadcast the generated message via short-range wireless transmissions, such as Bluetooth LE packets. If within the range of the short-range broadcasts, a proximity broadcast receiver may receive and process the broadcasts as described below with reference to FIG. 7A.

The wireless identity transmitter may periodically broadcast the same generated message multiple times for each counter time period. In other words, the wireless identity transmitter may broadcast the generated message more than once before modifying the counter variable value. In determination block 488, the wireless identity transmitter may determine whether the predetermined counter time period has expired. If the counter time period has not expired (i.e., determination block 488="No"), the wireless identity transmitter may continue to broadcast the generated message periodically in block 486.

If the counter time period has expired (i.e., determination block 488="Yes"), in block 490 the wireless identity transmitter may increment the counter and, in determination block 492, determine whether the wireless identity transmitter has become available for receiving messages based on the counter value. For example, the wireless identity transmitter may compare the current counter variable value to a predefined maximum (or minimum) counter value. As stated above, in various other embodiments, the wireless identity transmitter may determine availability for receiving messages based on other evaluations of time or instructions stored within the wireless identity transmitter.

If it is not available to receive messages (i.e., determination block 492="No"), the wireless identity transmitter may continue with the operations in block 484 to generate a new message to broadcast. If the wireless identity transmitter is available to receive messages (i.e., determination block 492="Yes"), in block 494 the wireless identity transmitter may listen for incoming messages, such as by monitoring a receiver circuit for incoming short-range radio transmissions, and in block 496 the wireless identity transmitter may process any received incoming messages, such as with software or operations running on a processor or wireless modem within the wireless identity transmitter.

In determination block 498, the wireless identity transmitter may determine whether the receiving time period has expired. In other words, the wireless identity transmitter may determine whether incoming messages may still be received. The time period for receiving incoming messages may be based on a counter variable maintained by the wireless identity transmitter, a clock signal indication, or information within a received message. If the receiving time period has not expired (i.e., determination block 498="No"), the wireless identity transmitter may continue to listen for incoming messages in block 494. However, if the receiving time period has expired (i.e., determination block 498="Yes"), the wireless identity transmitter may repeat the process by returning to block 482.

Figure 5:
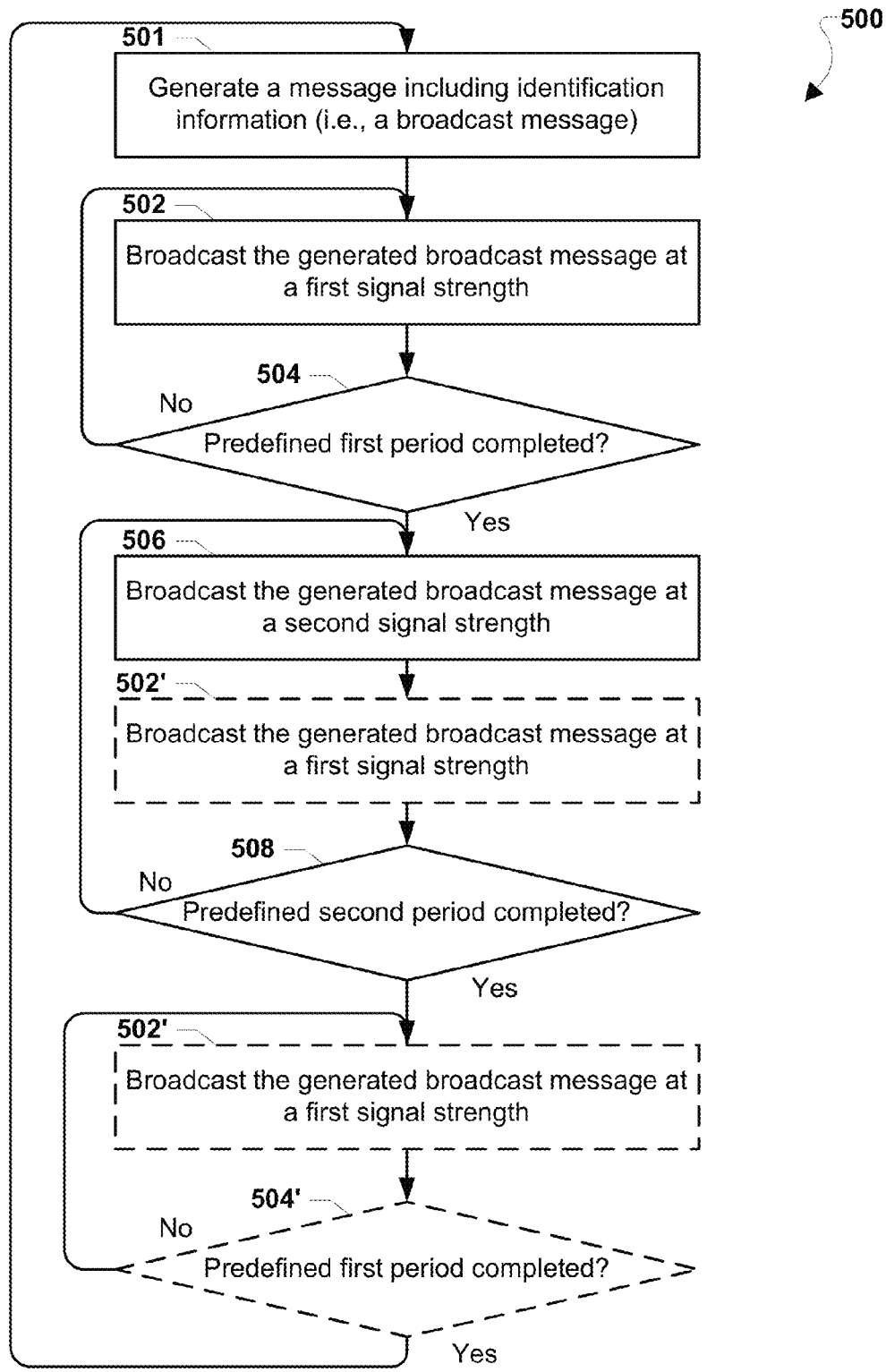
FIG. 5 is a process flow diagram illustrating an embodiment method for a wireless identity transmitter broadcasting messages in a cycle at varying signal strengths.

FIG. 5 illustrates an embodiment method 500 for a wireless identity transmitter broadcasting messages in a cycle at varying signal strengths. In general, a central server may track the location of a wireless identity transmitter based on sighting messages from proximity broadcast receivers receiving broadcast messages from the wireless identity transmitter. As described above, sighting message may contain information regarding the location of proximity broadcast receivers, which the server may use to estimate a general location of the wireless identity transmitter. However, in embodiments in which the wireless identity transmitter broadcasts via short-range radio that is not directed to or paired with a particular proximity broadcast receiver, the broadcast messages may be received by any proximity broadcast receiver within reception distance (or radius) of the wireless identity transmitter. When multiple proximity broadcast receivers are within reception range of a broadcasting wireless identity transmitter, all the proximity broadcast receivers receiving the broadcast message may transmit concurrent sighting messages to the central server. The central server may use the various sighting messages that include location information to estimate a location or proximity of the wireless identity transmitter.

To enable more precise location or proximity estimations, the wireless identity transmitter may broadcast messages at different signal strengths (e.g., low-power signals and high-power signals), resulting in broadcasts with two different reception ranges. Proximity broadcast receivers positioned within reception range of low-power signals may be able to receive and report both high- and low-power signals, while proximity broadcast receivers that are more distant from the wireless identity transmitter may only receive and report high-power signals. The central server may identify sighting messages transmitted by proximity broadcast receivers that received low-power signals and may determine these proximity broadcast receivers as closer to the wireless identity transmitter than proximity broadcast receivers that do not receive low-power signals.

In block 501, as described above, the wireless identity transmitter may generate a message that includes identification information (i.e., a broadcast message). In block 502, the wireless identity transmitter may broadcast the generated broadcast message at a first signal strength via a short-range radio. The first signal strength may be a "high" (or higher) signal strength generated by applying a standard amount of power to the short-range radio. In determination block 504, the wireless identity transmitter may determine whether a predefined first period has completed. In other words, the wireless identity transmitter may determine whether it has broadcast the broadcast message at the first signal strength for a predefined time period. Alternatively, the wireless identity transmitter may determine whether it has broadcast the broadcast message a predetermined number of times at the first signal strength. The wireless identity transmitter may base this determination on a counter variable, clock signal assessment, or any other technique for monitoring a period of activity. If the predefined first period has not completed (i.e., determination block 504="No"), the wireless identity transmitter may continue to broadcast the broadcast message at the first signal strength in block 502.

If the predefined first period has completed (i.e., determination block 504="Yes"), in block 506 the wireless identity transmitter may broadcast the generated broadcast message at a second signal strength via the short-range radio. The second signal strength may be a "low" (or lower) signal strength generated by applying less power to the short-range radio. To enable receipt of the broadcast message beyond the reception range of the second signal strength, in optional block 502', the wireless identity transmitter may also broadcast the generated broadcast message at the first signal strength immediately before or after the broadcast at the second signal strength.

In determination block 508, the wireless identity transmitter may determine whether a predefined second period has completed. In other words, the wireless identity transmitter may determine whether it has broadcast the broadcast message at the second signal strength for a predefined time period. Alternatively, the wireless identity transmitter may determine whether it has broadcast the broadcast message a predetermined number of times at the second signal strength. If the predefined second period has not completed (i.e., determination block 508="No"), the wireless identity transmitter may continue to broadcast the broadcast message at the second signal strength in block 506.

If the predefined second period has completed (i.e., determination block 508="Yes"), in optional block 502' the wireless identity transmitter may transmit the generated broadcast message at the first signal strength. As described above, the wireless identity transmitter may transmit the broadcast message at the first signal strength for a predefined first period and in optional determination block 504' may determine whether the first period has completed. If the optional predefined period has not completed (i.e., optional determination block 504'="No"), the wireless identity transmitter may continue broadcasting the generated broadcast message at the first signal strength in optional block 502'. If the predefined first period has completed (i.e., optional determination block 504'="Yes"), the wireless identity transmitter may repeat the cycle by performing the operations in block 501.

In various embodiments, the wireless identity transmitter may broadcast at the first and second signal strengths in cycles of various patterns, periods, sequences, and permutations. For example, the wireless identity transmitter may cyclically transmit a pattern of a high-power signals periodically interspersed with one or a few signals transmitted at low-power. As another example, the predefined periods for transmitting at the first signal strength may be the same, shorter, or longer than the periods for transmitting at the second signal strength, and vice versa. For example, the wireless identity transmitter may transmit the broadcast message at the first signal strength for a period several times longer (or larger) than the second signal strength transmission period. In an embodiment, the wireless identity transmitter may change the pattern of transmissions based on a predetermined schedule, received messages from a proximity broadcast receiver or server, user input data, device battery condition, sensor data, etc. In various embodiments, the wireless identity transmitter may broadcast messages at arbitrary and varying signal strengths. In an embodiment, the wireless identity transmitter may transmit signals at more than two power levels to enable more than two reception ranges. For example, signals may be broadcast with strengths of high, medium, medium-high, medium-low, etc.

In an embodiment, the wireless identity transmitter may transmit a second broadcast message at the second signal strength that is different from a first broadcast message transmitted at the first signal strength. For example, the second broadcast message may include additional or variant information, such as indicators that the second broadcast message is being transmitted at a lower signal strength. The use of a different broadcast message for the second signal strength may assist the server in further disambiguating between proximity broadcast receivers relaying or reporting the broadcast messages, as well as avoiding spoofed messages from illegitimate parties. For example, the second broadcast message corresponding to the second signal strength may include information that can only be decoded or used by pre-registered or known proximity broadcast receivers.

Figure 6:
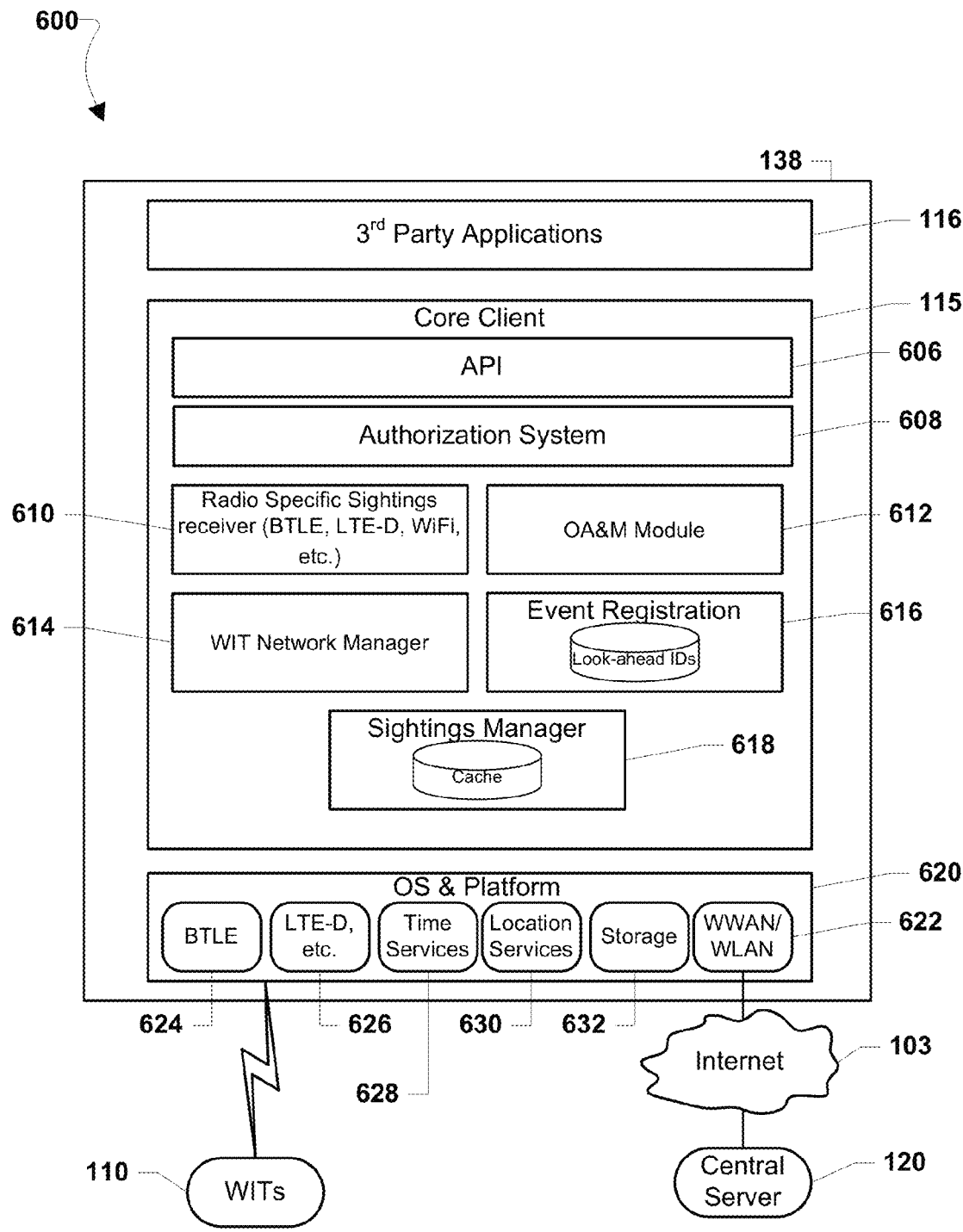
FIG. 6 is a component diagram illustrating various modules within a mobile proximity broadcast receiver suitable for use in various embodiments.

FIG. 6 is a diagram 600 of various modules within a mobile proximity broadcast receiver 138. As described above, proximity broadcast receivers may include stationary proximity broadcast receivers, such as dedicated devices placed around a building, and mobile proximity broadcast receivers 138, such as mobile devices that are configured to perform operations to receive broadcast messages from wireless identity transmitters 110 and transmit sighting messages over the Internet 103 to a central server 120 via long-range communications (e.g., via WiFi or a cellular network). The various modules and components are described below in the context of elements within a mobile proximity broadcast receiver 138, however in various embodiments, any proximity broadcast receiver, such as a stationary proximity broadcast receiver, may include similar modules and/or components.

The mobile proximity broadcast receiver 138 may include a core client module 115 that may be software, instructions, routines, applications, operations, or other circuitry utilized to process received broadcast messages from proximate wireless identity transmitters 110. The core client module 115 may also handle communications between the proximity broadcast receivers 142, 138 and the central server 120, such as transmitting sighting messages and receiving return messages from the central server 120. For example, the core client module 115 may operate as a background service that performs operations, such as uploading or transmitting sighting messages, without interaction from a user.

The core client module 115 may include an API component 606 that corresponds to application programming interface data, code, or other commands related to broadcast messages and/or sighting messages. For example, the API component 606 may be utilized by a proximity broadcast receiver when listening for Bluetooth LE advertising packets received from the wireless identity transmitter 110. As another example, the API component 606 may be utilized to register the mobile proximity broadcast receiver 138 to receive notifications, alerts, or other communications corresponding to wireless identity transmitters 110. The core client module 115 may also include an authorization system component 608 for processing received broadcast messages. For example, the mobile proximity broadcast receiver 138 may support oAuth for authorization requests and xAuth for approved communication partners. The core client module 115 may also include a radio specific sightings receiver component 610 (e.g., a component for handling Bluetooth LE, LTE-D, WiFi, and other communications), an operations, administration, and management (or OA&M) module 612, a wireless identity transmitter network manager component 614, an event registration component 616 that relates to stored look-ahead identifiers, and a sightings manager component 618. In an embodiment, the event registration component 616 may store numerous rolling identifiers downloaded from the central server 120 and corresponding to a particular wireless identity transmitter 110, such as a set of rolling identifiers that may match possible rolling identifiers broadcast by the wireless identity transmitter 110 during a certain time window.

Like many modern mobile devices, the mobile proximity broadcast receiver 138 may be configured to execute third-party applications (or "apps"), and thus may include a third-party applications module 116 that may execute, manage, and otherwise perform software instructions and routines related to applications provided by various third-parties (e.g., merchants). For example, the third-party applications module 116 may receive various data from the core client module 115 to be used by various third-party applications. For illustration purposes, a third-party application related to a department store that is registered with the central server 120 may be configured to receive notifications from the core client module 115 when the user of the mobile proximity broadcast receiver 138 enters, remains, and/or leaves the department store (e.g., a geofence of the store). In an embodiment, for optimization purposes, applications or apps executing via the third-party applications module 116 may register or otherwise be configured to received notifications from the core client module 115 when particular wireless identity transmitters are within proximity, or alternatively, leave proximity. For example, applications may register in advance with the core client module 115 to receive event notifications that indicate whether a particular wireless identity transmitter enters proximity, stays within proximity (e.g., standing nearby and not moving), or leaves proximity.

The mobile proximity broadcast receiver 138 may also include an operating system and platform module 620 for performing various operations and managing circuitry, such as short-range signal receiver circuitry. In particular, the operating system and platform module 620 may include a Bluetooth Low Energy (LE) module 624 for processing communications utilizing Bluetooth LE protocols, a cellular network module 626 for processing communications corresponding to various cellular and similar long-range wireless networks (e.g., LTE-D, etc.). The operating system and platform module 620 may also include a time services component 628 that may track time and generate timestamp data, a location services component 630 that may maintain low-precision location data or alternatively more precise GPS (or A-GPS) location data, a storage component 632, and a wireless wide area network/wireless local area network component 622 for enabling communications via WiFi or other wireless networks.

In an embodiment, the core client module 115 may request from the central server sets of wireless identity transmitter identifiers (e.g., rolling identifiers of all transmitters on an interested list, identifiers for all transmitters owned by a user, etc.). Such sets may correspond to wireless identity transmitters that are currently in use and are expected to be in use for some period of time.

Figure 7A:
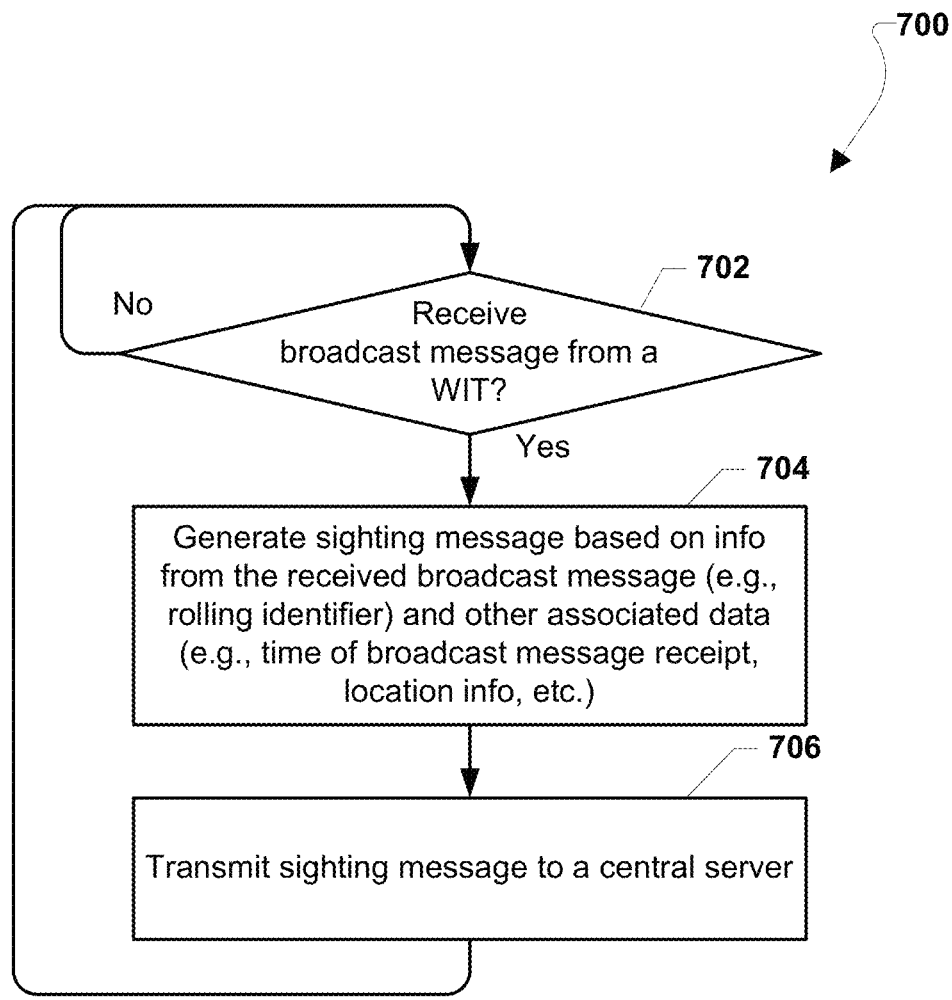
FIGS. 7A-7B are process flow diagrams illustrating an embodiment method of a mobile proximity broadcast receiver relaying a wireless identity transmitter's identifier along with other data, such as a time or location.

FIG. 7A illustrates an embodiment method 700 that may be implemented on a proximity broadcast receiver, such as a stationary proximity broadcast receiver or a mobile proximity broadcast receiver. In determination block 702, the proximity broadcast receiver may determine whether a broadcast message is received. For example, the proximity broadcast receiver may begin listening for broadcast advertisement packets by wireless identity transmitters. As discussed above, in the passive mode/embodiment, the proximity broadcast receiver may continuously be in a monitoring mode, or begin listening for particular identifiers in response to an alert (or search activation message) received from a central server. If the proximity broadcast receiver does not receive a broadcast message (i.e., determination block 702="No"), the proximity broadcast receiver may continue with the operations in determination block 702.

If the proximity broadcast receiver receives a broadcast message (i.e., determination block 702="Yes"), in block 704 the proximity broadcast receiver may generate a sighting message based on information obtained from the received broadcast message and other associated data. In particular, the sighting message may include an identifier specific to the wireless identity transmitter that transmitted the received broadcast message, such as a rolling identifier (i.e., an encoded device identifier), MAC address, or other unique code that may be used to identify the particular wireless identity transmitter. The other associated data may include various information related to the receipt of the broadcast message, such as the time the proximity broadcast receiver received the broadcast message, location information, the proximity broadcast receiver's identification information, related services (e.g., associated merchants), and signal strength information. In other words, the proximity broadcast receiver may associate data about present conditions (e.g., a timestamp, GPS coordinates, Cell ID of the closest base station, etc.) with the broadcast message and/or the wireless identity transmitter's identifier. This data may be stored in any of various types of data structures, such as an array with one or more identifiers associated with timestamps and GPS coordinates from when the sighting corresponding to each identifier occurred. In an embodiment, the sighting message may include authentication data, such as a digital certificate or code, that may be used by a central server to confirm the identity of the proximity broadcast receiver. For example, within the metadata of the sighting message, the proximity broadcast receiver may include a special hash code known only to the proximity broadcast receiver and the central server.

In block 706, the proximity broadcast receiver may transmit the sighting message to a central server, such as via a cellular (e.g., an LTE, 3G, or 4G network) or other network and the Internet as discussed above with reference to FIGS. 2A-2B. Upon reporting a contact event by transmitting the sighting message, the proximity broadcast receiver may promptly return to perform the operations in determination block 702 and await further broadcasts from wireless identity transmitters. This enables the proximity broadcast receiver to continuously report contact events to the central server.

Figure 7B:
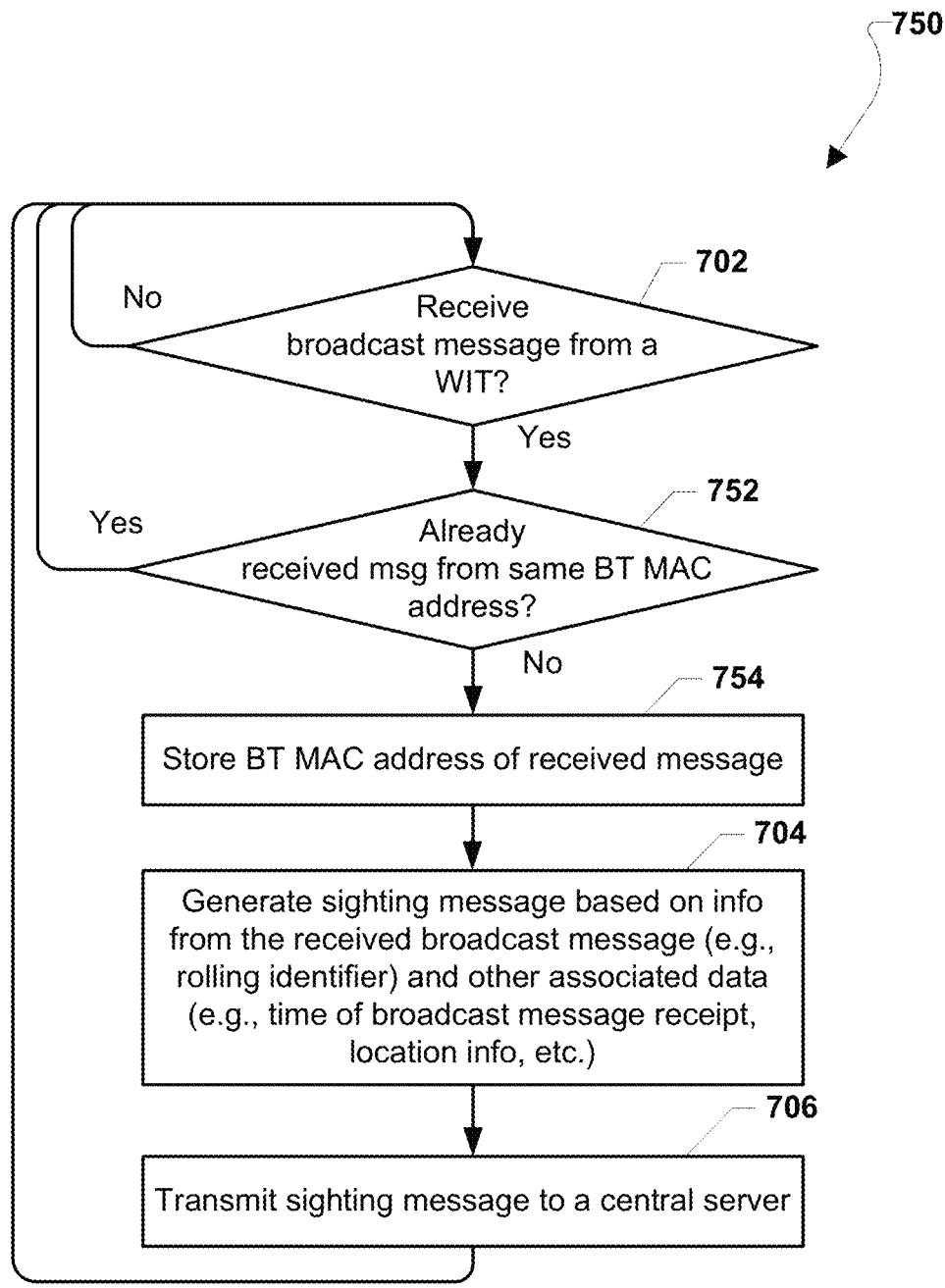

FIG. 7B illustrates an embodiment method 750 that may be implemented on a proximity broadcast receiver, such as a stationary proximity broadcast receiver or a mobile proximity broadcast receiver. The method 750 may be similar to the method 700, except that the proximity broadcast receiver may perform method 750 to ignore received broadcast messages that indicate being broadcast by a Bluetooth machine (MAC) address the proximity broadcast receiver has already encountered. In an embodiment, the method 750 may be performed in response to receiving broadcast messages transmitted by wireless identity transmitters that perform the method 450 described above. By performing the method 750, proximity broadcast receivers may avoid relaying overly redundant information to a central server via sighting messages, which may increase battery efficiency of proximity broadcast receivers configured to utilize internal batteries as well as decreasing unnecessary central server workloads.

In determination block 702, the proximity broadcast receiver may determine whether a broadcast message is received. If the proximity broadcast receiver does not receive a broadcast message (i.e., determination block 702="No"), the proximity broadcast receiver may continue with the operations in determination block 702. If the proximity broadcast receiver receives a broadcast message (i.e., determination block 702="Yes"), in determination block 752 the proximity broadcast receiver may determine whether it has already received a message from the same Bluetooth MAC address. The proximity broadcast receiver may compare a Bluetooth MAC address indicated within the received message to a list of stored Bluetooth MAC addresses corresponding to previously received Bluetooth MAC addresses. In an embodiment, the proximity broadcast receiver may compare the received MAC address to other received addresses over a period of time (e.g., a minute, an hour, etc.) or alternatively may compare the received MAC address to any/all addresses previously received.

If the proximity broadcast receiver has already received a message from the same Bluetooth MAC address (i.e., determination block 752="Yes"), the proximity broadcast receiver may continue with the operations in determination block 702. However, if the proximity broadcast receiver has not already received a message from the same Bluetooth MAC address (i.e., determination block 752="No"), in block 754, the proximity broadcast receiver may store the Bluetooth MAC address of the received message. For example, the proximity broadcast receiver may store the Bluetooth MAC address in a data table that may also contain the time of receipt, as well as other information regarding the received broadcast message. In block 704 the proximity broadcast receiver may generate a sighting message based on information from the received broadcast message and other associated data. In block 706, the proximity broadcast receiver may transmit the sighting message to a central server. Upon reporting a contact event by transmitting the sighting message, the proximity broadcast receiver may promptly return to perform the operations in determination block 702 and await further broadcasts from wireless identity transmitters.

Figure 8:
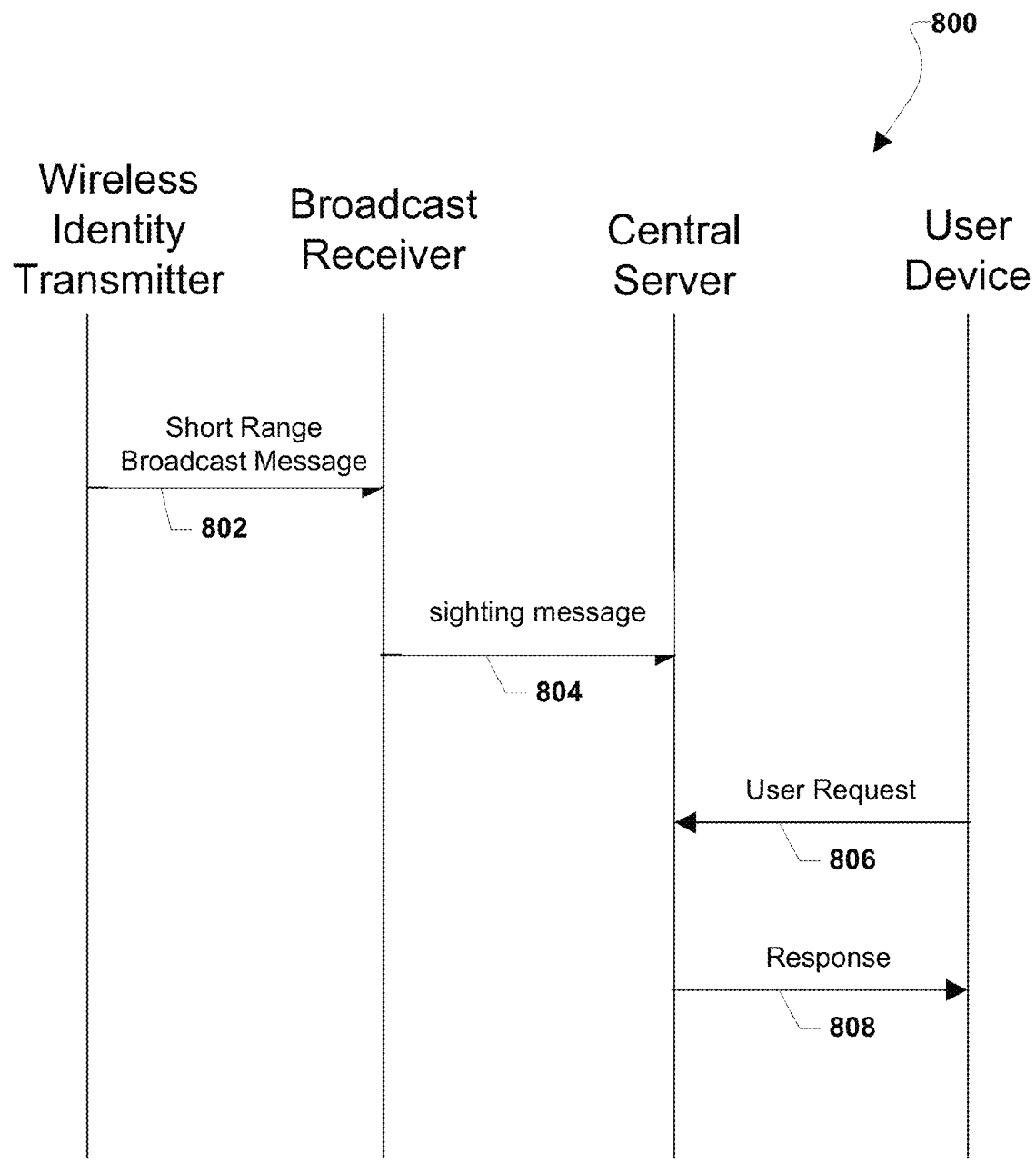
FIG. 8 is a call flow diagram illustrating messages exchanged in responding to a user request for a wireless identity transmitter's location in accordance with various embodiments.

FIG. 8 is a call flow diagram 800 illustrating communications during various embodiments. A wireless identity transmitter 110 may transmit a short range broadcast message 802 (e.g., a Bluetooth LE signal) to a proximity broadcast receiver, such as a mobile proximity broadcast receiver (e.g., a mobile device, cellular phone, etc.) or various other proximity broadcast receivers as discussed above. The broadcast message 802 may contain an identifier for the wireless identity transmitter. The proximity broadcast receiver may transmit (or upload) the wireless identity transmitter's identifier along with any associated data (e.g., timestamp, GPS coordinates, Cell ID, etc.) as a sighting message 804 to a central server 120. The central server 120 may receive the sighting message 804 and store many different identifiers from one or more proximity broadcast receivers.

In some embodiments, identifiers and the associated data may be transmitted (or uploaded) to the central server without any of a user's personal data to protect privacy. In the various embodiments attempting to leverage personal mobile phones, the phone users may opt-in as mobile proximity broadcast receivers. However, these phone users may refuse to opt-in if they fear that personally identifiable data will also be transmitted to the central server. Therefore, an application for uploading received identifiers installed on these personal mobile devices (i.e., mobile proximity broadcast receivers) may prohibit transmission of personal data or other data that may identify the mobile proximity broadcast receivers.

The central server 120 may receive a user request 806 from a user device, such as a terminal 124 or a mobile device, requesting the location of a wireless identity transmitter. This request may be sent by a user after logging into an account associated with a particular wireless identity transmitter. For example, each wireless identity transmitter may be registered with an authenticated user such that a request 806 for the registered wireless identity transmitter's location can only be transmitted after the authenticated user logs into a secure account.

After receiving a user request 806, the server 120 may search through the previously reported wireless identity transmitter identifiers that are received via sighting messages to find any matches with the identifier of the requested wireless identity transmitter. Any matches could be reported to the user in a response 808. The response 808 may also include associated data (e.g. timestamp, GPS coordinates, Cell ID) within the sighting message 804. A user may use this associated data to help locate or track the wireless identity transmitter (e.g., a mother could look for a lost child at the latest location reported for the child's wireless identity transmitter).

Figure 9A:
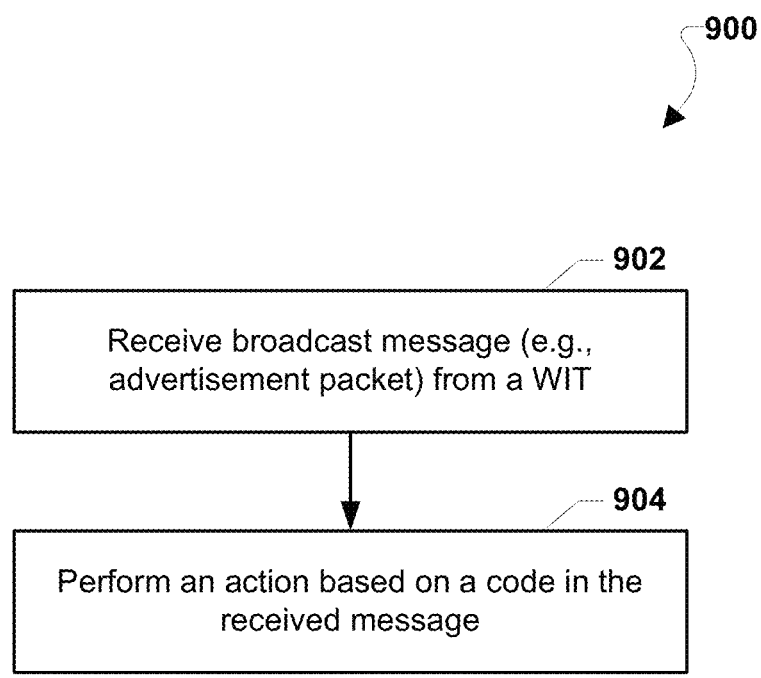
FIG. 9A is a process flow diagram illustrating an embodiment method of responding to a second segment indicating how a message from a wireless device should be handled.

FIG. 9A illustrates an embodiment method 900 for including a type or command segment. In block 902, a proximity broadcast receiver may receive a broadcast message, such as a broadcast advertising packet, from a wireless identity transmitter (referred to as "WIT" in FIG. 9A). The broadcast message may contain an identifier segment, as well as an additional segment or code, such as a type segment or command segment. The proximity broadcast receiver may perform an action based on this code in the received broadcast message in block 904. In various embodiments, this action may include any operation the proximity broadcast receiver is capable of performing. For example, the proximity broadcast receiver may assign different levels of priority to messages or identifiers based on a type segment or command segment (e.g., child safety devices have higher priority than security tags from stores). Received messages or identifiers with higher priority may be transmitted to a central server first or deleted last from a proximity broadcast receiver's local log.

A proximity broadcast receiver may handle the broadcast message or identifier differently based on a type or command segment. For example, the message may be stored locally for a certain time (e.g., various times depending on the value of the segment) prior to being transmitted to a central server.

Alternatively, the message or identifier, along with any associated data such as timestamps and GPS coordinates, may be transmitted to multiple locations.

As another example, a proximity broadcast receiver may initiate various communications based on the type and/or command segments. The proximity broadcast receiver may report to particular URLs, transmit an SMS message, initiate a phone call, or establish new network connections. In various embodiments, some of these actions may be optionally disabled to protect user privacy.

In further embodiments, the proximity broadcast receiver may be configured to transmit the additional segment or other message to another network device for the other network device to take some action. For example, the proximity broadcast receiver may forward the message along with associated data to the central server. The central server may perform an action based on the additional segment in the message, such as automatically sending a message to a user without waiting for a user request.

Figure 9B:
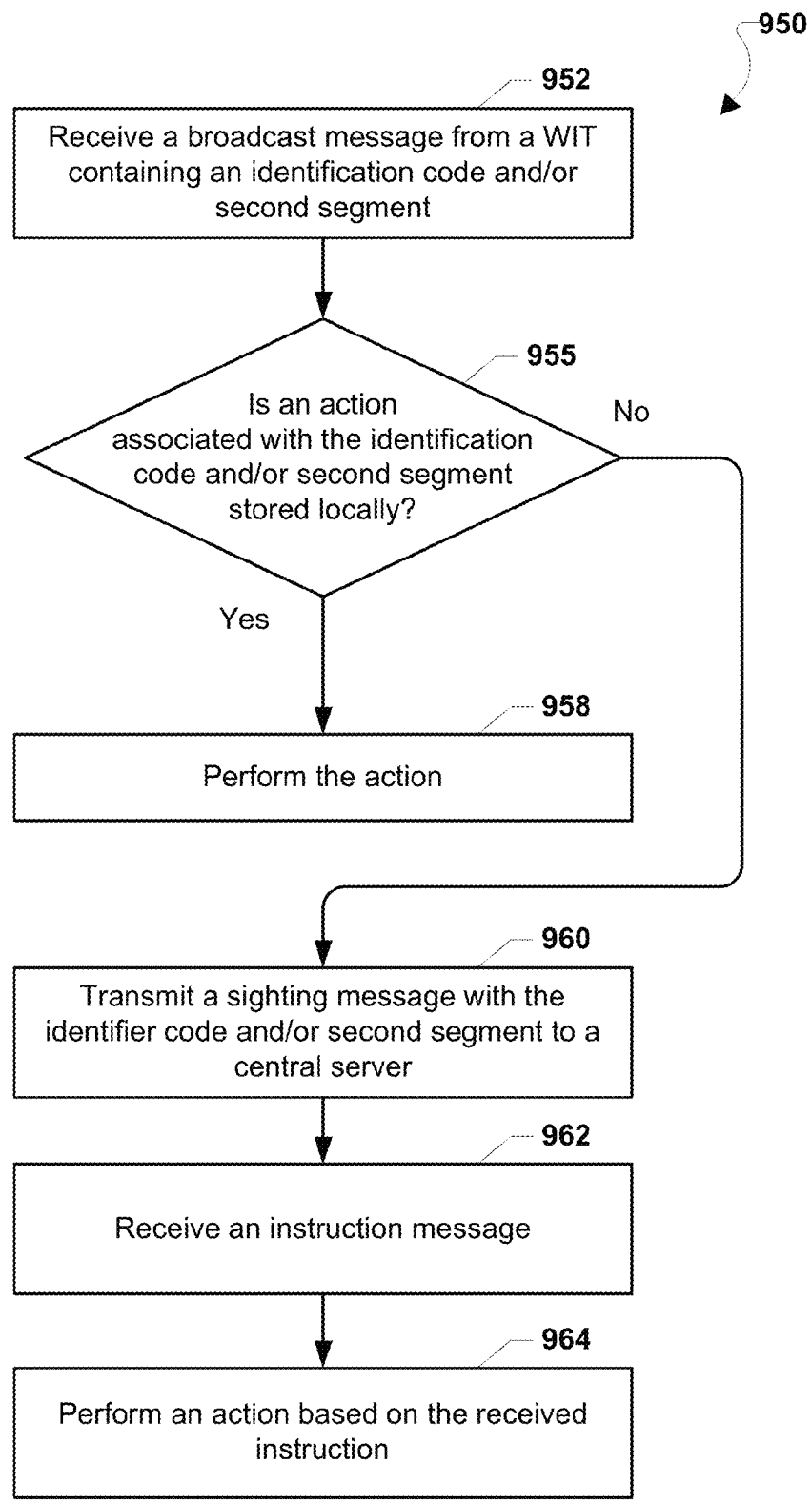
FIG. 9B is a process flow diagram illustrating an embodiment method of publishing content based on proximity to a wireless identity transmitter.

FIG. 9B illustrates an embodiment method 950 for providing content based on proximity to a wireless identity transmitter. A proximity broadcast receiver may receive a broadcast message from a wireless identity transmitter (referred to as "WIT" in FIG. 9B) containing an identification code and/or second segment in block 952. The proximity broadcast receiver may determine whether an action associated with the identification code and/or second segment is stored locally (e.g., in the proximity broadcast receiver's memory) in determination block 955. If an associated action is found locally (i.e., determination block 955=Yes), the action may be performed by the proximity broadcast receiver in block 958.

If an associated action is not found locally (i.e., determination block 955=No), the proximity broadcast receiver may transmit a sighting message with the identifier and/or second segment to a central server in block 960. In an embodiment, the proximity broadcast receiver may transmit a message to another device, such as a user device. The proximity broadcast receiver may receive an instruction message in block 962. This instruction may be sent by the central server or other device in response to the sighting message with the identifier and/or second segment. In block 964, the proximity broadcast receiver may perform an action based on the received instruction message, such as access content by going to a web page or other online resource. In alternate embodiments, the proximity broadcast receiver may skip the determination block 955 and automatically proceed to either transmit a sighting message in block 960 or attempt to perform an action stored locally.

A proximity-based content publishing system may be used for a wide range of activities. For example, teens may carry a wireless identity transmitter with them that they point to their social networking pages (e.g., Facebook®). When they are proximate to friends, the pages can be quickly accessed on proximity broadcast receivers (i.e., mobile phones configured to operate as mobile proximity broadcast receivers). Realtors may setup a web page for a home and affix to the home's signpost a wireless identity transmitter pointing to the web page so that anyone driving by the home can access that information. Stores may include wireless identity transmitters with products to provide dynamic displays such as links to coupons, consumer reports, or additional nutritional information. If a lost dog has a wireless identity transmitter on its collar, instead of trying to wrestle the dog for access to his collar, a proximity broadcast receiver may simply access the wireless identity transmitter and send a message or call the owner.

The various features and alternative actions may enable the system to have flexible and extensible functionality. The functionality could be added later as the actions taken are controlled by applications that may be updated in proximity broadcast receivers over time.

Figure 10:
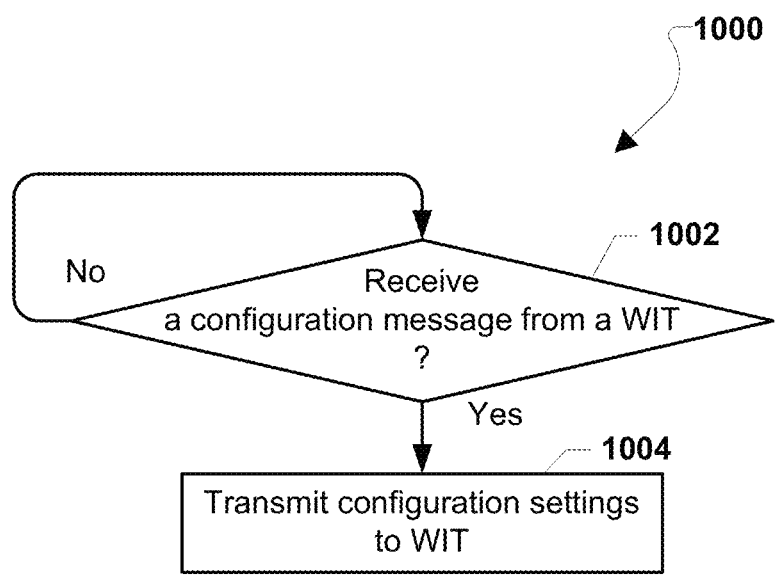
FIG. 10 is a process flow diagram illustrating an embodiment method for a proximity broadcast receiver to transmit configuration settings for receipt by a wireless identity transmitter.

FIG. 10 illustrates an embodiment method 1000 for a proximity broadcast receiver to transmit configuration settings for receipt by a wireless identity transmitter (referred to as "WIT" in FIG. 10). The method 1000 may be performed by the proximity broadcast receiver, such as a stationary proximity broadcast receiver or a mobile proximity broadcast receiver, in combination with or in response to the wireless identity transmitter performing the operations of the method 400 described above with reference to FIG. 4A. In determination block 1002, the proximity broadcast receiver may determine whether a configuration message from a wireless identity transmitter is received. For example, the proximity broadcast receiver may monitor a receiving circuit to determine whether short-range wireless signals having particular codes, flags, metadata, header information, or information the proximity broadcast receiver identifies as relating to configuration requests. If a configuration message is not received (i.e., determination block 1002="No"), the proximity broadcast receiver may continue with the operations in determination block 1002.

If a configuration message is received (i.e., determination block 1002="Yes"), in block 1004, the proximity broadcast receiver may transmit configuration settings to the wireless identity transmitter. For example, the proximity broadcast receiver may broadcast a Bluetooth LE signal that includes values for configuration parameters of the wireless identity transmitter indicated in the received configuration message. In particular, the proximity broadcast receiver may broadcast Bluetooth LE setters that may be received by the wireless identity transmitter and processed to set various operating or configuration parameters, such as a transmit interval parameter. In an embodiment, the proximity broadcast receiver (or an identity transceiver) may perform the operations of method 1000 as a background service or application such that the proximity broadcast receiver may be constantly or periodically monitoring for configuration messages from wireless identity transmitters.

Figure 11:
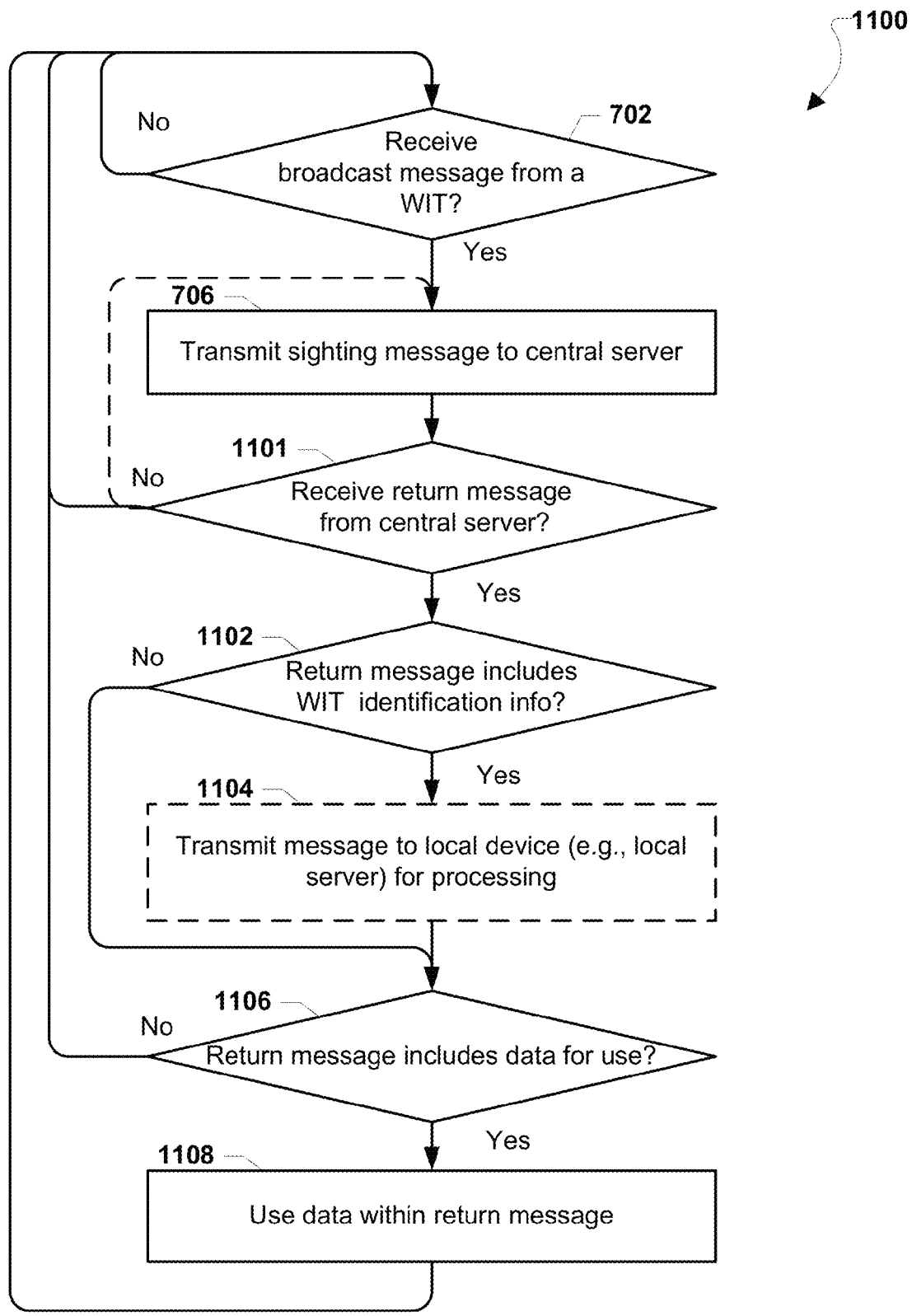
FIG. 11 is a process flow diagram illustrating an embodiment method for a proximity broadcast receiver relaying a received broadcast to and receiving a return message from a central server.

FIG. 11 illustrates an embodiment method 1100 for a proximity broadcast receiver relaying a broadcast message to and receiving a return message from a central server. Proximity broadcast receivers may be connected to facilities, such as houses, stores, gyms, schools, etc., and may be configured to execute various operations relating to those facilities. For example, a proximity broadcast receiver may be contained within equipment that executes software routines. Such proximity broadcast receivers may be configured to execute particular routines in response to receiving broadcast messages from a wireless identity transmitter (referred to as "WIT" in FIG. 11). For example, the proximity broadcast receiver may modify the execution of operations to suit preferences of the user of the wireless identity transmitter.

However, as discussed above, the wireless identity transmitter may obscure or encrypt data within broadcast messages to protect the privacy and identity of the wireless identity transmitter user. For example, the broadcast messages may not transmit the user's identity in the clear. To determine the identity information related to received broadcast messages, the proximity broadcast receiver may relay the broadcast messages to the central server, which may identify the wireless identity transmitter and its user based on information in the messages (e.g., a disguised, rolled, or encrypted device ID). As discussed above, the central server may store a secret to decrypt messages transmitted by the wireless identity transmitter. In response to receiving a sighting message, the central server may transmit a return message to the proximity broadcast receiver including identification information of the wireless identity transmitter.

In an embodiment, the central server may also store additional information relevant to the operations of the facility associated with the proximity broadcast receiver. For example, the central server may be an information hub that stores proprietary information related to the operations of the facility the proximity broadcast receiver is within. As another example, the central server may contain instructions for the proximity broadcast receiver to perform based on the identity of the wireless identity transmitter. Accordingly, the central server may transmit a return message that may not identify the wireless identity transmitter (or its user) related to a sighting message, but may instead includes data relevant to the wireless identity transmitter. In various embodiments, return messages may include or not include either data or identification information based on the preferences of the user of the wireless identity transmitter and/or the services associated with the proximity broadcast receiver. For example, the proximity broadcast receiver may be registered as relating to a trusted service for the user of the wireless identity transmitter, and therefore the central server may transmit return messages that identify the user. As another example, the user of the wireless identity transmitter may have set privacy permissions (or settings) during a registration procedure with the central server that enable anonymous data to be distributed to proximity broadcast receivers. Privacy permissions are further discussed below with reference to FIG. 23.

In determination block 702, the proximity broadcast receiver may determine whether a broadcast message is received, such as from a wireless identity transmitter. If no broadcast message is received (i.e., determination block 702="No"), the proximity broadcast receiver may continue with the operations in determination block 702. If a broadcast message is received (i.e., determination block 702="Yes"), in block 706 the proximity broadcast receiver may transmit a sighting message to a central server. For example, the sighting message may include identification information of the wireless identity transmitter as well as associated data, such as the location of the proximity broadcast receiver and a timestamp. In determination block 1101, the proximity broadcast receiver may determine whether a return message from the central server is received. In an embodiment, the proximity broadcast receiver may record identification information about the sighting message and may compare that information to received messages to find a match. If no return message is received (i.e., determination block 1101="No"), the proximity broadcast receiver may continue with the operations in determination block 702. Alternatively, if no return message is received (i.e., determination block 1101="No"), the proximity broadcast receiver may optionally re-transmit the sighting message to the central server in block 706. In an embodiment, the proximity broadcast receiver may retransmit sighting messages a predefined number of times over a period of time when no return message is received.

When a return message is received (i.e., determination block 1101="Yes"), in determination block 1102 the proximity broadcast receiver may determine whether the return message includes wireless identity transmitter identification information. For example, identification information may include user names, addresses, sensitive information (e.g., social security number, banking information, passwords, etc.), and other data describing the wireless identity transmitter and/or the user of the wireless identity transmitter. If the return message does contain identification information (i.e., determination block 1102="Yes"), in optional block 1104 the proximity broadcast receiver may transmit a message to a local device, such as a local server, for processing. In other words, the proximity broadcast receiver may relay the identification information in the return message to a local device associated with proximity broadcast receiver and/or the facility in which the proximity broadcast receiver is located. For example, the proximity broadcast receiver may transmit the identification information of the wireless identity transmitter to a local computing device of a gym, retail store, a school, or other third-party that may in turn determine instructions for the proximity broadcast receiver based on the identification information. In an embodiment, the local device may store the identification information and/or relate the information to database data for further use with the various related devices of the facility.

If the return message does not include identification information (i.e., determination block 1102="No") or the proximity broadcast receiver transmits a message to the local device in optional block 1104, the proximity broadcast receiver may determine whether the return message includes other data for use, such as by the proximity broadcast receiver or other devices associated with the proximity broadcast receiver in determination block 1106. For example, the return message may include commands or instructions for the proximity broadcast receiver to perform. Additionally, the data may contain configuration data (or configuration information) that may be used by various devices to accommodate the wireless identity transmitter and/or the preferences of the wireless identity transmitter's user. For example, the return message may contain software instructions for the proximity broadcast receiver to use or transfer to the local device, the wireless identity transmitter, or various other associated devices. If the return message includes data for use (i.e., determination block 1106="Yes"), in block 1108 the proximity broadcast receiver may use the data within the return message. For example, the proximity broadcast receiver may execute operations to utilize configuration data from the return message (e.g., set equipment to suit the user's preferences). If the return message does not contain data for use by the proximity broadcast receiver (i.e., determination block 1106="No"), the proximity broadcast receiver may continue with the operations in determination block 702.

As a non-limiting, illustrative example: the proximity broadcast receiver may be connected to a piece of exercise equipment within a fitness facility. When the proximity broadcast receiver receives a broadcast message from the wireless identity transmitter carried by a user intending to work-out on the exercise equipment, the proximity broadcast receiver may transmit a sighting message to the central server. The proximity broadcast receiver may receive a return message from the central server that includes data which may be used to configure the exercise equipment to suit the anatomical dimensions and preferences of the user of the wireless identity transmitter without necessarily sharing the user's identity. For example, the proximity broadcast receiver may use the data to adjust the height of the equipment's seat or pedals. As another example, the data may define a workout routine to be executed on the exercise equipment. Alternatively, the return message may include the user's fitness facility identification, which the proximity broadcast receiver may transmit to a local server (e.g., a gym administrative server). The local server may compare the user's fitness facility identification to a local database and in response to the comparison, may transmit personalized configuration instructions to the proximity broadcast receiver and exercise equipment. Other non-limiting but illustrative applications of return message data may include configuring rental cars (e.g., seat positions, settings, etc.) and computer components (e.g., mouse, keyboards, etc.) for personalized use by the user of the wireless identity transmitter.

In an embodiment, return messages may include identification information such as photographic imagery useful to identify the user of the wireless identity transmitter. For example, in response to receiving a return message identifying the user of the wireless identity transmitter, the proximity broadcast receiver may display an image of the user or a sample of the user's handwriting (e.g., a signature). This functionality may be used by emergency personnel, citizens on alert, or merchants when attempting to quickly verify the identity of a person (e.g., a missing child, customer, etc.) equipped with a wireless identity transmitter. In another embodiment, a merchant's proximity broadcast receiver engaged in a business transaction (e.g., a point-of-sale device with an embedded proximity broadcast receiver) may transmit a sighting message including information broadcast by a proximate customer's wireless identity transmitter. The resulting return message may include confirmation that the identities of the registered user of the wireless identity transmitter and the customer match (i.e., the in-store person matches the user indicated in the central server as relating to the wireless identity transmitter). Additionally, if the identities are the same, the return message may include additional information to assist in the transactions, such as payment information, credit card numbers, or contact information for follow-up communications.

In another embodiment, the return message from the central server may include software instructions and/or data that may cause the proximity broadcast receiver to modify, adjust, remove, activate, or disable components, sensors, features, software, and/or functions of the proximity broadcast receiver. For example, the return message may include software instructions that the proximity broadcast receiver executes upon receiving the return message, or triggers the proximity broadcast receiver to execute a pre-loaded routine or enter a particular operating mode. Such software instructions may define operations the proximity broadcast receiver may execute that configure the proximity broadcast receiver, such as activating (or de-activating) a camera component, a cellular network modem, speaker systems, WiFi transceivers, etc. As another example, the return message may instruct the proximity broadcast receiver, such as a smartphone configured to operate as a mobile proximity broadcast receiver, to execute an application, transmit a message (e.g., email, SMS, short-range radio signal, etc.), or turn itself off. Software instructions within such return messages may include timing information that indicates when affected components, sensors, features, software, and/or functions may be configured and/or re-configured. For example, the return message may include instructions that cause the proximity broadcast receiver to disable a microphone for a certain period of time. In an embodiment, the proximity broadcast receiver may be configured to reverse any modifications, adjustments, operating mode selections, or other configurations identified in return message software instructions after a period of time and/or when the proximity broadcast receiver no longer receives broadcast messages from wireless identity transmitters related to the return message. For example, the proximity broadcast receiver may disable the speakers on the proximity broadcast receiver so long as the proximity broadcast receiver receives broadcast messages from the wireless identity transmitter. In another embodiment, the proximity broadcast receiver may modify, adjust, remove, activate, or disable components, sensors, features, software, and/or functions of the proximity broadcast receiver based on information within received broadcast messages. For example, the proximity broadcast receiver may process a received broadcast message and execute detected software instructions that direct the proximity broadcast receiver to disable a sensor, such as a camera.

Such embodiments may be useful in a number of applications. For example, wireless identity transmitters may be placed in sensitive areas, such as government buildings, court houses, locker rooms, intelligence offices, executive conference rooms, movie theaters, etc. When deployed in this manner the proprietors or management authorities of the sensitive areas may require that any mobile computing devices (e.g., smart phones) that are brought into such areas be coupled to or configured to function as proximity broadcast receivers, such as loading and/or activating a PBR application. Mobile computing devices configured to function as mobile proximity receivers may receive wireless identity transmitter wireless short-range signals from wireless identity transmitters in particularly sensitive areas, and relay the information in those signals to a central server. When the relayed identity transmitter information indicates the mobile computing device is in a sensitive area, the central server may send commands to the mobile computing device causing it to take appropriate actions, such as turning off ringers, cameras and/or microphones. For example, regulators may require all portable computing devices (e.g., smartphones, table computers, etc.) entering a particular government building to include Bluetooth LE transceivers that can receive broadcast messages from the wireless identity transmitters within the building and an application to perform the proximity broadcast receiver functions described in the various embodiments. As another example, mobile proximity broadcast receivers (e.g., tablet devices) entering a theater may be required to execute an application that can process broadcast messages, transmit sighting messages to a central server, and respond to commands in return messages from the central server. Devices configured in this manner may transmit identity information from received broadcast messages to a central server, which may enable the central server to determine the location of the device (i.e., within reception range of the identified wireless identity transmitter). This may enable the central server to determine when a computing device is within a sensitive area. For example, the central server may decode a sighting message and identify the corresponding wireless identity transmitter as one within a sensitive area. The central server may generate and transmit return messages containing commands or software instructions, as described above, that may direct the computing devices to disable various sensor devices, functions, and/or components. For example, a smartphone mobile proximity broadcast receiver relaying broadcast messages from a wireless identity transmitter in a locker room may receive return messages from the central server instructing the smartphone to de-activate its camera. In an embodiment, the computing devices may execute software instructions received from the central server as long as broadcast messages are received from the sensitive area wireless identity transmitters. Thus, in the foregoing example, when the smartphone exits the locker room, it may stop receiving the return messages from the central server and, in response, reactivate its camera. In a similar manner, the various embodiments may be used to deactivate smartphone ringers in theaters or court rooms, deactivate microphones in concerts and live theater, deactivate GPS receivers and transmitters in military installations, deactivate SMS and email functions on school grounds, etc.

Figure 12A:
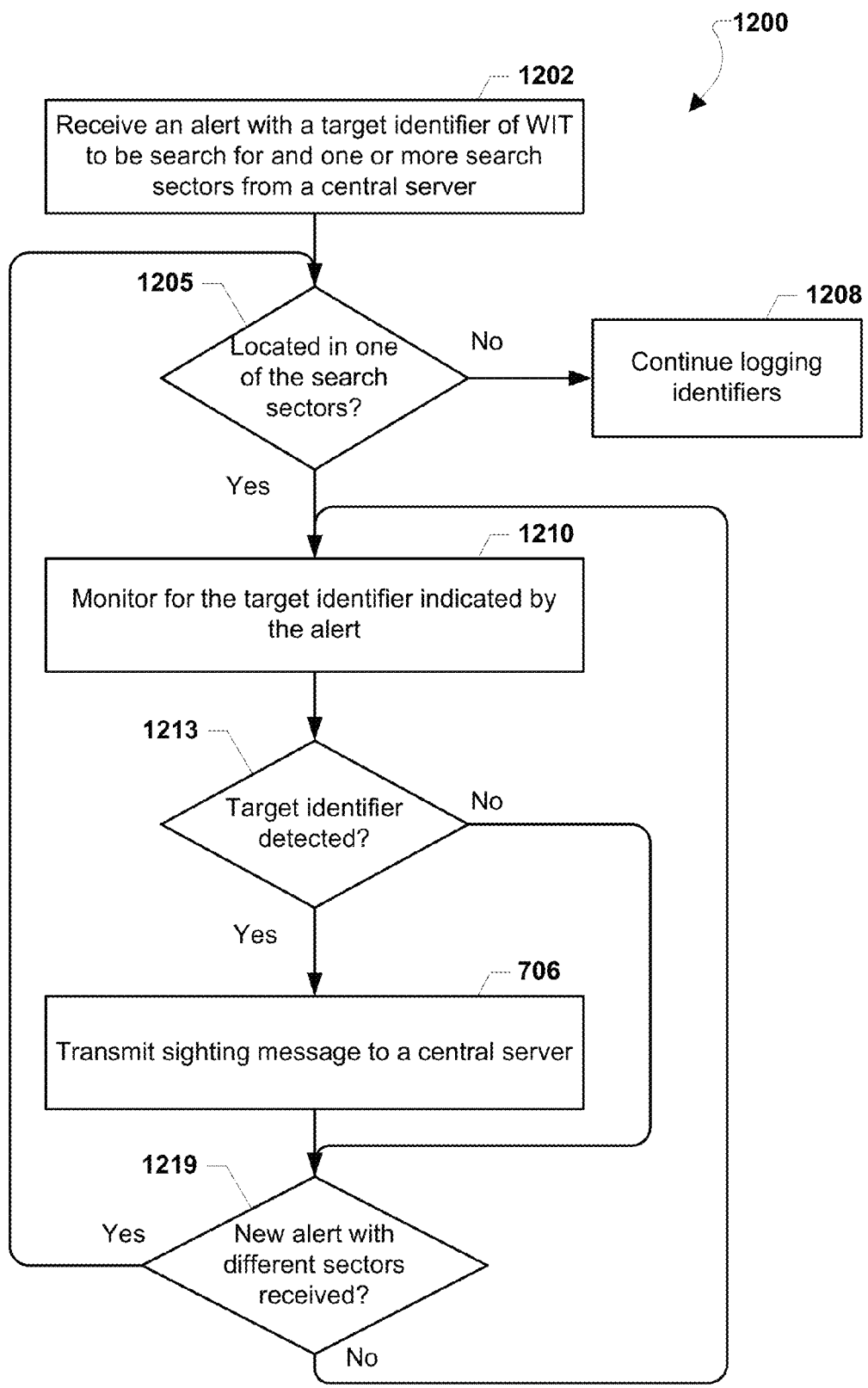
FIG. 12A is a process flow diagram illustrating an embodiment method of a mobile proximity broadcast receiver responding to an alert for a particular wireless identity transmitter.

FIG. 12A illustrates an embodiment method 1200 for a proximity broadcast receiver actively searching for a wireless identity transmitter. In block 1202, the proximity broadcast receiver may receive an alert (or search activation message) with a target identifier of the wireless identity transmitter (referred to as "WIT" in FIG. 12A) to be searched for and one or more search sectors from a central server. In an embodiment, the alert may include an encoded, encrypted, or otherwise obscured identifier that the proximity broadcast receiver may not access such that the target of the search may not be identified by the proximity broadcast receiver. The search sectors indicated in the alert may correspond to one or more sectors to be searched. The proximity broadcast receiver may determine whether it is located within one of the search sectors in determination block 1205. For example, the proximity broadcast receiver may compare the search sectors from the alert to its current GPS coordinates or Cell ID.

If the proximity broadcast receiver is not located in one of the search sectors (i.e., determination block 1205=No), in block 1208 the proximity broadcast receiver may continue logging identifiers, such as storing obscured or secure identifiers (i.e., rolling identifiers) within received broadcast messages in relation to corresponding locations and times. In an embodiment, the proximity broadcast receiver may maintain a log of previous wireless identity transmitter sightings. In this embodiment, rather than storing all of the data from previous sightings on one or more remote servers (e.g., the central server), the data may remain distributed on the proximity broadcast receiver until a search or alert is active. In various embodiments, the proximity broadcast receiver may store data from previous sightings, such as the wireless identity transmitter's rolling identifier and the location and time of the sighting (as well as any other associated data). In response to an alert, the proximity broadcast receiver may search its database for any recorded sightings for which the stored identifier matches with the target identifier provided in the alert or activation message. If a match is present, a response may be transmitted to the central server that provides data corresponding to that target identifier as described below.

If the mobile proximity broadcast receiver is located in one of the search sectors (i.e., determination block 1205=Yes), the proximity broadcast receiver may monitor for the target identifier indicated by the alert in block 1210, such as by comparing the target identifier with any identifiers received in broadcast messages from proximate wireless identity transmitters. In determination block 1213, the proximity broadcast receiver may determine whether the target identifier is detected. If the target identifier is not detected (i.e., determination block 1213=No), the proximity broadcast receiver may proceed to determination block 1219 discussed below.

If the target identifier is detected (i.e., determination block 1213=Yes), the proximity broadcast receiver may immediately transmit a sighting message to a central server in block 706, such as by transmitting a sighting message including the target identifier, a time, and location information (e.g., GPS coordinates). The proximity broadcast receiver may determine whether a new alert with different sectors from the previous alert has been received in determination block 1219. If a new alert is received (i.e., determination block 1219=Yes), the proximity broadcast receiver may determine whether it is located in one of the new sectors by performing the operations in determination block 1205. If no new alert is received (i.e., determination block 1219=No), the proximity broadcast receiver may continue monitoring for the target identifier in block 1210.

In further embodiments, the proximity broadcast receiver may determine the search sectors for which it is responsible. For example, a cell phone that has opted in may install a tracking application for finding wireless identity transmitters. This application may develop a list of sectors in which a search should be conducted by monitoring the cell phone's location over time. The application may then search for wireless identity transmitters based on alert messages that list the search sectors. Thus, in this embodiment, the alerts (or search activation message) may be broadcast or multicast by a central server to all proximity broadcast receivers identifying the sectors being searched, and the receivers themselves may determine whether they should enter the active search mode based upon their current location.

In other embodiments, proximity broadcast receivers may be configured to transmit sighting messages for all broadcast messages received, regardless of having received an alert message. In other words, proximity broadcast receivers may transmit sighting messages for the central server to detect whether a target identifier is included and therefore the wireless identity transmitter targeted by an active search has been sighted.

Figure 12B:
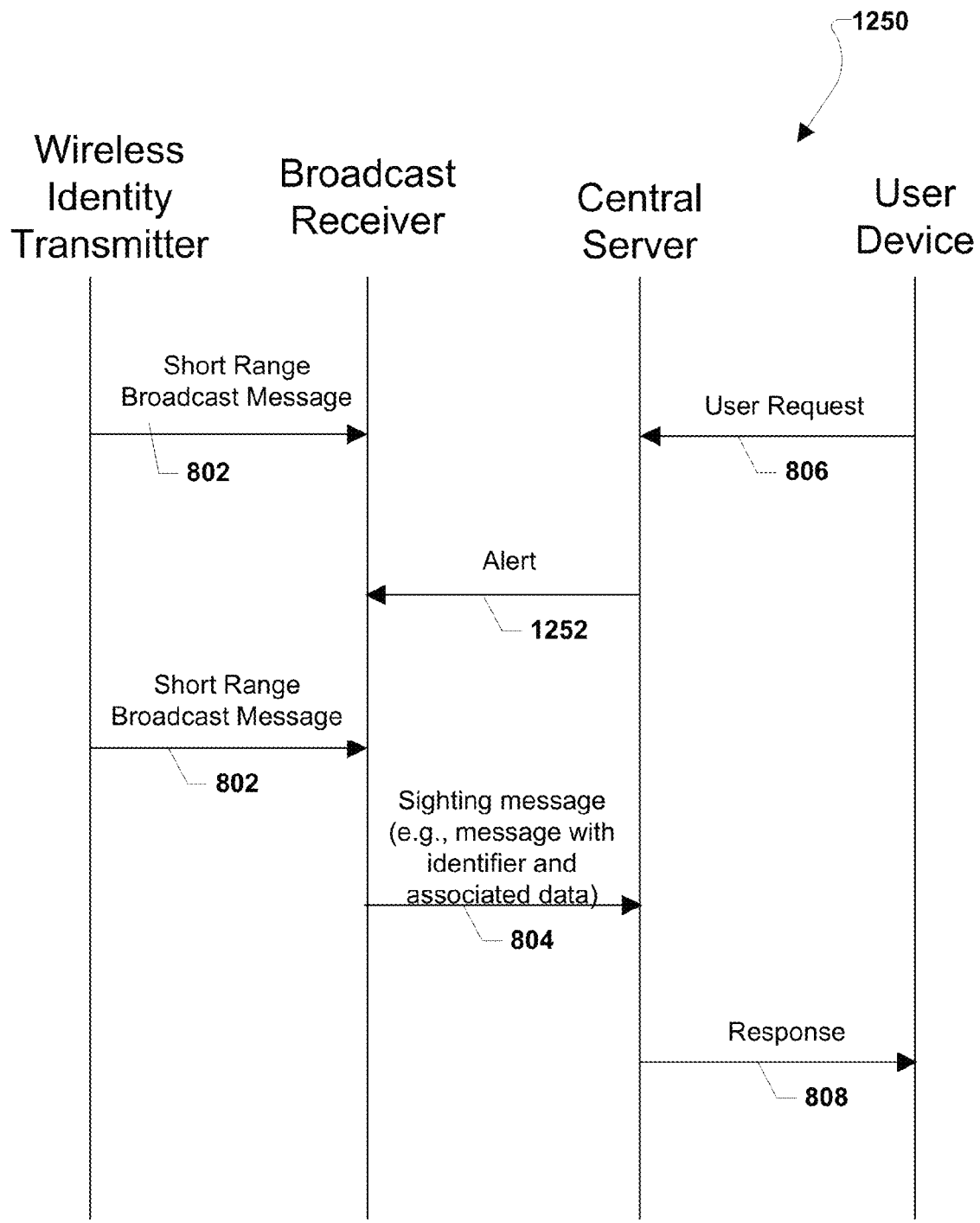
FIG. 12B is a call flow diagram for responding to a user request for a wireless identity transmitter's location by sending an alert in accordance with various embodiments.

FIG. 12B is a call flow diagram 1250 illustrating communications related to an alert 1252 during various embodiments. In general, an alert 1252 may be related to an active search as described above. A user request 806 may be sent to a central server from a user device, such as a terminal or mobile device. The user request 806 may request the location of a wireless identity transmitter and may include a code or identifier associated with the wireless identity transmitter. The central server may transmit an alert 1252 (or search activation message) to one or more proximity broadcast receivers. The alert 1252 may contain a representation of the identifier of the requested wireless identity transmitter. For example, the alert 1252 may contain a rolling identifier that is secure and does not provide the identity of the wireless identity transmitter or its user.

As mentioned above, in an embodiment the central server may transmit the alert to a certain subsets of proximity broadcast receivers, such as proximity broadcast receivers located within a particular geographic sector where the requested wireless identity transmitter is likely or suspected to be. For example, the user request 806 may specify the last known location of the requested wireless identity transmitter, and the central server may transmit the alert 1252 to proximity broadcast receivers in sectors near that location.

Proximity broadcast receivers receiving the alert 1252 may monitor for broadcast messages 802 (e.g., broadcast advertisements) with the identifier of the requested wireless identity transmitter. The proximity broadcast receiver may then transmit a sighting message 804 to the central server. In other words, the proximity broadcast receiver may upload associated data, such as timestamp, GPS coordinates, proximity broadcast receiver identification, and/or Cell ID, that is associated with the wireless identity transmitter or its identifier. The central server may transmit a response 808 to the user device informing the user of the associated data from the proximity broadcast receiver's contact with the searched for wireless identity transmitter.

Various embodiments may combine the active searching method illustrated in FIG. 12B with the passive searching model discussed above. For example, the proximity broadcast receiver may have previously received a short range broadcast message 802 (e.g., a Bluetooth LE radio signal) from the wireless identity transmitter. This message 802 and any associated data (e.g., timestamp, GPS coordinates, Cell ID, etc.) may be stored locally on the proximity broadcast receiver or forwarded to the central server performing tracking services. When a user request 806 is received, the central server or proximity broadcast receiver may search a database corresponding to prior received broadcast messages 802 from wireless identity transmitters and associated data in addition to initiating an active search by transmitting the alert 1252. The response 808 may include all data resulting from the active search and associated with any prior messages 802.

Figure 13:
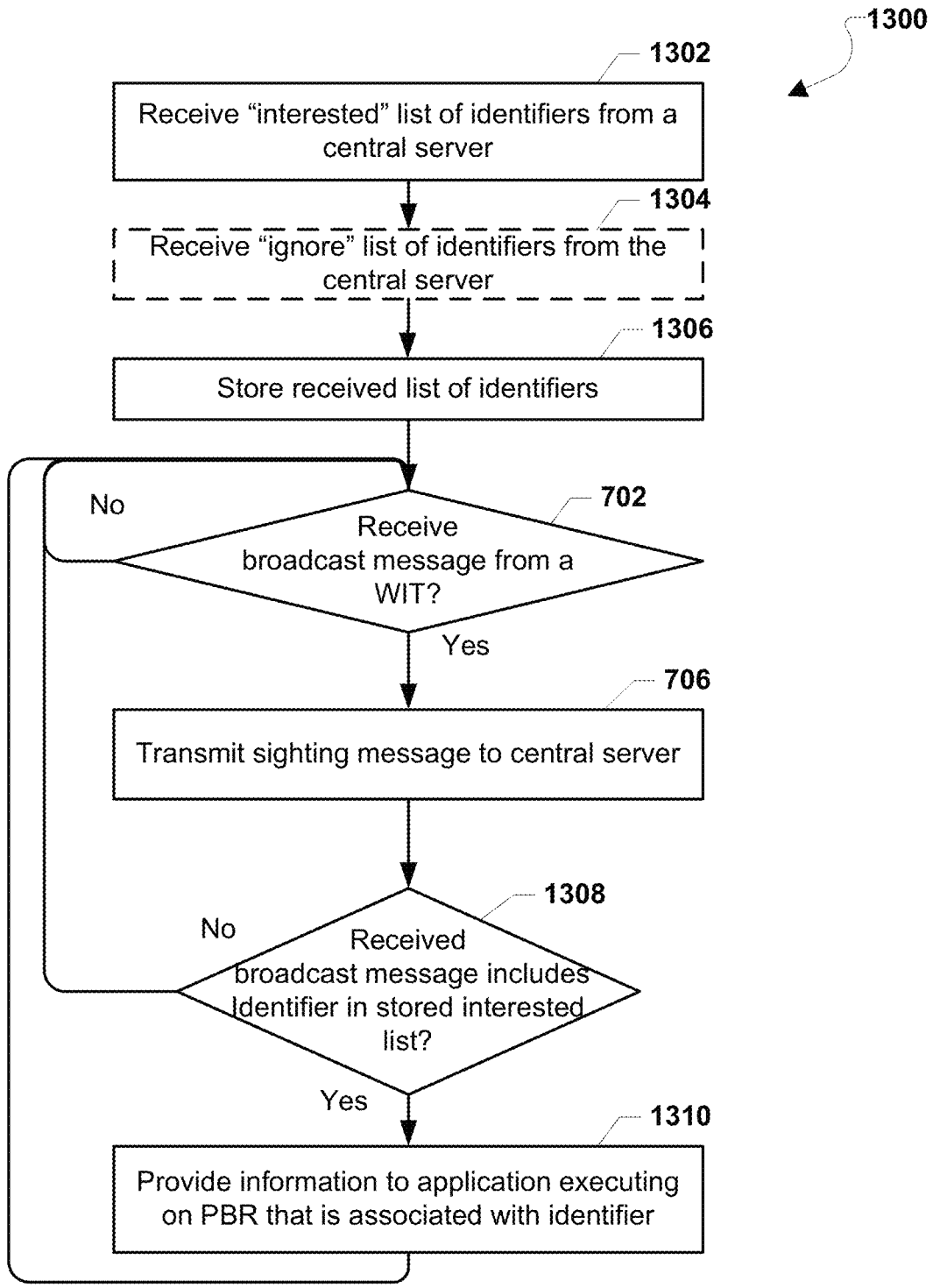
FIG. 13 is a process flow diagram illustrating an embodiment method for a proximity broadcast receiver to utilize a list of known wireless identity transmitter identifiers.

FIG. 13 illustrates an embodiment method 1300 for a proximity broadcast receiver to utilize a list of known wireless identity transmitter identifiers. Proximity broadcast receivers may be configured to store lists of particular identifiers or other data corresponding to users and/or wireless identity transmitters. For example, a proximity broadcast receiver (e.g., a smartphone configured to operate as a mobile proximity broadcast receiver) may store within a local database a table that includes a plurality of unique machine addresses of wireless identity transmitters. In particular, the proximity broadcast receiver may utilize a stored list of identifiers the user of the proximity broadcast receiver is interested in (i.e., an "interested" list). An interested list may include identifiers of all wireless identity transmitters owned by the user of the proximity broadcast receiver. For example, the central server may prompt the user to indicate all wireless identity transceivers, wireless identity transmitters, and proximity broadcast receivers associated with the user during a registration procedure (e.g., a website registration associated with the central server). By storing such lists, the proximity broadcast receiver may avoid constantly querying the central server for identification or relevance information regarding received broadcasts. In other words, "interested" lists may put the proximity broadcast receiver on notice of broadcast messages that the user of the proximity broadcast receiver may want to be announced.

The interested list may be utilized to inform applications executing on the proximity broadcast receiver (e.g., third-party apps related to merchants or services) when the proximity broadcast receiver receives broadcast messages from wireless identity transmitters associated with persons, places, or things that are of interest to the user of the proximity broadcast receiver. For example, the proximity broadcast receiver may receive a broadcast message from a wireless identity transmitter located at a check-out counter of a retail store, match the identifier within the received broadcast message to an identifier stored in an interested list, and provide the matched identifier to an app that is associated with the retail store and is running on the proximity broadcast receiver. In an embodiment, the proximity broadcast receiver may include in an interested list any entities, such as stores, vendors, merchants, and other third-parties, that are associated with (or sponsoring) third-party applications installed on the proximity broadcast receiver. In an alternative embodiment, the proximity broadcast receiver may store a list of identifiers that may be ignored (i.e., an ignore list). Such an ignore list may be utilized by the proximity broadcast receiver to avoid reporting identifiers received in broadcast messages to applications. For example, when an identifier on the ignore list is received via a broadcast message, the proximity broadcast receiver may disregard the broadcast message with respect to third-party applications executing on the proximity broadcast receiver.

In various embodiments, interested lists may be defined, populated, or otherwise generated by a user when registering a proximity broadcast receiver. For example, when installing software that enables a smartphone to operate as a mobile proximity broadcast receiver, the user may be prompted to log into a registration website associated with a central server that asks for identifiers of third-parties, people, places, things in which the user is interested (or alternatively not interested). In an embodiment, the central server and/or the proximity broadcast receiver may automatically populate an interested list for a user based on previous purchases, known behaviors (e.g., schedules), preferences, and other information provided during registration operations. For example, the interested list may be generated by the proximity broadcast receiver based on installed third-party applications. As another example, the central server may generate the interested list of identifiers based on categories associated with known preferences, location information, and/or regular activities of the user. In an embodiment, the proximity broadcast receiver may upload interested lists to the central server. In another embodiment, the "interested" list may include identifiers of searched for wireless identity transmitters, such as those belonging to missing children or assets.

In block 1302, the proximity broadcast receiver may receive an "interested" list of identifiers from a central server. For example, the proximity broadcast receiver may download the interested list from the central server. In optional block 1304, the proximity broadcast receiver may receive an "ignore" list of identifier from the central server. In various embodiments, the proximity broadcast receiver may also receive (or download) from the central server secret keys, decryption software routines, and other information to access identifiers within broadcast messages related to wireless identity transmitters of interest or to be ignored. For example, the proximity broadcast receiver may receive the interested list along with decoding instructions to be used in the operations in determination block 1308 below.

In block 1306, the proximity broadcast receiver may store the received list of identifiers. For example, the proximity broadcast receiver may cache a data table of identifiers corresponding to wireless identity transmitters within restaurants the user likes. In determination block 702, the proximity broadcast receiver may determine whether a broadcast message from a wireless identity transmitter (referred to as "WIT" in FIG. 13) is received. If no broadcast message is received (i.e., determination block 702="No"), the proximity broadcast receiver may continue with the operations in determination block 702.

If a broadcast message is received (i.e., determination block 702="Yes"), in block 706, the proximity broadcast receiver may transmit a sighting message to the central server. In other words, regardless of whether the broadcast message relates to an identifier on an interested (or ignore) list, the proximity broadcast receiver may relay identifiers and associated data, such as location information, when any broadcast message is received. In determination block 1308, the proximity broadcast receiver may determine whether the received broadcast message includes an identifier in the stored interested list. The proximity broadcast receiver may parse, decode, and otherwise access the information within the broadcast message to identify any included identifiers. In an embodiment, the proximity broadcast receiver may compare an encoded identifier within the broadcast message to a set of encoded data and identify the identity associated with the broadcast message when a match is found. In other words, the proximity broadcast receiver may not be configured to decode identifiers within broadcast messages, but instead may be configured to relate encoded information from an unknown transmitter to encoded information from a known transmitter.

If the received broadcast message does not include an identifier in the stored interested list (i.e., determination block 1308="No"), the proximity broadcast receiver may continue with the operations in determination block 702. However, if the received broadcast message includes an identifier in the stored interested list (i.e., determination block 1308="Yes"), in block 1310, the proximity broadcast receiver may provide information to an application executing on the proximity broadcast receiver that is associated with the identifier. In particular, a lower-level operating system routine or thread may provide information to applications running on the processor of the proximity broadcast receiver. For example, the proximity broadcast receiver may signal a third-party application running in the background of the proximity broadcast receiver's processor to indicate that the proximity broadcast receiver has come within proximity of a wireless identity transmitter associated with the third-party. As another example, proximity broadcast receiver may indicate to a restaurant chain application that the proximity broadcast receiver is within one of the restaurant chain's buildings based on the received broadcast message being identified as being broadcast by a wireless identity transmitter within the building. In an embodiment, the proximity broadcast receiver may and may not provide identifiers to third-party applications running on the proximity broadcast receiver.

Figure 14:
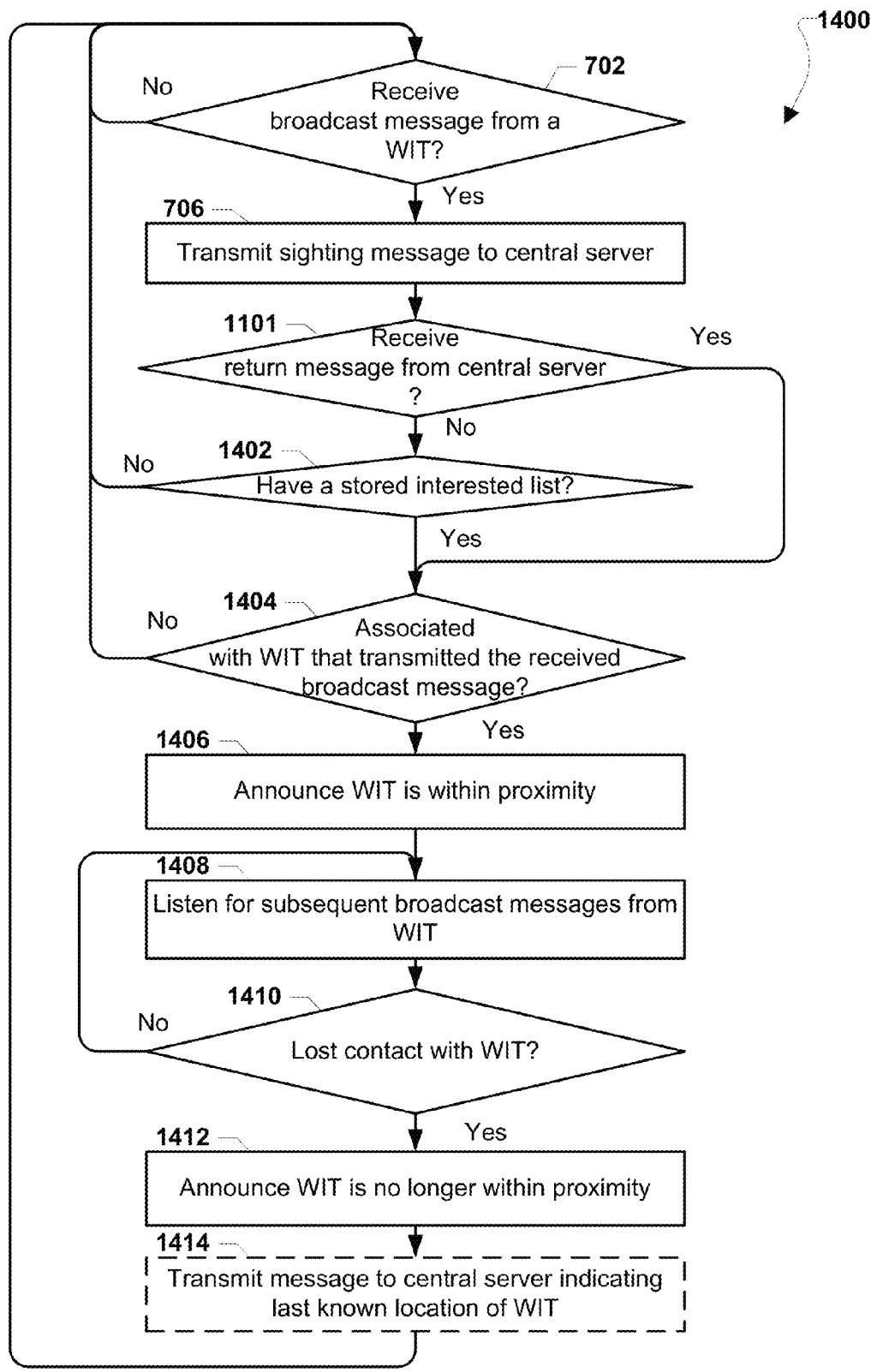
FIG. 14 is a process flow diagram illustrating an embodiment method for a proximity broadcast receiver indicating proximity to a wireless identity transmitter.

FIG. 14 illustrates an embodiment method 1400 for a proximity broadcast receiver indicating proximity to a wireless identity transmitter. Proximity broadcast receivers may be associated with particular wireless identity transmitters, and may announce when those wireless identity transmitters enter and leave the proximity of the proximity broadcast receivers. In other words, a virtual "leash" may be implemented with a proximity broadcast receiver and an associated wireless identity transmitter. Proximity announcements may be useful for ensuring that assets, such as pets, equipment, and/or children, stay close to a proximity broadcast receiver and are otherwise tracked. For example, a parent carrying a proximity broadcast receiver and placing a wireless identity transmitter on a child may be notified when the child strays away. As another example, the user of a proximity broadcast receiver may receive an announcement (e.g., a SMS text message, a beep, etc.) when an item of interest equipped with a wireless identity transmitter comes close to him/her (e.g., a package or piece of luggage has arrived).

As described above, in determination block 702, the proximity broadcast receiver may determine whether a broadcast message from a wireless identity transmitter (referred to as "WIT" in FIG. 14) is received. If no broadcast message is received (i.e., determination block 702="No"), the proximity broadcast receiver may continue with the operations in determination block 702. If a broadcast message is received (i.e., determination block 702="Yes"), in block 706 the proximity broadcast receiver may transmit a sighting message to a central server, such as a message that indicates the broadcast message contents, as well as the time and location at which the proximity broadcast receiver received the broadcast message. In determination block 1101, the proximity broadcast receiver may determine whether a return message from the central server is received, such as a message sent in response to the sighting message transmitted in block 706. If no return message is received (i.e., determination block 1101="No"), in determination block 1402, the proximity broadcast receiver may determine whether the proximity broadcast receiver has a stored interested list. Such an interested list may be as described above with reference to FIG. 13, and may include a set of identifiers of wireless identity transmitters that the proximity broadcast receiver is searching for, interested in, or otherwise registered to receive notices about when within proximity. If the proximity broadcast receiver does not have a stored interested list (i.e., determination block 1402="No"), the proximity broadcast receiver may continue with the operations in determination block 702. In other words, the received broadcast message may not be associated with the proximity broadcast receiver such that an announcement should be made.

However, if the proximity broadcast receiver has a stored interested list (i.e., determination block 1402="Yes") or if a return message is received from the central server, in determination block 1404 the proximity broadcast receiver may determine whether the proximity broadcast receiver is associated with the wireless identity transmitter that transmitted the broadcast message. In an embodiment, the proximity broadcast receiver may evaluate the return message and/or stored interested list of identifiers to determine whether the wireless identity transmitter is associated with the proximity broadcast receiver. For example, the return message may provide the identification of the wireless identity transmitter which the proximity broadcast receiver may compare to a locally stored list of associated devices. When a stored interested list is within the proximity broadcast receiver, the proximity broadcast receiver may determine whether there is an association based on operations as described above with reference to determination block 1309 in FIG. 13. For example, the proximity broadcast receiver may determine whether an identifier related to the received broadcast message is indicated within a stored interested list stored within the proximity broadcast receiver. In an embodiment, the return message may simply indicate that the wireless identity transmitter is associated with the proximity broadcast receiver. For example, the return message may include a code, flag, or data that indicates the proximity broadcast receiver is associated and therefore should announce the proximity of the wireless identity transmitter. If the proximity broadcast receiver is not associated with the wireless identity transmitter (i.e., determination block 1404="No"), the proximity broadcast receiver may continue with the operations in determination block 702.

If the proximity broadcast receiver is associated with the wireless identity transmitter (i.e., determination block 1404="Yes"), in block 1406 the proximity broadcast receiver may announce the wireless identity transmitter is within proximity, such as by providing a message to the user of the proximity broadcast receiver. The announcement may involve a sound indicator, a displayed message, a vibration, etc. In an embodiment, the proximity broadcast receiver may display (or render) a visual map or other representation that indicates the location of the wireless identity transmitter relative to the proximity broadcast receiver. In other embodiments, the proximity broadcast receiver may perform an announcement by providing information to third-party applications, as described above with reference to block 1310 in FIG. 13, and in turn, the third-party applications may communicate the proximity to the user. For example, an app executing in the background of the proximity broadcast receiver's operating system may pop-up messages on a display unit of the proximity broadcast receiver. In various other embodiments, the announcements may include transmitting emails, SMS text messages, or other transmissions to notify the user of the proximity.

In block 1408, the proximity broadcast receiver may listen for subsequent broadcast messages from the wireless identity transmitter, and in determination block 1410 the proximity broadcast receiver may determine whether the proximity broadcast receiver has lost contact with the wireless identity transmitter. In an embodiment, this determination may be based on the failure to receive any broadcast message from the wireless identity transmitter within a predetermined or predefined period of time. In an embodiment, the proximity broadcast receiver may utilize a tolerance threshold that may determine that contact with the wireless identity transmitter has been lost when the proximity broadcast receiver does not receive broadcast messages of a predefined signal strength. If contact is not lost with the wireless identity transmitter (i.e., determination block 1410="No"), the proximity broadcast receiver may continue to listen for broadcast messages from the wireless identity transmitter in block 1408.

If contact is lost with the wireless identity transmitter (i.e., determination block 1410="Yes"), in block 1412 the proximity broadcast receiver may announce the wireless identity transmitter is no longer within proximity, such as by providing a message to the user of the proximity broadcast receiver. In other words, the proximity broadcast receiver may announce the wireless identity transmitter is absent (or has "broken the leash"). This announcement may be similar to as described above (e.g., sounds, displayed message, etc.), but may include different sounds, messages, and other indicators to represent the loss of contact with the wireless identity transmitter. In optional block 1414, the proximity broadcast receiver may transmit a message to the central server indicating the last known location of the wireless identity transmitter.

In an embodiment, the proximity broadcast receiver may display a map of the last known location for all associated wireless identity transmitters. The last known location may not be near the proximity broadcast receiver, and may include a large area, such as a location several miles from the proximity broadcast receiver's current location. For example, a smartphone configured to operate as a mobile proximity broadcast receiver may display a graphical map showing indicators for each of the wireless identity transmitters the smartphone may track within the state. Additionally, the proximity broadcast receiver may periodically receive location information updates from the central server based on information transmitted by various other proximity broadcast receivers. For example, the proximity broadcast receiver may receive a message from the central server that includes the last known location information for all associated wireless identity transmitters as reported in sighting messages from any possible proximity broadcast receiver.

Figure 15:
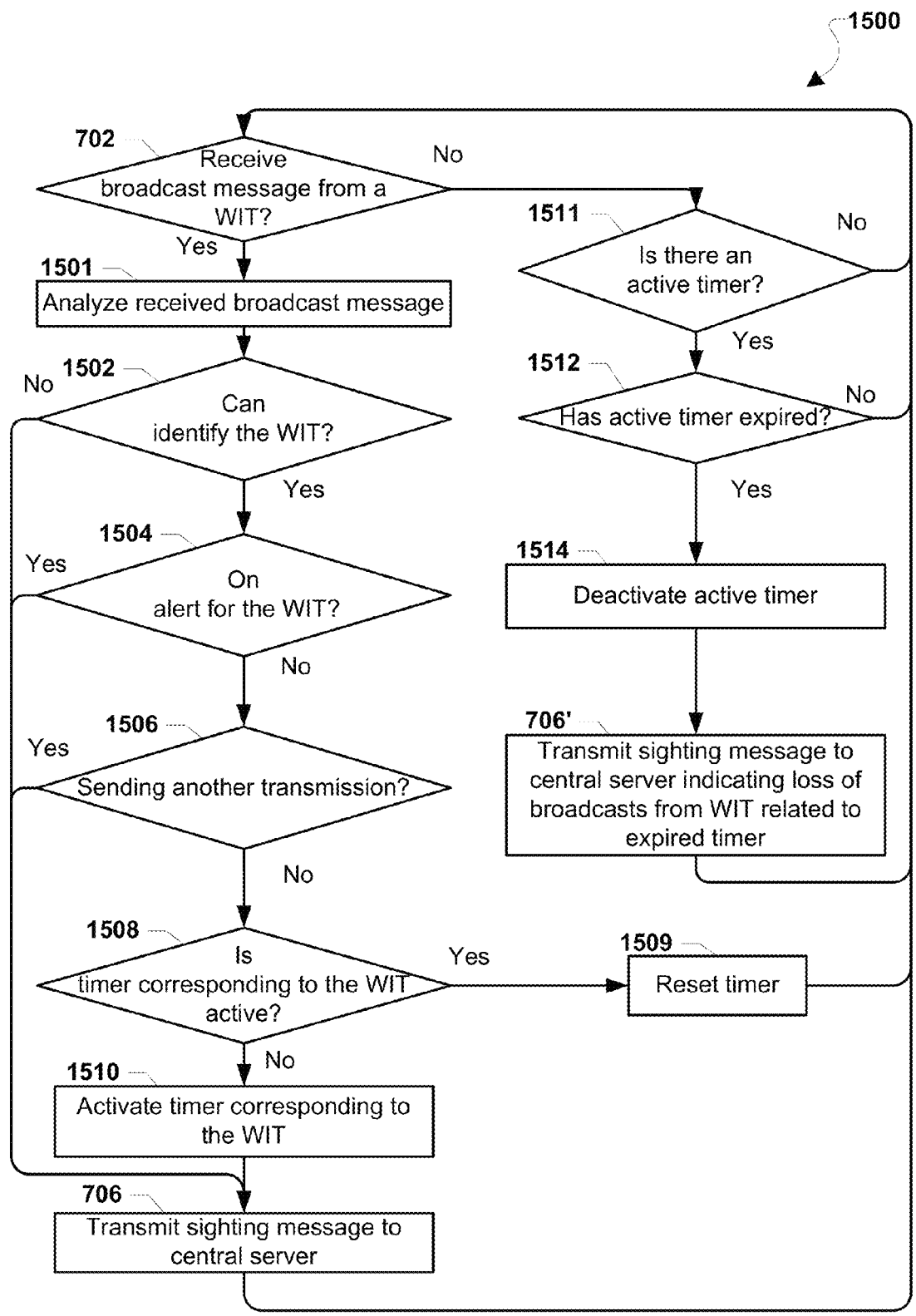
FIG. 15 is a process flow diagram illustrating an embodiment method for a proximity broadcast receiver selectively transmitting sighting messages to a server.

FIG. 15 illustrates an embodiment method 1500 for a proximity broadcast receiver selectively transmitting sighting messages to a central server. To conserve power and reduce superfluous messaging, the proximity broadcast receiver may be configured to generate and transmit sighting messages to the central server based on certain triggers, such as the presence of special conditions (e.g., active alerts, an initial message received from a wireless identity transmitter), or whether the sighting message is coincident with other operations and/or transmissions. In other words, the proximity broadcast receiver may not transmit sighting messages for every received broadcast message from a wireless identity transmitter in real-time, in batches, or at all. Instead, the proximity broadcast receiver may transmit a sighting message based on a received broadcast message when the received broadcast message relates to an alert, the received broadcast message regards an unidentified wireless identity transmitter, or the sighting message may be transmitted or processed concurrently with other operations.

Alternatively, the receiver may transmit a sighting message to the central server indicating when a broadcast message is not received within a certain time period. For example, after having already received broadcast messages, the proximity broadcast receiver may transmit a sighting message indicating the loss of contact with a wireless identity transmitter. In an embodiment, when the proximity broadcast receiver receives a broadcast message but does not transmit a sighting message based on that broadcast message, the proximity broadcast receiver may extract, buffer, and/or compress information from the broadcast message for later transmission in subsequent sighting messages. For example, the proximity broadcast receiver may archive received broadcast messages from the wireless identity transmitter and may include portions or the entirety of the broadcast messages in a sighting message generated when the proximity broadcast receiver is no longer within reception range of the wireless identity transmitter. In another embodiment, the proximity broadcast receiver may transmit sighting messages based on data within the broadcast messages (e.g., tracked attribute reported in the broadcast message). For example, the proximity broadcast receiver may transmit a sighting message when a received broadcast includes sensor data (e.g., accelerometer data) that has a higher value than previously reported sensor data for the wireless identity transmitter.

In determination block 702, the proximity broadcast receiver may determine whether it has received a broadcast message from a wireless identity transmitter. In various embodiments, the proximity broadcast receiver may periodically or constantly check a receiving circuit, buffer, or queue for the presence of incoming broadcast messages. If a broadcast message is received (i.e., determination block 702="Yes"), in block 1501 the proximity broadcast receiver may analyze the received broadcast message. For example, the proximity broadcast receiver may analyze header or metadata within the received broadcast message, as well as parse and evaluate various data within the message. In determination block 1502, the proximity broadcast receiver may determine whether it can identify the wireless identity transmitter. In other words, the proximity broadcast receiver may determine whether the broadcast message contains information identifying the wireless identity transmitter associated with the received broadcast message. In an embodiment, the broadcast message may contain identifying information that the proximity broadcast receiver may or may not be able to detect. As described above, the wireless identity transmitter may encrypt identification information within broadcast messages such that only authorized devices may detect the identification data. For example, the broadcast message may be encrypted using a special key that is known only by the wireless identity transmitter and the server. In an embodiment, the broadcast message may contain data that the proximity broadcast receiver may recognize without determining the identification information. For example, the broadcast message may contain unencrypted data that indicates the subject matter and/or classification information regarding the broadcast message, as well as encrypted data that represents the identification of the wireless identity transmitter.

If the proximity broadcast receiver can identify the wireless identity transmitter based on the analysis of the broadcast message (i.e., determination block 1502="Yes"), in determination block 1504 the proximity broadcast receiver may determine whether it is on alert for the wireless identity transmitter. In other words, the proximity broadcast receiver may determine whether the received broadcast message relates to an active alert, such as an alert for a missing child. In various embodiments, the central server may transmit alert messages or notifications to proximity broadcast receivers, indicating particular wireless identity transmitters that must be tracked/searched for or that are of concern (i.e., there is an active alert for the wireless identity transmitter). For example, an alert notification may inform a proximity broadcast receiver to be on the look-out for the wireless identity transmitter corresponding to a missing or abducted child. The proximity broadcast receiver may store identifying information about wireless identity transmitters for which there are active alerts, and may compare the identification information of the received broadcast message to the stored active alerts information. In an embodiment, the proximity broadcast receiver may determine it is on alert for the wireless identity transmitter based on a stored interested list, as described above with reference to FIG. 13.

If the proximity broadcast receiver is not on alert for the wireless identity transmitter (i.e., determination block 1504="No"), in determination block 1506 the proximity broadcast receiver may determine whether it is sending another transmissions. In other words, the proximity broadcast receiver may determine whether other operations or transmissions are scheduled to be executed and/or are currently being performed. If transmissions and other power-intensive operations are being performed by the proximity broadcast receiver, additional transmissions may not require a significant amount of additional power to perform, and so the proximity broadcast receiver may immediately transmit a sighting message regarding the received broadcast message based on the other messages being scheduled for transmission.

In an embodiment, the proximity broadcast receiver may estimate the expense in terms of battery power of transmitting a sighting message with respect to operations being executed at the time of receiving the broadcast message. If the estimated power expense does not exceed a particular tolerance or threshold, the proximity broadcast receiver may generate and transmit a sighting message.

In various embodiments, the proximity broadcast receiver may log information describing received broadcast messages. For example, the proximity broadcast receiver may maintain a database recording all received messages and stored relative to the corresponding transmitting device. The proximity broadcast receiver may store various data relating to received broadcast messages, such as any identifying information about the wireless identity transmitter, time of receipt, etc. In particular, the proximity broadcast receiver may store a timer variable relating to the wireless identity transmitter. In response to receiving an initial broadcast message from the wireless identity transmitter, the proximity broadcast receiver may activate the timer. When active, the timer variable may be periodically changed by the proximity broadcast receiver to represent the passage of a predefined period of time. When the predefined period of time elapses, the timer may be considered expired. In an embodiment, if the timer is active and has not expired, the proximity broadcast receiver may not transmit sighting messages to the server regarding the wireless identity transmitter and thus may avoid sending numerous or superfluous messages.

Returning to FIG. 15, if another transmissions is not being sent (i.e., determination block 1506="No"), in determination block 1508 the proximity broadcast receiver may determine whether a timer corresponding to the wireless identity transmitter is active. In an embodiment, the proximity broadcast receiver may store information, such as in a database, indicating timer values relative to various wireless identity transmitters or identifiers. In general, the timer (or timer mechanism) may be active when the proximity broadcast receiver has received a broadcast message from the wireless identity transmitter. If the timer corresponding to the wireless identity transmitter is active (i.e., determination block 1508="Yes"), in block 1509 the proximity broadcast receiver may reset the timer to indicate a default value, such as a predefined period of time, and may continue with the operations in determination block 702.

If the timer is not active (i.e., determination block 1508="No"), in block 1510 the proximity broadcast receiver may activate the timer corresponding to the wireless identity transmitter. As described above, when activated, the timer may periodically decrement. In an embodiment, the timer corresponding to a wireless identity transmitter may be activated for the initial broadcast message received by the proximity broadcast receiver and/or subsequent broadcast messages received after the timer has been activated and has expired, as described below.

If the wireless identity transmitter cannot be identified (i.e., determination block 1502="No") or the proximity broadcast receiver is on alert for the wireless identity transmitter (i.e., determination block 1504="Yes") or there is another transmission to send (i.e., determination block 1506="Yes") or the proximity broadcast receiver performed the operations in block 1510, in block 706, the proximity broadcast receiver may transmit a sighting message to the server. For example, the proximity broadcast receiver may generate a sighting message based on the received broadcast message (e.g., a message including the wireless identity transmitter's identifier, location information, time of receipt, etc.) and may transmit the sighting message with long-range communications (e.g., WiFi, cellular network signals, etc.). The proximity broadcast receiver may continue to perform such operations in a loop by returning to listening for broadcast messages in determination block 702.

If the proximity broadcast receiver determines that no broadcast message has been received (i.e., determination block 702="No"), in determination block 1511 the proximity broadcast receiver may determine whether there is an active timer, such as a timer mechanism (or variable) that is currently indicating that a previous broadcast message from a wireless identity transmitter has been received. If there is no active timer (i.e., determination block 1511="No"), the wireless identity transmitter may continue with the operations in determination block 702. However, if there is an active timer (i.e., determination block 1511="Yes"), in determination block 1512 the proximity broadcast receiver may determine whether the active timer has expired. For example, the proximity broadcast receiver may compare the current timer value to a maximum or threshold timer value to determine whether the active timer has expired. If the active timer has not expired (i.e., determination block 1512="No"), the wireless identity transmitter may continue with the operations in determination block 702.

If the active timer has expired (i.e., determination block 1512="Yes"), in block 1514 the proximity broadcast receiver may deactivate the active timer. The proximity broadcast receiver may conclude that the wireless identity transmitter corresponding to the active timer may no longer be accessible or within proximity (i.e., the proximity broadcast receiver may be outside of short-range radio transmission range of the wireless identity transmitter). In block 706', similar to the operations in block 706, the proximity broadcast receiver may transmit a sighting message to the central server, indicating the loss of broadcasts from the wireless identity transmitter related to the expired timer. For example, the sighting message may include information that indicates that the proximity broadcast receiver has lost contact with the wireless identity transmitter (e.g., a flag indicator), the location, and the identification of the proximity broadcast receiver. In an embodiment, the proximity broadcast receiver may additionally include in the sighting message data describing the last received broadcast message from the wireless identity transmitter, as well as any other conditions related to that receipt (e.g., time of receipt, location at time of receipt, etc.). The proximity broadcast receiver may continue with the operations in determination block 702.

Figure 16:
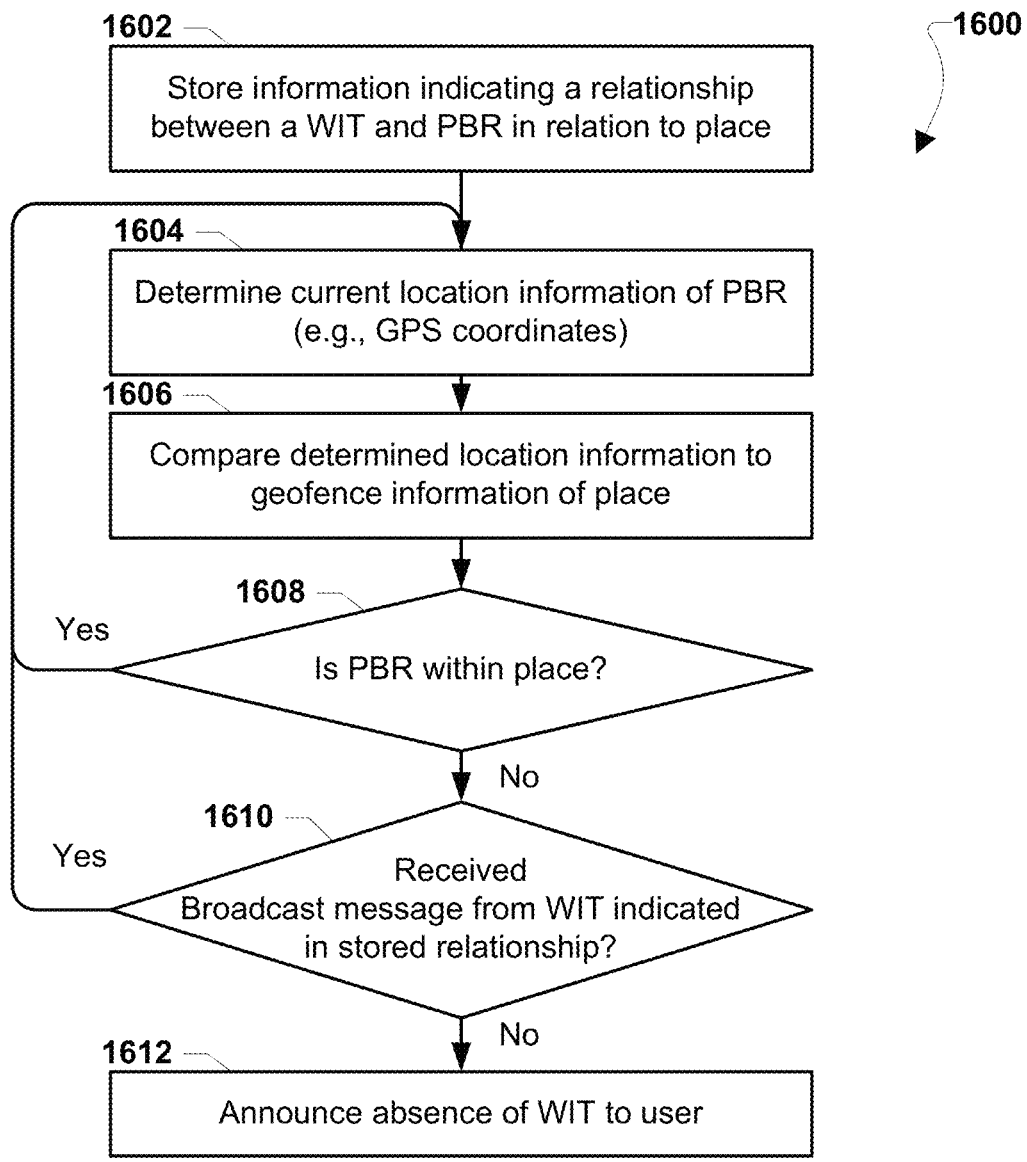
FIG. 16 is a process flow diagram illustrating an embodiment method for a proximity broadcast receiver determining whether it has left a predefined place without a certain wireless identity transmitter.

FIG. 16 illustrates an embodiment method 1600 for a proximity broadcast receiver determining whether it has left a predefined place without a certain wireless identity transmitter. In an embodiment, the proximity broadcast receiver, such as a mobile proximity broadcast receiver, may be associated with a plurality of wireless identity transmitters. For example, the proximity broadcast receiver may be a user's smartphone that is associated with wireless identity transmitters within assets, such as a wallet, purse, luggage, medicine bag, and clothing. When the proximity broadcast receiver detects that it is located outside of the predefined place, such as a house or business office, the proximity broadcast receiver may determine whether all associated wireless identity transmitters relevant to the place are within proximity of the proximity broadcast receiver. For example, the proximity broadcast receiver may check if the user left home without his wallet. The proximity broadcast receiver may announce the absence of the missing or left behind asset so that the user may be reminded of any associated wireless identity transmitters left behind in the place. In another embodiment, a central server may perform similar operations to those as described below with reference to blocks 1602-1610. For example, based on sighting messages from a mobile proximity broadcast receiver (e.g., smartphone carried by a user), the central server may determine the user left a medicine bag and transmit a message that commands the mobile proximity broadcast receiver to announce the absence of the medicine bag to the user.

In block 1602, the proximity broadcast receiver may store information indicating a relationship between a wireless identity transmitter, the proximity broadcast receiver, and a place. For example, the proximity broadcast receiver may store in local memory information indicating a relationship between the user's smartphone mobile proximity broadcast receiver, a wireless identity transmitter connected to a wallet, and the user's house. In an embodiment, the relationship may be stored in a relationship database which may also include information about the geofence information of the place, such as GPS coordinates or virtual geofence data of a house or office building.

In block 1604, the proximity broadcast receiver may determine current location information of the proximity broadcast receiver. For example, the proximity broadcast receiver may query a connected GPS receiver or chip to obtain GPS coordinates. In block 1606, the proximity broadcast receiver may compare the determined location information to geofence information of the place. For example, the proximity broadcast receiver may estimate whether the current location information coincides with or is included within any of the relationship database data related to places known to the user. In determination block 1608, the proximity broadcast receiver may determine whether it is within the place. For example, based on the determined location information and the stored geofence information related to the place, the proximity broadcast receiver may determine whether the proximity broadcast receiver has entered, left, or stayed within the place. If the proximity broadcast receiver determines it is within the place (i.e., determination block 1608="Yes"), the proximity broadcast receiver may continue with the operations in block 1604.

However, if the proximity broadcast receiver determines it is not within the place (i.e., determination block 1608="No"), in determination block 1610 the proximity broadcast receiver may determine whether a broadcast message from the wireless identity transmitter indicated in the stored relationship is received. In other words, the proximity broadcast receiver may determine whether it is within proximity of the wireless identity transmitter based on whether the proximity broadcast receiver receives broadcast messages from the wireless identity transmitter. If the proximity broadcast receiver receives a broadcast message from the wireless identity transmitter (i.e., determination block 1610="Yes"), the proximity broadcast receiver may continue with the operations in block 1604. In other words, the proximity broadcast receiver may be outside of the place with the wireless identity transmitter of the asset still within proximity (i.e., the user took the asset out of the place with him.) However, if the proximity broadcast receiver does not receive a broadcast message from the wireless identity transmitter (i.e., determination block 1610="No"), the proximity broadcast receiver may announce the absence of the wireless identity transmitter to the user. For example, the proximity broadcast receiver may emit a sound, play an audio message, display a message, or otherwise indicate to the user that the proximity broadcast receiver has left the place without the wireless identity transmitter associated with the proximity broadcast receiver and the place.

Figure 17A:
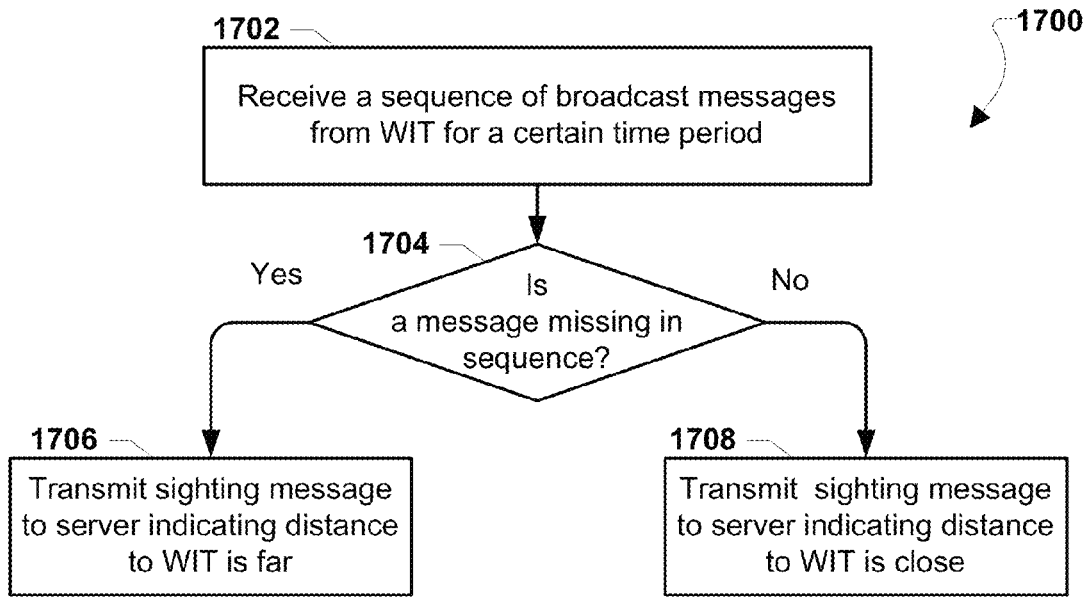
FIG. 17A is a process flow diagram illustrating an embodiment method for a proximity broadcast receiver evaluating broadcasts to determine proximity to a wireless identity transmitter.

FIG. 17A illustrates an embodiment method 1700 for a proximity broadcast receiver evaluating broadcast messages to determine proximity to a wireless identity transmitter (referred to as "WIT" in FIG. 17A). As described above with reference to FIG. 5, the wireless identity transmitter may modulate the signal strength at which broadcast messages are transmitted over a time period or cycle, such as a certain sequence of signals (i.e., broadcast messages) with differing signal strengths. For example, the wireless identity transmitter may transmit broadcast messages over a cycle using both high and low signal strengths. If the proximity broadcast receiver receives both high and low signals, the proximity broadcast receiver may receive a complete sequence and thus may be determined to be close to the wireless identity transmitter. Alternatively, receiving an incomplete sequence of broadcast messages may indicate that the proximity broadcast receiver is not close enough to the wireless identity transmitter to receive the low strength signals. The proximity broadcast receiver may assist a central server in disambiguating between a plurality of proximity broadcast receivers by including this proximity determination in transmitted sighting messages.

In block 1702, the proximity broadcast receiver may receive a sequence of broadcast messages (or signals) from a wireless identity transmitter for a certain time period. In other words, the proximity broadcast receiver may receive signals for a period corresponding to a cycle. In an embodiment, the proximity broadcast receiver and the wireless identity transmitter may be hardcoded or otherwise configured to recognize the certain time period that corresponds to a cycle. For example, the proximity broadcast receiver may store information indicating that the wireless identity transmitter transmits cycles that have a duration of the certain period of time. In another embodiment, each broadcast message may include information, such as in a header or metadata, indicating the number of broadcast messages (or signals) within a cycle.

The proximity broadcast receiver may continually track received broadcast messages until the proximity broadcast receiver has received either a complete sequence (e.g., received the total number of broadcast messages in a cycle) or the expected duration (or length) of a cycle has expired. For example, the proximity broadcast receiver may determine that a complete sequence has been received when the proximity broadcast receiver has received both a first and a last broadcast message of a cycle. As another example, the proximity broadcast receiver may determine it has received a cycle when it has calculated that the period of time required to receive a complete cycle has expired.

In determination block 1704, the proximity broadcast receiver may determine whether a message is missing in the sequence. In other words, the proximity broadcast receiver may determine whether all expected signals of the cycle were received and thus the proximity broadcast receiver received a complete sequence. For example, the proximity broadcast receiver may count the number of received broadcast messages from the wireless identity transmitter with a certain period of time (e.g., the period of time for a cycle) and compare that number to a known number of messages that should be received in a complete sequence from wireless identity transmitters. If a message is not missing in the sequence (i.e., determination block 1704="No"), in block 1708 the proximity broadcast receiver may transmit a sighting message to the central server indicating that the proximity broadcast receiver is close to the wireless identity transmitter. In other words, because the proximity broadcast receiver received a complete sequence of broadcast messages, the proximity broadcast receiver may have been close enough to the wireless identity transmitter to receive both high and low signal strength messages.

If a message is missing in the sequence (i.e., determination block 1704="Yes"), in block 1706 the proximity broadcast receiver may transmit a sighting message to the central server indicating that the proximity broadcast receiver is far (or not within proximity) to the wireless identity transmitter.

Figure 17B:
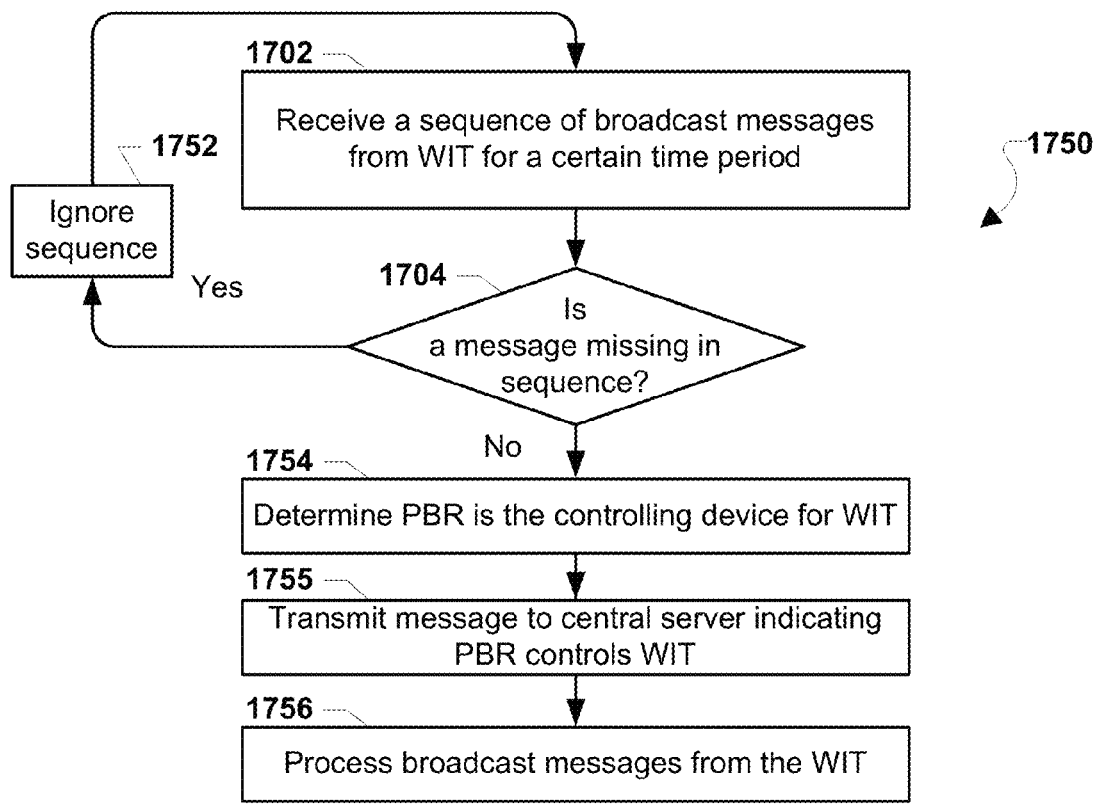
FIG. 17B is a process flow diagram illustrating an embodiment method for a proximity broadcast receiver evaluating received messages from a wireless identity transmitter to determine whether it is close.

FIG. 17B illustrates another embodiment method 1750 for a proximity broadcast receiver evaluating received broadcast messages from a wireless identity transmitter (referred to as "WIT" in FIG. 17B) to determine whether it is within proximity (i.e., close). Unlike the method 1700 described above, the method 1750 of FIG. 17B does not involve a central server to further disambiguate between proximity broadcast receivers that may be in proximity of the wireless identity transmitter. Instead, the proximity broadcast receiver may simply ignore broadcast messages from the wireless identity transmitter when the proximity broadcast receiver determines incomplete broadcast message sequences are received and, likewise, may determine the proximity broadcast receiver to be the closest proximity broadcast receiver when a complete sequence is received.

In block 1702, the proximity broadcast receiver may receive a sequence of broadcast messages from a wireless identity transmitter for a certain time period. In determination block 1704, the proximity broadcast receiver may determine whether a message is missing in the sequence. If a message is missing in the sequence (i.e., determination block 1704="Yes"), in block 1752 the proximity broadcast receiver may ignore the sequence and may continue with the operations in block 1702.

If a message is not missing in the sequence (i.e., determination block 1704="No"), in block 1754 the proximity broadcast receiver may determine that it is the controlling device for the wireless identity transmitter. In other words, the proximity broadcast receiver may determine that, due to receiving all messages in the sequence, the proximity broadcast receiver is the closest device to the wireless identity transmitter and therefore the proximity broadcast receiver is in custody or in control the wireless identity transmitter. For example, when the proximity broadcast receiver is one of a plurality of proximity broadcast receivers, receiving the complete sequence in the proximity broadcast receiver may indicate that the user of the wireless identity transmitter intends to interface with the proximity broadcast receiver instead of the other devices in the plurality (i.e., the proximity broadcast receiver is controlling). In block 1755, the proximity broadcast receiver may transmit a message to the central server indicating the proximity broadcast receiver controls the wireless identity transmitter. In an embodiment, the message may be a sighting message, such as described throughout this disclosure, indicating that the proximity broadcast receiver has determined itself to be the controlling proximity broadcast receiver for the wireless identity transmitter. In an embodiment, the sighting message may indicate that the proximity broadcast receiver is the closest to the wireless identity transmitter. In block 1756, the proximity broadcast receiver may process the broadcast messages from the wireless identity transmitter, such as the messages in the received sequence. For example, the proximity broadcast receiver may generate a sighting message including information from the broadcast messages. As another example, the proximity broadcast receiver may perform operations based on data within the broadcast message, such as configuring a piece of equipment to accommodate the user of the wireless identity transmitter.

Figure 18:
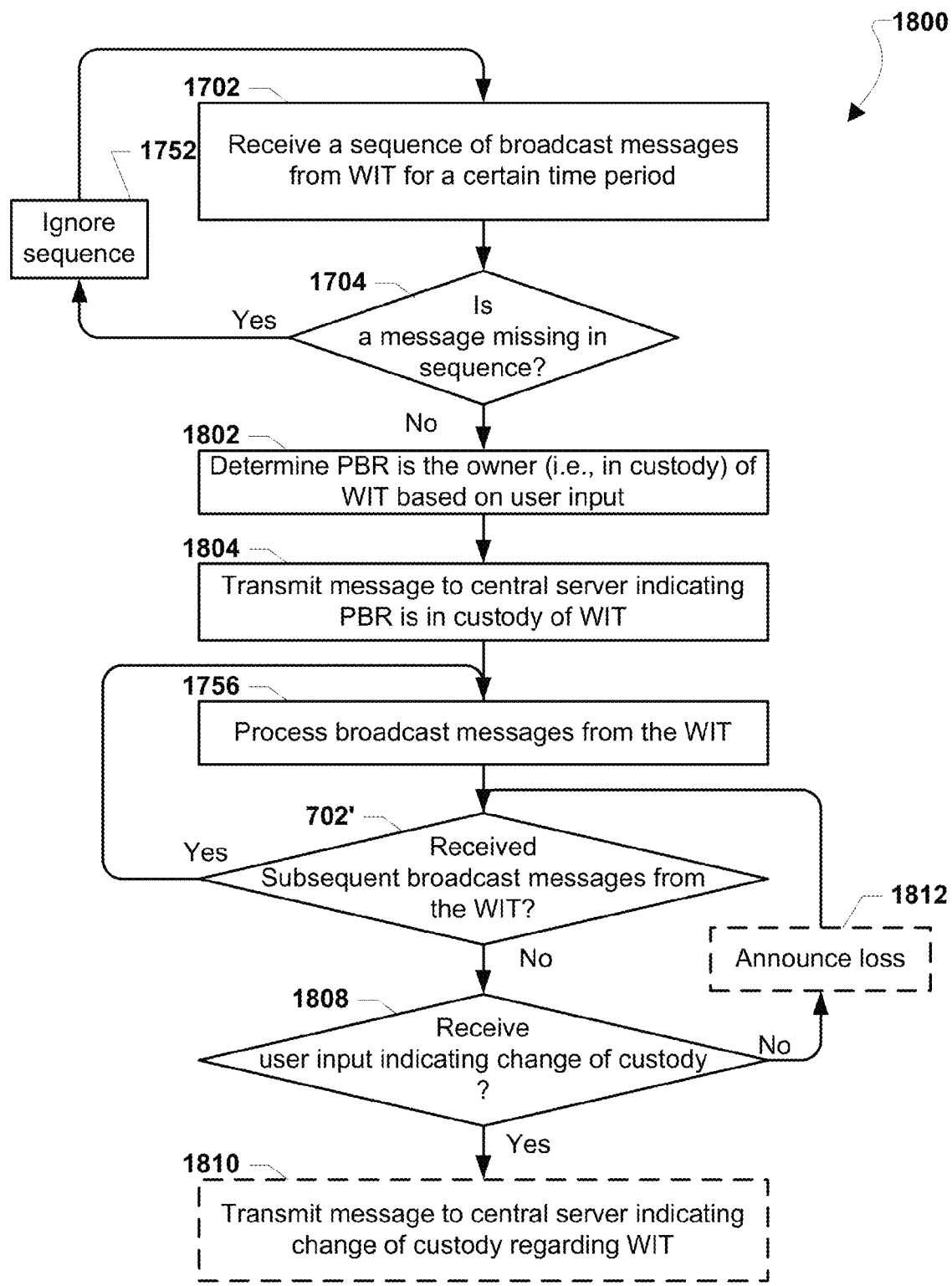
FIG. 18 is a process flow diagram illustrating an embodiment method for a proximity broadcast receiver determining change of custody of a wireless identity transmitter.

FIG. 18 illustrates an embodiment method 1800 for a proximity broadcast receiver determining change of custody of a wireless identity transmitter (referred to as "WIT" in FIG. 18). The method 1800 may be similar to method 1750 described above with reference to FIG. 17B with the exception that the proximity broadcast receiver may receive input data that indicates the receipt and loss of "custody" (or control) over the wireless identity transmitter. The proximity broadcast receiver's custody of a wireless identity transmitter may be an indication that the proximity broadcast receiver is the closest among many other proximity broadcast receivers that may also be within reception range of the wireless identity transmitter's short-range wireless signals. Indicating changes of custody between various proximity broadcast receivers may be important for tracking assets attached to the wireless identity transmitter, such as a gun, art, or other valuable possessions. In an embodiment, changes of custody may be indicated to a central server which may store and otherwise keep track of proximity broadcast receivers in control of or interfacing with a particular wireless identity transmitter.

As described above, in block 1702, the proximity broadcast receiver may receive a sequence of broadcast messages from a wireless identity transmitter for a certain time period. In determination block 1704, the proximity broadcast receiver may determine whether a message is missing in the sequence. If a message is missing in the sequence (i.e., determination block 1704="Yes"), in block 1752 the proximity broadcast receiver may ignore the sequence and may continue with the operations in block 1702. If a message is not missing in the sequence (i.e., determination block 1704="No"), in block 1802, the proximity broadcast receiver may determine that it is the owner (i.e., is in custody) of the wireless identity transmitter based on received user input data. In other words, the proximity broadcast receiver may determine it is the closest to the wireless identity transmitter and therefore in control of the wireless identity transmitter. For example, the proximity broadcast receiver may detect input data from a soft button input on a graphical user interface that may be interpreted as a confirmation of obtaining custody over the wireless identity transmitter.

In block 1804, the proximity broadcast receiver may transmit a message, such as a sighting message, to a central server that indicates the proximity broadcast receiver custody over the wireless identity transmitter. In an embodiment, the message may include rolling identifier information, encrypted data, or otherwise obfuscated information that the proximity broadcast receiver cannot access but that the central server may decode or otherwise fully access. In block 1756, the proximity broadcast receiver may process broadcast messages received from the wireless identity transmitter and in determination block 702' may determine whether subsequent broadcast messages are received from the wireless identity transmitter. For example, the proximity broadcast receiver may compare identification information, such as encoded identifiers within broadcast messages, known to correspond to the wireless identity transmitter with information in received broadcast messages. If the proximity broadcast receiver receives subsequent broadcast messages from the wireless identity transmitter (i.e., determination block 702'="Yes"), the proximity broadcast receiver may continue to process the broadcast messages with the operations in block 1756.

If the proximity broadcast receiver does not receive subsequent broadcast messages from the wireless identity transmitter (i.e., determination block 702'="No"), in determination block 1808 the proximity broadcast receiver may determine whether user input data is received that indicates a change of custody. For example, the user may press a button to indicate the custody has been lost or transferred to another proximity broadcast receiver. If no change of custody user input is received (i.e., determination block 1808="No"), in optional block 1812 the proximity broadcast receiver may announce the loss of the broadcast messages to the user (e.g., the broadcast messages have not been received from the wireless identity transmitter). For example, the proximity broadcast receiver may render a message on an LED display or emit an audible beep indicating that the broadcast messages were lost. The proximity broadcast receiver may then continue with the operations in determination block 702'. In an embodiment, the proximity broadcast receiver may also prompt the user to input change of custody data in the operations in optional block 1812. For example, if the user forgets to indicate that a change of custody occurred when the wireless identity transmitter was transferred to another owner, the proximity broadcast receiver may continually remind the user to input data via soft buttons. In another embodiment, the proximity broadcast receiver may prompt the user to press a button indicating that the loss of broadcast messages from the wireless identity transmitter can be ignored (e.g., the user has "orphaned" the wireless identity transmitter). This may provide the user with the option of supplying change of custody information to the system or simply ignoring the wireless identity transmitter.

If a change of custody user input is received (i.e., determination block 1808="Yes"), in optional block 1810, the proximity broadcast receiver may transmit a message to the central server indicating a change of custody regarding the wireless identity transmitter. For example, the message may indicate that the proximity broadcast receiver has lost custody of the wireless identity transmitter.

In another embodiment, when the user fails to input change of custody information for a predefined period after the proximity broadcast receiver fails to receive broadcast messages from the wireless identity transmitter, the proximity broadcast receiver may transmit a message to the server indicating that the user no longer possesses the wireless identity transmitter. In other words, the proximity broadcast receiver may automatically indicate to the server that the user has lost, abandoned or "orphaned" the wireless identity transmitter. This situation may occur when custody is improperly transferred (e.g., custody is transferred during a proximity broadcast receiver system failure, reboot, etc.) or when the wireless identity transmitter is lost or transferred to a new owner who is not registered with the server and/or associated services.

Figure 19A:
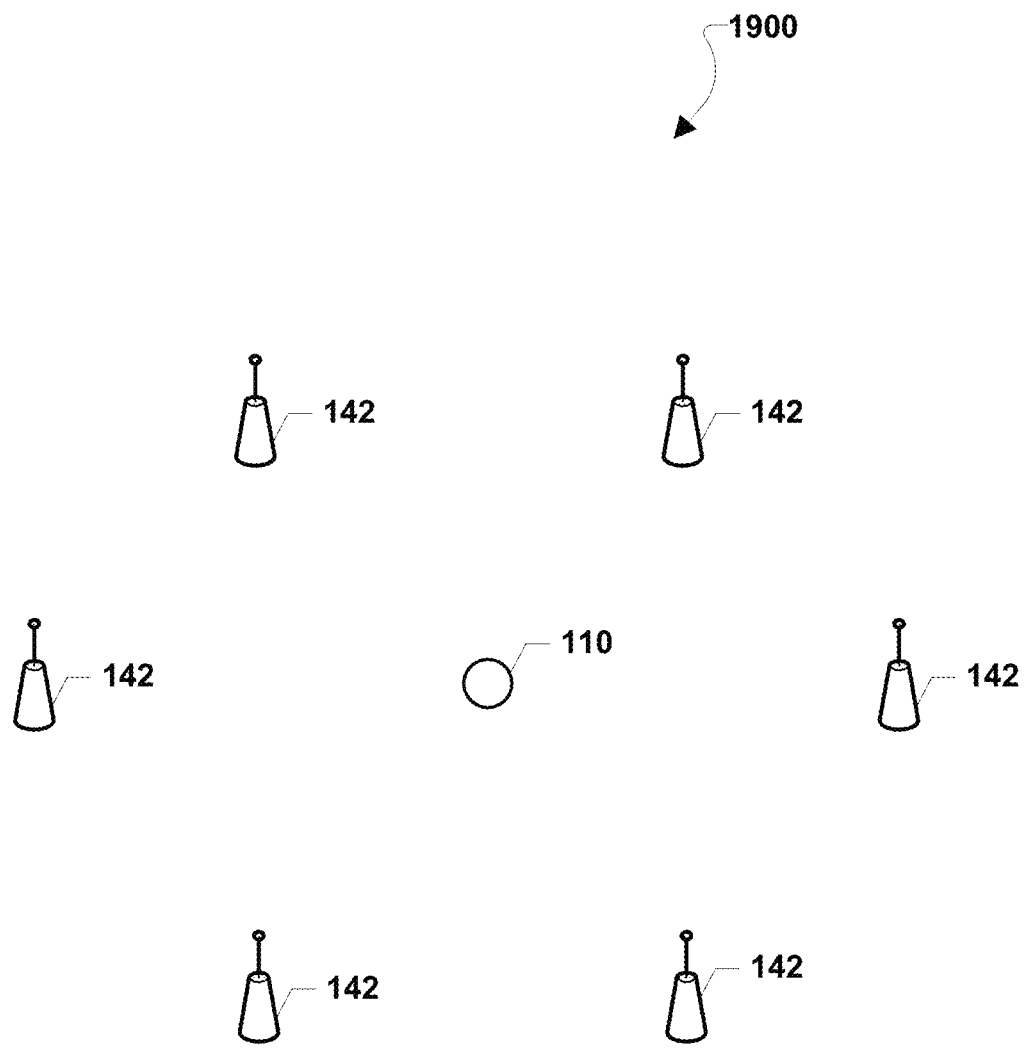
FIG. 19A is a communication system diagram of a wireless identity transmitter inside a perimeter formed by mobile proximity broadcast receivers.
Figure 19B:
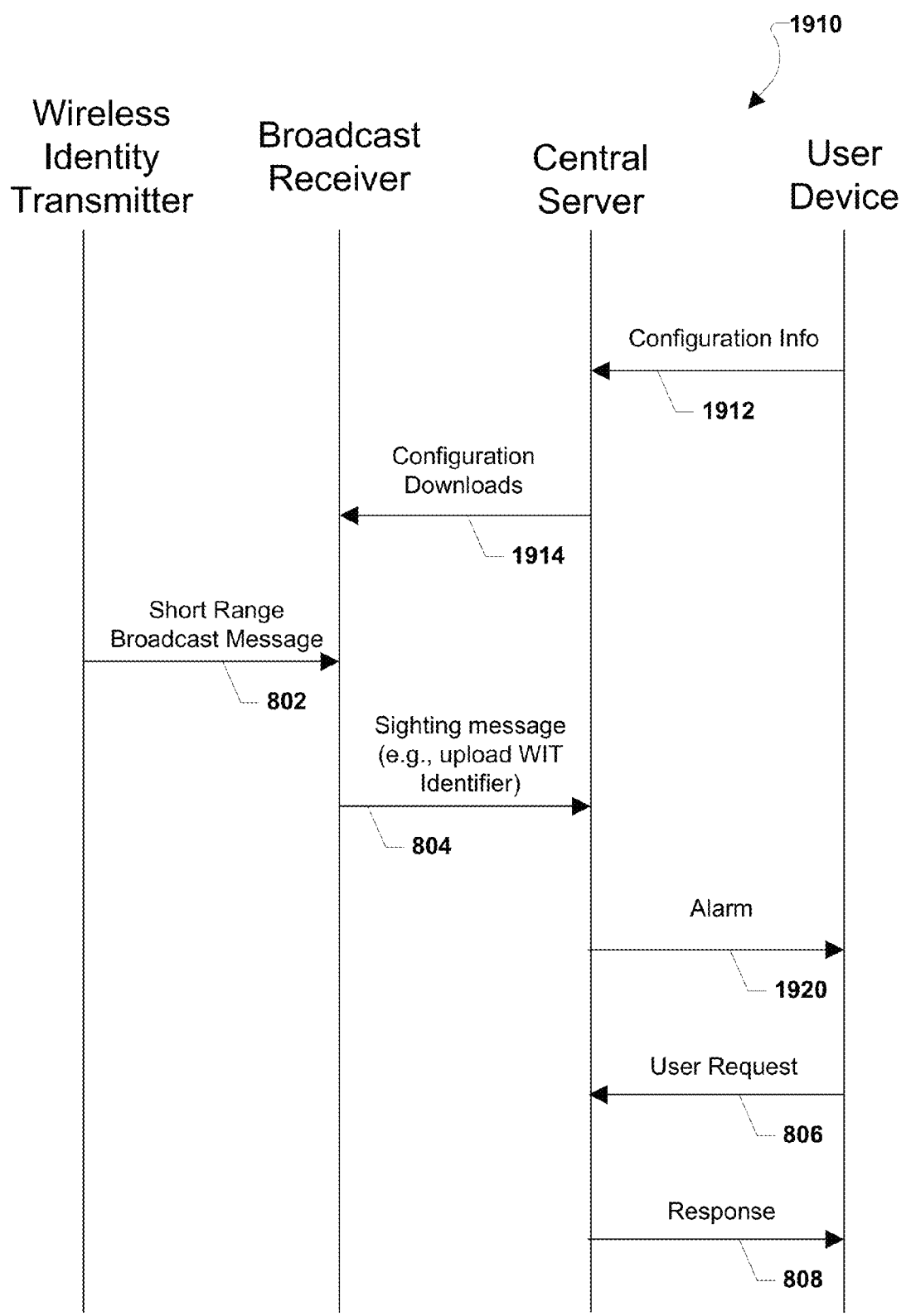
FIG. 19B is a call flow diagram illustrating messages exchanged in configuring mobile proximity broadcast receivers arranged in a perimeter and responding to a user request for a wireless identity transmitter's location in accordance with various embodiments.
Figure 19C:
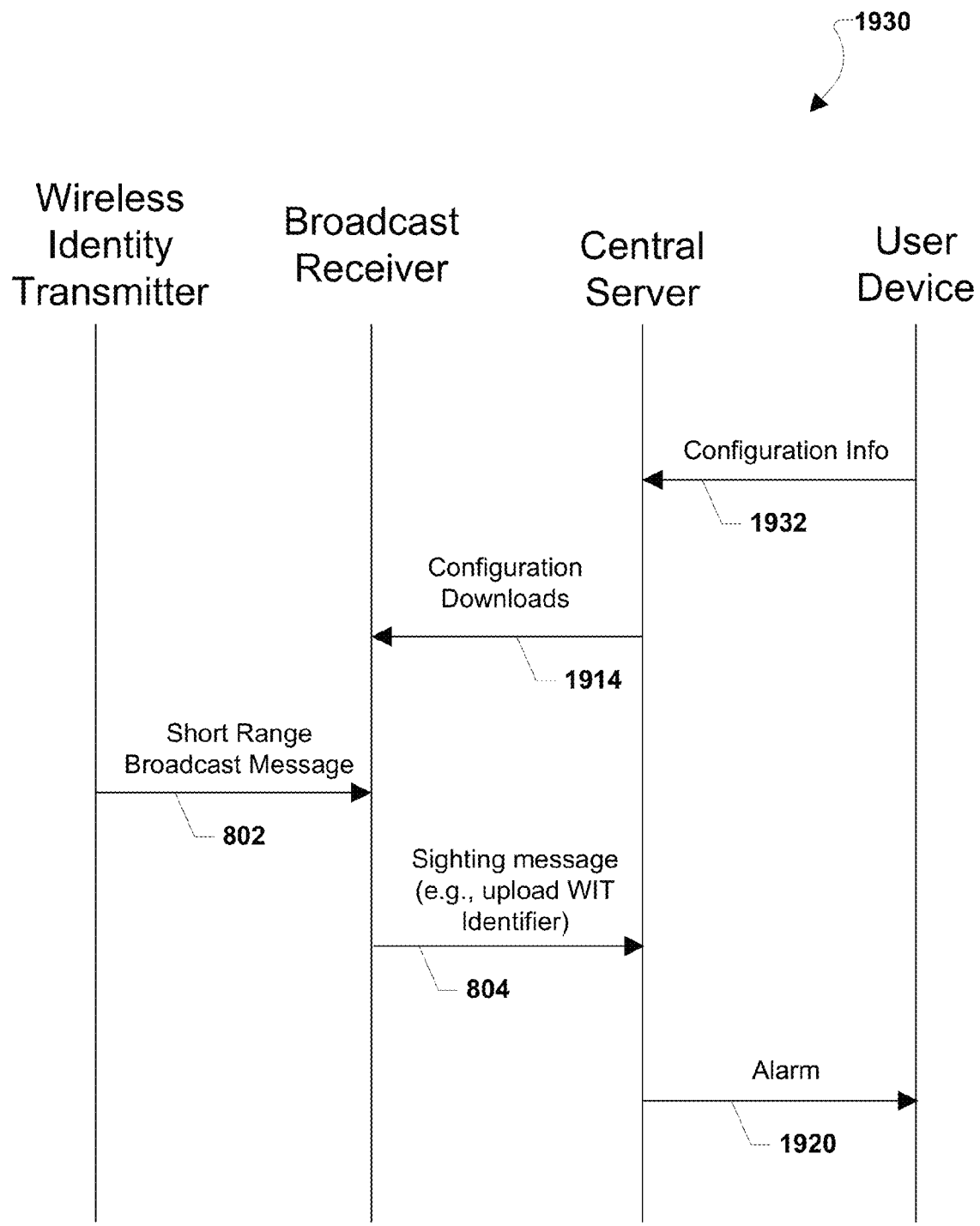
FIG. 19C is a call flow diagram illustrating messages exchanged in configuring mobile proximity broadcast receivers arranged in a perimeter and sending an alarm in accordance with various embodiments.

FIGS. 19A-C describe various embodiments that include proximity broadcast receivers that may be arranged in a fence mode to detect whenever a wireless identity transmitter passes into or out of particular area. FIG. 19A illustrates an embodiment system 1900 that may be used in a fence mode. Stationary proximity broadcast receivers 142 may be arranged in a closed shape or perimeter around a fenced area with one or more wireless identity transmitters 110 inside. The proximity broadcast receivers 142 may be connected to a central server (not shown) directly or indirectly through one or more network connections. The proximity broadcast receivers 142 may be spaced such that the wireless identity transmitter 110 cannot leave the fenced area without coming into communication range of at least one of the proximity broadcast receivers. The proximity broadcast receivers 142 may be configured to automatically detect the wireless identity transmitter 110 and transmit an alarm with the time and identifier of any sighting to the central server. In an embodiment, the alarm may be transmitted via sighting message to the central server which may transmit alarm messages to various user devices, such as smartphones. Any sightings may indicate that the perimeter of the proximity broadcast receivers 142 has been or may soon be broken. As the proximity broadcast receivers 142 are stationary, the central server may be configured with the locations corresponding to each proximity broadcast receiver. Users may receive the alarm and request the identity of the wireless identity transmitter 110 as well as the time of detection and the location of the proximity broadcast receiver 142 corresponding to the detection.

In other embodiments, proximity broadcast receivers 142 may be arranged in various other shapes, such as a line or arc around a point of interest. Proximity broadcast receivers 142 may also be arranged within the various shapes. As an example of a fenced mode, children may be assigned wireless identity transmitters 110 before entering an amusement park. Each wireless identity transmitter 110 may have a serial code cross-referenced with the identifier of the wireless identity transmitter 110. The serial code may be provided to parents. A fence of proximity broadcast receivers 142 may be arranged around the park's perimeter such that any child leaving the park could be identified along with the time and location of exit.

Additional proximity broadcast receivers 142 could be placed within the park so that parents could use the serial code of a child's wireless identity transmitter 110 to actively search for the child's location within the park. Terminals for parents to use may be provided throughout the park. Parents may also setup alerts triggered if a child enters or leaves certain areas of the park (i.e., if a particular proximity broadcast receiver 142 receives a broadcast message from the child's wireless identity transmitter. These alerts may be sent to a parent's registered cellular phone or other mobile device.

FIG. 19B illustrates an embodiment call flow diagram 1910 illustrating messages that may be exchanged in such an embodiment. A user device (e.g., a terminal, mobile device, or amusement park kiosk) may send configuration information 1912 to the central server that may include tracking/searching parameters, such as setting search run times, entering serial codes for active wireless identity transmitters, or setting up alerts. This configuration information 1912 may be obtained by the proximity broadcast receivers in configuration downloads 1914. Any wireless identity transmitter coming within range of a proximity broadcast receiver may transmit a short-range broadcast message 802 with an identifier. The proximity broadcast receivers may upload the identifier as sighting messages 804 to the central server. As described above, such sighting messages may also include data associated with receiving the broadcast message 802, such as a timestamp from when the proximity broadcast receiver received the broadcast message 802, location information, and/or a separate identifier for the proximity broadcast receiver. The central server may generate an alarm 1920 (e.g., sending an alert to park authorities or to parents).

Alternately, user requests 806 may be sent to the central server requesting the location of a wireless identity transmitter. The central server may use a serial code in the user request 806 to search for matches in a database of uploaded identifiers of wireless identity transmitters as reported via various sighting messages 804. In some embodiments, the serial code may be cross-referenced with a corresponding identifier, and the central server may search for the corresponding identifier and the uploaded identifiers. Any matches and their associated times and locations may be sent in a response 808.

In further embodiments, the proximity broadcast receivers may operate as peer devices without a central server. Instead, the proximity broadcast receivers may share any alarms with each other in a common log. Users may request searches of the common log for wireless identity transmitters and any corresponding times and locations of sightings from any of the proximity broadcast receivers.

In further embodiments, one or more wireless identity transmitters may be away from or outside of an arrangement of one or more proximity broadcast receivers configured in a beacon mode. However, rather than generating an alarm when a sighting occurs as described above, alternate embodiments may generate an alarm if a sighting does not occur. If one or more wireless identity transmitters fail to enter a zone (i.e., pair with one or more particular proximity broadcast receivers), an alarm may be generated by the proximity broadcast receiver or a central server. These alarms may be forwarded to registered terminals or mobile devices to alert users.

For example, schools may have one or more proximity broadcast receivers arranged by doors or in classrooms. These devices could detect when a student arrived (i.e., a student's wireless identity transmitter paired with a proximity broadcast receiver). Various embodiments may be used for attendance. If a student does not show up, an alarm may be generated. The proximity broadcast receivers may associate times with the sightings, and these times may be used to determine which students are tardy. Alarms may also be generated for tardy students. Some embodiments may also function as fenced mode embodiments and may be used to detect entry into restricted areas or entry after regular class hours.

Alternate embodiments for a beacon mode arrangement may be used at home, in the work place, or in halfway homes. Parents may use a proximity broadcast receiver to confirm children have made it home on time. Further embodiments may function similar to time clocks in the work place, with sightings recorded to show employees arrived or left on time or worked a minimum number hours. Halfway homes may use a beacon mode embodiment to check that parolees returned home every night.

FIG. 19C illustrates an embodiment call flow diagram 1930. A user device may send configuration information 1932 to prepare the central server to perform tracking operations in a beacon mode, such as setting run times, entering serial codes for active wireless identity transmitters, or setting up alarms. This configuration information 1932 may be downloaded to the proximity broadcast receivers as configuration downloads 1914. Any wireless identity transmitter coming within range of a proximity broadcast receiver may transmit a short range broadcast message 802 with an identifier. The proximity broadcast receivers may upload the identifier as a sighting message 804 to the central server. The proximity broadcast receiver may also upload data associated with receiving the broadcast message 802, such as a timestamp from when the proximity broadcast receiver received the broadcast message 802. The central server may generate an alarm 1920 if a sighting message associated with a particular wireless identity transmitter never occurs (e.g., a parolee never comes home) or occurs too late (e.g., a student is tardy).

The various examples provided herein should not be construed as limiting. Various embodiments may be used for several other uses. Further embodiments may be used to quickly identify proximate disaster victims trapped in buildings during fires, after earthquakes, or during other emergencies. In those cases, the server may maintain the status of a wireless identity transmitter as "found" or "to be recovered". As wireless identity transmitters were encountered, indication of those with a "to be recovered" status may facilitate recovery by the proximate disaster response crews.

Figure 19D:
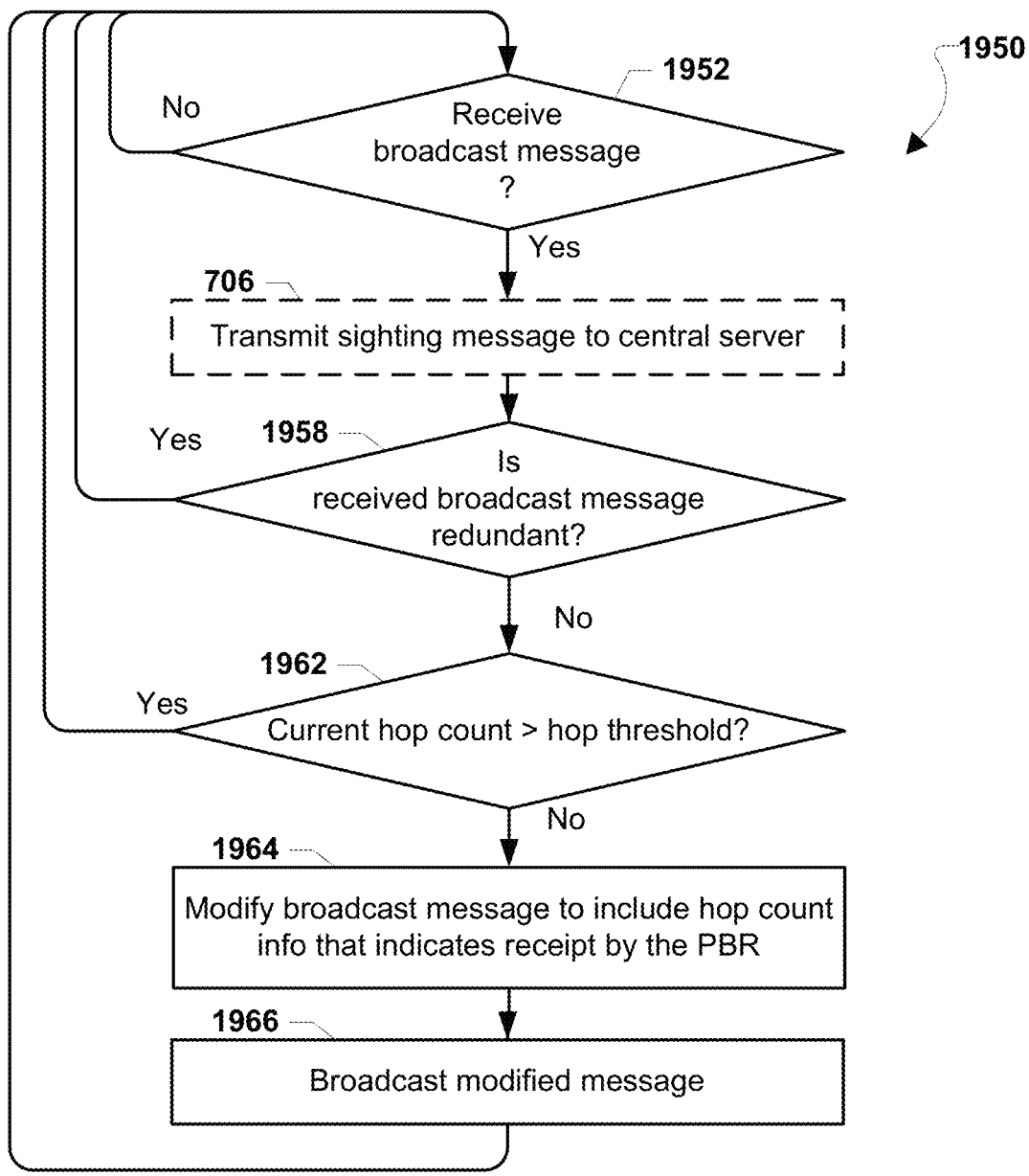
FIGS. 19D and 19E are process flow diagrams illustrating embodiment methods for a proximity broadcast receiver to propagate (or re-broadcast) received broadcast messages from wireless identity transmitters.
Figure 19E:
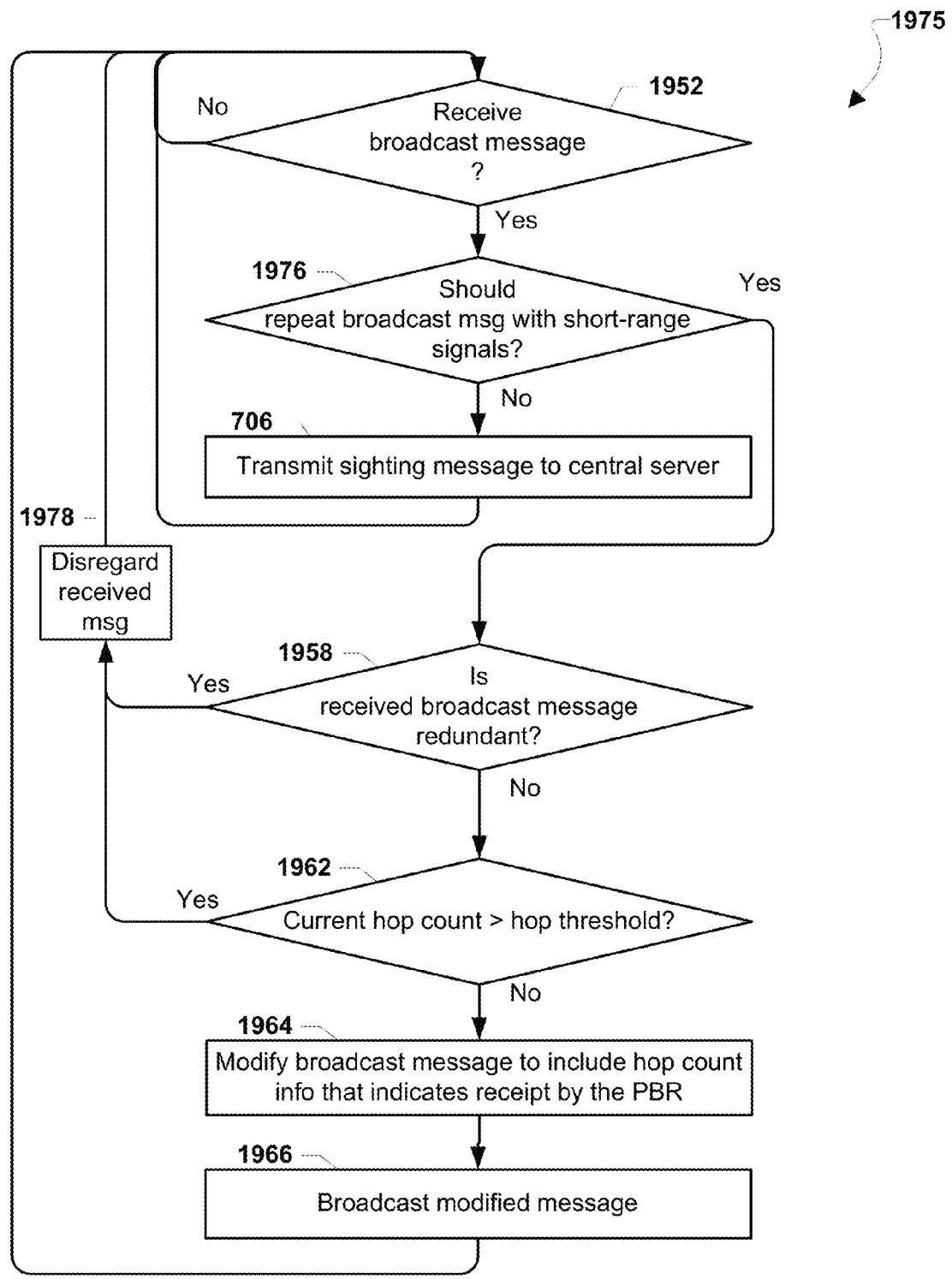

FIGS. 19D and 19E illustrate embodiment methods 1950 and 1975 for propagating (or re-broadcast) received broadcast messages from wireless identity transmitters. Locating people in large areas, especially during emergency situations, is often difficult for emergency personnel. In particular, during times of natural disasters, victims may be incapacitated, buried, or otherwise unable to communicate with emergency responders. Emergency personnel may not know where missing/injured people are within large areas (e.g., large buildings, stadiums, shopping malls, theme parks, and campuses) or if there are even any people to find within an area at all. Thus, conventional locating procedures often are slow and without direction, leading to untimely recoveries of people in need of immediate assistance.

Under normal circumstances, the effective range of a wireless identity transmitter is the limit of the transmission range of the transmitter's radio (e.g., Bluetooth LE advertisement packet range). In other words, at a given time, users carrying wireless identity transmitters may only be located based on proximity broadcast receivers within broadcast range. However, a proximity broadcast receiver performing the operations in the methods 1950 and/or 1975 may propagate (or repeat) broadcast messages originating from wireless identity transmitters and thus increase the effective range of broadcast message from the wireless identity transmitters. For the purposes of describing FIGS. 19D and 19E, the term "repeating proximity broadcast receiver" will be used to refer to proximity broadcast receiver devices configured to both receive and re-broadcast messages received from proximate wireless identity transmitter.

In particular, repeating proximity broadcast receivers may be placed at various locations out to the edge of a desired coverage area, such as a college campus. Upon receipt of a broadcast message from a wireless identity transmitter (or another proximity broadcast receiver configured to re-broadcast messages), such a repeating proximity broadcast receiver may increment a "hop count" indicator (e.g., metadata, header information, etc.) and re-broadcast the modified broadcast message. The "hop-count" information in these re-broadcast messages indicates the relative proximity to the wireless identity transmitter that sent the original broadcast message. In other words, hop-count data may be an indicator of how many repeating proximity broadcast receivers or other devices have re-broadcast or passed along a broadcast message.

For illustration purposes, wireless identity transmitters may be affixed to employee badges and repeating proximity broadcast receivers may be placed in strategic locations (e.g., concentric circles) inside a large office building or campus. If a catastrophic earthquake occurs with a portion of the building coming down, emergency personnel equipped with mobile proximity broadcast receivers (e.g., smartphones running an app for re-transmitting broadcast messages) may be enabled to locate survivors by way of broadcast messages from the employees' wireless identity transmitters. The emergency personnel may determine how many employees were in the building and approximately how close they are from the current location of the emergency personnel based on hop count information within re-broadcast messages received from the repeating proximity broadcast receivers throughout the building/campus.

In various embodiments, the repeating proximity broadcast receivers may be wall-mounted units that include batteries allowing for long periods of operation and may or may not be enabled to exchange long-range communications with a central server (e.g., connected to a local area network with access to the Internet.) In another embodiment, the repeating proximity broadcast receivers may be configured to only broadcast messages in response to receiving other broadcast messages. For example, the repeating proximity broadcast receivers may be dormant until a broadcast message from a wireless identity transmitter is received. Most importantly, this mechanism may not require network connectivity (e.g., WiFi, cellular network access points, etc.) and thus may continue to function as long as the wireless identity transmitters and repeating proximity broadcast receivers are powered via internal batteries or otherwise.

FIG. 19D illustrates an embodiment method 1950 for a repeating proximity broadcast receiver relaying broadcast messages received from a wireless identity transmitter. In determination block 1952, the repeating proximity broadcast receiver may determine whether a broadcast message has been received. For example, the repeating proximity broadcast receiver may monitor a receiving circuit, queue, or buffer for incoming short-range wireless signals broadcast by a wireless identity transmitter or another repeating proximity broadcast receiver. If a broadcast message is not received (i.e., determination block 1952="No"), the repeating proximity broadcast receiver may continue with the operations in determination block 1952. However, if a broadcast message is received (i.e., determination block 1952="Yes"), in optional block 706 the repeating proximity broadcast receiver may transmit a sighting message to a central server. For example, the repeating proximity broadcast receiver may utilize long-range communications, such as via a WiFi or cellular network, to relay the received broadcast message, identifier information about the corresponding wireless identity transmitter, the time, the location of the repeating proximity broadcast receiver, and other associated data to the central server for processing. This transmission of a sighting message to the central server may be made if a long-range data link is available to the repeating proximity broadcast receiver (e.g., in normal, non-emergency conditions). If a long-range data link is not available to the repeating proximity broadcast receiver, as may be the case in an earthquake or other natural disaster, the repeating proximity broadcast receiver may retransmit the received message so that the message can be propagated from repeating proximity broadcast receiver to repeating proximity broadcast receiver until a device, such as a mobile proximity broadcast receiver carried by a (e.g., a smartphone) rescuer, receives the messages and transmits the sighting message to the central server.

In determination block 1958, the repeating proximity broadcast receiver may determine whether the received broadcast message is redundant. In other words, the repeating proximity broadcast receiver may evaluate identification information (i.e., identifiers) within the received broadcast message to determine whether the repeating proximity broadcast receiver has already received a similar message corresponding to the same wireless identity transmitter. Messages may be redundant when corresponding to the same wireless identity transmitter (e.g., same device ID) but indicating different hop counts. If the received message is redundant (i.e., determination block 1958="Yes"), the repeating proximity broadcast receiver may continue with the operations in determination block 1952.

If the received message is not redundant (i.e., determination block 1958="No"), in determination block 1962 the repeating proximity broadcast receiver may determine whether the current hop count is greater than a hop threshold which is used to avoid repeating messages indefinitely. The repeating proximity broadcast receiver may evaluate metadata, header information, and descriptive data within the received message to detect reported hop count indicators. When a hop count is not indicated in the received broadcast message, the broadcast message may be considered to be directly received from the wireless identity transmitter. Likewise, when there is a hop count in the received broadcast message, this means that another repeating proximity broadcast receiver has re-broadcast the message. The hop threshold value may represent a predefined number of hops or re-broadcasts of a broadcast message before re-broadcasting the message is of no use to subsequent recipients. In other words, the repeating proximity broadcast receiver may not re-broadcast the received message if the proximity to the wireless identity transmitter is too broad. If the current hop count exceeds the hop threshold (i.e., determination block 1962="Yes"), the repeating proximity broadcast receiver may continue with the operations in determination block 1952

If the current hop count does not exceed the hop threshold (i.e., determination block 1962="No"), in block 1964 the repeating proximity broadcast receiver may modify the broadcast message to increment the hop count information to indicate re-transmissions by the repeating proximity broadcast receiver. If there is no hop count in the received message (which is when the broadcast message was received directly from the wireless identity transmitter) the repeating proximity broadcast receiver may add hop count information. In an embodiment, the repeating proximity broadcast receiver may further modify the broadcast message by inserting associated data, such as the repeating proximity broadcast receiver's identifier, timestamp information, and/or signal strength information relevant to the received broadcast message. In block 1966, the repeating proximity broadcast receiver may broadcast the modified message, such as with a short-range radio (e.g., Bluetooth LE), and may then continue with the operations in determination block 1952.

FIG. 19E illustrates an embodiment method 1975 for a proximity broadcast receiver to propagate (or re-broadcast) received broadcast messages corresponding to a wireless identity transmitter. The method 1975 is similar to the method 1950, except that the method 1975 may be performed by any receiver device, such as a mobile proximity broadcast receiver, and not dedicated repeating proximity broadcast receivers. The method 1975 may contain additional operations that may enable a proximity broadcast receiver to check whether it is configured to operate as a repeating proximity broadcast receiver. For example, a stationary proximity broadcast receiver may repeat broadcast messages when it cannot connect to a local area network and transmit sighting messages to a central server.

In determination block 1952, the proximity broadcast receiver may determine whether a broadcast message has been received. If a broadcast message is not received (i.e., determination block 1952="No"), the proximity broadcast receiver may continue with the operations in determination block 1952. However, if a broadcast message is received (i.e., determination block 1952="Yes"), in determination block 1976 the proximity broadcast receiver may determine whether it should repeat the broadcast message with short-range signals. In other words, the proximity broadcast receiver may determine whether it has connectivity to transmit a sighting message via long-range communications to a central server. For example, the proximity broadcast receiver may determine to repeat broadcast message when the proximity broadcast receiver cannot connect to a local area network (e.g., WiFi) or a cellular network. If the proximity broadcast receiver determines it should not repeat broadcast with short-range signals (i.e., determination block 1976="No"), in block 706 the proximity broadcast receiver may transmit a sighting message to the central server and may continue with the operations in determination block 1952. For example, because connectivity to a wireless wide area network has not been lost, the proximity broadcast receiver may transmit a sighting message that indicates the identity of the wireless identity transmitter related to the received broadcast message as well as the location of the proximity broadcast receiver. In an embodiment, the proximity broadcast receiver may be configured to repeat or re-broadcast received broadcast messages in addition to transmitting sighting messages.

If the proximity broadcast receiver determines it should repeat the broadcast message with short-range signals (i.e., determination block 1976="Yes"), in determination block 1958 the proximity broadcast receiver may determine whether the received broadcast message is redundant. If the received message is redundant (i.e., determination block 1958="Yes"), in block 1978 the proximity broadcast receiver may disregard the received message and may continue with the operations in determination block 1952. If the received message is not redundant (i.e., determination block 1958="No"), in determination block 1962 the proximity broadcast receiver may determine whether the current hop count is greater than a hop threshold. If the current hop count exceeds the hop threshold (i.e., determination block 1962="Yes"), the proximity broadcast receiver may continue with the operations in block 1978.

If the current hop count does not exceed the hop threshold (i.e., determination block 1962="No"), in block 1964 the proximity broadcast receiver may modify the broadcast message to include hop count information that indicates receipt by the proximity broadcast receiver. In block 1966, the proximity broadcast receiver may broadcast the modified message, such as with a short-range radio (e.g., Bluetooth LE), and may then continue with the operations in determination block 1952.

Figure 20A:
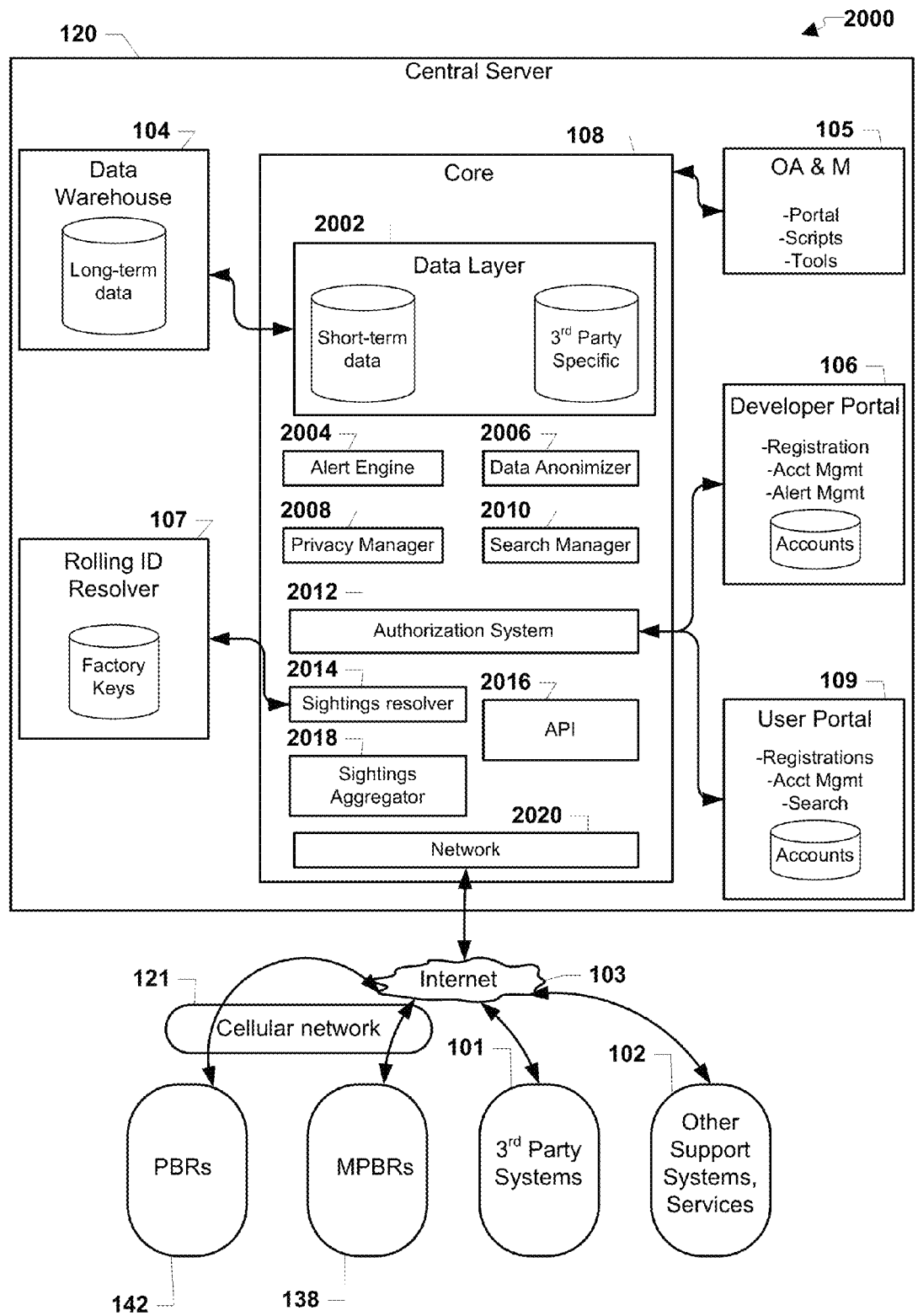
FIG. 20A is a component diagram illustrating various modules within a central server suitable for use in various embodiments.

FIG. 20A illustrates a diagram 2000 of various modules within a central server 120. The various modules and components are described below in the context of modules, components, and/or elements within a central server 120. However, in various embodiments, the central server 120 may include or be connected to individual computing devices, server blades, or other units that may perform the operations associated with the various modules and/or components described below.

As described above with reference to FIG. 1, the central server 120 may be configured to receive, store, and otherwise process data corresponding to wireless identity transmitters. For example, the central server 120 may be configured to exchange communications with various devices via the Internet 103, such as proximity broadcast receivers 142 and mobile proximity broadcast receivers 138 communicating via a cellular network 121, third-party systems 101, and other support systems and/or services 102.

The central server 120 may include several components 104-109 to perform various operations to process data, such as received from proximity broadcast receivers 142, 138, third-party systems 101, or other support systems and/or services 102. In particular, the central server 120 may include a core component 108 that may process sighting messages, execute an alert or notice engine module, handle application programming interface (API) commands, and exchange data with other components within the central server 120. The core component 108 may include a data layer module 2002 that may include units for storing short-term data and third-party specific data. The core component 108 may also include an alert engine module 2004 for generating alert messages for transmissions to proximity broadcast receivers and initiating searches of various target wireless identity transmitters. The core component 108 may further include a data anonimizer module 2006 that may generate generic, anonymous, or otherwise processed data based on privacy policies or profile preferences of users. For example, the data anonimizer module 2006 may strip personal information from return messages transmitted to a proximity broadcast receiver associated with a store so that a consumer user of a wireless identity transmitter is not identified to the store, but the fact that the user is within the store is still reported to the store. The core component 108 may also include a privacy manager module 2008 that may maintain privacy permission information for various users.

For example, the privacy manager module 2008 may include a database of privacy parameters provided by users at registration. In an embodiment, the data anonimizer module 2006 and/or the privacy manager module 2008 may utilize the permissions described below with reference to FIG. 23.

The core component 108 may also include a search manager module 2010 for assisting in organizing and administering searches and an authorization system module 2012. The core component 108 may further include a sightings resolver module 2014 that may be utilized by the central server 120 for identifying wireless identity transmitters associated with broadcast messages reported within received sighting messages from proximity broadcast receivers 142, 138. The core component 108 may include an API module 2016 that may include functions and interfaces for initiating operations, a sightings aggregator module 2018 for compounding various sighting messages over a period for transmissions in consolidated form to merchants, third-parties, and other services. The core component 108 may also include a network module 2020 for transmitting and receiving various communications with devices, such as proximity broadcast receivers 142, 138 and third-party systems 101 via the Internet.

The central server 120 may also include a data warehouse component 104 that may store long-term data (e.g., archived user data, past location information, etc.). The data warehouse component 104 may include various databases for storing information pertinent to users of wireless identity transmitters, such as profile information provided by users via registration websites. The data warehouse component 104 may be configured to exchange data with the data layer module 2002 of the core component 108. The central server 120 may also include an operations, administration, and management (or OA & M) component 105 that may process and/or store software associated with user portal accesses, scripts, and tools (e.g., software utilities, routines, etc.). The OA & M component 105 may be configured to exchange data with the core component 108.

The central server 120 may also include a developer portal component 106 that may store developer account data and perform registration, account management, and alert (or notice) management routines associated with developers, such as vendors or merchants that register to interact with users of wireless identity transmitters 110. The central server 120 may also include a user portal component 109 that may store user account data and perform registration, account management, and search routines associated with users, such as persons associated with wireless identity transmitters. The user portal component 109 and developer portal component 106 may be configured to exchange data with the authorization system module 2012 of the core component 108. The central server 120 may also include a rolling identifier (or ID) resolver component 107 that may store factory keys associated with wireless identity transmitters 110 as well as perform operations, software, or routines to match encrypted, encoded, rolling, or otherwise obfuscated identification information within received sighting messages with affiliated user data. The rolling identifier (or ID) resolver component 107 may be configured to exchange data with the sightings resolver module 2014 of the core component 108.

In various embodiments, the modules and components described with reference to FIG. 20A, such as the rolling ID resolver component 107, may be performed or otherwise enabled by software instructions, applications, routines, threads, circuitry, or hardware units.

Figure 20B:
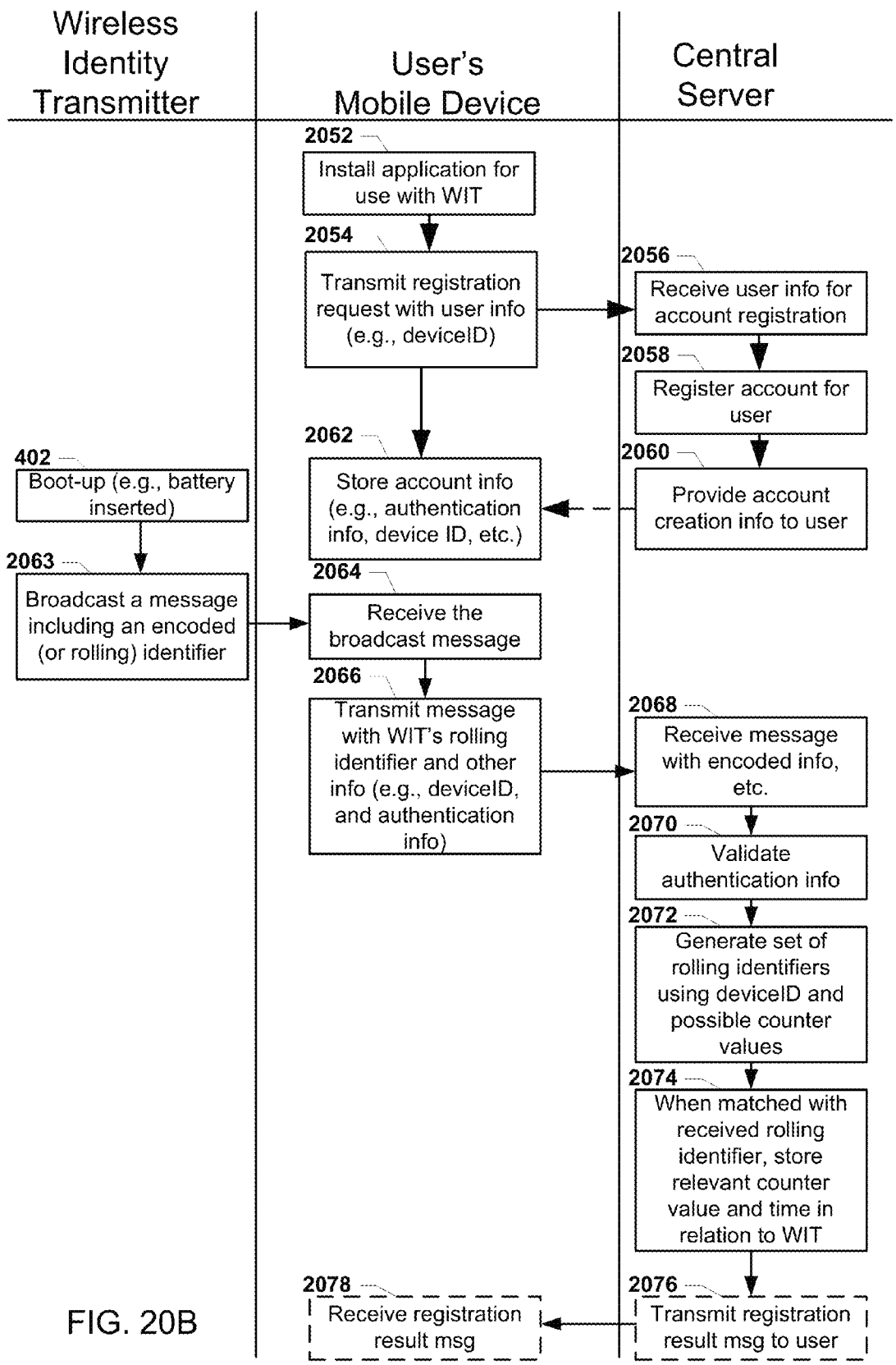
FIG. 20B is a diagram illustrating a wireless identity transmitter registration process for use in various embodiments.

FIG. 20B illustrates a wireless identity transmitter registration process for use in various embodiments. In general, before broadcast messages may be processed by a central server, the central server may require that wireless identity transmitters and their users be registered with the central server. For example, before any tracking, searching, or other location-based activities related to a wireless identity transmitter can be initiated, the central server must be able to determine the users associated with the various wireless identity transmitters circulating in the world. Registration may create links between identifiers transmitted by wireless identity transmitters in broadcast messages, the wireless identity transmitters, and their users. For example, in order to transmit a notification to a missing child's parents that the child has been found, relayed obfuscated (or encoded) identifiers must be matched to account information that indicates the parents' cell phone numbers as stored in relation to a registered user account.

In particular, through registration, a timing mechanism may be synchronized between each wireless identity transmitter and the central server (i.e., a counter). With such a counter, a wireless identity transmitter and the central server may encode (or roll) and decode identifiers respectively, keeping the identity associated with the wireless identity transmitter (and its users) concealed and private. The most appropriate time to synchronize such a timing mechanism or counter may be during a device registration and/or account creation process as described below. For the purpose of FIG. 20B, a mobile device, such as a smartphone, is described as being used by a user to perform account creation and registration operations (e.g., the mobile device accesses a web portal to register with the central server, etc.). However, any computing device connected to the Internet and capable of exchanging communications with the central server via a registration web portal or website may be relevant.

In block 2052, a user's mobile device (e.g., an iPhone, Android, tablet device, etc.) may install an application for use with wireless identity transmitters. Such an application (or "app") may execute on the mobile device's processor as a background service or alternatively may be activated for selective use by the user. As described throughout this disclosure, such an application may enable the mobile device to process short-range broadcast messages from proximate wireless identity transmitters, such as by identifying received signals as broadcast messages and relaying sighting messages having location information to the central server in response. In block 2054, the mobile device may transmit a registration request with user information (e.g., a device identity or "deviceID"). The registration request may be sent to the central server via Internet communications with a web portal, web site, or web server controlled or otherwise accessible by the central server. In other words, the mobile device may invoke the registration process or by providing user information (e.g., device ID) through the installed app by providing the device ID (deviceID) and other information the central server may utilize to bind the registration request to an account. For example, the user's mobile device may access a registration website, receive inputs from the user, and transmit the user input as data to the registration website for use by the central server as described above with reference to FIG. 20A. In an embodiment, the user information may include personal information about the user, such as name, address, contact information (e.g., social network sites, cell phone number, email address, telephone number, etc.) age, and other demographic information, as well as identifying information about wireless identity transmitters and/or proximity broadcast receivers that may be associated with the user's account. For example, the user information transmitted to the central server may include the serial number on a wireless identity transmitter and/or a confirmation code produced by the mobile device in response to installing the application with the operations in block 2052. The user information may also include preference information, such as the user's preferred retails stores, product lines, and areas to eat or consume. The user information may further include privacy permissions that indicate how personal information may be distributed or used by the central server, such as discussed below. In an embodiment, users may register as anonymous users, such that the central server does not store any identifying information about the users. For example, an account may be registered that is linked to a non-descript post office box, a disposable cellular telephone number, or other contact information that does not directly identify the user or the holder of the account. This may be important for those who may choose to utilize services provided by the central server, but who are concerned about leaked private or identifying information. In block 2062, the user's mobile device may store account information, such as authentication information (e.g., codes, messages) from the central server or device ID associated with an owned wireless identity transmitter.

In block 2056, the central server may receive the user information for account registration. In block 2058, the central server may register an account for the user. For example, the central server may store the user's information, including provided device identifications, in a database of all registered users. In block 2060 the central server may provide account creation information to the user. The account creation information may include an authentication code or other information the user's mobile device may store for future use. For example, the central server may display confirmation of account creation on a website accessible by the user's mobile device or alternatively may transmit a confirmation signal, text message, email, or other communication to the user's mobile device.

In block 402, the wireless identity transmitter boots-up, such as in response to the user inserting a battery. When the wireless identity transmitter boots, a nonce or counter value may be initialized. For example, the wireless identity transmitter may begin to increment a value that represents the passage of time, starting from a zero value. In block 2063, the wireless identity transmitter may broadcast a message (i.e., a broadcast message) that includes an encoded (or rolling) identifier. For example, the wireless identity transmitter may begin transmitting broadcast messages every few seconds. The wireless identity transmitter may generate rolling identifiers with the embodiment methods described below. In general, the broadcast message may include a payload that includes data generated by performing a pseudo-random function. For example, the wireless identity transmitter may perform a pseudo-random function to generate encoded data based on input values of the wireless identity transmitter's device ID, a nonce or counter value, and a secret key, seed, or other value known only to the wireless identity transmitter and the central server. In an embodiment, the pseudo-random function may be a polynomial time computable function that may utilize a randomly selected seed value only known to the wireless identity transmitter and the central server, such that the pseudo-random function may be computationally indistinguishable from a random function defined on the same domain with output to the same range as the pseudo-random function. In an embodiment, the keyed-hash Message Authentication Code (HMAC) or the cipher-based Message authentication Code (CMAC) may be used as the pseudo-random function.

In an embodiment, the wireless identity transmitter may be required to be activated within a predefined number of seconds within the time the mobile device begins the registration process with the operations in block 2054. In other words, once the wireless identity transmitter begins incrementing its nonce or counter value, the user must register with the central server within a certain period. This enables the central server to try at only a certain number of values when trying to determine the nonce or counter value at the wireless identity transmitter during registration.

In an embodiment, the wireless identity transmitter may indicate an initial broadcast by adjusting data within a broadcast message's payload. For example, the wireless identity transmitter may change a bit within a broadcast message that the central server may recognize as indicating an initialization time period for the wireless identity transmitter. If there are initialization indicators within payloads, the central server may expedite comparisons between received payloads and stored payloads by avoiding comparisons to payloads corresponding to already registered (or recognized) wireless identity transmitters within a central server lookup data table.

In block 2064, the user's mobile device may receive the broadcast message. In other words, based on the installed application (or app), the mobile device may function as a mobile proximity broadcast receiver. An installed application may, such as the app installed with the operations in block 2052, may be waiting to receive such a broadcast message in response to initiating registration operations with the central server via the registration request. In block 2066, the mobile device may transmit the wireless identity transmitter's rolling identifier and other information, such as the stored device ID and authentication information. In an embodiment, the mobile device may extract encoded information from the received broadcast message, such as by using text comparison and/or parsing operations. For example, the mobile device may perform a most-significant bit operation.

In block 2068, the central server may receive the message with the encoded information, as well as the authentication information and the device ID. In block 2070, the central server may validate authentication information, such as in the received message from the mobile device. In particular, the central server may compare the authentication information to information generated in the operations in blocks 2058-2060. In block 2072, the central server may generate a set of rolling identifiers using the device ID and possible nonce or counter values. The central server may compare the rolling identifiers of the set with the rolling identifier received from the mobile device. In an embodiment, the central server may compute a set of encoded data by using a pseudo-random function, such as described above, along with the device ID and a number of nonce or counter values. For example, the central server may execute the pseudo-random function with a seed shared with wireless identity transmitters, the device ID indicated by the mobile device, and many nonce or counter values, starting with 0. In block 2074, when the central server matches the received rolling identifier to one of the rolling identifiers in the generated set, the central server may store relevant nonce or counter value and time in relation to the wireless identity transmitter. The central server may use the nonce or counter value used to generate the matching rolling identifier to sync with the nonce or counter running on the wireless identity transmitter. In an embodiment, the central server may store an indicator that describes the wireless identity transmitter as having been successfully registered and/or synced. In optional block 2076, the central server may then transmit a registration result message to the user, such as by transmitting a message to the mobile device. The registration result message may indicate whether or not the central server was able to match the received encoded identifier with a generated identifier. In optional block 2078, the mobile device may receive the registration result message. In an embodiment, the registration result message indicates that the registration process failed (e.g., the received broadcast message received by the mobile device did not correspond to the user's wireless identity transmitter), the mobile device may re-attempt the registration by receiving and relaying another broadcast message.

The operations described in FIG. 20B, particularly within blocks 2063-2074, assume that message processing operations performed by the various devices, as well as any propagation delay, may be much smaller than the time required to increment (or update) the nonce or counter value at the wireless identity transmitter. This ensures that the nonce or counter values at the wireless identity transmitter and central server do not differ by more than 1.

Figure 21A:
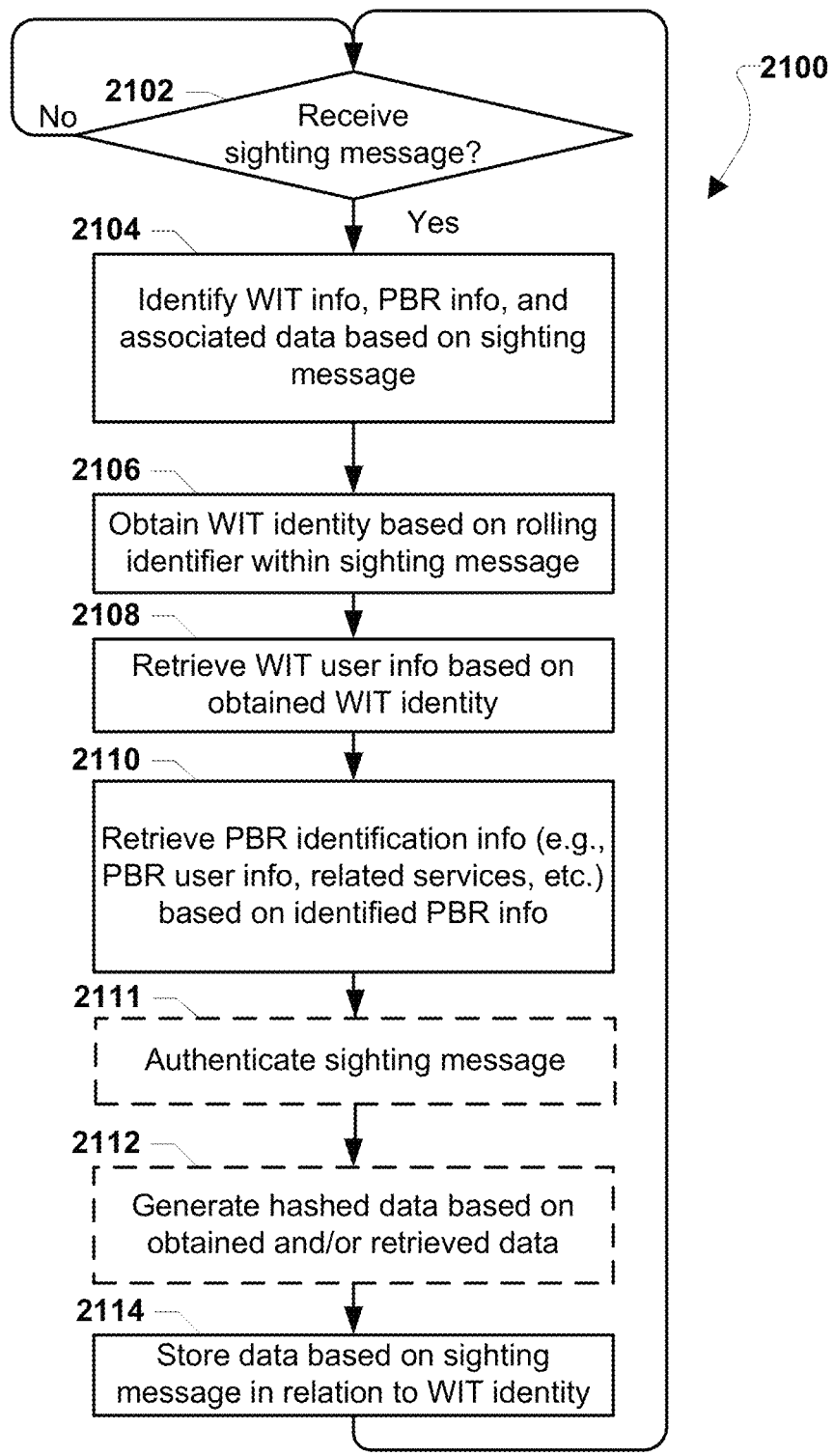
FIGS. 21A and 21B are process flow diagrams illustrating embodiment methods for a central server to process sighting messages received from proximity broadcast receivers.

FIG. 21A illustrates an embodiment method 2100 for a central server to process sighting messages received from proximity broadcast receivers. As described above, the central server may be configured to utilize various modules, components, circuitry, and software to process sighting messages. In determination block 2102, the central server may determine whether a sighting message is received. The central server may evaluate a receiving circuit, buffer, queue or other indicator to determine when messages are received from various devices, such as proximity broadcast receivers. In an embodiment, the central server may utilize a network module as described above to determine whether a sighting message is received. In general, sighting messages may be received via long-range communications, such as packets transmitted via a cellular network over the Internet. If the central server does not receive a sighting message (i.e., determination block 2102="No"), the central server may continue with the operations in determination block 2102.

If the central server receives a sighting message (i.e., determination block 2102="Yes"), in block 2104 the central server may identify wireless identity transmitter information, proximity broadcast receiver information, and associated data based on the sighting message. The central server may evaluate, parse, and otherwise make accessible various data and information segments within the received sighting message. For example, the central server may parse the sighting message to identify an included broadcast message from the wireless identity transmitter. As another example, the central server may identity encoded data corresponding to a wireless identity transmitter identity (i.e., rolling identifier), proximity broadcast receiver identification information (e.g., a receiver ID), location information, timestamp information, sensor data (e.g., accelerometer sensor data, etc.), identifiers of applications (or apps) associated with a proximity broadcast receiver (e.g., a list of installed applications, an identifier for a relevant app executing on the proximity broadcast receiver, etc.). In an embodiment, the central server may perform the operations of block 2104 with a sightings resolver module as described above.

In block 2106, the central server may obtain the wireless identity transmitter identity based on the rolling identifier within the sighting message. The central server may perform operations to decode, descramble, decrypt, or otherwise make accessible the rolling identifier. For example, the central server may perform operations to apply a secret key or decoding algorithm to obtain the identity of the wireless identity transmitter. In an embodiment, the operations of block 2106 may be performed by the central server by way of a rolling ID resolver component as described above. For example, the central server may cause a sightings resolver module to exchange data with the rolling ID resolver component to obtain a decoded wireless identity transmitter identifier. Embodiment operations to identity the wireless identity transmitter based on a sighting message that includes a rolling identifier are described below.

In block 2108, the central server may retrieve the wireless identity transmitter user information based on the obtained wireless identity transmitter identity. For example, the central server may retrieve user account information related to the wireless identity transmitter, such as demographics information, stored data indicating previous behaviors (e.g., travel paths, location history, etc.). In an embodiment, the operations of block 2108 may be performed by the central server by way of an authorization system module as described above. For example, the central server may cause the authorization system module to exchange wireless identity transmitter identity information with a user portal component to obtain user information as saved within user registration databases.

In block 2110, the central server may retrieve proximity broadcast receiver identification information, such as proximity broadcast receiver user information and related services, based on the identified proximity broadcast receiver information. For example, the central server may retrieve the merchant identity associated with the proximity broadcast receiver that transmitted the received sighting message, the tracking services the proximity broadcast receiver is registered to participate in, as well as any other relevant information to the proximity broadcast receiver. The central server may retrieve email addresses, MAC addresses, phone numbers, and other contact information related to a user of related proximity broadcast receiver based on the information within the sighting message. For example, the central server may determine the user contact information associated with a proximity broadcast receiver that may be used for subsequent transmissions from the central server, such as emails or SMS text messages that indicate proximity to an item of interest. In an embodiment, the central server may determine the identity of a user of a smartphone that is configured to perform operations of a mobile proximity broadcast receiver. In an embodiment, the operations of block 2110 may be performed by the central server by way of an authorization system module as described above. For example, the central server may cause the authorization system module to exchange proximity broadcast receiver information with a developer (or user) portal component to obtain information about related registered services (e.g., merchants, stores, vendors, services, etc.) as saved within developer registration databases.

In optional block 2111, the central server may authenticate the sighting message. Based on authentication information within the received sighting message, the central server may perform authentication operations that confirm the legitimacy of the sighting message as coming from a known or otherwise valid proximity broadcast receiver. As described above, sighting messages may include data, such as secret codes, certificates, or hash data, that can be used to confirm the identities of valid proximity broadcast receivers. As third-parties may attempt to spoof proximity broadcast receivers associated with registered services (e.g., a nefarious spammer may attempt to imitate a merchant's store proximity broadcast receiver by sending a fraudulent sighting message), the central server may check for authentication information that confirms the information within the sighting message is useful and related to a registered service (e.g., a registered merchant, a valid developer, or other party that deploys legitimate proximity broadcast receivers). For example, the central server may detect obscured header information within the sighting message that relates to a merchant established within the central server as a registered developer. When the sighting message does not include authentication information expected by the central server, such as a special code that all proximity broadcast receivers within a certain building possess, or does include authentication information that does not match information stored in the central server, the central server may disregard the sighting message and all included information. For example, a sighting message with out-of-date or incomplete authentication information may be disregarded by the central server, or alternatively stored in a list for potentially fraudulent proximity broadcast receivers.

In optional block 2112, the central server may generate hashed data based on the obtained and/or retrieve data. In an embodiment, the operations of optional block 2112 may be performed by the central server by way of a data anonimizer module as described above. In block 2114, the central server may store data based on the sighting message in relation to the wireless identity transmitter identity. For example, the central server may store identified associated data from the sighting message in a database in relation to the wireless identity transmitter's decoded identity. In an embodiment, the operations of block 2114 may be performed by the central server by way of a data layer module as described above.

Figure 21B:
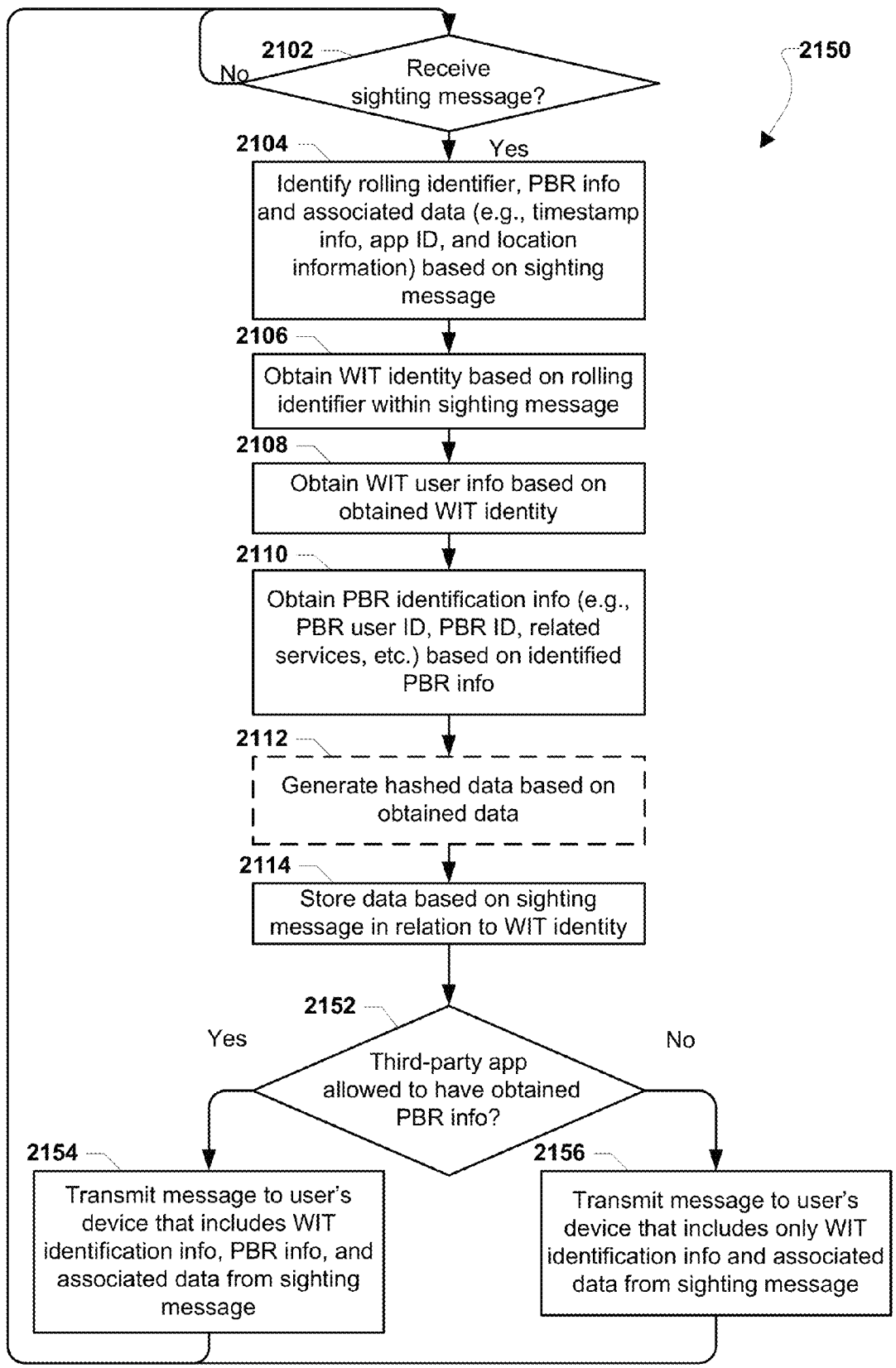

FIG. 21B illustrates an embodiment method 2150 for a central server to process sighting messages received from proximity broadcast receivers. The method 2150 is similar to the method 2100 described above, except that the central server may perform the method 2150 to transmit messages for use by a third-party application executing on mobile device carried by a user. As described above, various messages, such as return messages, alerts (or search activation messages), may be transmitted by the central server to various recipients, such as mobile devices associated with a user. For example, the central server may transmit messages to a user's tablet, smartphone, wireless receiver device, or other computing device. A recipient may also include an application or app executing on a mobile device. In an embodiment, the central server may also transmit messages to other third-party recipients or devices, such registered services that may include EMT, fire, local police, retail store, merchant computing devices, and ad servers.

Messages transmitted by the central server in response to receiving sighting messages may be transmitted to inform devices, such as a mobile phone or mobile proximity broadcast receiver carried by a user, of the location of proximity of known wireless identity transmitters. For example, when a proximity broadcast receiver, such as a stationary proximity broadcast receiver within a retail store, relays a broadcast message from a wireless identity transmitter associated with a user, the central server may respond by transmitting a message back to a mobile device of the user indicating the user is near the store's receiver device. Further, a third-party application running on the user's device may use information within the message. For example, a retail store app running on a user's smartphone may receive a notice that the user has moved within proximity of a display area within proximity of a retail store building. In various other embodiments, the third-party applications may be utilized to track owned items associated with wireless identity transmitters. For example, a particular third-party application may perform a ring tone when the user is within proximity of a searched for missing child.

In determination block 2102, the central server may determine whether a sighting message is received. If the central server does not receive a sighting message (i.e., determination block 2102="No"), the central server may continue with the operations in determination block 2102. If the central server receives a sighting message (i.e., determination block 2102="Yes"), in block 2104 the central server may identify wireless identity transmitter information, proximity broadcast receiver information, and associated data based on the sighting message. In block 2106, the central server may obtain the wireless identity transmitter identity based on the rolling identifier within the sighting message. In block 2108, the central server may retrieve the wireless identity transmitter user information based on the obtained wireless identity transmitter identity. In block 2110, the central server may retrieve proximity broadcast receiver identification information, such as proximity broadcast receiver user information and related services, based on the identified proximity broadcast receiver information. In optional block 2112, the central server may generate hashed data based on the obtained and/or retrieve data. In block 2114, the central server may store data based on the sighting message in relation to the wireless identity transmitter identity.

In determination block 2152, the central server may determine whether a third-party application (or app) is allowed to have obtained proximity broadcast receiver information. In other words, based on data stored in the central server that is associated with the user of the wireless identity transmitter, the central server may detect any registered services or third-party applications that are associated with the user's devices. For example, the central server may evaluate database information to identify the user has installed a third-party application on his/her smartphone that corresponds to a retail store. The proximity broadcast receiver information may include proximity broadcast receiver identification (e.g., an ID code or identifier) and the user identity of the proximity broadcast receiver. In an embodiment, the central server may identify whether third-party applications are allowed such information based on the third-party's developer rights, such as indicated when the third-party registered as a developer or registered service, or alternatively based on the user's permission settings, as described below with reference to FIG. 22. In an embodiment, the central server may use application identification information provided within the received sighting message to determine whether the third-party applications on the user's device may receive proximity broadcast receiver information. For example, the sighting message may contain indicators of applications (e.g., app IDs) that correspond to the sighting message and thus are allowed to receive any proximity broadcast receiver information from the central server.

If the third-party app is not allowed to have the obtained proximity broadcast receiver information (i.e., determination block 2152="No"), in block 2156 the central server may transmit a message to the user's device that includes only wireless identity transmitter identification information and associated data from the sighting message. For example, the message transmitted by the central server may include the obtained wireless identity transmitter identity, user information, timestamp data, and location information from the sighting message. If the third-party app is allowed to have the obtained proximity broadcast receiver information (i.e., determination block 2152="Yes"), in block 2154 the central server may transmit a message to the user's device that includes wireless identity transmitter identification information, proximity broadcast receiver information, and associated data from the sighting message. For example, the message transmitted by the central server to the user's smartphone may include indicators of the obtained proximity broadcast receiver identification (e.g., serial code, group affiliation, merchant category, etc.). The central server may then continue with the operations in determination block 2102. In an embodiment, the central server may utilize an alert engine module, such as described above with reference to FIG. 20A, to transmit and/or generate messages for transmission to various devices.

Figure 22:
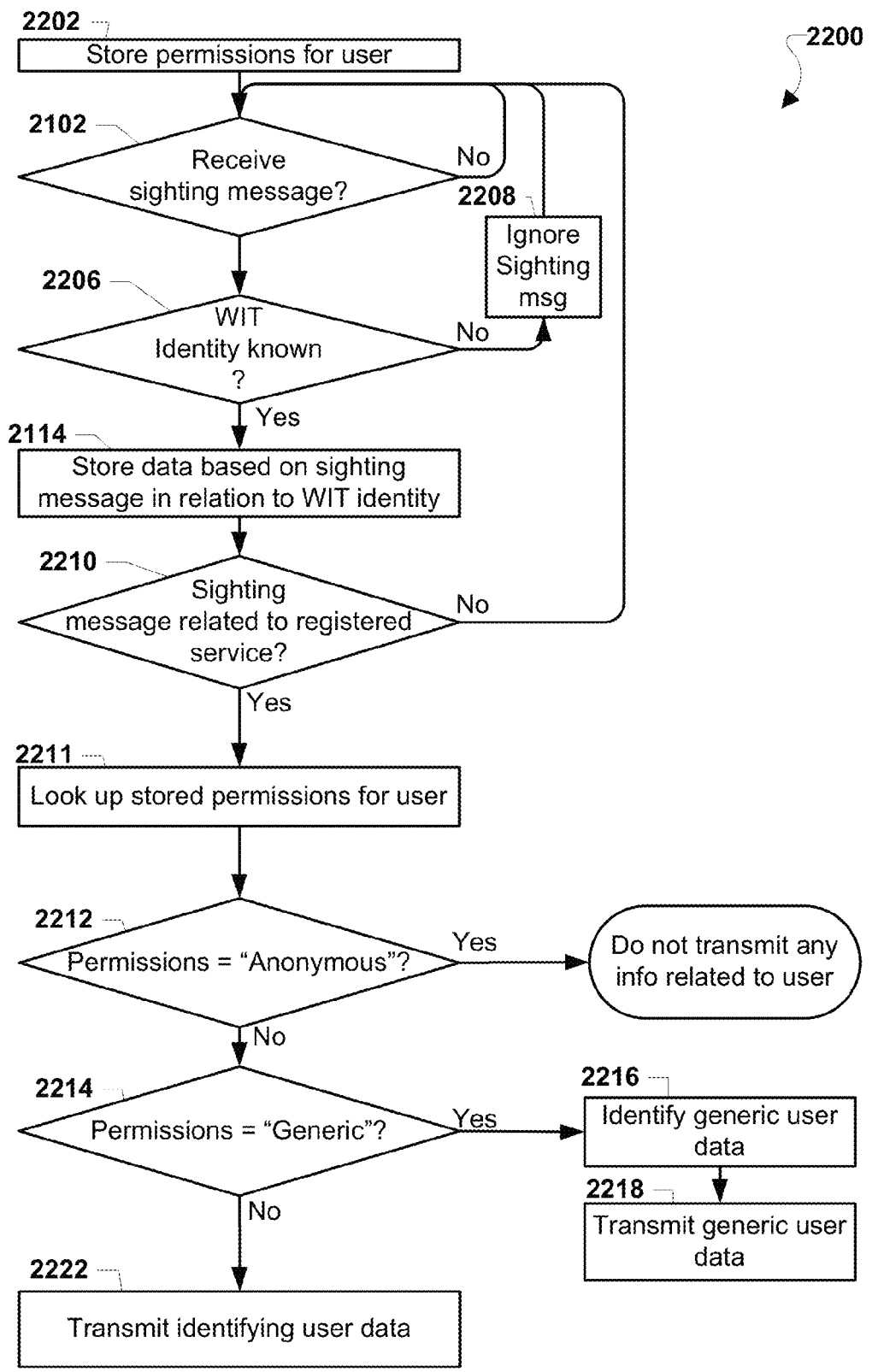
FIG. 22 is a process flow diagram illustrating an embodiment method for a central server to transmit user data based on stored permissions.

FIG. 22 illustrates an embodiment method 2200 for a central server to transmit user data based on stored permissions. The various embodiment systems of this disclosure may provide registered users with mechanisms for protecting their privacy, such that personal information of registered users may only be provided to third-parties with consent and for valid purposes. For example, a user may permit the photo of a missing child may be provided by a central server to mobile proximity broadcast receivers in order to expedite her rescue. Thus, the central server may store information (i.e., "permissions") that indicates whether users authorize to have their identity (and other personal information) provided to third-parties and/or third-party applications. Permissions may be set, provided, or otherwise indicated by users when they register a wireless identity transmitter, mobile proximity broadcast receiver, or other device (e.g., a smartphone) with the central server. For example, the central server may collect privacy rules, settings, preferences, and other data from users during registration procedures via a web portal.

For the purposes of this disclosure, permissions may have several values that indicate various privacy levels or authorizations regarding the disclosure of user identification information to third-parties. In an embodiment, the central server may store permissions for a user that allow no identifying information to be shared with third-parties (i.e., "anonymous" permissions value), permissions that allow only generic, indirect identification information of users to be shared (i.e., "generic" permissions value), and/or permissions that allow any information to be shared. For example, a user unwilling to receive any marketing information from merchants or provide any identification, location history, or behavior information to any third-parties may have permissions set to "anonymous." In an embodiment, the "anonymous" permissions value and the "generic" permissions value may be mutually exclusive. In other words, a user may authorize no information, only generic information, or any information to be provided to third-parties (e.g., merchants or apps on a mobile device). In an embodiment, generic information may include personal data that indicates demographic categories applicable to a particular user, such as the user's age, height, weight, race, marital status, and education.

In various embodiments, the central server may store different permissions values for various conditions and third-parties associated with a user. For example, the central server may store a permissions value that indicates a particular merchant registered service may not receive any personal data regarding a user (i.e., anonymous permissions value). However, the central server may store a different permissions value (i.e., generic permissions value) for the same user and a second merchant.

In block 2202, the central server may store permissions for a user. For example, during registration, the central server may receive a user's permission values that indicate no personal information should be transmitted by the central server to third-parties. In an embodiment, the central server may modify stored permissions based on subsequent updates received from users. For example, the central server may receive information via a website portal that indicates the user no longer wants his name to be shared with any registered services (e.g., retail stores).

In determination block 2102, the central server may determine whether a sighting message is received. If no sighting message is received (i.e., determination block 2102="No"), the central server may continue with the operations in determination block 2102. If a sighting message is received (i.e., determination block 2102="Yes"), in determination block 2206 the central server may determine whether the wireless identity transmitter identity is known. In other words, the central server may perform the operations in block 2104-2110 as described above with reference to FIG. 21A in order to evaluate, decode, decrypt, and otherwise access the data within the received sighting message to determine whether it includes a wireless identity transmitter identity (or identifier) that is registered with the central server. For example, the central server may compare identifiers within the sighting message to a database of all registered wireless identity transmitters to determine whether the wireless identity transmitter corresponding to the received sighting message is known. If the wireless identity transmitter is not known (i.e., determination block 2206="No"), in block 2208 the central server may ignore the sighting message and continue to perform the operations in determination block 2102.

If the wireless identity transmitter is known (i.e., determination block 2206="Yes"), in block 2114 the central server may store data based on the sighting message in relation to the wireless identity transmitter identity, such as storing location data within the sighting message in a database in relation to the user of the wireless identity transmitter. In determination block 2210, the central server may determine whether the received sighting message relates to a registered service. As described above, registered services may include known routines, actions, services managed by the central server, such as searches or alerts, applications that may be executing on a mobile device (e.g., a third-party app), and/or parties registered, known, or otherwise authenticated with the central server. For example, a registered service may correspond to a merchant third-party that has registered proximity broadcast receivers with the central server.

To make the determination, the central server may analyze the received sighting message and evaluate any metadata or header information that identifies the proximity broadcast receiver, the subject matter of the sighting message, or other descriptive information regarding the proximity broadcast receiver and/or the wireless identity transmitter that transmitted the broadcast message reported by the sighting message. For example, the sighting message may contain metadata that indicates the sighting message was sent by a proximity broadcast receiver in response to an active alert. Alternatively, the sighting message may contain header information that indicates relevance to a particular vendor facility or service. For example, the sighting message may contain metadata that indicates the proximity broadcast receiver is associated with a particular third-party application (e.g., a retail store app ID). The central server may compare information obtained from the sighting message to lists of registered services.

If the sighting message does not relate to a registered service (i.e., determination block 2210="No"), the central server may continue with the operations in determination block 2102. If the sighting message does relate to a registered service (i.e., determination block 2210="Yes"), in block 2211 the central server may look up stored permissions for the user, such as the user associated with the known wireless identity transmitter. In another embodiment, the user may be associated with the proximity broadcast receiver that transmitted the sighting message. For example, the wireless identity transmitter may be associated with a third-party and the sighting message may have been relayed to the central server by the user's mobile proximity broadcast receiver. The stored permissions may be permissions set by the user for a particular registered service or for any/all registered services.

In determination block 2212 the central server may determine whether the user's permissions indicate an "anonymous" value. In other words, the central server may determine whether the user set permissions values that permit information to be shared with registered services, such as third-party merchants or third-party apps executing on the user's mobile device. If the permissions indicate an "anonymous" value (i.e., determination block 2212="Yes"), the central server may not transmit any information related to the user, as the user has not authorized any user data to be shared.

In an embodiment, even with an anonymous permissions value, the central server may still transmit messages to registered services that indicate proximity of an anonymous wireless identity transmitter. For example, the central server may transmit a message to a user's mobile device that may indicate to a third-party app that an unidentified wireless identity transmitter came within proximity of an associated proximity broadcast receiver. Such messages may provide circumstantial information, such as an approximate time at which the sighting message was received by the central server. In another embodiment, such messages with no user information may be used by registered services to estimate foot traffic through particular areas, such as retail stores.

If the permissions do not indicate an "anonymous" value (i.e., determination block 2212="No"), in determination block 2214 the central server may determine whether the permissions indicate a "generic" value. In an embodiment, the "generic" value may indicate that the user does not desire to be identified directly, but may authorize the central server to provide registered services (e.g., merchants) with general information about the user. For example, generic information may include the sex or age of the user. If the permissions indicate a "generic" value (i.e., determination block 2214="Yes"), in block 2216, the central server may identify generic user data. In particular, generic user data may include the user's age, height, weight, race, marital status, education, and other general attributes that do not directly indicate the user's identity. In an embodiment, generic data may include any data stored by the central server that does not directly indicate the user's name, unique identifier, profile identifiers, financial account information (e.g., credit card numbers, etc.), and/or specific affiliations. For example, generic data may not include the user's employer or checking account bank. In various embodiments, generic user data may include behaviors within the retail store, such as number of visits recorded by the central server, travel paths throughout departments, dwell time, and purchase convergence information. In an embodiment, the generic user data may include data stored with the operations in block 2114, such as location information and/or sensor data. In block 2218, the central server may transmit the generic user data, such as a message to a third-party registered service or a message for use by an application executing on a mobile proximity broadcast receiver.

If the permissions do not indicate a "generic" value (i.e., determination block 2214="No"), in block 2222 the central server may transmit identifying user data, such as by transmitting a return message to the proximity broadcast receiver that includes the user's personal information (e.g., name, address, etc.). In other words, based on stored permissions, the user may have authorized the central server to provide identifying data, such as the user's name or ID, to registered services by default. For example, the user may desire to have marketing information, such as coupons, that directly address the user. In an embodiment, the central server may transmit the user's name, financial information, employer name, mailing address, email address, phone number, and any other data that the central server may store. In an embodiment, the identifying user data may also include any generic user data as described above.

Other use cases may include dynamic privacy permissions or settings. Various embodiments may allow the public to view, track, or see the location of a wireless identity transmitter. Users may associate their wireless identity transmitter with personal websites or with profiles on Facebook® or other social networks. These profiles may be made public allowing friends or other limited groups specified by the user to follow the location of the wireless identity transmitter. In further embodiments, if a search is initiated for the wireless identity transmitter, the central server may configure a user's linked profile and/or user permissions to indicate a private or hidden mode. For example, if parents are actively searching for a child's wireless identity transmitter, they may not want the public following along.

In an embodiment, the central server may periodically transmit messages to users prompting for permissions to transmit particular personal information to third-parties based on received sighting messages. For example, a user walking into a retail store department may receive a message from the central server asking the user if it is acceptable to provide that department personnel with a notice of the user's name and shopping habits.

Figure 23:
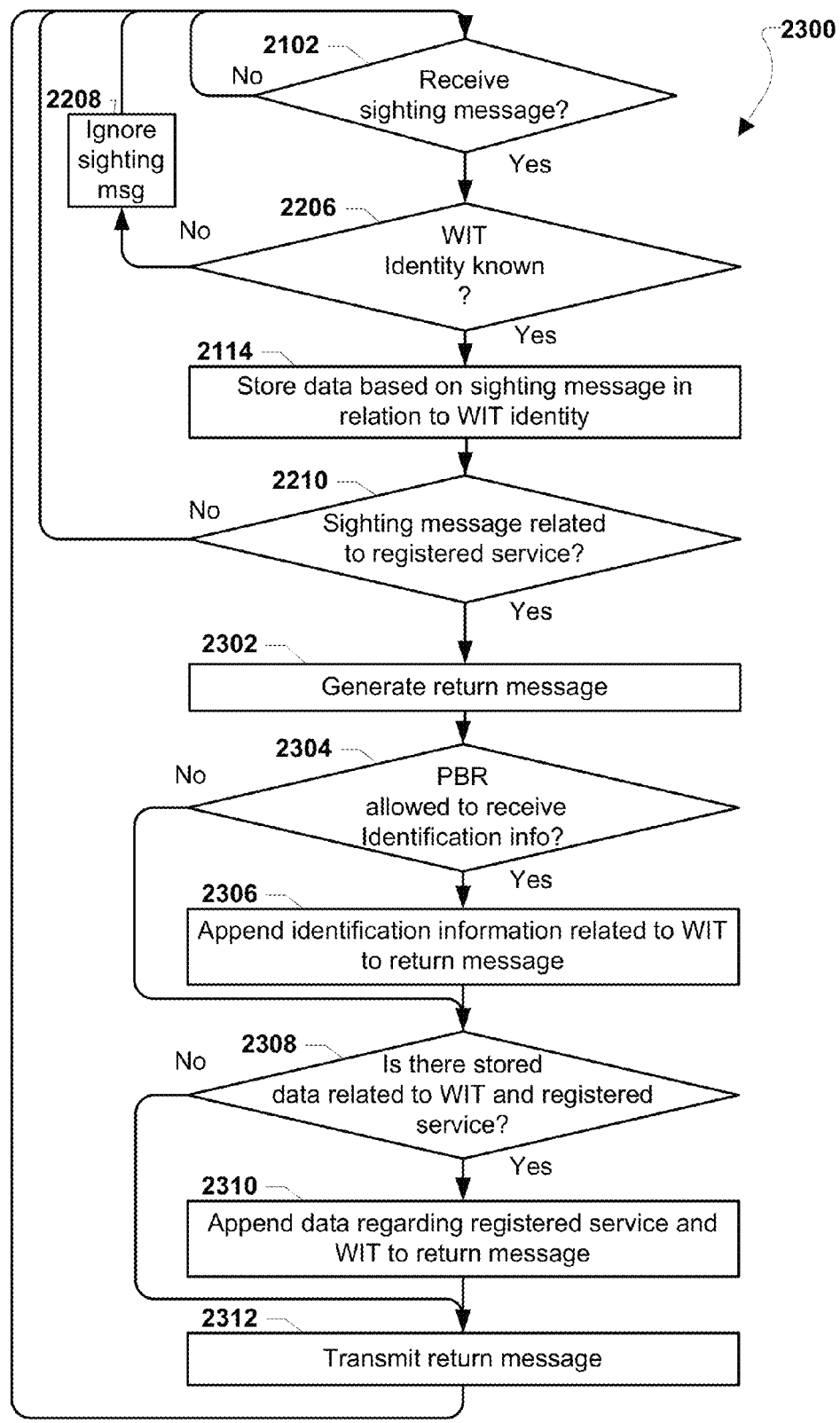
FIG. 23 is a process flow diagram illustrating an embodiment method for a central server receiving sighting messages from a proximity broadcast receiver.

FIG. 23 illustrates an embodiment method 2300 for a central server to process sighting messages received from a proximity broadcast receiver. In general, based on the information within sighting messages, the central server may identify a wireless identity transmitter (and related user), determine whether there is a relationship between the proximity broadcast receiver and the wireless identity transmitter (i.e., related to a registered service), and transmit return messages with various data and/or information based on the sighting messages. In this manner, return messages may be provided to proximity broadcast receivers such that no identifying information about the wireless identity transmitter is included. This may enable the proximity broadcast receiver to anonymously personalize equipment, devices, or other facilities, as described above, to benefit the user of the wireless identity transmitter without disclosing his/her identity. For example, a return message from the central server may include a user's configuration data for a piece of equipment but not the user's identity. In an embodiment, the method 2300 may be performed by the central server in connection with the proximity broadcast receiver performing the operations of the method 1100 as described above with reference to FIG. 11. In various embodiments, such return messages may be transmitted to any devices related to received sighting messages and/or the related wireless identity transmitter, such as third-parties (e.g., emergency services, retailers, etc.) or user devices associated with the sighting message.

In determination block 2102, the central server may determine whether a sighting message is received. If no sighting message is received (i.e., determination block 2102="No"), the central server may continue with the operations in determination block 2102. If a sighting message is received (i.e., determination block 2102="Yes"), in determination block 2206 the central server may determine whether the wireless identity transmitter identity is known. In other words, the central server may perform the operations in block 2104-2110 as described above with reference to FIG. 21A in order to evaluate, decode, decrypt, and otherwise access the data within the received sighting message to determine whether it includes a wireless identity transmitter identity (or identifier) that is registered with the central server. If the wireless identity transmitter is not known (i.e., determination block 2206="No"), in block 2208 the central server may ignore the sighting message and continue to perform the operations in determination block 2102.

If the wireless identity transmitter is known (i.e., determination block 2206="Yes"), in block 2114 the central server may store data based on the sighting message in relation to the wireless identity transmitter identity, such as storing location data within the sighting message in a database in relation to the user of the wireless identity transmitter. In determination block 2210, the central server may determine whether the received sighting message relates to a registered service. If the sighting message does not relate to a registered service (i.e., determination block 2210="No"), the central server may continue with the operations in determination block 2102.

If the sighting message does relate to a registered service, such as a valid vendor service or an active alert (i.e., determination block 2210="Yes"), in block 2302 the central server may generate a return message. The return message may include information that indicates the sighting message, the proximity broadcast receiver, related services, time of receipt of the sighting message, and other informational data. In determination block 2304, the central server may determine whether the proximity broadcast receiver is allowed to receive identification info. In other words, the central server may determine whether the proximity broadcast receiver has permission or is authorized to receive identification information of the wireless identity transmitter. For example, based on metadata within the sighting message indicating that the proximity broadcast receiver is associated with a vendor or a registered service, the central server may determine that the identification of the wireless identity transmitter (or its user) may not be included within the return message. In an embodiment, the central server may evaluate a stored database that describes information permissions based on the identity of the proximity broadcast receiver and its associated services. For example, the database may indicate that the proximity broadcast receiver is associated with a service that is allowed to receive identification information about the wireless identity transmitter. In another embodiment, the central server may perform the operations similar to the operations in blocks 2211-2216 described above with reference to FIG. 22 to determine whether user data may be transmitted. For example, using user identification information obtained based on the sighting message, the central server may look-up user permissions to identify whether the user authorized user data to be shared with registered services.

If the proximity broadcast receiver is allowed to receive identification information (i.e., determination block 2304="Yes"), in block 2306 the central server may append identification information to the return message. For example, the return message may include the username, customer ID, address and/or name of the user of the wireless identity transmitter. If the proximity broadcast receiver is not allowed to receive identification information (i.e., determination block 2304="No") or if the central server appended identification information to the return message in block 2306, the central server may determine whether there is stored data related to the wireless identity transmitter and the registered service in determination block 2308. The central server may evaluate a database and identify whether the proximity broadcast receiver, its associated devices or services (e.g., a local server), and/or the wireless identity transmitter require data based on the sighting message. Examples of such data may include firmware, software instructions, configuration information, proprietary information (e.g., customer ID), activity information (e.g., information describing recent wireless identity transmitter activities related to the proximity broadcast receiver), or any other relevant information. The central server may query the database using the wireless identity transmitter identification information in combination with the proximity broadcast receiver identification information to detect data within the database that may be included in the return message. For example, the return message may contain personalization information for the user of the wireless identity transmitter to be used by the proximity broadcast receiver. In an embodiment, the database may indicate that the proximity broadcast receiver is associated with a service (e.g., vendor, merchant, etc.) that stores proprietary data within the central server database.

If there is stored data related to the wireless identity transmitter and the registered service (i.e., determination block 2308="Yes"), in block 2310 the central server may append the data regarding registered service and the wireless identity transmitter to the return message. If there is no stored data related to the wireless identity transmitter and the registered service (i.e., determination block 2308="No"), or if data is already appended, in block 2312 the central server may transmit the return message, such as to the proximity broadcast receiver. The central server may then continue to perform the operations in determination block 2102.

Figure 24:
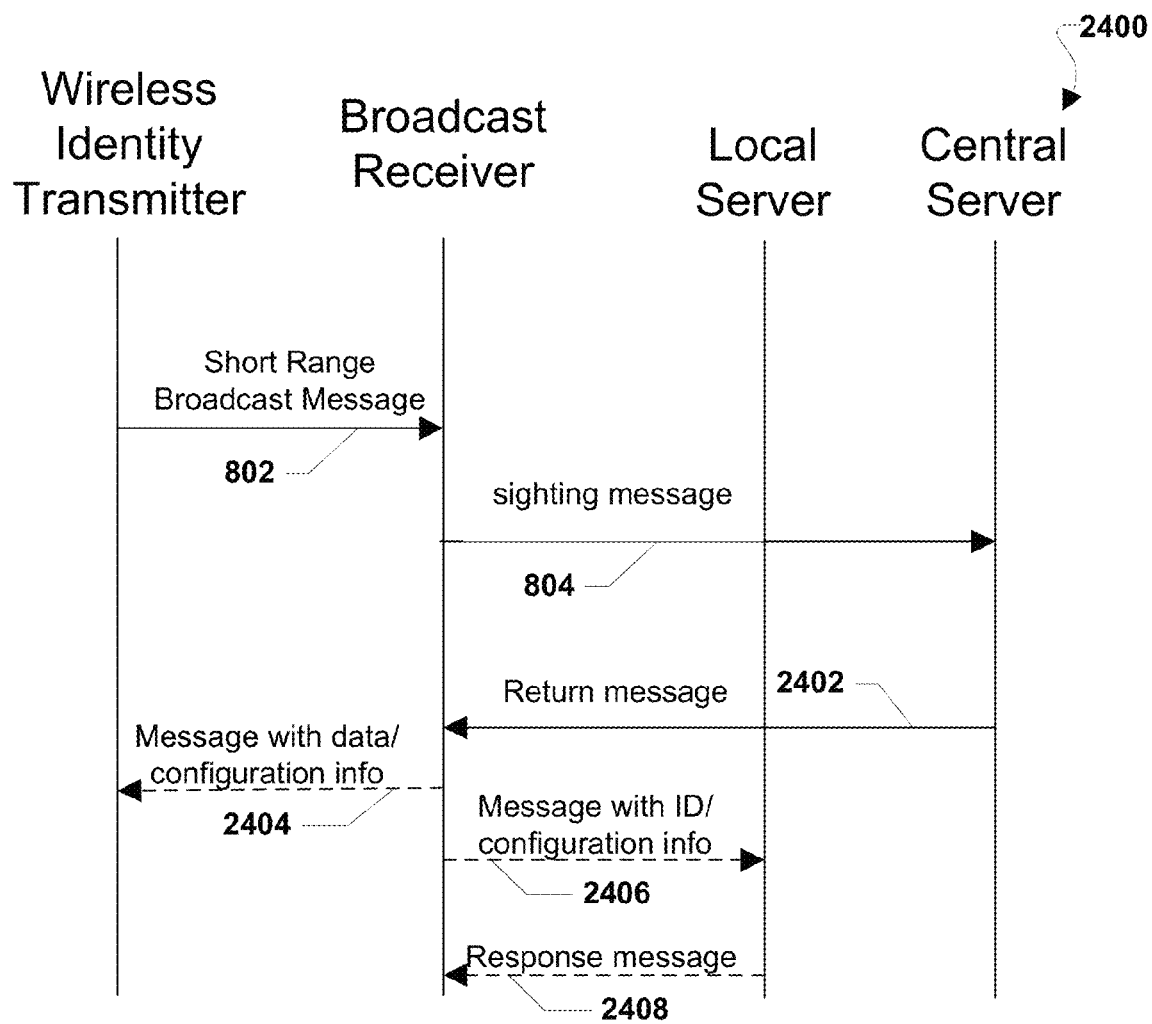
FIG. 24 is a call flow diagram illustrating communications between a wireless identity transmitter, a proximity broadcast receiver, and a central server in accordance with various embodiments.

FIG. 24 illustrates an embodiment call flow diagram 2400 illustrating communications between a wireless identity transmitter, a proximity broadcast receiver, and a central server. As described above, the wireless identity transmitter may periodically transmit a short-range broadcast message 802 via a short-range radio. When within signal range of the broadcast message 802, the proximity broadcast receiver may receive the broadcast message 802 using a similar short-range radio. The broadcast message 802 may be processed by the proximity broadcast receiver and related data may be relayed to the central server as a sighting message 804. In an embodiment, the sighting message 804 may include the broadcast message, identification information of the proximity broadcast receiver and/or the wireless identity transmitter, encrypted information the proximity broadcast receiver is incapable of decoding, and other information related to the reception of the broadcast message 802. In an embodiment, the sighting message 804 may be transmitted over various wireless or wired networks that may be configured to communicate via Internet protocols.

The central server may receive and process the sighting message 804. When the central server determines that the sighting message 804 requires a response based on the information in the sighting messages (e.g., metadata requesting a response, the sighting message relates to a wireless identity transmitter that needs to receive upgraded firmware, etc.), the central server may generate and transmit a return message 2402 to the proximity broadcast receiver. In various embodiments, the return message 2402 may contain configuration information, identification information describing the wireless identity transmitter, or other data as described above. The proximity broadcast receiver may receive and process the return message 2402. Based on the data within the return message 2402, the proximity broadcast receiver may optionally transmit a message 2404 to the wireless identity transmitter that may contain configuration information and other data from the central server. The wireless identity transmitter may selectively accept transmissions such as the message 2404 using operations as described above with reference to FIG. 4.

As another option, the proximity broadcast receiver may transmit a message 2406 to a local server based on the return message 2402. The message 2406 may contain wireless identity transmitter identification information, configuration information, software routines, and various other data from the return message 2402 for storage, processing, and otherwise additional use by the local server. Based on the message 2406, the local server may in turn transmit an optional response message 2408 to the proximity broadcast receiver that may include software instructions, configuration data, or other data generated in response to receiving the message 2406.

In an embodiment, the central server may also transmit messages directly to the local server (not shown) that include configuration information and other data. For example, the sighting message 804 from the proximity broadcast receiver may provide the contact information for the local server which the central server may utilize for subsequent communications.

Figure 25:
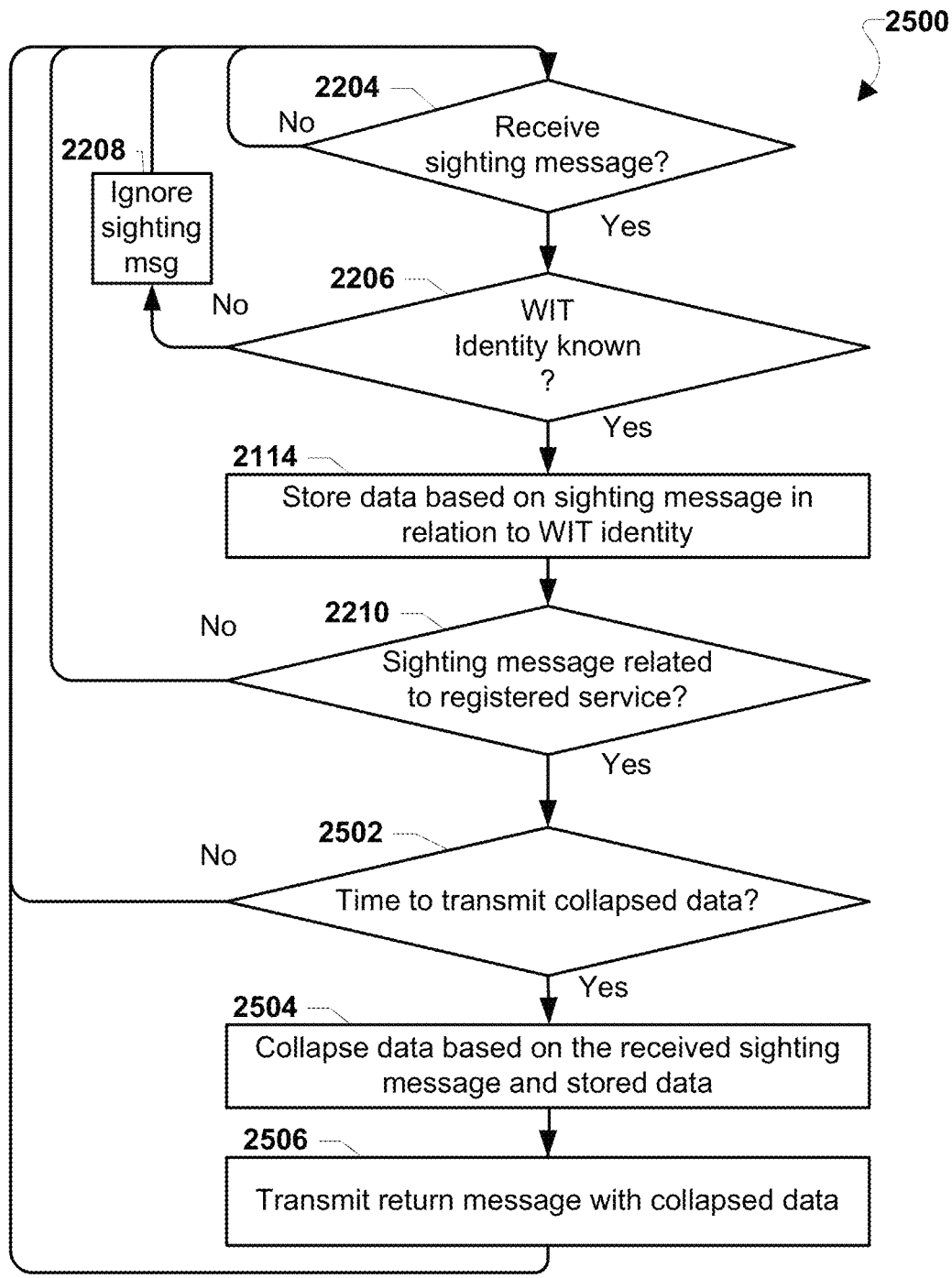
FIG. 25 is a process flow diagram illustrating an embodiment method for a central server to collapse data for transmission.

FIG. 25 illustrates an embodiment method 2500 for a central server collapsing data for transmission. As described above, proximity broadcast receivers may report all broadcast messages received from proximate wireless identity transmitters. For example, when a particular wireless identity transmitter is left beside a proximity broadcast receiver, the proximity broadcast receiver may transmit a sighting message for every broadcast message transmitted by the wireless identity transmitter, regardless of whether the wireless identity transmitter is moved. Although the central server may be configured to process such redundant messages, registered services may be overwhelmed if messages are sent for every broadcast message. For example, a merchant that has registered with the central server to receive notifications related to wireless identity transmitter users within a retail store may not desire to have countless notifications that all report the same information. Instead, registered services may benefit from compiled, averaged, or summarized data (i.e., "collapsed" data) that reports information over a period.

Thus, the central server may be configured to transmit messages with collapsed data that represents information from a plurality of sighting messages received over a period. Such a period may be defined by a duration of time, such a few seconds, minutes, or hours, or alternatively may be defined by a certain number of received sighting messages. In another embodiment, the period may be defined by events or conditions defined within sighting messages. For example, based on location information provided in sighting messages over a period of time, the central server may determine that a particular wireless identity is no longer within proximity of a particular proximity broadcast receiver (i.e., the wireless identity transmitter is not dwelling within a geofence, but has exited the geofence).

In determination block 2102, the central server may determine whether a sighting message is received. If no sighting message is received (i.e., determination block 2102="No"), the central server may continue with the operations in determination block 2102. If a sighting message is received (i.e., determination block 2102="Yes"), in determination block 2206 the central server may determine whether the wireless identity transmitter identity is known. In other words, the central server may perform the operations in block 2104-2110 as described above with reference to FIG. 21A in order to evaluate, decode, decrypt, and otherwise access the data within the received sighting message to determine whether it includes a wireless identity transmitter identity (or identifier) that is registered with the central server. If the wireless identity transmitter is not known (i.e., determination block 2206="No"), in block 2208 the central server may ignore the sighting message and continue to perform the operations in determination block 2102.

If the wireless identity transmitter is known (i.e., determination block 2206="Yes"), in block 2114 the central server may store data based on the sighting message in relation to the wireless identity transmitter identity, such as storing location data within the sighting message in a database in relation to the user of the wireless identity transmitter. In determination block 2210, the central server may determine whether the received sighting message relates to a registered service. If the sighting message does not relate to a registered service (i.e., determination block 2210="No"), the central server may continue with the operations in determination block 2102.

If the sighting message does relate to a registered service, such as a valid vendor service or an active alert (i.e., determination block 2210="Yes"), in determination block 2502 the central server may determine whether it is time to transmit collapsed data, such as within a return message to the proximity broadcast receiver that sent the sighting message. As described above, the central server may determine whether to transmit collapsed data based on the expiration of a predefined time period, the receipt of a predefined number of sighting messages, or a recognized change of the status of a wireless identity transmitter (e.g., user has taken the wireless identity transmitter away from a proximity broadcast receiver, the wireless identity transmitter has been moved within proximity of the proximity broadcast receiver, etc.). If it is not time to transmit collapsed data (i.e., determination block 2502="No"), the central server may continue with the operations in determination block 2204.

However, if it is time to transmit collapsed data (i.e., determination block 2502="Yes"), in block 2504 the central server may collapse data based on the received sighting messages and stored data. In particular, the central server may generate average or summarized data of the wireless identity transmitter's location and behavior since the last collapsed data was transmitted. In an embodiment, the collapsed data may include summarized sensor data (e.g., the average temperature since the last collapsed data was transmitted). In another embodiment, collapsed data may include data regarding the user of the wireless identity transmitter, such as purchase history and preferences (e.g., food, shopping, etc.). In block 2506, the central server may transmit the return message with the collapsed data. The return message may be transmitted to the proximity broadcast receiver that transmitted the sighting message, or alternatively to a computing device associated with registered service. For example, a merchant registered to receive consumer foot traffic information may receive a return message with collapsed data indicating a consumer's summarized location within a retail store over a period.

Figure 26:
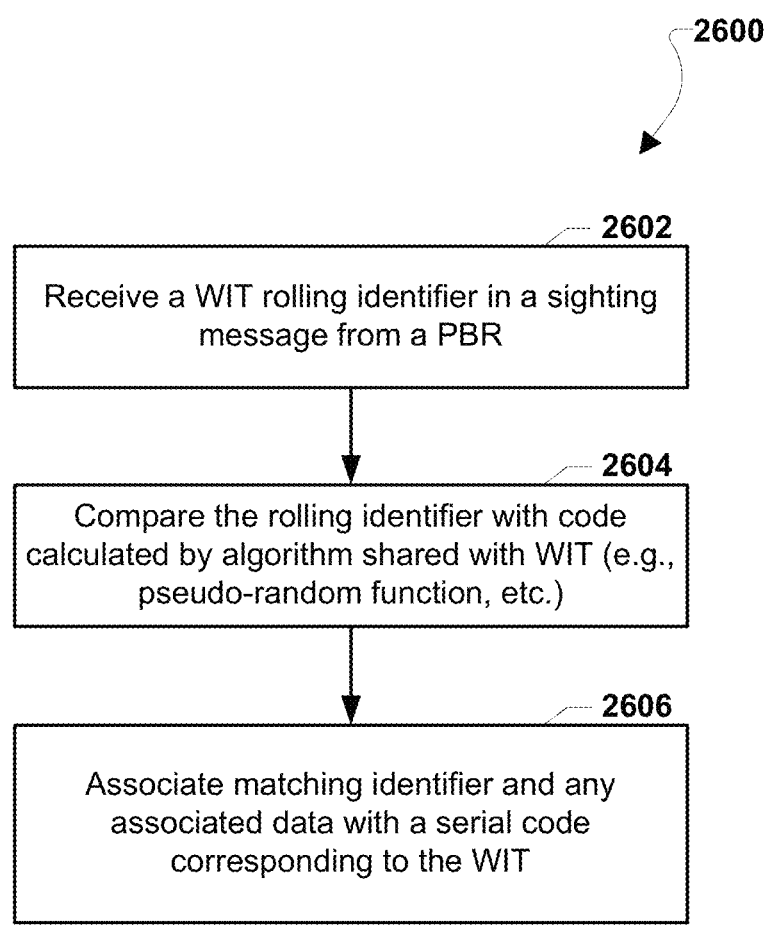
FIG. 26 is a process flow diagram illustrating an embodiment method for a server handling a rolling identifier.

FIG. 26 illustrates an embodiment method 2600 that may be implemented within a central server. The method 2600 may be performed by the central server in response to receiving a sighting message from a proximity broadcast receiver that includes encoded, rolling, or otherwise protected data originally broadcast by a wireless identity transmitter. Privacy of users of wireless identity transmitters may be protected by using a rolling or randomly varying identifier for each wireless identity transmitter so the identifier changes with time. New identifiers may be generated periodically or based on certain events, such when a wireless identity transmitter broadcasts an identifier a certain number of times or for a certain time period (e.g., an hour). This rolling of identifiers may be coordinated with the central server so that the wireless identity transmitter may still be tracked. For example, the wireless identity transmitter and the central server may each have a cryptographically secure pseudo-random number generator algorithm that is used to generate identifiers on a common time scale so that any given moment, the central server can calculate the identifier being transmitted by a particular wireless identity transmitter.

Generating rolling identifiers, or other methods of obfuscating identifiers, is important in that it may prevent sniffing attacks from a third party. For example, if the identifier was static, a third party could sniff the identifier, such as by impersonating a proximity broadcast receiver, and then use the identifier to track the wireless identity transmitter. A rolling identifier may hinder such an attack impossible if the third party lacks the pseudo-random number generator or other means of generating the latest rolling identifiers.

In block 2602, the central server may receive a wireless identity transmitter's rolling identifier in a sighting message from a proximity broadcast receiver. In block 2604, the central server may compare the rolling identifier with code calculated by a pseudo-random number generator. The random number generator may be software instructions, routines, algorithms, circuitry, or modules that are utilized by the central server to calculate codes that are expected to align with rolling identifiers generated and broadcast by the wireless identity transmitter over a period. In various embodiments, the central server may compare the received identifier with the next several codes in case some identifiers were missed. If the received identifier matches any of the expected codes, in block 2606 the central server may associate the matching identifier and any associated data with a serial code corresponding to the wireless identity transmitter. This way, if the central server later receives a user request with the wireless identity transmitter's serial code, such as a request from a parent to locate the wireless identity transmitter carried by a child, then the central server can find all the prior matches and any associated data without having to search for every previous rolling identifier.

In an embodiment, when initiating a search for a target wireless identity transmitter, the central server may use the shared algorithm and information (e.g., key) to generate a target device ID that is transmitted in an alert message. In this embodiment, alert messages may be retransmitted with an updated target device ID whenever the target wireless identity transmitter is scheduled to roll its identifier.

Figure 27:
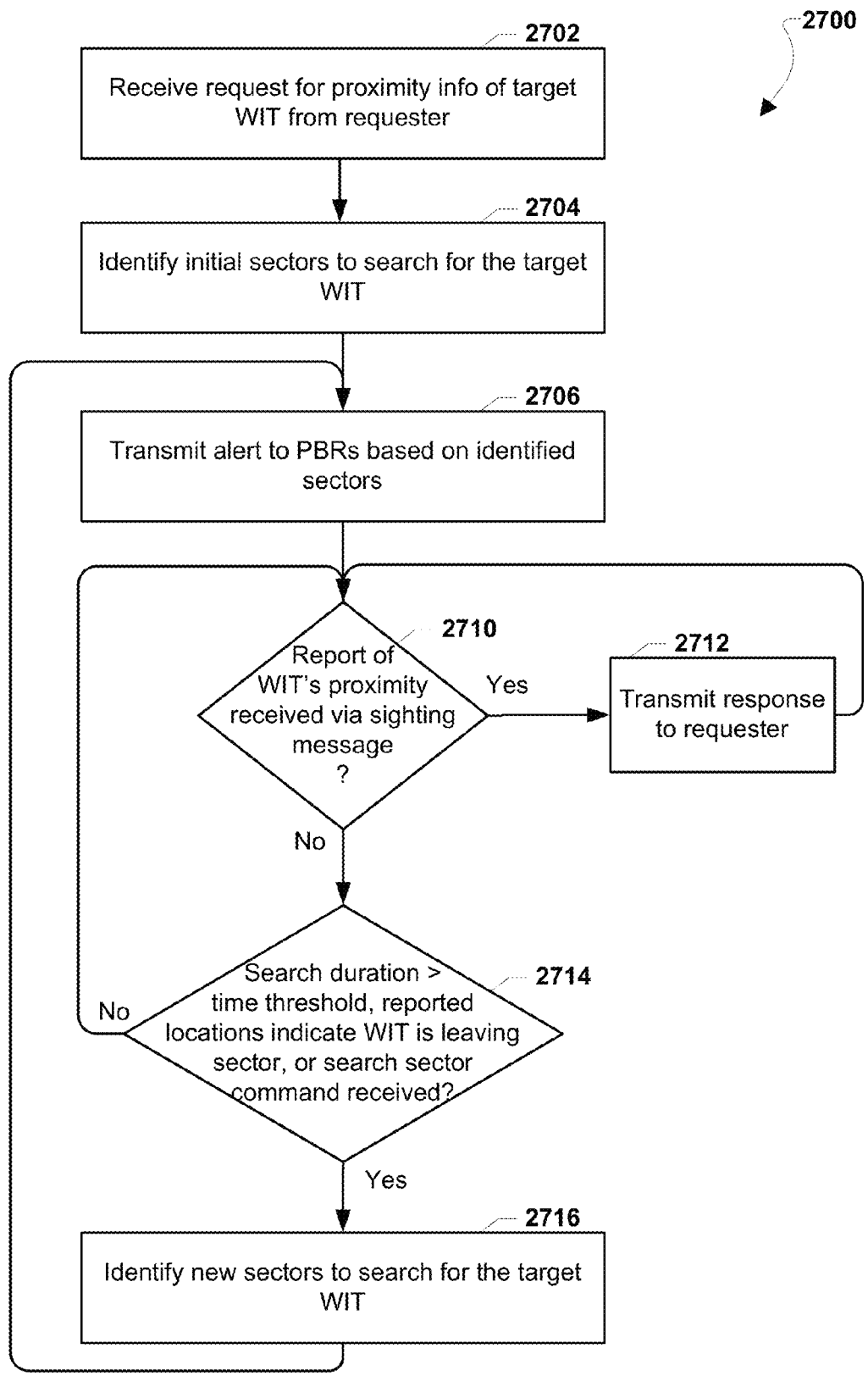
FIG. 27 is a process flow diagram illustrating an embodiment method for sending alerts to mobile proximity broadcast receivers in identified sectors in response to a user request for a wireless identity transmitter's location.

FIG. 27 illustrates an embodiment method 2700 for a central server activating a search by sending activation messages to proximity broadcast receivers in particular sectors. In block 2702, the central server may receive a request, such as a user request described above, for proximity information of a particular wireless identity transmitter (i.e., the target wireless identity transmitter). In other words, the requester may want to locate the target wireless identity transmitter. The central server may identify one or more initial sectors to search for the target wireless identity transmitter in block 2704. The initial sectors may be identified in various ways. For example, the request may include a location (e.g., the last known location of the target wireless identity transmitter) and the central server may identify the sectors around the location. Alternatively, the target wireless identity transmitter may have sectors associated with it based on prior tracking attempts or data (e.g., GPS coordinates, Cell ID) received from proximity broadcast receivers based on prior sightings.

The central server may transmit an alert to proximity broadcast receivers based on the identified sectors in block 2706. For example, the central server may transmit the alert to proximity broadcast receivers that are currently located in the identified sectors, that frequently travel in the sectors (e.g., mobile proximity broadcast receivers known to go into the sectors), that are near or have ever previously been near the sectors, and/or that are predicted to be in the sectors in the future. In various embodiments, the alert may indicate that the central server has initiated or activated a search. In alternate embodiments, the alert message may be available on a separate server or other network location and the proximity broadcast receivers may periodically query a URL where the alert may be maintained. For example, cellular phones often periodically check in for a variety of data, such as clock and other network settings, so proximity broadcast receivers may be configured to also check for alerts the same way or on the same connection used for these other data checks. In an embodiment, the central server may transmit such alert messages such that the recipient proximity broadcast receivers may not be able to identify the target wireless identity transmitter. For example, the alert message may include an encoded, encrypted, or otherwise obscured identifier for the target wireless identity transmitter that only the central server can access, thus keeping the search anonymous to all proximity broadcast receivers and other devices, except for the requester. In another embodiment, the operations in block 2706 may be optional when mobile proximity broadcast receivers are configured to automatically relay broadcast messages received from the target wireless identity transmitter, regardless of whether the mobile proximity broadcast receivers have received any alert or search activation message. For example, mobile proximity broadcast receivers may transmit sighting messages to the central server that include any broadcast messages received from wireless identity transmitters within proximity.

Upon transmitting the alert, in determination block 2710 the central server may determine whether a report of the target wireless identity transmitter's proximity is received via a sighting message. In other words, the central server may stand by to receive sighting messages that indicate the target or searched for wireless identity transmitter has been within proximity of a proximity broadcast receiver and thus has been located. The central server may decode, decrypt, or otherwise access a rolling identifier within the received sighting message and determine whether it matches the identity of the target wireless identity transmitter. If a report of the target wireless identity transmitter proximity is received (i.e., determination block 2710="Yes"), then the central server may transmit a response to the requester with any data received from proximity broadcast receiver(s) in block 2712. The process of standing by and receiving sighting messages (or other location reports) from proximity broadcast receiver(s) in determination block 2710 and transmitting responses to one or more requesters in block 2712 may continue so long as the alert remains in effect (e.g., until the child is found and the alert is cancelled by the requesting authority), or until the central server stops receiving proximity reports of the target wireless identity transmitter (i.e., determination block 2710=No).

In determination block 2714 and block 2716 the central server may be configured to adjust the search sector to expand the search area, shift the search area from sector to sector to follow a moving target wireless identity transmitter, and respond to commands to move, expand or focus the search received from the requester or an authority. In this manner the central server can actively adjust the search sectors by notifying proximity broadcast receivers in order to increase the likelihood that a device may be located and tracked. In determination block 2714, the central server may determine whether the search duration exceeds a time threshold, whether there are reported locations indicating the target wireless identity transmitter is leaving the sector, or whether a search sector command is received. So long as the search duration or duration since a last report is less than the predetermined time threshold, the target wireless identity transmitter does not move out of the search sector and/or the central server is not commanded to adjust the search area (i.e., determination block 2714=No), the central server may continue standing by for and receiving proximity reports via sighting messages in determination block 2710.

In an embodiment, if the central server fails to receive or stops receiving proximity reports via sighting messages regarding the target wireless identity transmitter (i.e., determination block 2710=No), the central server may determine whether the time since the search began or the last received report exceeds a predetermined threshold in determination block 2714. This predetermined threshold may be set by the requester or an authority at the time the search was activated, such as depending upon a suspected mode of transportation. For example, the search may be activated in a sector surrounding a last known location of a child, but be configured to expand within 15 minutes if the abductor is suspected to be traveling on foot or expand within five minutes if the abductor is suspected to be traveling by car. In this manner, the central server may expand the search area automatically. If the central server determines that the preset duration since the search was initiated or a last location report was received has expired (i.e., determination block 2714=Yes), the central server may identify new sectors to search for the target wireless identity transmitter in block 2716, and a new alert within the new sectors may be transmitted or otherwise made available to proximity broadcast receivers in block 2706. In this manner, a search may expand to encompass a larger area to accommodate a potentially moving abductor.

In another embodiment, a search may be expanded based on movement of the target wireless identity transmitter. For example, in an ongoing search, the central server may have received sighting messages from one or more proximity broadcast receivers. Based on the times and locations in these messages, the central server may assume that the target wireless identity transmitter is moving in a particular direction, such as down a highway and add sectors in the direction of travel to anticipate the target wireless identity transmitter's future location. Thus, in determination block 2714 the central server may determine when received reported locations (or proximities) indicate the target wireless identity transmitter is leaving the sector. This may be accomplished by comparing a sequence of locations or proximities received in determination block 2710 to a digital map to estimate a direction and speed of travel. When the central server determines that location or proximity reports have ceased being received and the target wireless identity transmitter was moving out of the current search sector (i.e., determination block 2714=Yes), the central server may identify new sectors to search in block 2716, and a new alert with the new sectors may be transmitted or otherwise made available to proximity broadcast receivers in block 2706. In block 2716 the identified new sector(s) may be the sector or sectors along the direction of motion estimated by the central server. In this manner, a search may be shifted from sector to sector in sequence in order to track a moving wireless identity transmitter.

In another embodiment, the central server may be configured to receive commands to expand, shift or focus the search area, which may be received in determination block 2714. When the central server receives a command to expand the search (i.e., determination block 2714=Yes), the central server may identify new sectors to search for the target wireless identity transmitter in block 2716 consistent with the received command, and then a new alert with the new sectors may be transmitted or otherwise made available to proximity broadcast receivers in block 2706. In this manner, a requestor or search authority may adjust the search dynamically via the central server such as to investigate tips and eye witness reports.

Alternatively, a search may be expanded gradually. The central server may identify one or just a few sectors initially, and if the target wireless identity transmitter is not located, the central server may identify additional sectors to alert. For example, if a child goes missing after school, the alert may be sent to proximity broadcast receivers in the school's sector, then to devices in neighboring sectors, then to devices in the rest of town, and then even to devices in neighboring towns and beyond if necessary.

Searching by sectors may conserve network resources and allow more efficient responses. Cell phones users that have opted in as proximity broadcast receivers may not have to worry about unproductive searches in other cities or states, such as California phones searching for a wireless identity transmitter missing in Atlanta. A child in Atlanta missing after school for only a few hours could not have possibly made it across the country to California. However, as the search progresses and time passes, sectors may be added and the search scope expanded as appropriate.

Various embodiments may include one or more features to protect the privacy of each party involved. In various embodiments, the proximity broadcast receiver may not report to the proximity broadcast receiver's user anything about a search (e.g. a cell phone may not reveal to a user the identifier of a target wireless identity transmitter, the identity of the requester, whether a target wireless identity transmitter has been found, or even that a search is under way). In various embodiments, the personal information of any proximity broadcast receiver may be protected by excluding any such information from any data sent to the central server.

Figure 28A:
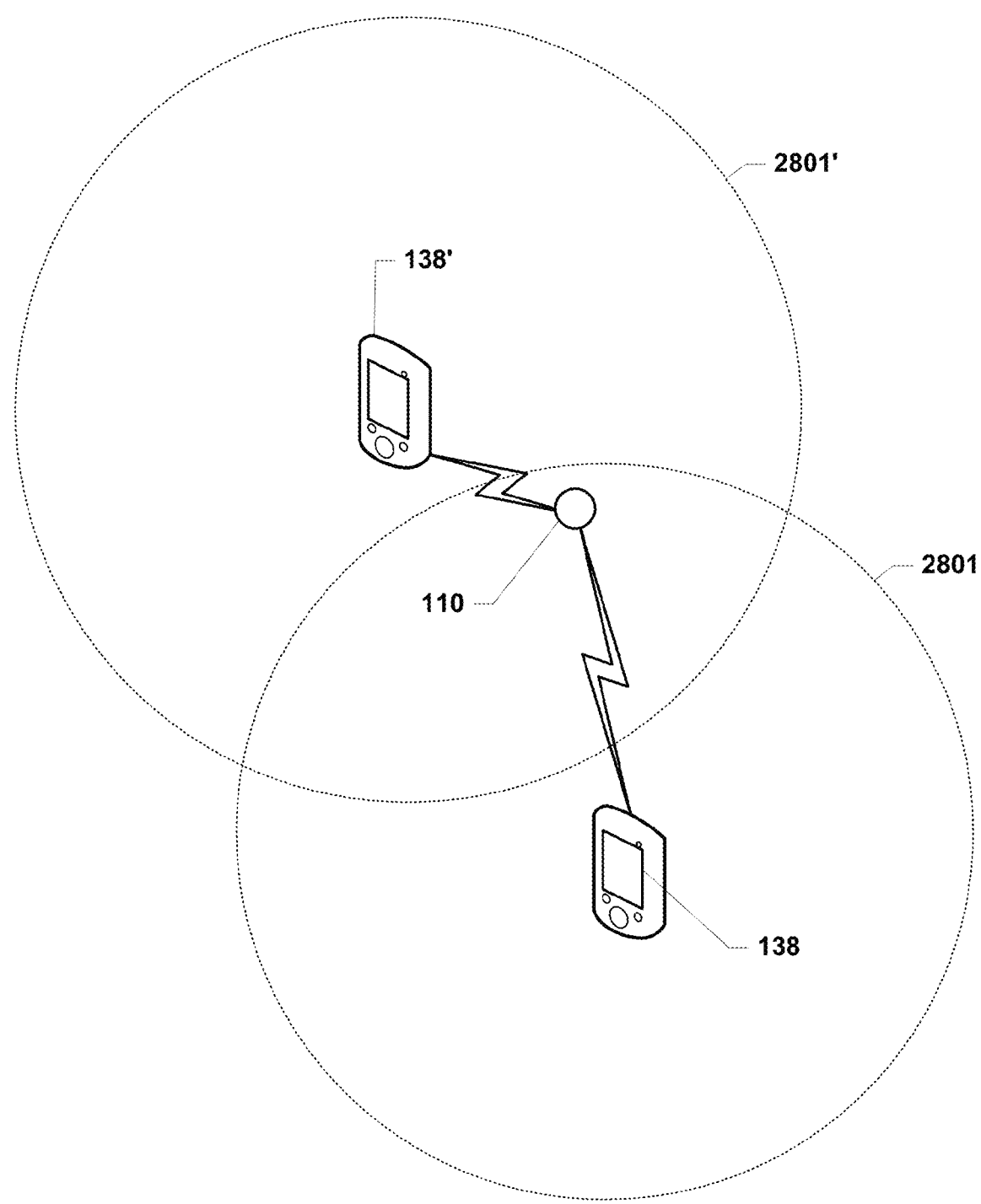
FIGS. 28A and 28C are communication system diagrams of mobile proximity broadcast receivers in communication with a wireless identity transmitter.

FIG. 28A illustrates two proximity broadcast receivers 138, 138' receiving short-range broadcast messages from a wireless identity transmitter 110. In various embodiments, the communication system may provide increased location or proximity granularity when multiple proximity broadcast receivers (e.g., mobile proximity broadcast receivers) are able to successfully communicate with a wireless identity transmitter. As previously discussed, since the wireless identity transmitter relies on a short-range radio to broadcast its identifier to proximity broadcast receivers, the location of a proximity broadcast receiver receiving such a short-range broadcast message provides an approximate location for the wireless identity transmitter (i.e., the proximity broadcast receiver and wireless identity transmitter are within proximity of each other when a broadcast message is received). However, if multiple proximity broadcast receivers receive the broadcast message from the wireless identity transmitter, the location of the wireless identity transmitter may be more precisely approximated.

In particular, two proximity broadcast receivers 138, 138' may receive broadcast messages from a wireless identity transmitter 110. Since the reception range of signals transmitted by wireless identity transmitters 110 is limited, proximity broadcast receivers 138, 138' may receive the broadcast messages only if the wireless identity transmitter 110 is within that reception range 2801, 2801'. Thus, if both proximity broadcast receivers 138, 138' receive the same broadcast message from the wireless identity transmitter 110, then the wireless identity transmitter 110 must be located in the overlapping region that is within the reception range 2801, 2801' of both of the two proximity broadcast receivers 138, 138'. Since the reception range 2801, 2801' will depend upon signal attenuators (e.g., structures and vegetation) along the transmission path and the sensitivity of proximity broadcast receivers 138, 138', this variability may be taken into account by a central server, such as by treating the reception range 2801, 2801' as a statistical parameter (e.g., average range with standard deviations, which may be determined through field testing). In such an embodiment, the central server may assign probabilities to different overlapping region sizes, which may help searchers focus initial search efforts.

Figure 28B:
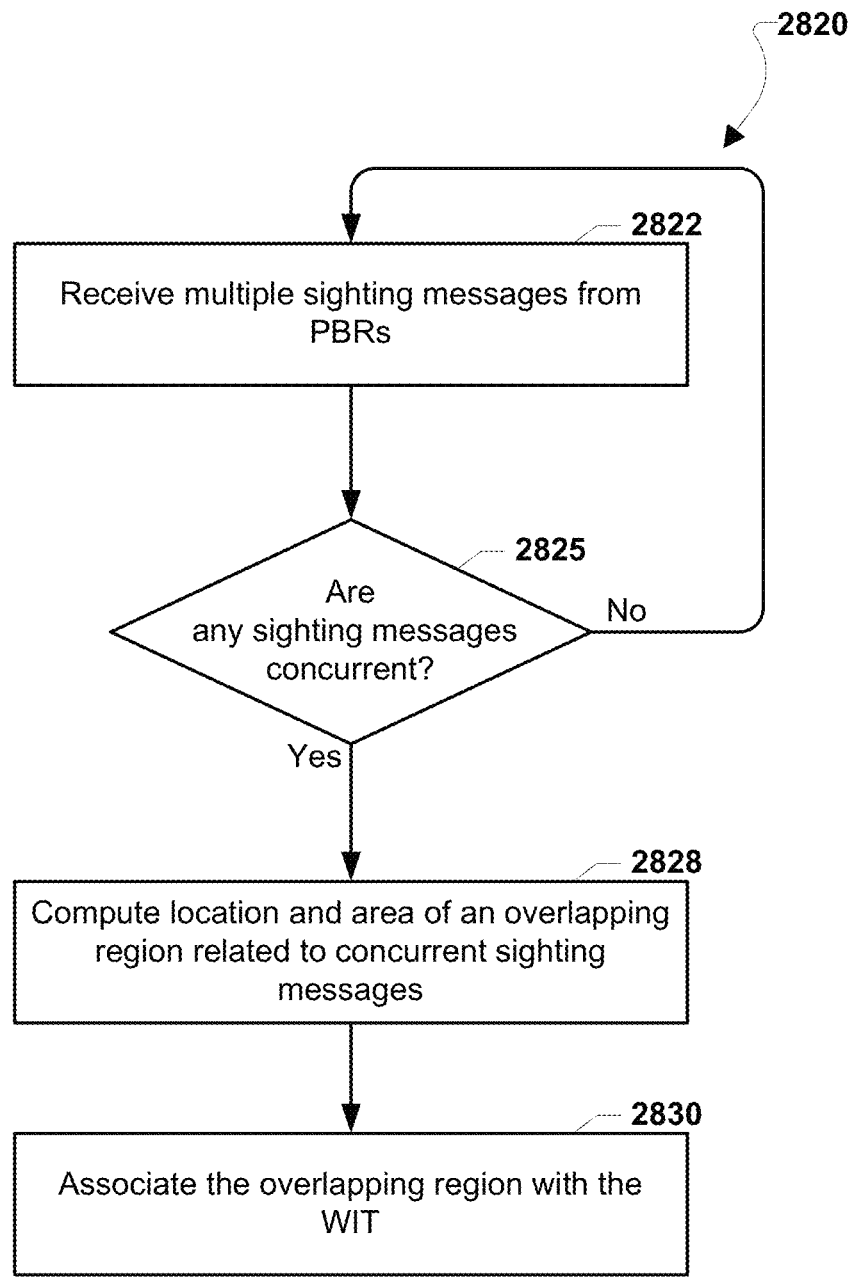
FIGS. 28B and 28D are process flow diagrams illustrating embodiment methods for determining the location of the wireless identity transmitter in the communication systems illustrated in FIGS. 28A and 28C, respectively.

FIG. 28B illustrates an embodiment method 2820 for a central server providing a finer grained location for a wireless identity transmitter based on a plurality of proximity reports or sightings. The central server may receive multiple sighting messages from proximity broadcast receivers in block 2822. The central server may determine whether any of the received sighting messages are concurrent in determination block 2825 (i.e., whether broadcast messages from the same wireless identity transmitter are reported as being received at approximately the same time from two different proximity broadcast receivers). The central server may not consider sighting messages concurrent unless they are associated with the same wireless identity transmitter (i.e., include the same identifier or corresponding rolling identifiers) and come from different proximity broadcast receivers. Further, the central server may determine whether sighting messages are concurrent based on the contents of the messages, such as by comparing and matching timestamps in the received sighting messages (i.e., the time the proximity broadcast receivers received broadcast messages from the same wireless identity transmitter). The timestamps may be matched without being exactly the same in order to accommodate differences due to unsynchronized clocks within the proximity broadcast receivers, transmission delays, etc. In some cases, such as if the wireless identity transmitter is assumed or determined to be stationary, received sighting messages may be matched for purposes of refining the position despite the messages being received at different times. The acceptable time range for matching may be adjustable. Alternately, if the wireless identity transmitter is using a rolling identifier that shifts with each broadcast message, the central server may match received sighting messages based on the rolling identifier rather than on timestamps. If none of the sighting messages are determined to be concurrent (i.e., determination block 2825="No"), the central server may continue with the operations in block 2822.

If the central server determines that two or more sighting messages are concurrent (i.e., determination block 2825="Yes"), the central server may compute the location (based on the sighting locations) and area of an overlapping proximity region related to the concurrent sighting messages in block 2828. For example, based on the locations of each of the proximity broadcast receivers associated with the concurrent sighting messages and the known proximity (i.e., transmission range) of the wireless identity transmitter, the central server may compute the proximity radius of each proximity broadcast receiver to determine the overlapping region. The location of each proximity broadcast receiver may be included in sighting messages transmitted by each proximity broadcast receiver.

In block 2830, the central server may associate the overlapping region (i.e., the computed location of the reporting devices and area of the overlapping proximity regions) with the wireless identity transmitter. In other words, the central server may associate a finer grained location of the wireless identity transmitter by calculating multiple reception radii for each of the proximity broadcast receivers and identifying an overlapping region that falls within the reception range of each proximity broadcast receiver. This finer grained location may also be associated with the contents of one or more of the proximity broadcast receiver sighting messages (e.g., timestamp, sensor data, etc.). Also as part of block 2830, the central server may identify a number of overlapping area boundaries and assign a probability value to each based on the average and variability of the transmission range.

Embodiment method 2820 may be applied to many concurrent sighting messages received from several proximity broadcast receivers, which may enable the overlapping area to be more narrowly defined. For example, the central server may compute the overlapping region between several proximity broadcast receiver listening ranges or refine a previously computed overlapping region based on another overlapping report (i.e., compute the overlapping region shared by a previous overlapping region and another proximity broadcast receiver listening area). For example, as searchers close in on the wireless identity transmitter, each of their respective mobile proximity broadcast receivers will begin to transmit sighting messages related to the wireless identity transmitter, which the central server may combine to further narrow the search area as searchers approach from different directions. This capability may be further leveraged by having some searchers move away from a suspected location of the wireless identity transmitter until their mobile proximity broadcast receivers are transmitting sighting messages only intermittently, indicating they are on the edge of the transmission range. With multiple proximity broadcast receivers positioned near the apparent maximum transmission range, the overlapping area computed by the central server can be minimized, thereby helping to further pinpoint the location of the wireless identity transmitter.

Figure 28C:
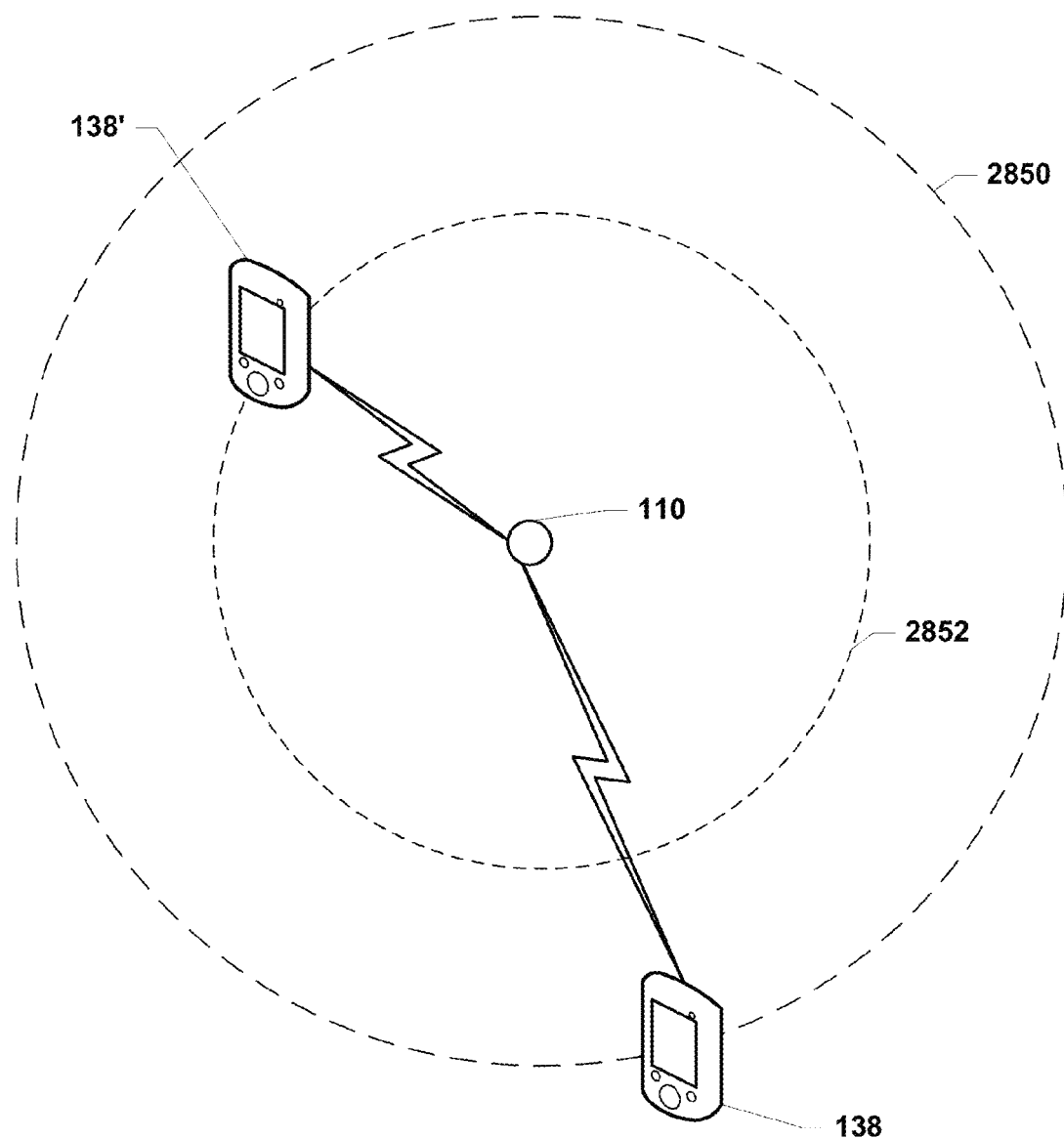

Further embodiments may provide increased location granularity by considering the power level of the broadcast messages received by multiple proximity broadcast receivers since different power levels will be associated with different proximities. As is well known, the signal strength of a radio transmission from a point transmitter decreases with distance by a factor proportional to the inverse of the square of the distance (i.e., $1/R^2$), with any intervening structure or vegetation causing further attenuation. Thus, proximity broadcast receivers located at different distances from a wireless identity transmitter will typically receive the broadcast messages with different signal strengths. For, example, FIG. 28C illustrates a wireless identity transmitter 110 whose transmissions (i.e., broadcast messages) are being received by two proximity broadcast receivers 138, 138' at different ranges. Due to the attenuation of radio signals with distance, the proximity broadcast receiver 138' at distance 2852 from the wireless identity transmitter 110 may typically receive the transmissions with a higher signal strength than a more distant proximity broadcast receiver, such as the proximity broadcast receiver 138 at distance 2850. Thus, by including the signal strength of received transmissions in sighting messages transmitted by proximity broadcast receivers 138, 138' to a central server, the central server may be able to further refine the location of a wireless identity transmitter 110.

A proximity broadcast receiver's proximity to the wireless identity transmitter 110 may be estimated as inversely proportional to the power level. Proximity estimations may also account for channel conditions such as intervening signal attenuators (e.g., vegetation, buildings, etc.), echoes (i.e., multipath reception) or other interferences. The proximity may be estimated locally on the proximity broadcast receiver 138, 138' or alternately by the central server if the proximity broadcast receiver 138, 138' includes the power level in a sighting message. Each proximity broadcast receiver's own location and estimated proximity tp the wireless identity transmitter 110 may be used to triangulate the approximate location of the wireless identity transmitter 110. For example, as searchers close in on the wireless identity transmitter, the signal strength of received broadcast messages from the wireless identity transmitter may increase, enabling the central server to further narrow the search area as searchers approach from different directions. Thus, when proximity broadcast receivers 138, 138' include signal strength data in sighting messages, the central server can reduce the overlap area for searching as multiple searchers approach the wireless identity transmitter 110 (which would not be the case in the circumstances similar to illustrated above with reference to FIGS. 28A and 28B as the overlap area was determined solely upon the maximum reception range).

Figure 28D:
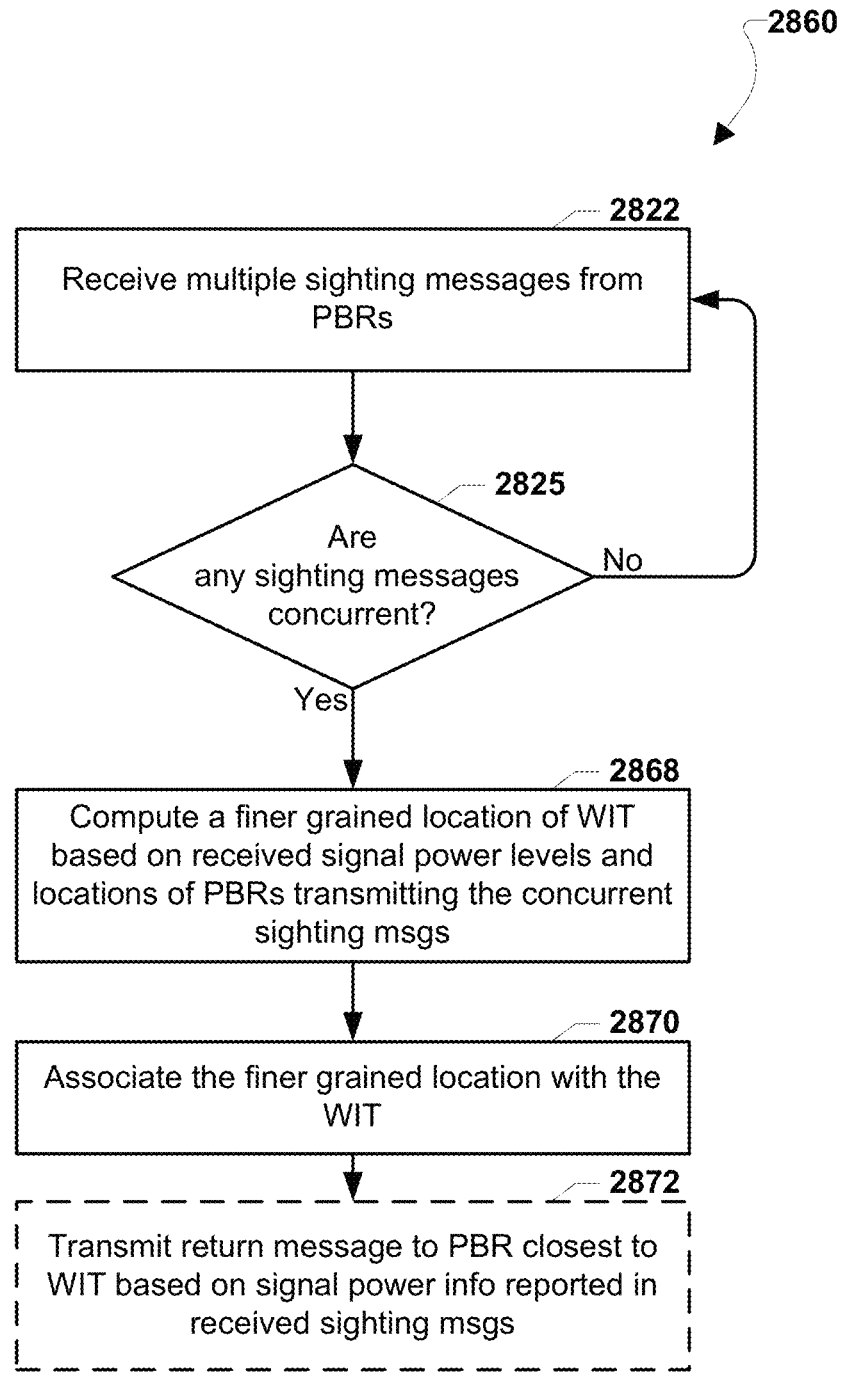

FIG. 28D illustrates an embodiment method 2860 for a central server providing a finer grained location for a wireless identity transmitter based on the power level of broadcast messages received by proximity broadcast receivers. The central server may receive multiple sighting messages from proximity broadcast receivers in block 2822. The sighting messages may include the power level of a broadcast messages received by the reporting proximity broadcast receivers, or an estimated proximity to the proximity broadcast receiver to the wireless identity transmitter determined based on the received signal strength. The central server may determine whether any of the sighting messages are concurrent in determination block 2825. The central server may not consider sighting messages concurrent unless they are associated with the same wireless identity transmitter (i.e., include the same identifier or corresponding rolling identifiers) and are received from different proximity broadcast receivers. Further, the central server may determine whether sighting messages are concurrent based on the contents of the sighting messages as described above with reference to FIG. 28B. If none of the sighting messages are concurrent (i.e., determination block 2825="No"), the central server may continue with the operations in block 2822.

If the central server determines that two or more sighting messages are concurrent (i.e., determination block 2825="Yes"), the central server may compute a finer grained location of the wireless identity transmitter based on the received signal power levels and the locations of proximity broadcast receivers transmitting the concurrent sighting messages in block 2868. The central server may estimate the distance between the proximity broadcast receivers and the wireless identity transmitter or may receive an estimated distance in the sighting messages as discussed above. Each proximity broadcast receiver's location and estimated proximity to the wireless identity transmitter may be used to triangulate the finer grained location. Triangulation based on information within sighting messages received from only two proximity broadcast receivers may result in two possible locations for the wireless identity transmitter. However, information in sighting messages from three or more proximity broadcast receivers may be used to better approximate the wireless identity transmitter's location. The central server may associate the finer grained location (i.e., the triangulated location) with the wireless identity transmitter in block 2870. This finer grained location may also be associated with the contents of one or more of the proximity broadcast receiver sighting messages (e.g., timestamp, sensor data, etc.).

In optional block 2872, the central server may transmit a return message to a proximity broadcast receiver that is closest to the wireless identity transmitter based on signal power information reported in received sighting messages. In other words, the central server may determine the closest proximity broadcast receiver to the wireless identity transmitter among the plurality of proximity broadcast receivers that transmitted the concurrent sighting messages. Often, a user of a wireless identity transmitter may intend to use a device associated with a single proximity broadcast receiver within a plurality of proximity broadcast receivers (e.g., a point-of-sale device in a line of point-of-sale devices each connected to proximity broadcast receivers). The central server may use signal strength or signal power indicators within concurrent sighting messages, as well as any other relevant data (e.g., location information, direction of the wireless identity transmitter based on previous sighting messages, etc.) to determine the single proximity broadcast receiver the user of the wireless identity transmitter likely intends to interface. The return message may indicate to the proximity broadcast receiver that the wireless identity transmitter is likely intending to interface with that proximity broadcast receiver, and may additionally include instructions, data, or other information for the proximity broadcast receiver. For example, the return message may include a message indicating the user of the wireless identity transmitter is near, or alternatively instructions on how to handle the user.

In an embodiment, the return message may indicate information describing the certainty of the determination that the recipient proximity broadcast receiver is the closest to the wireless identity transmitter. Additionally, the return message may request a confirmation of proximity to the wireless identity transmitter. For example, the closest proximity broadcast receiver may confirm that it is the closest proximity broadcast receiver based on subsequent input data related to the user of the wireless identity transmitter (e.g., the user of the wireless identity transmitter pressed a 'confirm' button on the proximity broadcast receiver). In another embodiment, the central server may transmit messages to the proximity broadcast receivers determined to not be the closest proximity broadcast receiver, indicating that these proximity broadcast receivers are not closest and/or the identity of the determined closest proximity broadcast receiver. In response, the proximity broadcast receivers that are not the closest may modify their subsequent transmission of sighting messages regarding the wireless identity transmitter. For example, the proximity broadcast receivers may adjust (i.e., increase or decrease) the frequency of transmitting sighting messages regarding the wireless identity transmitter (i.e., adjust receiver thresholds) or alternatively may ignore future broadcast messages from the wireless identity transmitter for a period of time.

Figure 29:
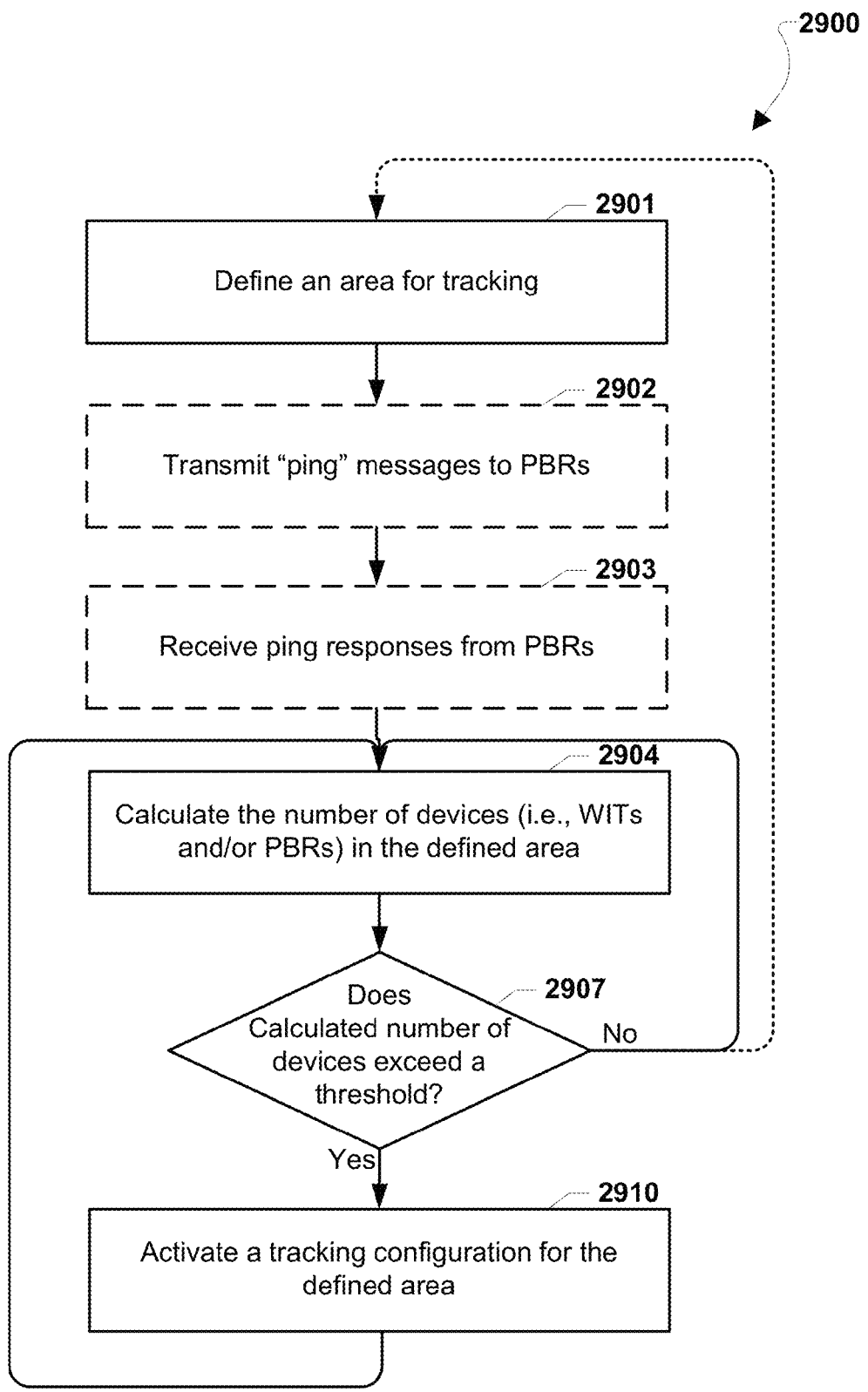
FIG. 29 is a process flow diagram illustrating an embodiment method of activating a virtual fence when enough receiver or wireless identity transmitters enter an area.

FIG. 29 illustrates an embodiment method 2900 for activating additional functionality based on the number of wireless identity transmitters (referred to in FIG. 29 as "WITs") and proximity broadcast receivers within a virtual fence. An area (i.e., the virtual fence or geofence) may be defined in block 2901. Various embodiments may be implemented for a stationary area, like a shopping mall for example, or for moving areas, like a portion of a cruise ship. For example, in an implementation on a cruise ship the map could be drawn on and scaled to the ship's layout, and the fence could move in a latitudinal and longitudinal manner with the ship.

In optional block 2902, the central server may transmit ping messages (or "pings") to proximity broadcast receivers. Such a "ping" may be in the form of a message broadcast, multicast, or unicast to each proximity broadcast receiver requesting (or commanding) the proximity broadcast receivers to provide a response including their current location information, and optionally a status related to its ability to transmit sighting messages (e.g., whether a reporting application is active or disabled, a battery level of a proximity broadcast receiver, a current operating mode, etc.). In an embodiment, the central server may "ping" proximity broadcast receivers with a relatively recent contact history in the defined area. Alternatively or additionally, the central server may periodically "ping" proximity broadcast receivers that are expected to be within the defined area, such as smartphones with an account zip code or address corresponding to the defined area. In optional block 2093, the central server may receive ping responses from proximity broadcast receivers, such as messages that include proximity broadcast receiver current locations as well as other status information.

A central server may calculate the number of devices (i.e., wireless identity transmitters and/or proximity broadcast receivers) in the defined area in block 2904. For example, the central server may calculate the number of devices based on recent sighting messages received from proximity broadcast receivers or responses to pings transmitted to proximity broadcast receivers. The central server may determine whether the calculated number of devices exceeds a threshold number in determination block 2907. This threshold may be a predefined number of proximity broadcast receivers, wireless identity transmitters, or combined number of wireless identity transmitters and proximity broadcast receivers. Alternately, the threshold may vary based on user input or system conditions. Further, the threshold may depend upon the size or type of tracking area defined in block 2901 (e.g., the threshold may increase as the area increases). Still further, there may be more than one threshold to which the number of devices is compared in determination block 2907, and the greatest threshold exceeded may define the action that is taken as discussed below with reference to block 2910.

If the number of devices does not exceed the threshold (i.e., determination block 2907="No"), the central server may continue with the operations in block 2904 (e.g., continue to re-calculate the number of devices in the defined area based on the number of received sighting messages). Optionally, in some implementations and embodiments, the central server may redefine the area for tracking by returning to block 2901, such as to more narrowly or more broadly define the tracking area in order to encompass more proximity broadcast receivers or implement a different type of tracking configuration or embodiment.

If the calculated number of devices exceeds the threshold (i.e., determination step 1707="Yes"), the central server may activate a tracking configuration for the defined area in block 2910. Various tracking configurations may be activated, and the type of tracking configuration that is activated may depend upon the tracking area defined in block 2901 and the threshold that was exceeded in determination block 2907. For example, a stationary virtual fence in a restaurant may be configured such that when enough customers with mobile proximity broadcast receivers or wireless identity transmitters are in line, various functions are activated, such as sending an alert to open another line or prompting users in line to order food with their devices or providing special offers.

Further embodiments may work with mobile virtual fences. For example, a guide, such as a museum tour guide or scoutmaster, could have a mobile proximity broadcast receiver (e.g., a smartphone executing an application that enables reception of broadcast messages and transmissions of sighting messages to a central server), and tourists or scouts may each be equipped with wireless identity transmitters. When the group convenes in an area, a tracking configuration may be activated so the group can move together (e.g., through the museum or down the trail), but if any of the wireless identity transmitters stray too far from the guide's mobile proximity broadcast receiver (i.e., crosses beyond the mobile fence), the guide's mobile proximity broadcast receiver may receive an alert, such as transmitted by central server. In an embodiment, the mobile proximity broadcast receiver may detect when a wireless identity transmitter leaves the mobile fence based upon losing the broadcast messages (or signals) or the signal strength of received broadcast messages falling below a threshold value. In another embodiment, the central server may monitor the moving fence (e.g., a predefined distance about a particular proximity broadcast receiver) using sighting messages received from many proximity broadcast receivers. Thus, in this embodiment, even if the guide's mobile proximity broadcast receiver stops receiving transmissions from a particular wireless identity transmitter, an alert would not be sounded if the wireless identity transmitter is still within the defined boundaries of the mobile fence, such as just around the corner in a museum or behind a chain link fence, as determined by another proximity broadcast receiver.

Figure 30:
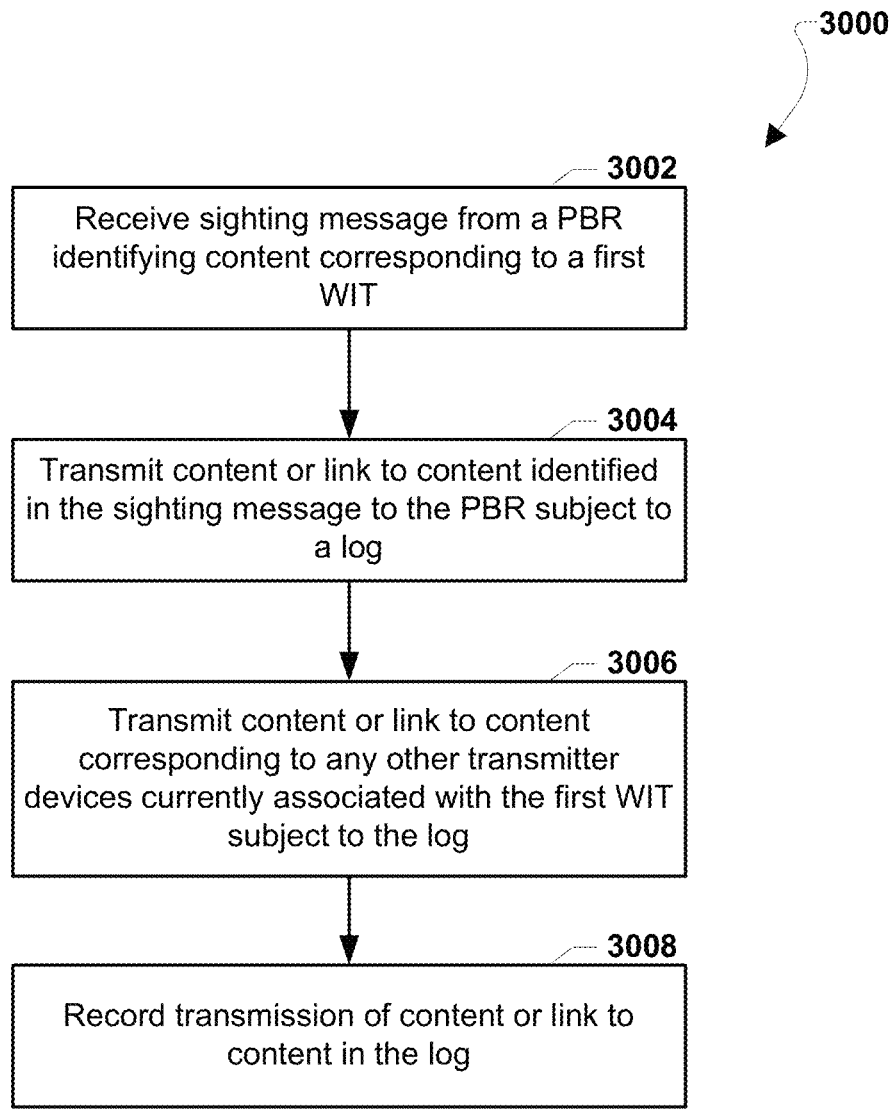
FIG. 30 is a process flow diagram illustrating an embodiment method of pre-fetching content.

FIG. 30 illustrates an embodiment method 3000 for pre-fetching content in response a central server's knowledge of the location of wireless identity transmitters. In block 3002, the central server may receive a sighting message from a proximity broadcast receiver identifying content corresponding to a first wireless identity transmitter. For example, the sighting message may include content associated with the wireless identity transmitter, such as the wireless identity transmitter's identifier, or a second segment as previously discussed with reference to FIG. 9B. The central server may transmit the content or a link to the content identified in the sighting message to the proximity broadcast receiver subject to a log in block 3004. The log may be used by the central server to determine whether the content (or link) has already been transmitted recently the central server may not send it again unless specifically requested. For example, the central server may evaluate log data, such as in a log database, indicating the time and proximity broadcast receiver that received previous transmissions containing the content or links. In another embodiment, the central server may transmit the content or the link to the content to another device, such as a third-party server or a tablet associated with the user of the wireless identity transmitter.

In block 3006, the central server may transmit content or a link to content corresponding to any other wireless identity transmitters currently associated with the first wireless identity transmitter subject to the log. The link may be a network address, such as a website address or an IP address. In block 3008, the central server may record the transmission of the content or link to the content in the log. The central server may record the proximity broadcast receiver, the content, and other conditions related to the transmissions of the content or link (e.g., time of transmission). By logging transmissions the system can avoid redundant transmissions.

Associations of wireless identity transmitters with certain actions or content to be transmitted by the central server may be predetermined (e.g., based on a set relationship). Alternately, wireless identity transmitters may be associated dynamically, such as if they are near each other. Associations may be updated in real time based on the locations of wireless identity transmitters as recorded from previous proximity broadcast receiver sighting messages. For example, a store may deploy multiple wireless identity transmitters associated with content (e.g., marketing information, promotional materials, coupons, etc.) about products for sale. A mobile proximity broadcast receiver carried by a user may transmit a sighting message when receiving a broadcast message from such a wireless identity transmitter and as a result, may obtain information on a product near the wireless identity transmitter. Information on similar nearby products may be pre-fetched and sent to the proximity broadcast receiver user as well. If the store manager rearranges goods, associations could be automatically reset so that users of proximity broadcast receivers only receive pre-fetched content for goods that are actually within proximity to the user. In this manner, wireless identity transmitters and the systems (e.g., tracking systems) of the various embodiments may be deployed to provide an affordable geo-based advertising push system. In a further embodiment, the central server may simply record sighting messages from proximity broadcast receivers for certain fixed wireless identity transmitters as a mechanism for measuring the pedestrian or vehicle traffic (i.e., foot traffic) within proximity of each of the wireless identity transmitters. In this manner, wireless identity transmitters and the systems of the various embodiments may be used to affordably measure local traffic.

Further, embodiment systems may implement Peer-to-Peer communication mechanisms which may be used to avoid redundant sighting messages to the central server and/or to share content, search sector designations or assignments. Such Peer-to-Peer communication mechanisms may also enable a proximity broadcast receiver that did not receive any broadcast messages from an wireless identity transmitter to relay information (e.g., sighting messages) to the central server on behalf to one or more other proximity broadcast receivers, such as proximity broadcast receivers that lack an affordable data plan or communication network (e.g., 3G vs. 4G). Such Peer-to-Peer communication mechanisms may be accomplished via local area wireless communication links, such as WiFi. Embodiment peer-to-peer communications to relay broadcast messages from one proximity broadcast receiver to another are described above with reference to FIGS. 19D-19E.

Figure 31:
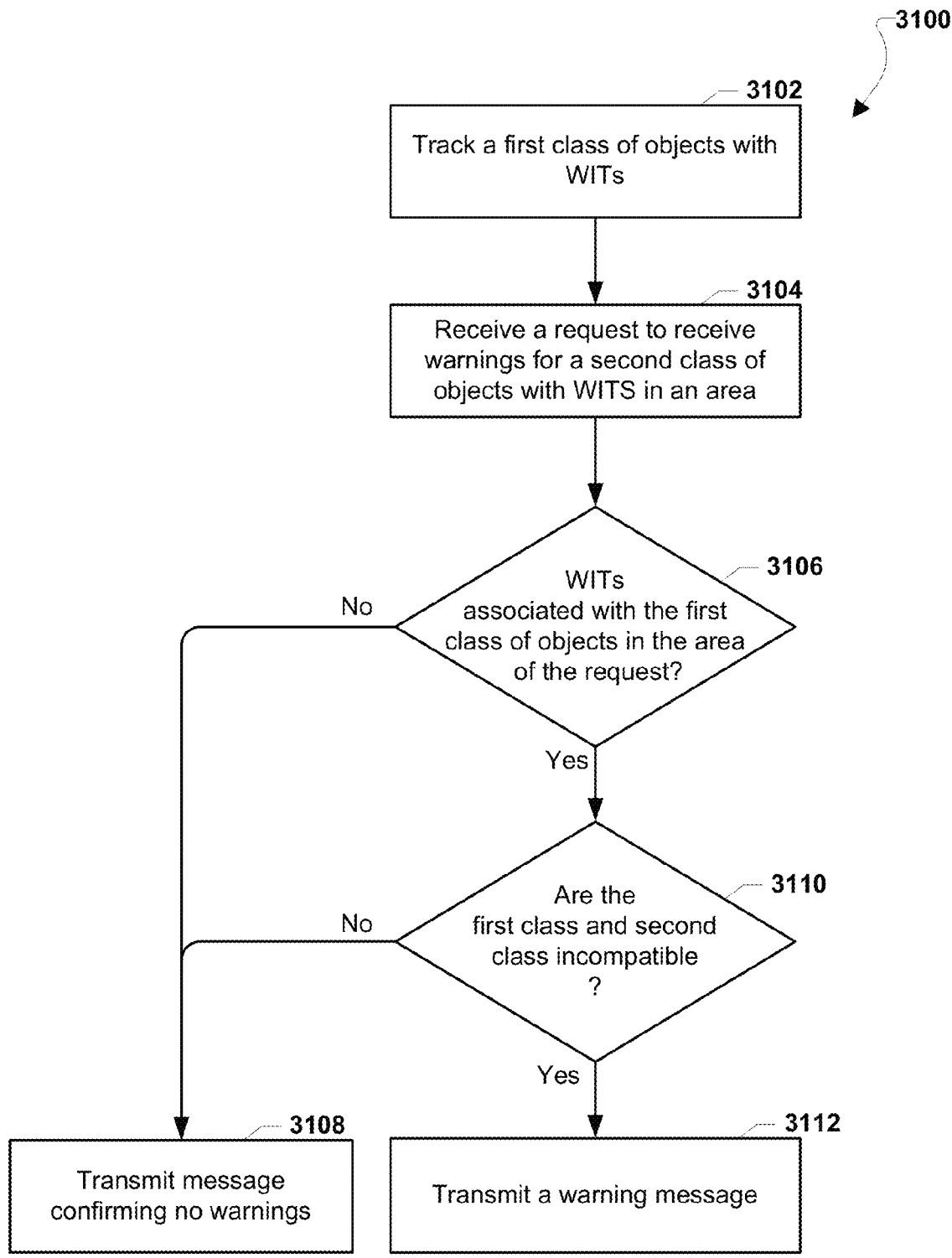
FIG. 31 is a process flow diagram illustrating an embodiment method of responding to an offender's location or proximity to receiver or wireless identity transmitters.

FIG. 31 illustrates an embodiment method 3100 for issuing a warning when incompatible classes of objects equipped with wireless identity transmitters enter into or are within a particular area. Previously discussed embodiments provide embodiments for identifying or tracking proximity of wireless identity transmitters and proximity broadcast receivers (e.g., the various beacon and virtual fence embodiments discussed above), but these embodiments may also be used to provide warnings in advance if incompatible classes of objects equipped with wireless identity transmitters are close by. Such warnings may be used to keep certain classes of wireless identity transmitters separate.

In block 3102, a central server may track a first class of objects with wireless identity transmitters, such as by applying wireless identity transmitters to a certain type of objects. The central server may receive a request to receive warnings for a second class of objects with wireless identity transmitters in an area in block 3104. In other words, a warning may be transmitted when objects of the first class enter into the area of the request. The request may come from various computing devices, such as a proximity broadcast receiver or computer a terminal. The request may specify the area to be checked or monitored (e.g., a geofence area). Alternatively, the area may be one of a predefined set of zones. Alternately, the area may be a predefined radius about the location of the proximity broadcast receiver. For example, the request may include the device's location, and the area may be defined as anywhere within a mile of that location.

In determination block 3106, the central server may determine whether any of wireless identity transmitters associated with the first class of objects are within the area of the request. The central server may make this determination based on information within sighting messages received by proximity broadcast receivers. For example, the central server may determine whether any of the wireless identity transmitters connected to objects of the first class have been within proximity of proximity broadcast receivers located within the area specified in the request. If no wireless identity transmitters associated with the first class objects are within the area of the request (i.e., determination block 3106="No"), in block 3108 the central server may transmit a message confirming there are no warnings.

If one or more wireless identity transmitters associated with the first class of objects are within the area of the request (i.e., determination block 3106="Yes"), the central server may determine whether the first class and second class are incompatible in determination block 3110. In other words, should the first class of objects not be in the area with the second class of objects. If the classes are not incompatible (i.e., determination block 3110="No"), the central server may transmit a message confirming there are no warnings in block 3108. If the object classes are incompatible (i.e., determination block 3110="Yes"), in block 3112 the central server may transmit a warning message, such as a warning message to the device that transmitted the request received with the operations in block 3104.

The embodiment illustrated in FIG. 31 may be used for a wide variety of purposes and objects, including, for example, tracking people. For example, sex offenders may be required to wear wireless identity transmitters and tracked by a central server (i.e., a tracking system central server) as a first class of objects that are incompatible with children (a second class of objects). In such an example applications, a parent may submit a query to the system inquiring whether there are any warnings in a specified area (neighborhood, shopping mall, playground, etc.) or within a specified distance of the parent's location. The request could also identify a "child" object class, such as if children are also equipped with wireless identity transmitters. Then, if a registered sex offender's wireless identity transmitter was recently tracked near the specified area or the parent's location, the central server may find the "sex offender" and "child" classes incompatible and transmit a warning to the parent requesting the warning. To employ this embodiment, an authority may attach a first wireless identity transmitter to a person or object to be tracked, parents may attach a second wireless identity transmitter to another object or their children, the system may determine in the central server from sighting messages received from a plurality of mobile proximity broadcast receivers whether the person or object being tracked is closer than a predefined threshold distance to the another object or child, and the central server may transmit a warning when they are within the predefined threshold distance of each other.

Figure 32A:
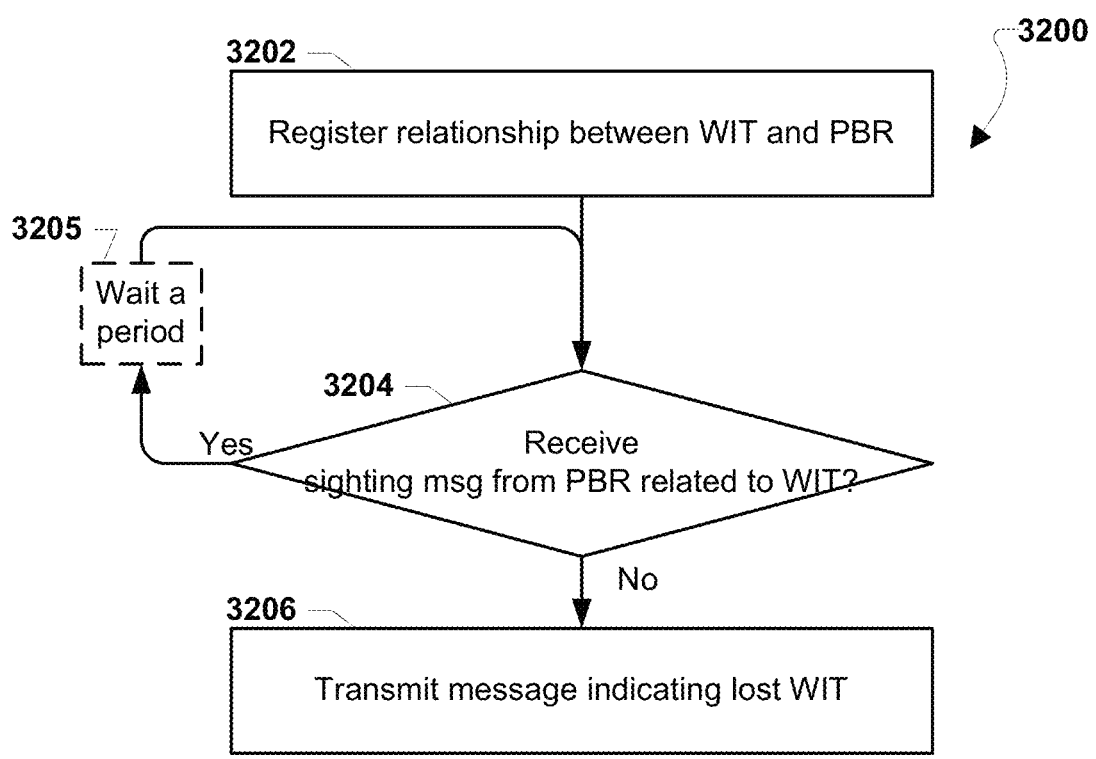
FIG. 32A is a process flow diagram illustrating an embodiment method for a central server determining whether a proximity broadcast receiver has lost a wireless identity transmitter.

FIG. 32A illustrates an embodiment method 3200 for a central server determining whether a proximity broadcast receiver has lost a wireless identity transmitter. In the central server, the proximity broadcast receiver may be associated with the wireless identity transmitter. For example, the proximity broadcast receiver may be a user's smartphone that is associated with the wireless identity transmitter within an asset (e.g., wallet, purse, luggage, medicine bag, clothing, etc.). In response to failing to receive sighting messages from a proximity broadcast receiver associated with a particular wireless identity transmitter, the central server may be configured to transmit messages, such as warnings, indicating that the wireless identity transmitter (and the object it is connected to) is lost, absent, forgotten, or otherwise non-proximate to the proximity broadcast receiver. This embodiment method 3200 may be useful for leashing certain assets, such as possessions, pets, and children. For example, when a child runs from a parent, broadcast messages from the child's wireless identity transmitter may no longer be received by the parent's proximity broadcast receiver. As a result, the parent's proximity broadcast receiver may not transmit sighting messages to the central server and the central server may determine the child has been lost or run away.

In block 3202, the central server may register a relationship between the proximity broadcast receiver and the wireless identity transmitter, such as by storing information within a database. In various embodiments, each proximity broadcast receiver and wireless identity transmitter may be involved in numerous relationships. Additionally, the relationship information may be stored based on user input data to the central server via a registration web portal (e.g., the user may access a website and indicate all of his/her wireless identity transmitters). During such a registration, the central server may prompt the user to provide conditions under which the central server should transmit messages when wireless identity transmitters are lost or otherwise outside of the proximity of the proximity broadcast receiver. For example, the user may enter configuration data stored by the central server that indicates that if the proximity broadcast receiver does not receive broadcast messages from the wireless identity transmitter between certain hours of the day, the central server should transmit a warning message.

In determination block 3204, the central server may determine whether a sighting message has been received from the proximity broadcast receiver related to the wireless identity transmitter. In other words, based on whether or not such a sighting message is received, the central server may detect if the wireless identity transmitter is close to the proximity broadcast receiver. The central server may also evaluate sighting messages received over a period to determine whether the wireless identity transmitter is (or has recently been) within proximity of the proximity broadcast receiver. In an embodiment, the central server may determine whether it receives a sighting message for each wireless identity transmitter registered in the relationship. For example, if the registered relationship includes multiple wireless identity transmitters, the central server may expect to receive sighting messages from the proximity broadcast receiver regarding all the wireless identity transmitters. If the central server receives a sighting message related to the wireless identity transmitter (i.e., determination block 3204="Yes"), in optional block 2305 the central server may wait a period and may continue with the operations in determination block 3204. In various embodiments, the central server may perform the operations in determination block 3204 periodically, such as every few seconds, minutes, or hours.

If the central server does not receive a sighting message related to the wireless identity transmitter (i.e., determination block 3204="No"), in block 3206 the central server may transmit a message indicating the wireless identity transmitter is lost. In various embodiments, the central server may transmit such a message to the proximity broadcast receiver, other devices associated with the user of the proximity broadcast receiver (e.g., a smartphone, tablet), and/or any other device relevant to the wireless identity transmitter. For example, the central server may transmit a warning message to a police server when the wireless identity transmitter is lost and associated with a child.

Figure 32B:
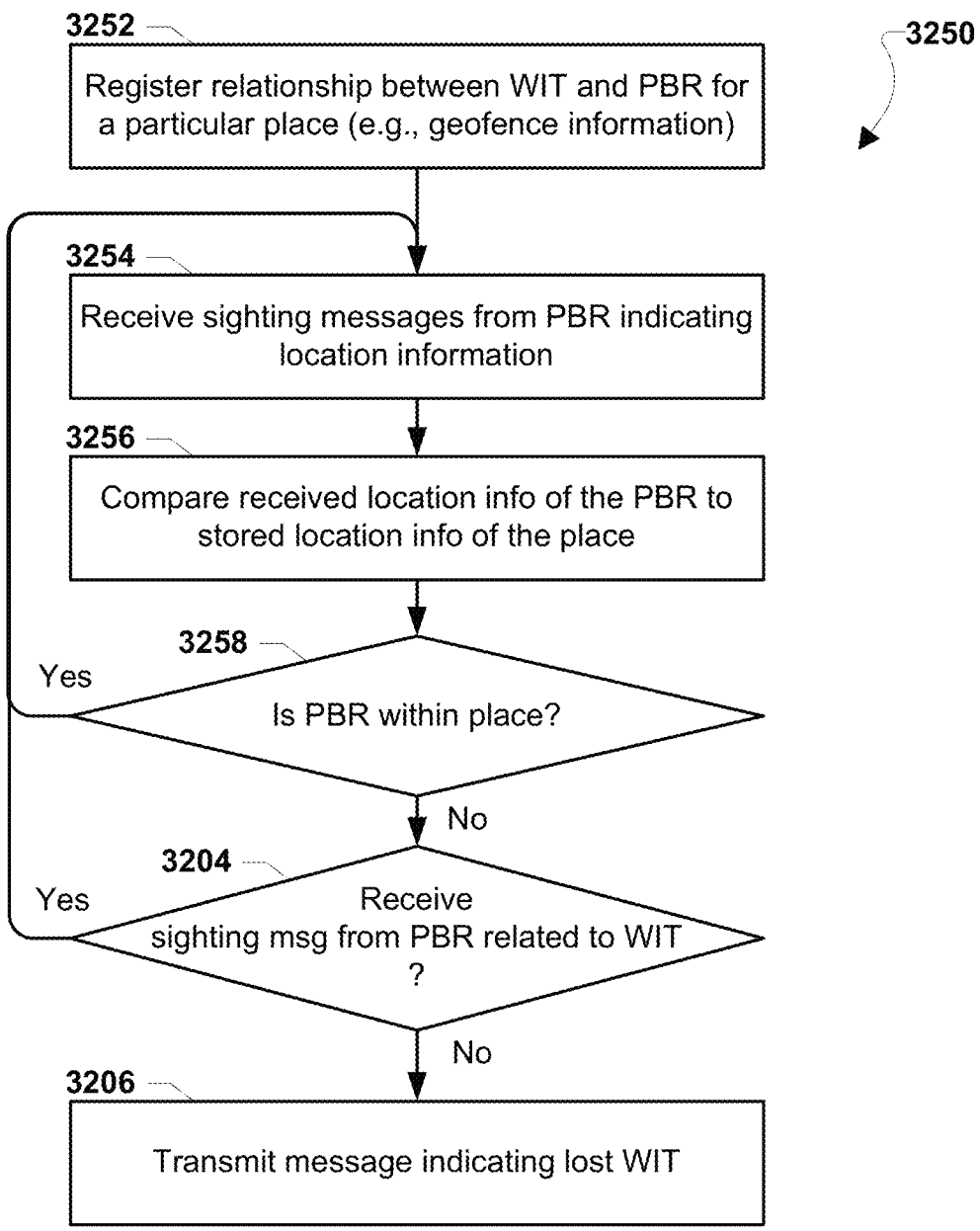
FIG. 32B is a process flow diagram illustrating an embodiment method for a central server determining whether a proximity broadcast receiver has left a predefined place without a certain wireless identity transmitter.

FIG. 32B illustrates an embodiment method 3250 for a central server determining whether a proximity broadcast receiver has left a predefined place without a certain wireless identity transmitter. The method 3250 is similar to method 3200 described above, except that the central server may transmit messages when the proximity broadcast receiver leaves a particular place. In particular, when the proximity broadcast receiver is outside of the predefined place, such as a house or business office, the central server may transmit a message to the proximity broadcast receiver if the proximity broadcast receiver is not within reception range of the associated wireless identity transmitters. In other words, if the user leaves the place with the proximity broadcast receiver but not all associated wireless identity transmitters, the central server may transmit a message to remind the user.

In block 3252, the central server may register a relationship between the proximity broadcast receiver, the wireless identity transmitter, and a place, such as by storing information within a database. In various embodiments, each proximity broadcast receiver, wireless identity transmitter, and place may be involved in numerous relationships. For example, the central server may record in a database that the proximity broadcast receiver is in a relationship for each of several different places. As another example, the wireless identity transmitter may be involved in a relationship with the proximity broadcast receiver for the place and involved in a separate relationship with a second proximity broadcast receiver at a second place. In another embodiment, the central server may register that the proximity broadcast receiver is in a relationship with a plurality of wireless identity transmitters for the place.

In block 3254, the central server may receive sighting messages from the proximity broadcast receiver that indicate the proximity broadcast receiver's location information. For example, the central server may receive GPS coordinates of the proximity broadcast receiver. In an embodiment, the location information may be within received sighting messages and/or separate transmissions received from the proximity broadcast receiver. In block 3256, the central server may compare the received location information of the proximity broadcast receiver to stored location information of the place, such as geofence information stored when the relationship was registered. In an embodiment, the central server may store numerous GPS coordinates that describe the perimeter of the place or, alternatively, a single location that defines the center of the place. In determination block 3258, the central server may determine whether the proximity broadcast receiver is within the place. In an embodiment, to account for imprecise location information (e.g., wireless network information as opposed to GPS coordinates), the central server may utilize tolerance thresholds when determining whether the proximity broadcast receiver is located within the place.

If the proximity broadcast receiver is within the place (i.e., determination block 3258="Yes"), the central server may continue with the operations in block 3254. However, if the proximity broadcast receiver is not within the place (i.e., determination block 3258="No"), in determination block 3204, the central server may determine whether a sighting message has been received from the proximity broadcast receiver related to the wireless identity transmitter. In an embodiment, the central server may continue to check whether the proximity broadcast receiver transmits sighting messages regarding the wireless identity transmitter as long as the proximity broadcast receiver is outside of the place. In another embodiment, the central server may only check whether the proximity broadcast receiver transmits a sighting message regarding the wireless identity transmitter one time (e.g., the first time the proximity broadcast receiver leaves the place). If the central server receives a sighting message related to the wireless identity transmitter (i.e., determination block 3204="Yes"), the central server may continue with the operations in block 3254. If the central server does not receive a sighting message related to the wireless identity transmitter (i.e., determination block 3204="No"), in block 3206 the central server may transmit a message indicating the wireless identity transmitter is lost. For example, the message may be an SMS message sent to the user's smartphone that states "You left your wallet in the house."

FIGS. 33-37C illustrate various embodiment methods for synchronizing a nonce or counter between a wireless identity transmitter and a central server to enable transmitting and receiving obscured information. The wireless identity transmitter may perform various methods for broadcasting messages that include obscured identifiers and data (i.e., payloads) that identify the wireless identity transmitter to the central server and provide a relative reading on the wireless identity transmitter clock. Likewise, the central server may perform various methods for processing obscured information within received messages corresponding to the wireless identity transmitter. As described above, the broadcast messages from the wireless identity transmitter may be sent to the central server directly or through intermediary devices, such as proximity broadcast receivers transmitting sighting messages.

Due to privacy concerns regarding unintended tracking of devices described above, the wireless identity transmitter may obscure information within the transmitted messages through obfuscation measures (e.g., encryption or pseudo-random data generation) known only to the central server and wireless identity transmitter. In an embodiment, the wireless identity transmitter may maintain a clock or timer mechanism that is represented by a nonce or counter value and that may begin once the device is operational (e.g., activated through the insertion of a battery). The clock may be relatively low-quality and therefore may drift unlike more accurate clocks, such as in the central server (e.g., clocks calibrated by periodic atomic clock readings). The counter or nonce may be a non-repeating number generated by the wireless identity transmitter, and may be changed each time wireless identity transmitter encodes its identifier for broadcasting, such as once every hour or even once every broadcast message. In some embodiments the nonce or counter value is not included in the broadcast messages. In some embodiments, nonces or counters (or counter values) may be encrypted or encoded using pseudo-random functions or other encryptions algorithms (e.g., AES), and the encrypted or encoded values included in the broadcast message. For example, a wireless identity transmitter may encode a nonce or counter value with an AES-CTR block cipher to create a nonce for use in generating the payload including a rolling identifier of a broadcast message. As another example, a nonce may be generated by applying a linear feedback shift register (LFSR) to a nonce or counter value.

As described throughout the disclosure, the wireless identity transmitter may also store a unique device identification code or number (i.e., a device identifier or 'deviceID') and be pre-provisioned with a per-device shared secret key (or K) which is associated with the unique identifier at the central server. For example, the central server may store the unique device identifier and the secret key in a database and may maintain a table of deviceID and K pairs for all wireless identity transmitters registered with the central server. The central server may use the device identifier and secret key, along with other information such as received nonce or counter values, to identify, decrypt and otherwise process obscured messages from the wireless identity transmitter. In an embodiment, the device identifier (or deviceID) may be generated sequentially or randomly.

Figure 33:
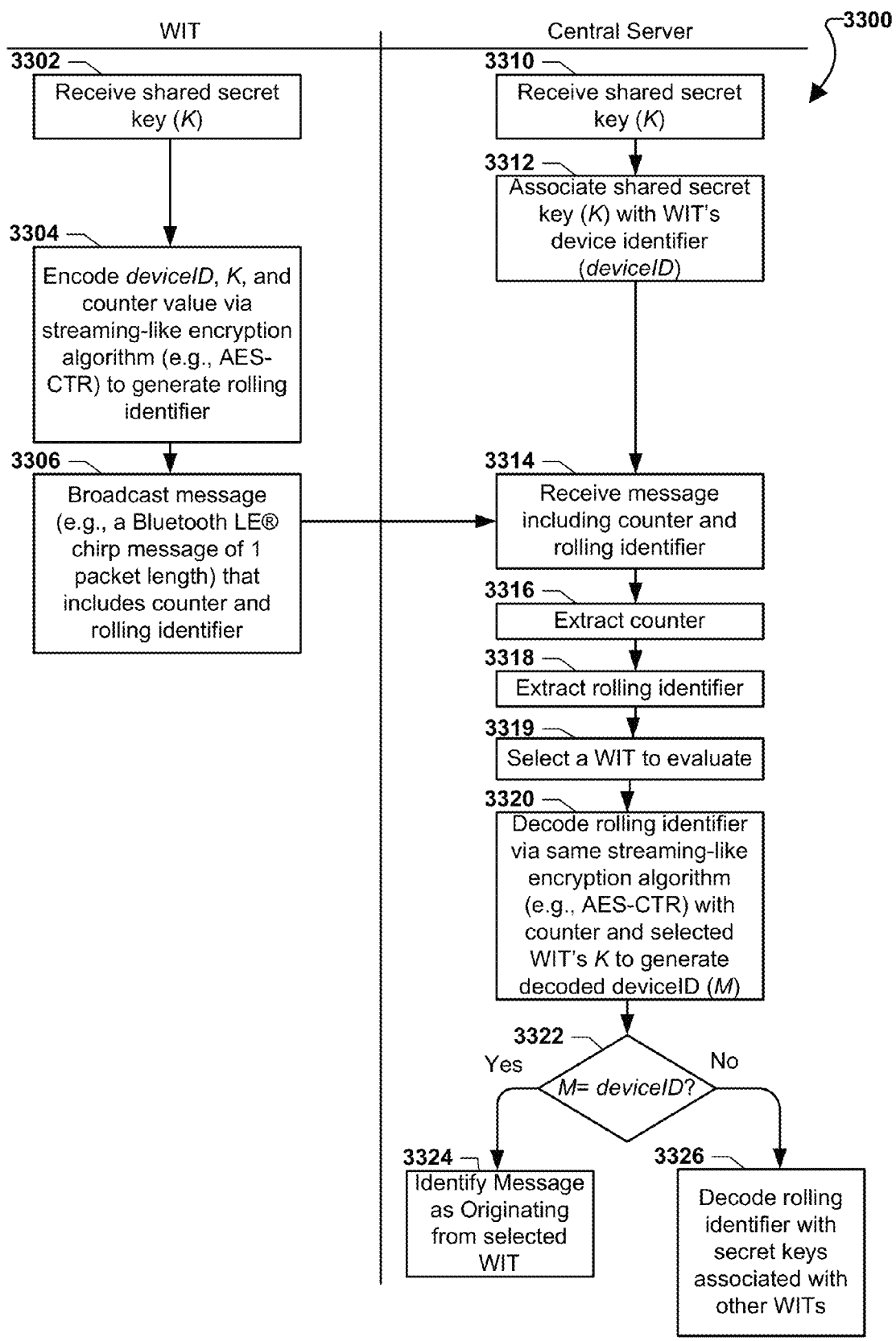
FIG. 33 is a process flow diagram illustrating embodiment operations by a wireless identity transmitter and a central server for transmitting and processing encrypted rolling identifiers.

FIG. 33 illustrates an embodiment method 3300 for a central server to identify a wireless identity transmitter indicated by encrypted data within a message broadcast by the wireless identity transmitter. In block 3302, the wireless identity transmitter may receive a shared secret key (i.e., "K"). In other words, the wireless identity transmitter may be pre-provisioned with a per-device shared secret key (K), such as during manufacturing. In another embodiment, the wireless identity transmitter may receive the secret key in a messages broadcast from a proximate proximity broadcast receiver, such as described above with reference to FIG. 4A. The secret key may be associated with the wireless identity transmitter's unique device identifier (i.e., deviceID) at the central server. In an embodiment, the secret key may be a 128 bit secret key.

In block 3304, the wireless identity transmitter may encode the device identifier (deviceID), secret key (K), and a nonce or counter value via a streaming-like encryption algorithm (e.g., AES-CTR encryption) to generate a rolling identifier. "AES-CTR" is one of the confidentiality modes recommended by the National Institute of Standards and Technology for implementations of the Advanced Encryption Standard (AES). In an embodiment, the wireless identity transmitter may include an AES coprocessor that is configured to support the "CTR" mode. In an embodiment, the rolling identifier may be represented by the following equation:

$$\text{Rolling identifier} = (\text{deviceID} \| \text{data}) \text{XOR}(\text{MSB}\_N(\text{AES}\_K(t)))$$

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits). This rolling identifier may then be included in the broadcast message that is regularly transmitted by the wireless transmitter device. In an embodiment, other device data (e.g., battery level, temperature, etc.) may be transmitted along with the rolling identifier in a broadcast packet.

In a further embodiment, other information may be included within the rolling identifier. Thus, in addition to providing an obscured identifier for the wireless identity transmitter, the rolling identifier field may include obscured data that only the central server can recover. One method for accomplishing this is to concatenate the additional information, such as a few bits to indicate the battery status (bat_stat) to the device identifier (deviceID) and applying the XOR function to the concatenation. The amount of additional information (i.e., number of bits of information) that can be included within (i.e., obscured within the same data field of) the rolling identifier is limited by the length N of significant bits within the rolling identifier field. Thus, if more bits are available in the data portion carrying the rolling identifier, more such data may be included within the encrypted rolling identifier. Since the data that is included within the rolling identifier is likely to change over time, this approach may further obscure the device's identity.

If more data is desired to be transmitted in broadcast messages, some of that data may be carried in the clear or encrypted with the data. There are a number of approaches for including data (e.g., battery state, temperature, etc.) within broadcast messages. In addition to including the data within the rolling identifier as described above, the data may be added by concatenating the data to the end of the rolling identifier as part of the manufacturer specific data payload, either before or after the rolling identifier, as sensor data in the clear. Thus, if there are more bits available in the manufacturer specific data payload they may be used to convey the data in the clear. Alternatively, the data may be encoded using the same key as used to generate the rolling identifier or an alternate key that is known to the server to be associated with the wireless identity transmitter or such data fields. In this alternative, the information in the rolling identifier enables the server to both determine the device's true identifier and the encryption key used to encrypt the other data included in the message. In yet a further embodiment, these options for carrying other data may be combined, such that some of it is included within the rolling identifier, some is carried in the clear and/or some data may be encrypted and included within the broadcast message.

In an embodiment, the broadcast message (or the payload of the broadcast message) may also include some device or sensor data (e.g., battery state, temperature, etc.) that may be encoded along with the device identifier using a process represented by the following equation:

$$\text{Rolling identifier} = (\text{deviceID} \| \text{bat\_stat}) \text{XOR}(\text{MSB}\_N(\text{AES}\_K(t)))$$

where 'bat_stat' is the battery status information of the wireless identity transmitter (e.g., a 4-bit code), and '||' means concatenation.

As an example embodiment in which the battery status is included within the rolling identifier, the broadcast message (or the payload of the broadcast message) may be represented by the following equation:

$$\text{Payload} = t \| (\text{deviceID} \| \text{bat\_stat}) \text{XOR}(\text{MSB}\_N(\text{AES}\_K(t)))$$

where t is the value of the wireless identity transmitter's nonce, which may just be the nonce or counter (e.g., a 20 bit value), 'bat_stat' is the battery status information of the device (e.g., a 4-bit code), '||' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce in the clear (i.e., not encrypted) in addition to a rolling identifier that includes a battery level indicator. In another embodiment, the battery level indicator (i.e., bat_stat) may not be encrypted, and may be included in another field of the broadcast message, such as within the service universally unique identifier (UUID) portion of a message.

In another embodiment, the payload may not include a nonce t, in which case the payload may be represented by the following equation:

$$\text{Payload} = (\text{deviceID} \| \text{bat\_stat}) \text{XOR}(\text{MSB}\_N(\text{AES}\_K(t))).$$

In block 3306, the wireless identity transmitter may then broadcast a message that includes the nonce and the rolling identifier, or simply the rolling identifier (i.e., without a nonce). In an embodiment, the broadcast message may be a single packet length Bluetooth LE® chirp message. In various embodiments, the nonce included in the broadcast message may be 20 bits and the rolling identifier may be 60 bits, so that the entire broadcast message is 80 bits.

In block 3310, the central server may receive the shared secret key (K), such as during the account creation operations described above with reference to FIG. 14. For example, the central server may generate the secret key in response to receiving account registration information from the user of the wireless identity transmitter (e.g., deviceID and registration request information). In block 3312, the central server may associate the shared secret key (i.e., K) with the wireless identity transmitter's device identifier (i.e., deviceID). For example, the central server may store the deviceID and K in a data table of registered devices.

In block 3314, the central server may receive a message including the nonce or counter and the rolling identifier. For example, the received message may be a sighting message from a proximity broadcast receiver that includes the information broadcast by the wireless identity transmitter with the operations in block 3306. In block 3316, the central server may extract the nonce or counter from the received message, and in block 3318 may extract the rolling identifier. In block 3319, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 3320, the central server may decode the rolling identifier via the same streaming-like encryption algorithm (e.g., AES-CTR) with the nonce or counter and the selected wireless identity transmitter's secret key (K) to generate a decoded device identifier (or M). For example, the central server may perform a decoding operation based on the AES-CTR algorithm that uses the rolling identifier as input along with the selected wireless identity transmitter's secret key (K) and the nonce or counter indicated in the received message.

In an embodiment, the decoded device identifier (M) may be represented by the following equation:

$$M=(\text{rolling identifier})\text{XOR}(\text{MSB}\_\{N-a\}(\text{AES}\_K(t))),$$

where t is the value of the wireless identity transmitter's nonce or counter (e.g., a 20 bit value), 'XOR' denotes the bitwise exclusive-or operation, 'AES_K( )' is the AES block cipher with key 'K', and 'MSB_{N–a}' means the 'N–a' most significant bits (e.g., 56 bits when a is 4 bits and N is 60 bits).

In determination block 3322, the central server may determine whether the decoded device identifier (M) and the deviceID match. In other words, the central server may compare the decoded device identifier (M) to the deviceID for the selected wireless identity transmitter whose secret key (K) was used with the AES-CTR algorithm operations to obtain the decoded device identifier (M). If M and the deviceID do match (i.e., determination block 3322="Yes"), in block 3324, the central server may identify the broadcast message as originating from the selected wireless identity transmitter. If M and the deviceID do not match (i.e., determination block 3322="No"), in block 3326 the central server may decode the rolling identifier with secret keys associated with other wireless identity transmitters. For example, the central server may select the next registered wireless identity transmitter and use the corresponding stored pair of a secret key (K) and corresponding deviceID. In this manner, all K and deviceID pairs stored for all registered wireless identity transmitters and/or users of the system may be tried by the central server until a match is found that identifies the originator of the broadcast message.

Figure 34A:
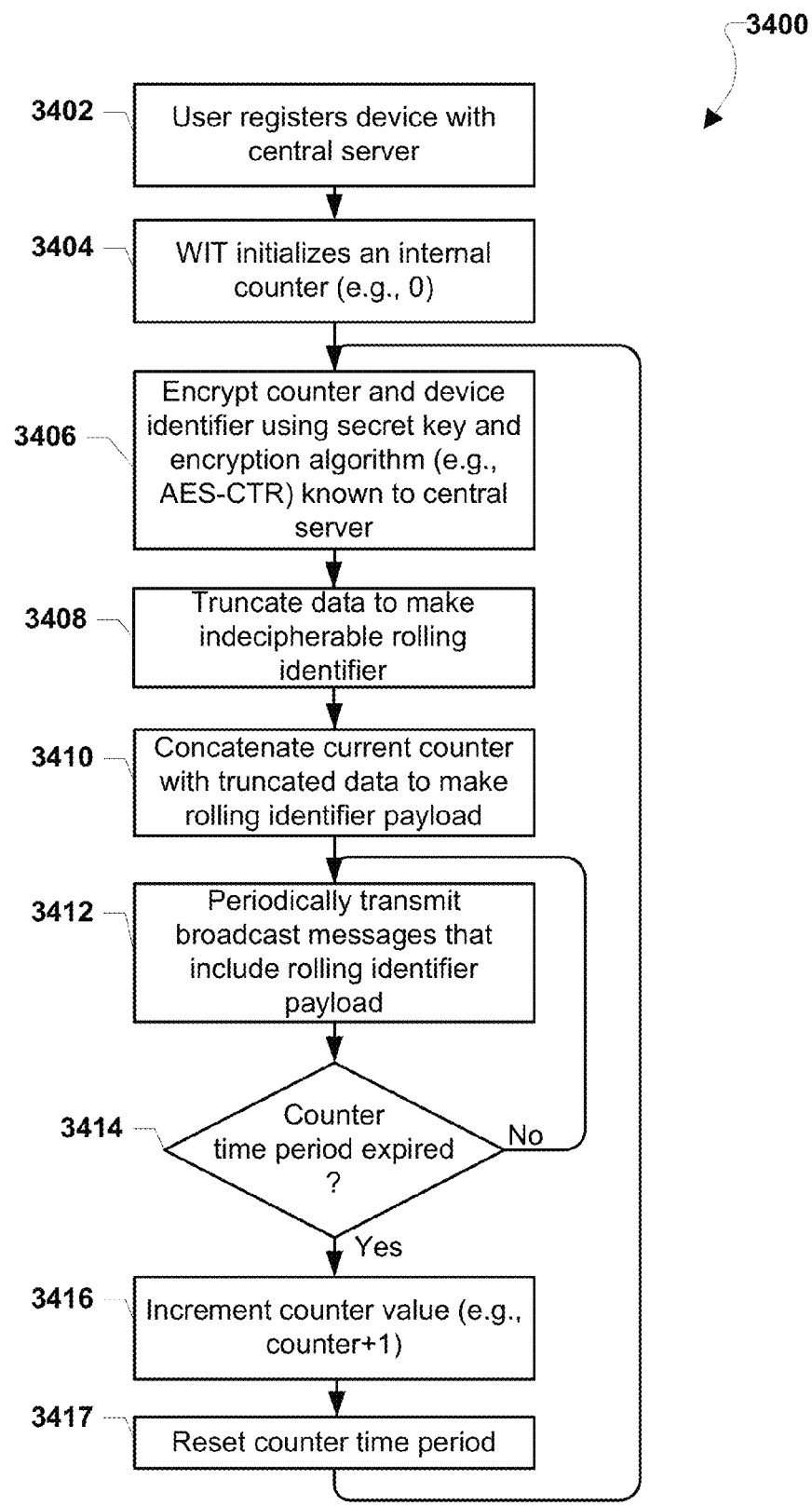
FIG. 34A is a process flow diagram illustrating an embodiment method for a wireless identity transmitter generating and broadcasting rolling identifier payloads.

FIG. 34A illustrates the embodiment method 3400 for a wireless identity transmitter generating and broadcasting an encrypted message (i.e., a rolling identifier) for receipt/use by a central server.

In block 3402, a user of the wireless identity transmitter may register the device with the central server. The services the wireless identity transmitter utilizes may require registrations of all active devices employed by users (e.g., consumers, proprietors, etc.). The registration process may include an initial synchronization with the central server by the user of the wireless identity transmitter. For example, the user of the wireless identity transmitter may register the device with the central server through a Web application, in a mobile device or a PC able to receive wireless identity transmitter messages and operated by the user. The wireless identity transmitter may be required to be registered with the central server within a certain time period from activation of the device. For example, the wireless identity transmitter may be required to be registered within the first 24 hours after the device is initiated (e.g., a battery is placed within the wireless identity transmitter). Registration operations are further described above with reference to FIG. 14.

In block 3404, the wireless identity transmitter may initialize an internal nonce or counter, such as by setting the nonce or counter to a zero value. The nonce or counter initialization may occur due to a triggering event, such as the placement of a battery or power source within the wireless identity transmitter. For example, the nonce or counter may begin incrementing once the wireless identity transmitter is activated or powered on. Alternatively, the initialization may occur in response to registration operations described above. The nonce or counter may begin with '0' (or any other starting value, such as '1') and may be incremented periodically by the wireless identity transmitter. In an embodiment, when the battery of the wireless identity transmitter is replaced (e.g., due to battery failure) or the wireless identity transmitter is otherwise reset/restarted/rebooted, the nonce or counter may return to the initial value (e.g., '0'). The nonce or counter may not repeat the value it represents unless the wireless identity transmitter is reset/restarted/rebooted. In an alternative embodiment, during initialization of the nonce or counter, the wireless identity transmitter may read from flash memory a predefined initial nonce or counter value. For example, the wireless identity transmitter may initialize the nonce or counter with a value set at a factory or updated by an installed application.

In an embodiment, the counter or nonce may be initialized and adjusted in a random or pseudo-random fashion using methods well known in the art. The nonce or counter may be a pseudo-randomly generated value that can be replicated in both the wireless identity transmitter and the central server. In another embodiment, the nonce or counter may be generated by the wireless identity transmitter using a linear feedback shift register (LFSR) with a proper period configured to create nonce or counter values that do not repeat during the lifetime of the device. Such nonces or counters derived from the LFSR may also be pseudo-random.

In block 3406, the wireless identity transmitter may encrypt the concatenated data using a secret key and encryption algorithm known to the central server. For example, the wireless identity transmitter may encode the nonce or counter and/or the device identifier (i.e., deviceID) using an AES-CTR block cipher. The encryption algorithm may utilize the secret key for encryption and decryption purposes, as the secret key is known by both the central server and wireless identity transmitter. The encryption algorithm may result in encrypted (or encoded) data of a certain size. For example, using the AES-CTR cipher, the wireless identity transmitter may generate encoded data of 128-bits. In an embodiment, the wireless identity transmitter may generate encrypted data represented by the following equation:

$$(\text{deviceID}\|\text{bat\_stat})\text{XOR}(\text{MSB\_N}(\text{AES\_K}(t))),$$

where t is the value of the wireless identity transmitter's nonce or counter (e.g., a 20 bit value), 'bat_stat' is the battery status information of the wireless identity transmitter (e.g., a 4-bit code), '||' means concatenation, 'XOR' denotes the bitwise exclusive-or operation, 'AES_K( )' is the AES block cipher with key 'K', and 'MSB_N( )' means the 'N' most significant bits (e.g., 60 bits). In other words, the embodiment broadcast message may include the nonce or counter in the clear (i.e., not encrypted) in addition to a rolling identifier that includes a battery level indicator. In another embodiment, the encrypted data may be represented by the following equation:

$$(\text{deviceID})\text{XOR}(\text{AES\_K}(t)),$$

where deviceID is a unique device identifier, t is the value of the wireless identity transmitter's nonce or counter (e.g., a 20 bit value), 'XOR' denotes the bitwise exclusive-or operation, 'AES_K( )' is the AES block cipher with key 'K', and 'MSB_N( )' means the 'N' most significant bits (e.g., 60 bits).

Due to the limited communication capabilities of the wireless identity transmitter, the payload of broadcast messages (e.g., the payloads supported by Bluetooth LE broadcast packets) may not be able to contain the entire encrypted message, but instead only include a portion of an encrypted piece of data. Accordingly, in block 3408, the wireless identity transmitter may truncate data to generate an indecipherable rolling identifier. In other words, by truncating the encrypted data, the wireless identity transmitter may create an identifier to be put in a broadcast message (or payload) such that the identifier's size may be supported by the utilized communication format, such as Bluetooth LE. For example, the wireless identity transmitter may truncate the encrypted data to fit within an 80-bit payload maximum size. When encrypted data is truncated, the decryption of that data within the central server may be impossible. However, the incomplete encrypted data may still be used by the central server as described below with reference to FIG. 34B. In an embodiment, truncation may be accomplished with a function, such as a most-significant-bit operation. In another embodiment, the truncated data may be represented by the following equation:

$$\text{TRUNC}(\text{deviceID XOR AES\_K}(t)),$$

where t is the value of the wireless identity transmitter's nonce or counter (e.g., a 20 bit value), 'XOR' denotes the bitwise exclusive-or operation, 'AES_K( )' is the AES block cipher with key 'K', and 'TRUNC ( )' denotes a truncation operations that may create a certain number of bits or bytes (e.g., 56 bits or 7 bytes).

In block 3410, the wireless identity transmitter may concatenate the current nonce or counter with the truncated data to make a message payload. For example, the wireless identity transmitter may combine the current wireless identity transmitter system clock value (e.g., 20 bits long) with the unique identification code of the wireless identity transmitter truncated to be 60 bits long. In an embodiment, the payload may include both encrypted data and unencrypted data (or "in the clear" data). For example, the payload may contain many bits representing the encrypted and/or truncated data and several other bits that represent the battery status of the wireless identity transmitter or a nonce or counter value.

In block 3412, the wireless identity transmitter may periodically transmit broadcast messages that include the payload with the rolling identifier, such as by broadcasting via short-range wireless communication techniques as described above. The frequency of transmissions of the broadcast messages may vary dependent upon system configurations, user settings, or any other source of scheduling and timing relevant for wireless identity transmitters communicating via radio signals. For example, the wireless identity transmitter may broadcast the rolling identifier every few seconds.

In determination block 3414, the wireless identity transmitter may determine whether a predefined nonce or counter time period has expired. This nonce or counter time period may be set in a similar manner as the broadcast frequency periodicity as described above. For example, the manufacturer or may establish the nonce or counter time period using various techniques, such as hard-coding variables within the wireless identity transmitter's processor circuitry.

If the nonce or counter time period has not expired (i.e., determination block 3414="No"), the wireless identity transmitter may continue with the operations in block 3412. For example, the wireless identity transmitter may broadcast the payload via short-range radio transmissions at a frequency of a few seconds for a time period of many minutes.

If the device determines the nonce or counter time period has expired (i.e., determination block 3414="Yes"), in block 3416 the wireless identity transmitter may increment the nonce or counter value, such as by adding 1. In block 3417, the wireless identity transmitter may reset the nonce or counter time period. For example, after a nonce or counter time period has expired, the wireless identity transmitter may increase the nonce or counter by a value of 1 and reset the nonce or counter time period to 0. The wireless identity transmitter may continue with the operations in block 3406 (e.g., the wireless identity transmitter may create a new payload and broadcast it for another nonce or counter time period).

Figure 34B:
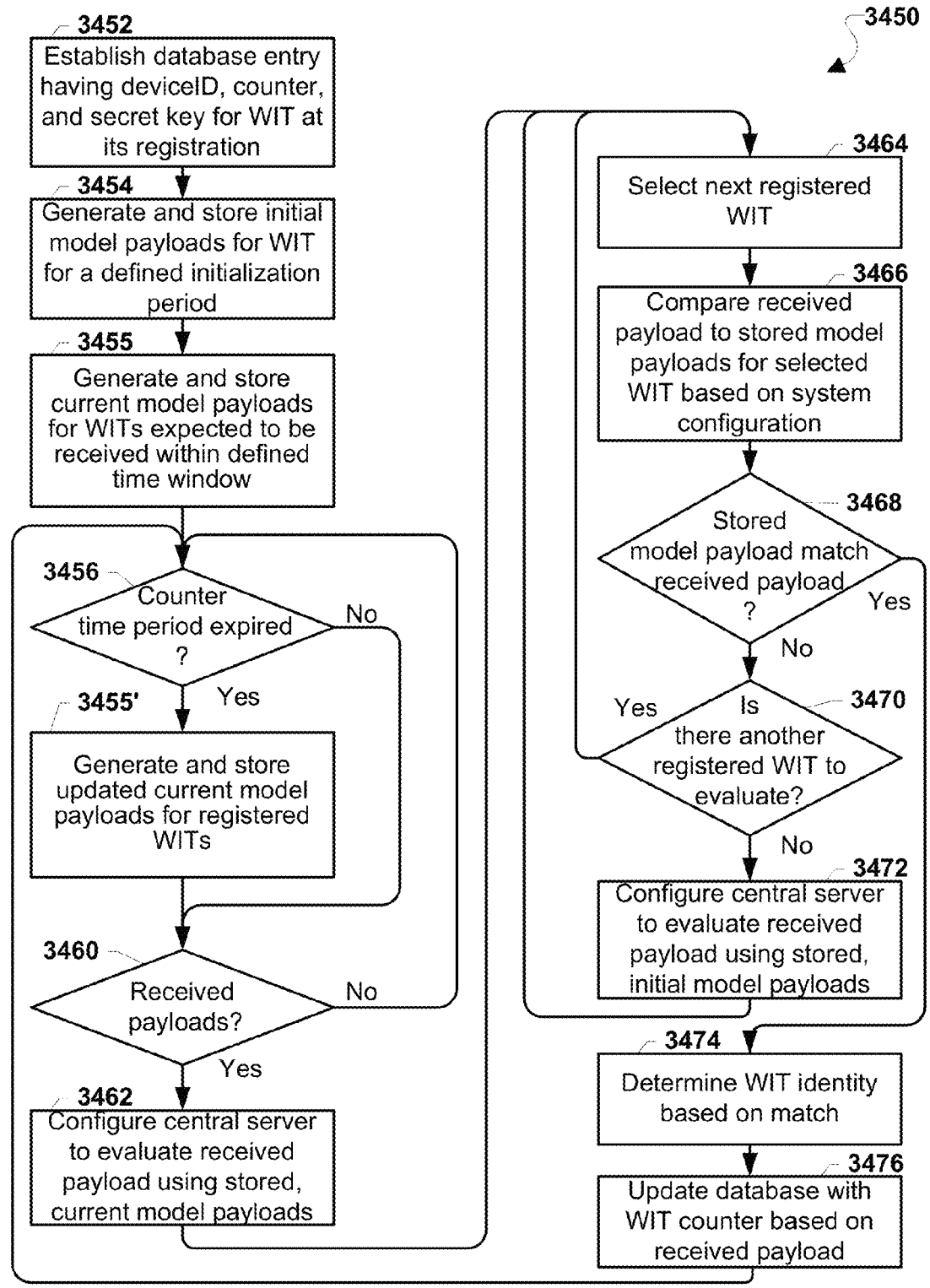
FIG. 34B a process flow diagram illustrating an embodiment method for a central server receiving and handling rolling identifier payloads.

FIG. 34B illustrates an embodiment method 3450 for a central server receiving messages and syncing timing nonce or counters based on payload information. In block 3452, the central server may establish a database entry having the device identifier (i.e., deviceID), nonce or counter, and secret key data for the wireless identity transmitter at its registration. The central server may maintain a database containing data records for each wireless identity transmitter associated with the central server and/or the central server's affiliated services. The database may be populated with information obtained via registration operations described above. Thus, there may be a data record for each wireless identity transmitter associated with the central server, and each record may contain information that represents a particular device's identification, its current nonce or counter (e.g., clock value), and a secret key associated with the wireless identity transmitter. In an embodiment, the secret key may be unique to each wireless identity transmitter registered with the central server. In an embodiment, the central server may also store the initial nonce or counter value for each wireless identity transmitter registered with the central server.

In various embodiments, when a wireless identity transmitter is registered, the central server may store the initial nonce or counter value for the wireless identity transmitter. Dependent upon the time between the activation of the wireless identity transmitter (e.g., when the battery was inserted and the device became operational) and the registration of the device, the initial nonce or counter for the wireless identity transmitter may or may not be 0. For example, if the registration of the wireless identity transmitter with the central server occurred several hours after a user inserted a battery in the wireless identity transmitter, the initial nonce or counter may not be 0. In an embodiment, the central server may also indicate the registration status of the wireless identity transmitter by setting a registration flag or other indicator and may store information describing wireless identity transmitters that have yet to be registered in the database. In an embodiment, the central server may maintain a database with initial values provided for all known wireless identity transmitter whether or not they have been registered. For example, based on manufacturing records, the central server may contain a database having information about every wireless identity transmitter created.

The central server may generate and store model payloads using operations similar to those described above with reference to blocks 3406-3410. Model payloads may be payloads the central server expects to receive from the wireless identity transmitter based on stored secret key, device identifier (deviceID), and nonce or counter information. For example, for each registered wireless identity transmitter, the central server may create a model payload by concatenating the device's deviceID to a nonce or counter value, encrypting the concatenated data using an encryption protocol that employs the secret key for the wireless identity transmitter, and truncating the encrypted data. Each model payload may be stored in a central server data table (or lookup table) in relation to the corresponding deviceID and nonce or counter values used to generate the respective model payloads. For example, for each model payload for each wireless identity transmitter, the central server may store in the data table the model payload, a time offset value (e.g., −2, −1, 1, 2, etc.), and the nonce or counter, all in relation to the deviceID of the wireless identity transmitter.

In block 3454, the central server may generate and store initial model payloads for the wireless identity transmitter for a defined initialization period. For example, starting at the initial nonce or counter value (e.g., 0 or a pseudo-random value known to the device and the central server), the central server may generate model payloads using nonce or counter values that are the same, lower, and/or higher than the actual initial nonce or counter of a wireless identity transmitter such that these model nonces or counters cover the initialization period. In an embodiment, the initialization period may be an hour, several hours, days, etc.). The central server may store the initial model payloads for use in the event of a registration/reset/reboot of a wireless identity transmitter.

In block 3455, the central server may also generate and store current model payloads for wireless identity transmitters expected to be received within a defined time window. To account for possible clock drift in wireless identity transmitters, the central server may generate and store model payloads for the defined time window (or time period) by using multiple derivative nonce or counter values that represent a range of possible nonces or counters. In other words, derivative nonce or counter values may be offsets to the current nonce or counter value stored for a wireless identity transmitter. For example, the central server may generate model payloads for derivative nonce or counter values that are lower and higher than the currently stored nonce or counter value in the database. A derivative nonce or counter value may be the result of an offset value (e.g., −2, −1, 1, 2, etc.) added to the stored nonce or counter value for a wireless identity transmitter. The central server may generate model payloads to represent the stored nonce or counter value and derivative nonce or counter values that incrementally represent the window time period. For example, the model payloads may represent nonces or counters increasing by a small time value, such as an hour, and covering a large period of time, such as multiple hours. As another example, the central server may store a payload corresponding to the current nonce or counter value stored for a wireless identity transmitter, a payload corresponding to the previous nonce or counter value for the device, and a payload corresponding to the next nonce or counter value for the device.

In an embodiment, the first generated current model payloads for a given wireless identity transmitter may be identical to the initial model payloads for the wireless identity transmitter as both sets of payloads may be generated by the central server based on the same initial nonce or counter values. In an embodiment, the initialization period may coincide with the defined time window. For example, the initialization period may involve a similar number of days, hours, minutes, etc. as the defined time window.

In determination block 3456, the central server may determine whether a nonce or counter time period has expired. The central server may initialize the evaluation of a nonce or counter time period at an arbitrary time or, alternatively, upon the receipt of a wireless identity transmitter registration. The nonce or counter time period may be the same period of time used by the wireless identity transmitters as described above with reference to determination block 3414.

If the nonce or counter time period has expired (i.e., determination block 3456="Yes"), in block 3455' the central server may generate and store updated current model payloads for registered wireless identity transmitters. The updated current model payloads may replace the previous current model payloads and may be based on the stored nonce or counter value in each respective wireless identity transmitter's database record.

If the nonce or counter time period has not expired (i.e., determination block 3456="No") or if the nonce or counter time period has expired and the central server has generated updated current model payloads, in determination block 3460, the central server may determine whether any payloads have been received. In an embodiment, payloads may be delivered directly from wireless identity transmitters or alternatively indirectly from proximity broadcast receivers via sighting messages which include (or relay) rolling identifier payloads from proximate wireless identity transmitters to the central server. If no payloads have been received (i.e., determination block 3460="No"), the central server may continue with the operations in determination block 3456.

If a payload has been received (i.e., determination block 3460="Yes"), in block 3462, the central server may be configured to evaluate the received payload using stored, current model payloads, such as the current model payloads stored for each registered wireless identity transmitter. As described above, the central server may maintain two sets of stored model payloads for each registered wireless identity transmitter, an initial model payload set that may include model payloads based on the initial nonce or counter and derivative nonce or counter values that span the initialization period, and a current model payload set that is based on the current nonce or counter value stored within the database record for each wireless identity transmitter. In an embodiment, the central server may set a system variable indicating the central server should compare the received payload to stored, current model payloads. The system variable may be set to direct the central server to evaluate either the current or initial model payloads for wireless identity transmitters.

In blocks 3464-3472, the central server may perform an operational loop in which the central server compares the received payload (i.e., data broadcast by the wireless identity transmitter) to stored model payloads for all registered wireless identity transmitters until a match is found. In block 3464, the central server may select a next registered wireless identity transmitter. The central server may determine the next registered device based on the database of registered wireless identity transmitters and may sequentially iterate through each device during the operations in blocks 3464-3472. In block 3466, the central server may compare the received payload to the stored model payloads for the selected wireless identity transmitter based on the system configuration, such as the configuration set in the operations in block 3462. For example, based on the system variable set to 'current' with the operations in block 3462, the central server may compare the received payload to stored current model payloads for the selected wireless identity transmitter. Based on the form of the encrypted data of the received payload, the comparison may be a pattern-matching routine in which the central server compares the data of the model payloads against the received payload. For example, the central server may compare the bit values for the stored and received payloads.

In determination block 3468, the central server may determine whether any of the stored model payloads match the received payload. If none of the stored model payloads match the received payload (i.e., determination block 3468="No"), in determination block 3470, the central server may determine whether there is another registered wireless identity transmitter to evaluate. In other words, the central server may determine whether the stored model payloads of all registered wireless identity transmitters have been evaluated. If there is another registered wireless identity transmitter to evaluate (i.e., determination block 3470="Yes"), the central server may continue by selecting the next registered wireless identity transmitter with the operations in block 3464.

If the central server has evaluated the stored model payloads of all registered wireless identity transmitters (i.e., determination block 3470="No"), in block 3472, the central server may be configured to evaluate the received payload using stored, initial model payloads, such as the initial model payloads stored for each registered wireless identity transmitter at the time of the devices' registration. For example, the central server may set a system variable indicating the central server should compare the received payload to stored, initial model payloads for evaluated registered wireless identity transmitters (e.g., the system variable may be set to 'initial'). The operational loop may then continue with the operations in blocks 3464-3468 wherein the central server may select each registered wireless identity transmitter and compare the initial model payloads of that selected device to the received payload.

If the central server does find a match between the received payload and any of the stored model payloads (current or initial) of a registered wireless identity transmitter (i.e., determination block 3468="Yes"), in block 3474, the central server may determine a wireless identity transmitter identity based on the match. In other words, the central server may identify the wireless identity transmitter corresponding to the received payload based on the identification information (e.g., deviceID) stored in relation to the matching stored model payload. In block 3476, the central server may update the database with the identified wireless identity transmitter's nonce or counter based on the received payload. Based on the database record corresponding to the matching stored model payload, the central server may determine the derivative nonce or counter value corresponding to the received payload and may update the stored nonce or counter value to represent the derivative nonce or counter value, thus syncing the identified wireless identity transmitter's nonce or counter and the central server nonce or counter. In an embodiment, the central server may also store in the database the central server nonce or counter (or time) at which the central server received the received payload.

In an embodiment, the central server may maintain a list (or data table) of recently received messages and the corresponding wireless identity transmitter identification. For example, the central server may record within a data table the deviceID and payload information for messages received within a certain period. The central server may compare any subsequently received payload to the data table to determine whether the subsequently received payload is redundant based on recently received payloads from the same wireless identity transmitter. For example, a subsequently received payload may represent a certain nonce or counter value from a particular wireless identity transmitter that was already received and processed by the central server a few minutes ago. This may expedite the method 3450 process and decrease search times for the operations in blocks 3464-3472. In an embodiment, the central server may expunge (or clear) the data table of recently identified payloads and wireless identity transmitters and may schedule the clearing operations similarly as described in block 3476 (e.g., the recent data table may be cleaned every time the nonce or counter time period is determined to be expired).

Figure 35:
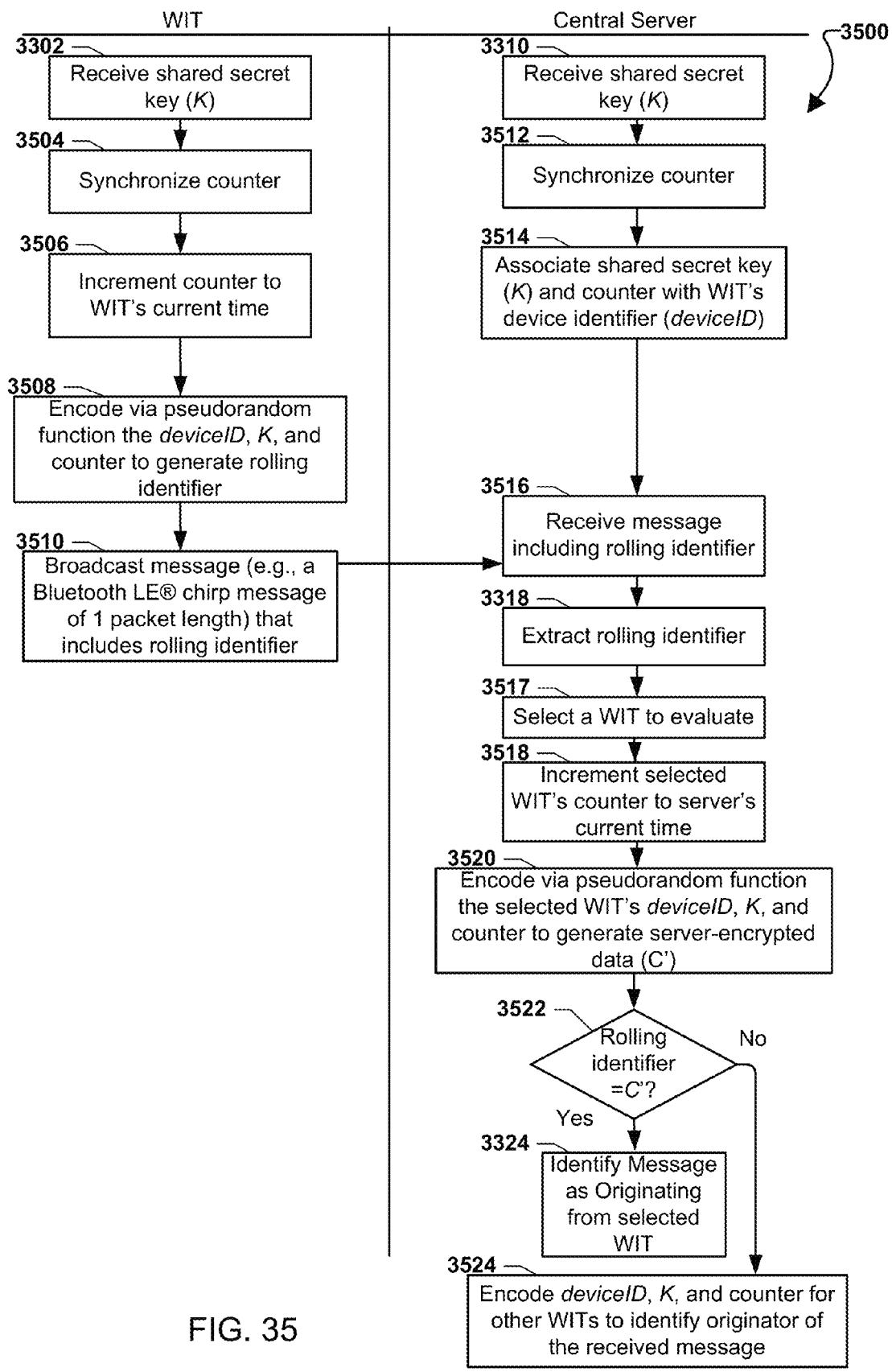
FIG. 35 is a process flow diagram illustrating embodiment operations by a wireless identity transmitter and a central server for transmitting and processing rolling identifiers using a pseudo-random function.

FIG. 35 illustrates another embodiment method 3500 for a central server to identify a wireless identity transmitter indicated by encrypted data within a message broadcast by the wireless identity transmitter. In the operations of the method 3500, nonce or counter values may never be included in broadcast messages to increase the security with which wireless identity transmitters transmit their identities. For example, as nonce or counter values may differ among different wireless identity transmitters, an attacker with the ability to capture a broadcast message may be able to easily predict values within future broadcast messages from the wireless identity transmitter. However, without nonce or counter data transmitted in the clear, nefarious snoopers may be better thwarted from following broadcasts from a particular wireless identity transmitter.

In block 3302, the wireless identity transmitter may receive a shared secret key (i.e., "K"). For example, each wireless identity transmitter may be pre-provisioned with a per-device shared secret key which is associated with the wireless identity transmitter's unique device identifier (or deviceID) at the central server. In block 3504, the wireless identity transmitter may synchronize a nonce or counter. The nonce or counter may be synchronized with the central server upon registration of the wireless identity transmitter at the central server. The synchronized nonce or counter value may also be associated with the deviceID and K in a data table stored in the central server (e.g., a table with stored pairs of IDs and K values).

In block 3506, the wireless identity transmitter may increment the nonce or counter to the wireless identity transmitter's current device time. For example, the nonce or counter may be incremented after a predefined number of seconds (e.g., one second, one hour, etc.). As another example, every 3600 seconds the wireless identity transmitter may increment the nonce or counter by one value. In this manner, the nonce or counter value may change to the current time as counted by the oscillator on the wireless identity transmitter. In block 3508, the wireless identity transmitter may encode via a pseudo-random function the device identifier (i.e., deviceID), the shared secret key (i.e., K), and the nonce or counter to generate a rolling identifier. In this manner, the rolling identifier may be generated as the nonce or counter value changes. In an embodiment, the pseudo-random function may be a polynomial time computable function with a seed ('s') and input variable ('x'), such that when the seed is randomly selected and not known to observers, the pseudo-random function (e.g., PRF(s, x)) may be computationally indistinguishable from a random function defined on the same domain with output to the same range. For example, the Keyed-Hash Message Authentication Code (HMAC) or the Cipher-Based Message Authentication Code (CMAC) may be used as the pseudo-random function.

In block 3510, the wireless identity transmitter may broadcast a message (e.g., a Bluetooth LE chrp message of 1 packet length) that includes the rolling identifier. In an embodiment, the broadcast message (or the payload of the broadcast message) may be represented by the following equation:

$$\text{Payload} = \text{MSB\_}N(\text{PRF}(K, (\text{deviceID} \| t)))$$

where t is the value of the wireless identity transmitter's nonce or counter, '||' means concatenation, 'PRF ( )' is the pseudo-random function, and 'MSB_N( )' means the 'N' most significant bits (e.g., 80 bits). In other words, the wireless identity transmitter may intentionally obscure (or skew) the device identifier and the nonce or counter information, thus the broadcast message's payload may not include either the device identifier or the nonce or counter information in the clear.

In block 3310, the central server may receive the shared secret key (K). In block 3512, the central server may synchronize a nonce or counter. For example, the nonce or counter may be set to represent a value included in a previous message related to the wireless identity transmitter, such as a registration message. In block 3514, the central server may associate the shared secret key (i.e., K) and nonce or counter with the wireless identity transmitter's device identifier (i.e., deviceID). For example, the central server may store the deviceID, K, and nonce or counter in a data table of registered devices (e.g., in a tuple record of a database). In an embodiment, the central server may also store an indicator or flag indicating whether each wireless identity transmitter has been registered or activated.

In block 3516, the central server may receive a message including the rolling identifier. For example, the received message may be a sighting message from a proximity broadcast receiver that includes the rolling identifier broadcast by the wireless identity transmitter with the operations in block 3510. In block 3318, the central server may extract the rolling identifier, such as by parsing the received message to identify the payload of the rolling identifier.

In block 3319, the central server may select a wireless identity transmitter (i.e., selected wireless identity transmitter) to evaluate. In other words, the central server may obtain a stored deviceID, K, and nonce or counter for a registered wireless identity transmitter known to the central server, such as from the database or data table storing such information for all registered wireless identity transmitters. In block 3518, the central server may increment the selected wireless identity transmitter's nonce or counter to the server's current time. In an embodiment, the central server may then increment the stored nonce or counter value to account for the time that has elapsed since the stored nonce or counter value was synchronized. As an example, the central server may compare the time of receipt of the message with the operations in block 3516 to the central server's current time (e.g., via a central server clock or time mechanism). Based on a known periodicity that wireless identity transmitters may increment their individual nonces or counters (e.g., once every hour), the central server may increment the selected nonce or counter value to account for the time difference.

In an embodiment, the central server may only increment the selected nonce or counter an amount that represents the time between broadcasts by a wireless identity transmitter. In other words, the central server may not increment the selected nonce or counter to include the time between receiving the message within the operations in block 3516 and the time a proximity broadcast receiver received the broadcast message. For example, the proximity broadcast receiver may have buffered broadcast messages before relaying sighting messages to the central server. The central server may calculate this time difference based on metadata within the message received with the operations in block 3516. For example, a sighting message from a proximity broadcast receiver may indicate when a broadcast message was received. Thus, the amount the selected nonce or counter is incremented may be based on when the proximity broadcast receiver actually received the broadcast message and not when the message from the proximity broadcast receiver was received by the central server.

In block 3520, the central server may encode via a pseudo-random function the selected wireless identity transmitter's device identifier, secret key, and nonce or counter to generate a server-encrypted data (i.e., C'). The pseudo-random function may be the same pseudo-random function utilized in the operations in block 3508. In an embodiment, the generated server-encrypted data may be represented by the following equation:

$$C' = \text{MSB\_}N(\text{PRF}(\text{sel\_}K, (\text{sel\_deviceID} \| \text{sel\_}t)))),$$

where sel_K is the value of the selected wireless identity transmitter's secret key, sel_deviceID is the value of the selected wireless identity transmitter's unique device identifier, sel_t is the value of the selected wireless identity transmitter's nonce or counter, '||' means concatenation, 'PRF ( )' is the pseudo-random function, and 'MSB_N( )' means the 'N' most significant bits (e.g., 60 bits, 74 bits, 80 bits, etc.).

In determination block 3522, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 3522="Yes"), in block 3324 the central server may identify the received message as originating from the selected wireless identity transmitter (e.g., corresponding to the selected wireless identity transmitter's unique identifier).

If the rolling identifier and the generated data do not match (i.e., determination block 3522="No"), in block 3524 the central server may encode device identifiers, secret keys, and nonces or counters for other wireless identity transmitters to identify the originator of the received message. In other words, the central server may select the next stored deviceID, nonce or counter, and K group from the database, increment that selected nonce or counter value, encode the selected deviceID, nonce or counter, and K, and compare the generated encoded data to the received rolling identifier until a match is found and the identity of the originator of the rolling identifier in the received message is known.

In an embodiment, when the wireless identity transmitter's battery has been removed and re-installed, the latest nonce or counter value may be persisted in the non-volatile memory of the wireless identity transmitter, so that the nonce or counter value can be read back from the non-volatile memory of the wireless identity transmitter when the battery is removed and then put back in. Alternatively, if no non-volatile memory is available or is not used, the wireless identity transmitter may fall back to the initial nonce or counter value after a battery re-installation. The central server may be required to be modified slightly to accommodate such a "counter synchronization". More specifically, in addition to trying values greater than the largest nonce or counter value for the pre-computed counter or nonce list, the central server may also try values, such as (counter+i) where i=0, . . . , n, when a "counter synchronization" is performed. In this case, a wireless identity transmitter user may need to be informed that the battery needs to be re-installed when "counter synchronization" fails multiple times.

Figure 36A:
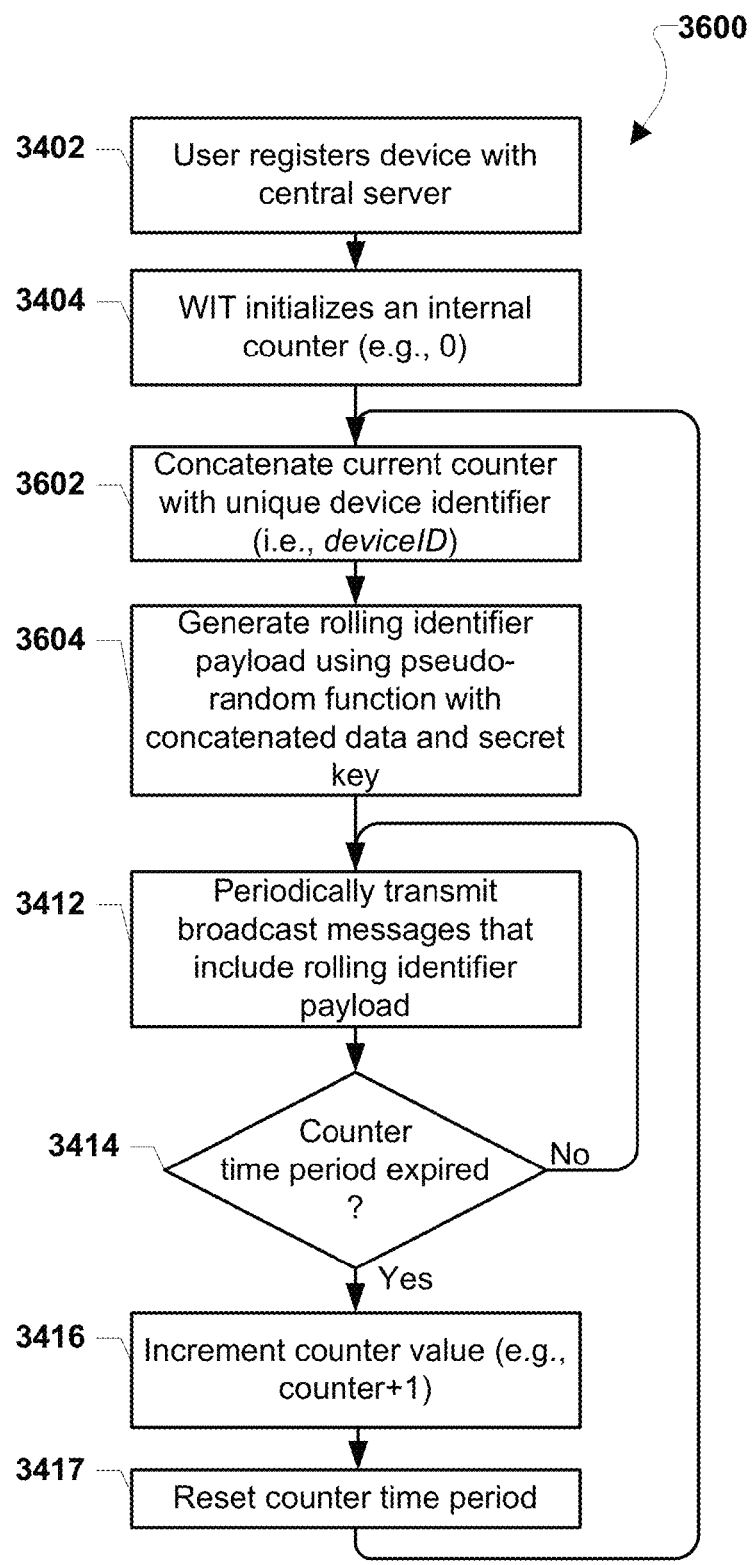
FIG. 36A is a process flow diagram illustrating an embodiment method for a wireless identity transmitter generating and broadcasting rolling identifier payloads using a pseudo-random function.

FIG. 36A illustrates an embodiment method 3600 for a wireless identity transmitter employing a pseudo-random function to generate a rolling identifier for broadcasting. The operations in the method 3600 may be similar to the embodiment method 3400 described above. However, instead of encrypting data, such as a nonce or counter value, with an AES-CTR encryption algorithm, the method 3600 may generate payloads based on the application of a pseudo-random function. As described above, the pseudo-random function and secret keys for each wireless identity transmitter may be known to both the corresponding wireless identity transmitter and a central server so that both may generate similar payloads based on similar data.

In block 3402, a user of the wireless identity transmitter may register the device with the central server. In block 3404, the wireless identity transmitter may initialize an internal nonce or counter, such as by setting the nonce or counter to a zero value. In block 3602, the wireless identity transmitter may concatenate the current nonce or counter with the wireless identity transmitter's unique device identifier (i.e., deviceID). In block 3604, the wireless identity transmitter may generate a payload with a rolling identifier using pseudo-random function with the concatenated data and the secret key. For example, the pseudo-random function may take as inputs the concatenated data (i.e., the deviceID+nonce/counter) and may use the secret key for the wireless identity transmitter as a randomness seed variable. The payload with the rolling identifier may include the output data from the pseudo-random function. In an embodiment, the payload with the rolling identifier may also include in-the-clear information regarding other aspects of the wireless identity transmitter. For example, the wireless identity transmitter may append to the payload several bits (e.g., 4 bits) of information which describe the battery status of the wireless identity transmitter. In an embodiment, the pseudo-random function may be a polynomial time computable function that is computationally indistinguishable from a random function defined on the same domain with output to the same range as the pseudo-random function. For example, the keyed hash Message Authentication Code (HMAC) or the Cipher-based Message Authentication Code (CMAC) may be used as the pseudo-random function. In an embodiment, the wireless identity transmitter may or may not perform a truncation operation to the generated rolling identifier payload. For example, the payload with the rolling identifier may be the result of performing a most-significant-bit operation on the results of the pseudo-random function.

In block 3412, the wireless identity transmitter may periodically transmit broadcast messages that include the payload with the rolling identifier, such as by broadcasting via short-range wireless communication techniques as described above. In determination block 3414, the wireless identity transmitter may determine whether a predefined nonce or counter time period has expired. If the nonce or counter time period has not expired (i.e., determination block 3414="No"), the wireless identity transmitter may continue with the operations in block 3412. If the device determines the nonce or counter time period has expired (i.e., determination block 3414="Yes"), in block 3416 the wireless identity transmitter may increment the nonce or counter value, such as by adding 1. In block 3417, the wireless identity transmitter may reset the nonce or counter time period, and may continue with the operations in block 3602.

Figure 36B:
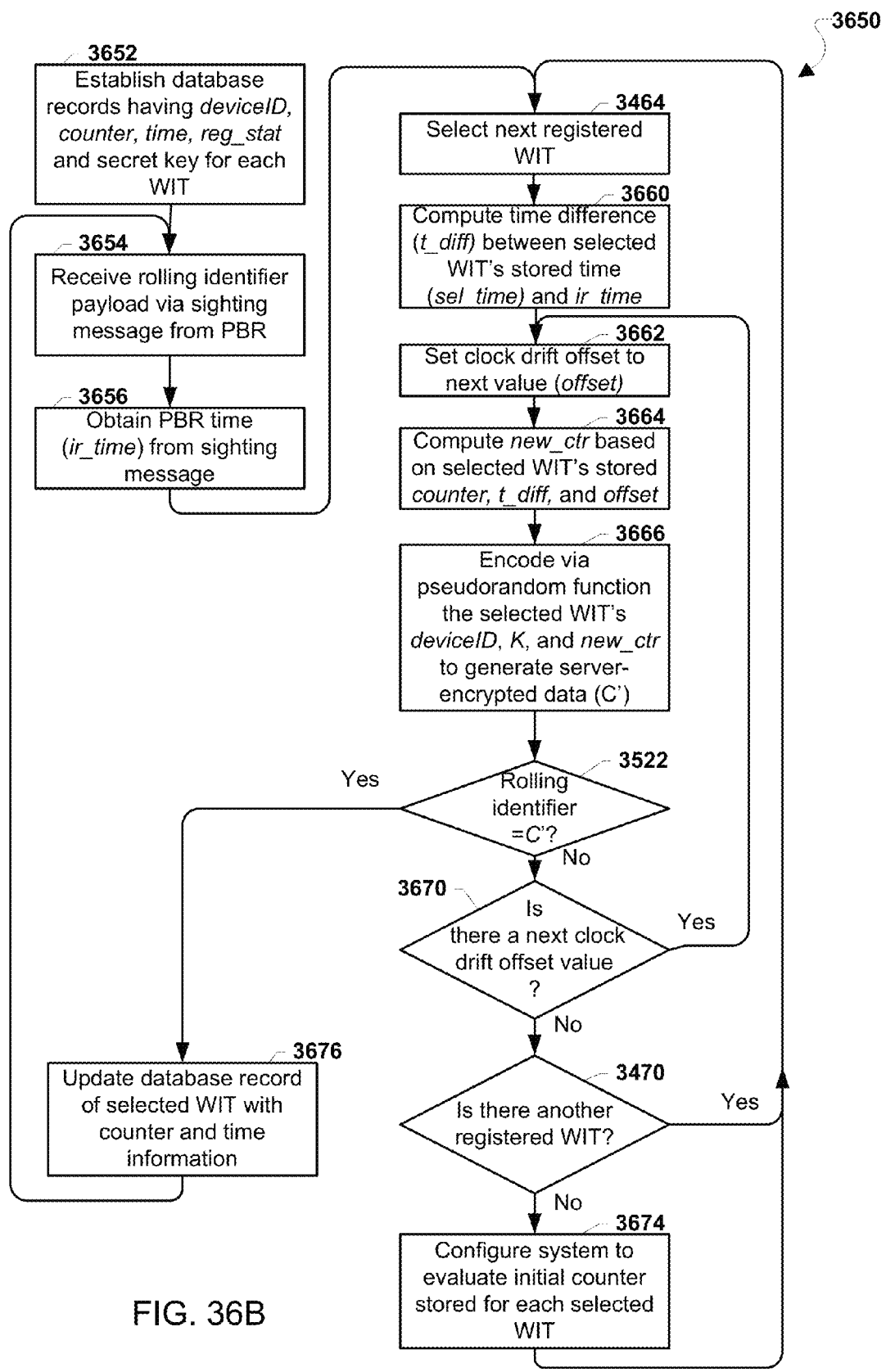
FIG. 36B a process flow diagram illustrating an embodiment method for a central server receiving and handling rolling identifier payloads using a pseudo-random function.

FIG. 36B illustrates an embodiment method 3650 for a central server responding to received messages containing pseudo-random function rolling identifiers. The embodiment method 3650 operations may be similar to the operations described above with reference to FIG. 34B, with the exception that the central server may compare outputs of a pseudo-random function with time-synchronized information stored in the central server to match payloads in messages received from wireless identity transmitters.

In block 3652, the central server may establish database records having device identifier (i.e., deviceID), nonce or counter, time, registration status (i.e., 'reg_stat'), and secret key (i.e., 'K') information for each wireless identity transmitter in a system. The time may indicate the last time the central server received a message corresponding to a particular wireless identity transmitter (e.g., a sighting message relaying a broadcast message), or in other words, the central server clock value at the moment when the nonce or counter value for a wireless identity transmitter was received/recorded in the database. It may be assumed that the period between when a wireless identity transmitter broadcasts a message with a rolling identifier (or rolling identifier payload) and when the central server receives the rolling identifier is very short. Thus, the stored nonce or counter and time values may be assumed to create a roughly accurate clock status of a wireless identity transmitter.

Additionally, once a wireless identity transmitter transmits registration information, the central server may indicate a valid registration by setting a registration flag in the database for the wireless identity transmitter (e.g. 'reg_stat'). The central server may query the database for all wireless identity transmitter records where the reg_stat indicates a valid registration has been conducted and may create data tables that include only registered wireless identity transmitters based on the reg_stat values.

In block 3654, the central server may receive a rolling identifier payload via a sighting message from a proximity broadcast receiver. The sighting message may have time information appended to the payload that describes the time at which the proximity broadcast receiver encountered the payload via a broadcast message from the respective wireless identity transmitter. For example, a payload may be received by a smartphone proximity broadcast receiver which in turn may append its own system clock reading to the payload information and transmit the data to the central server as a sighting message. The time measurement provided by the proximity broadcast receiver may be approximately synchronized with the central server system time. In an embodiment, the proximity broadcast receiver may append other additional information to the sighting message, such as location information (e.g., GPS coordinates) of the proximity broadcast receiver. In block 3656, the central server may obtain a proximity broadcast receiver time (i.e., 'ir_time') from the sighting message, such as indicated within the sighting message. For example, the central server may parse the sighting message and extract a time value indicating when the proximity broadcast receiver received a broadcast message that corresponds to the rolling identifier payload.

In blocks 3464-3674, the central server may perform an operational loop in which the central server may evaluate all registered wireless identity transmitters stored within the central server's database to find a device record that matches the received rolling identifier payload. In block 3464, the central server may select a next registered wireless identity transmitter. For example, the central server may iteratively select the next wireless identity transmitter represented in a data table of all wireless identity transmitters that have the reg_stat variable set to indicate registration occurred. The central server may sequentially iterate through such a data table or list for each device during the operations in blocks 3464-3674. In an embodiment, the central server may access a stored database record corresponding to the selected registered wireless identity transmitter that contains the current values for the information established with registration operations in block 3652.

In block 3660, the central server may compute the time difference (i.e., 't_diff') between the time indicated in the sighting message (ir_time) and the time stored within the database record of the selected registered wireless identity transmitter (i.e., 'sel_time'). For example, the t_diff value may be a non-zero or a zero value. This time difference may be a measure of the expected elapsed time between instances of the central server receiving payloads from the selected wireless identity transmitter.

In block 3662, the central server may set a clock drift offset (i.e., 'offset') to a next value. In general, the central server may account for possible wireless identity transmitter clock drift (e.g., inaccurate device system clock readings) by setting the clock drift offset value. The clock drift offset values may represent offsets that, when applied to nonce or counter values, may represent nonces or counters lower, the same, or higher than an expected nonce or counter value. In other words, the clock drift offsets may represent time before, during, or after the time represented by the current nonce or counter for the selected registered device. The clock drift offset value may be one of a sequence of clock drift offset values. In an embodiment, the clock drift offset value may be 0. In an embodiment, possible clock drift offset values may include numbers within a set {−N, . . . , −1, 0, 1, . . . , N}, where N is an arbitrary number.

In block 3664, the central server may compute an expected nonce or counter value (i.e., 'new_ctr') using the selected wireless identity transmitter's stored nonce or counter value, the computed time difference (i.e., t_diff) and the set offset value (i.e., offset). As described above, the nonce or counter may be stored within the selected registered wireless identity transmitter database record. For example, the central server may calculate new_ctr by adding the clock drift offset value to the sum of the t_diff value and the stored nonce or counter value.

In determination block 3666, the central server may encode via a pseudo-random function the selected wireless identity transmitter's device identifier, secret key, and computed nonce or counter (i.e., new_ctr) to generate a server-encrypted data (i.e., C'). The pseudo-random function may be the same pseudo-random function utilized by a wireless identity transmitter as described above with reference to FIG. 36A.

In determination block 3522, the central server may determine whether the generated server-encrypted data (C') is the same as the received rolling identifier. In other words, the central server may compare the received rolling identifier to the generated server-encrypted data to determine whether they match. If the rolling identifier and the generated server-encrypted data match (i.e., determination block 3522="Yes"), the central server may identify the received message as originating from the selected wireless identity transmitter (e.g., corresponding to the selected wireless identity transmitter's unique identifier). In an embodiment, the secret key (K) may be the seed value of the pseudo-random function. In an embodiment, the central server may concatenate the selected wireless identity transmitter's deviceID and the computed new_ctr value and provide that concatenated data to the pseudo-random function. The pseudo-random function may return (or output) encrypted data having a similar structure as received rolling identifier payload.

If the rolling identifier, such as received in the sighting message, and the generated server-encrypted data (i.e., C') match (i.e., determination block 3522="Yes"), in block 1276 the central server may update the database record of the selected wireless identity transmitter with the nonce or counter and time information, such as the new_ctr and the ir_time. For example, the central server may update the database record's time value to represent the time of receipt of the payload within the proximity broadcast receiver (e.g., ir_time) and may also update the stored nonce or counter value to represent the new_ctr value. The central server may continue with the operations in block 3654.

If the rolling identifier, such as received in the sighting message, and the generated server-encrypted data (i.e., C') do not match (i.e., determination block 3522="No"), the central server may determine whether there is a next clock drift offset value in determination block 3670. In other words, the central server may determine whether new_ctr values have been computed using all possible clock drift offset values (e.g., −1, 0, 1, etc.). If there is a next clock drift offset value (i.e., determination block 3670="Yes"), the central server may continue with the operations in block 3662. However, if there is not a next clock drift offset value (i.e., determination block 3670="No"), in determination block 3470, the central server may determine whether there is another registered wireless identity transmitter to evaluate. If there is another registered wireless identity transmitter to evaluate (i.e., determination block 3470="Yes"), the central server may continue with the operations in block 3464. However, if there is no other registered wireless identity transmitter (i.e., determination block 3470="No"), in block 3674 the central server may configure the system to evaluate initial nonce or counter values stored for each registered wireless identity transmitter. In an embodiment, the registration database described above may further include data that represents the initial nonce or counter value corresponding to each registered wireless identity transmitter. This initial nonce or counter value may be used if/when the various wireless identity transmitters are rebooted or otherwise reset their counters. For example, a wireless identity transmitter may operate and deliver payloads describing non-initial nonces or counters for a period of time before resetting its internal nonce or counter due to battery replacement. In such a scenario, the wireless identity transmitter may broadcast messages that include rolling identifier payloads based on reset nonce or counter information.

In another embodiment, the operations in block 3674 may be performed for individual registered selected devices during the operational loop in blocks 3662-3670, wherein the stored nonce or counter value in block 3664 may be replaced with the initial stored nonce or counter value. For example, once the central server determines a selected registered wireless identity transmitter's stored nonce or counter value with the various clock drift offset values cannot be used to generate encrypted data that matches the received rolling identifier payload, the central server may evaluate the initial stored nonce or counter value of the selected wireless identity transmitter before selecting the next registered wireless identity transmitter.

Figure 37A:
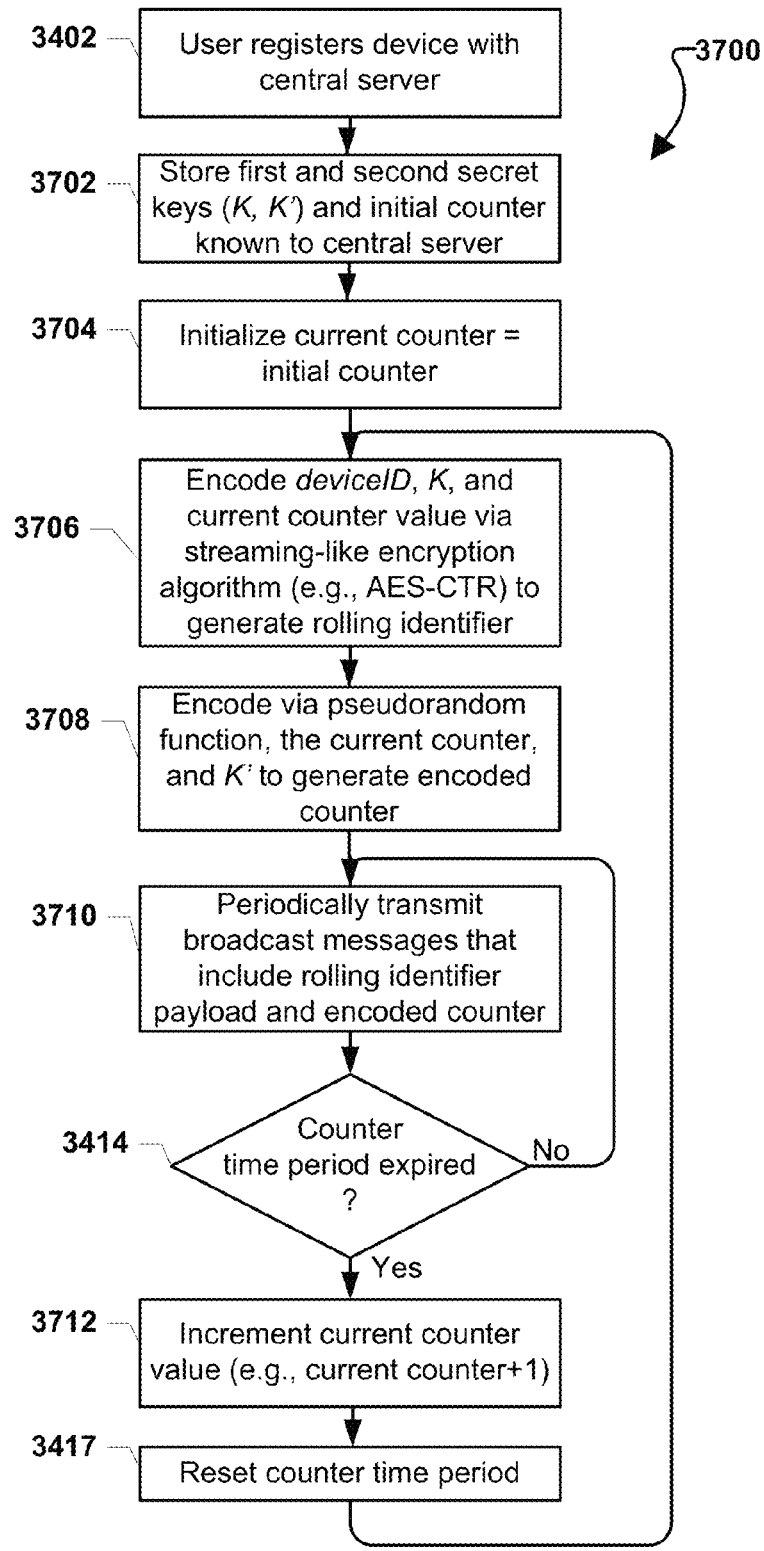
FIG. 37A is a process flow diagram illustrating an embodiment method for a wireless identity transmitter generating and broadcasting messages with rolling identifiers and encoded nonces or counters.

FIG. 37A illustrates an embodiment method 3700 for a wireless identity transmitter generating and broadcasting messages with rolling identifiers and encoded nonces or counters. The method 3700 may have operations performed by a wireless identity transmitter that are similar to those described above with reference to FIGS. 33, 34A, 35, and 36A. However, the method 3700 may involve broadcasting messages that include a rolling identifier (i.e., an encoded device identifier) as well as an encoded nonce or counter that may be evaluated separately by the central server with the operations described below with reference to FIG. 37B. In this manner, the wireless identity transmitter's nonce or counter value (or nonce) may not be sent in the clear in the payload of the broadcast message.

In block 3402, a user of the wireless identity transmitter may register the device with the central server. For example, the wireless identity transmitter may provide the unique device identifier (i.e., deviceID) to a central server for storage in a database of registered wireless identity transmitters. In block 3702, the wireless identity transmitter may store a first secret key (K) and a second secret key (K') and an initial nonce or counter that are known to the central server. For example, these values may be shared between the central server and the wireless identity transmitter during registration operations described in this disclosure. In block 3704, the wireless identity transmitter may initialize a current nonce or counter by setting it to the value of the initial nonce or counter value.

Similar to as described above with reference to FIG. 33, in block 3706, the wireless identity transmitter may encode the device identifier (deviceID), the first secret key (K), and the current nonce or counter via a streaming-like encryption algorithm (e.g., AES-CTR) to generate a rolling identifier. In block 3708, the wireless identity transmitter may encode via a pseudo-random function, the current nonce or counter, and the second secret key (K') to generate an encoded counter or nonce. In an embodiment, the encoded nonce or counter may be represented by the following equation:

$$\text{Encoded nonce/counter}=\text{MSB}\_M(\text{PRF}(K',t)),$$

where 'K'' is a per-device second secret key (usually different from the first per-device secret key K), 't' is the current nonce or counter, PRF ( )' is the pseudo-random function, and 'MSB_M( )' means the 'M' most significant bits (e.g., 20 bits).

In block 3710, the wireless identity transmitter may periodically transmit broadcast messages that include the payload with the rolling identifier and the encoded nonce or counter. In determination block 3414, the wireless identity transmitter may determine whether a predefined nonce or counter time period has expired. If the nonce or counter time period has not expired (i.e., determination block 3414="No"), the wireless identity transmitter may continue with the operations in block 3710. If the device determines the nonce or counter time period has expired (i.e., determination block 3414="Yes"), in block 3712 the wireless identity transmitter may increment the current nonce or counter value, such as by adding 1. In block 3417, the wireless identity transmitter may reset the nonce or counter time period and may continue with the operations in block 3706.

Figure 37B:
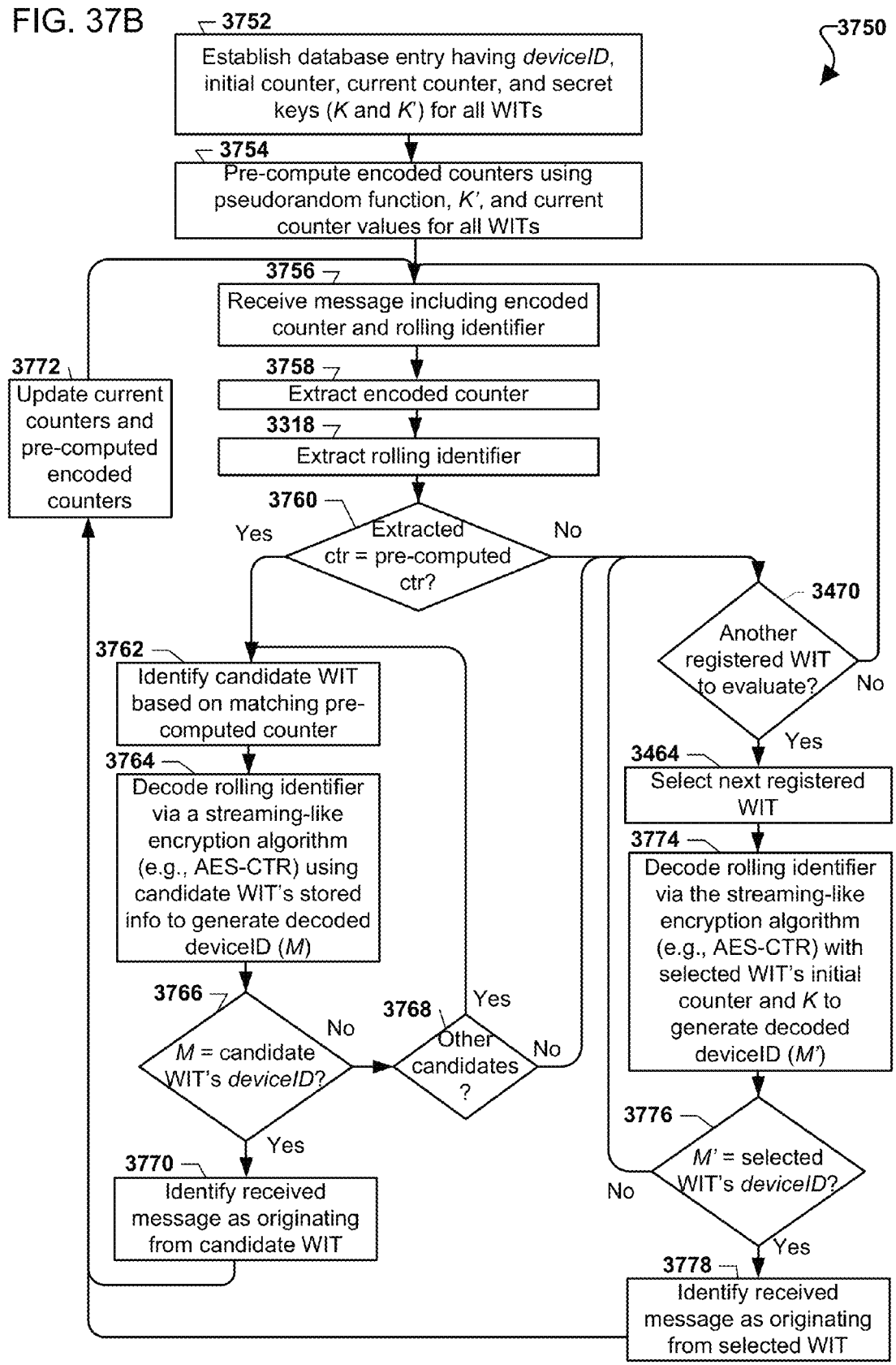
FIGS. 37B-37C are process flow diagrams illustrating embodiment methods for a central server receiving and handling messages including rolling identifiers and encoded nonces or counters.

FIG. 37B illustrates an embodiment method 3750 for a central server receiving and handling messages including rolling identifiers and encoded nonces or counters. The central server may perform the operations of method 3750 in combination or response to a wireless identity transmitter performing the method 3700 described above. The method may include two passes: a first pass wherein the central server attempts to identify a wireless identity transmitter based on an encoded nonce or counter within a received message (e.g., a sighting message), and a second pass wherein the central server attempts the identification based on a rolling identifier to within the received message In block 3752, the central server may establish a database entry having a device identifier (i.e., deviceID), initial nonce or counter, current nonce or counter, and secret keys (K and K') for all wireless identity transmitters in the system. The current nonce or counter values may be the same as the initial nonces or counters at the time of registration of wireless identity transmitters. In block 3754, the central server may pre-compute encoded nonces or counters using a pseudo-random function, the second secret key (K'), and current nonce or counter values for all wireless identity transmitters. For example, the central server may generate a plurality of encoded nonce or counter values for each registered wireless identity transmitter, such as one based on the current nonce or counter value, another based on a value one larger than the current counter value, etc. In an embodiment, the central server may pre-compute 24 encoded nonce or counters for each registered wireless identity transmitter. In an embodiment, the central server may store a separate list (or data table) of the pre-computed encoded nonces or counters for all registered wireless identity transmitters that also includes the device identifiers associated with each stored pre-computed encoded nonce or counter.

In block 3756, the central server may receive a message including an encoded nonce or counter and a rolling identifier, such as within a sighting message transmitted by a proximity broadcast receiver. In block 3758, the central server may extract an encoded nonce or counter from the received message, and in block 3318 may extract a rolling identifier from the received message. In determination block 3760, the central server may determine whether the extracted nonce or counter (or 'ctr') matches any of the pre-computed nonce or counters. For example, the central server may compare the encoded nonce or counter value extracted from the received message to the plurality of central server-encoded nonce or counter values for each registered wireless identity transmitter to identify any matches. If the extracted nonce or counter matches a pre-computed nonce or counter (i.e., determination block 3760="Yes"), in block 3762 the central server may identity a candidate wireless identity transmitter based on the matching pre-computed nonce or counter. In other words, the central server may identity the candidate as the deviceID stored in relation to the pre-computed nonce or counter in a data table in the central server. In block 3764, the central server may decode the rolling identifier via a streaming-like encryption algorithm (e.g., the same AES-CTR wireless identity transmitters use when performing the operations in FIG. 37A) using the candidate wireless identity transmitter's stored information (e.g., deviceID, secret key, etc.) to find a decoded device identifier (or M). In determination block 3766, the central server may determine whether the decoded device identifier (M) matches the candidate wireless identity transmitter's deviceID. Such a match may enable the central server to identify the wireless identity transmitter associated with that received rolling identifier without decoding the rolling identifier or the encoded nonce or counter value. If the deviceID and decoded identifier (M) match (i.e., determination block 3766="Yes"), in block 3770 the central server may identity the received message as originating from the candidate wireless identity transmitter. In block 3772, the central server may update current nonces or counters and pre-computed encoded nonces or counters. For example, the database entry for the wireless identity transmitter identified as the originator of the received message may be updated with new current nonce or counter information as well as new pre-computed encoded nonces or counters. Additionally, any stored lists of pre-computed encoded nonces or counters may have older pre-computed encoded nonces or counters removed at the same time newly computed encoded nonces or counters corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 3756.

If the deviceID and decoded identifier (M) do not match (i.e., determination block 3766="No"), in determination block 3768, the central server may determine whether there are other candidates, such as other registered wireless identity transmitters that have not been evaluated by the central server. If there are other candidates (i.e., determination block 3768="Yes"), the central server may continue with the operations in block 3762, such as by identifying the next wireless identity transmitter to evaluate regarding the rolling identifier.

If there are no other candidates (i.e., determination block 3768="No"), or if the extracted nonce or counter does not match the pre-computed nonce or counter (i.e., determination block 3760="No"), the central server may attempt to identify the originator of the received message by comparing the extracted rolling identifier to information associated with all registered wireless identity transmitters in the system. Thus, in determination block 3470 the central server may determine whether there is another registered wireless identity transmitter to evaluate. For example, the central server may iteratively use information of all registered wireless identity transmitters. If there is not another (i.e., determination block 3470="No"), the central server may continue with the operations in block 3756.

If there is another (i.e., determination block 3470="Yes"), in block 3464 the central server may select the next registered wireless identity transmitter. In block 3774, the central server may decode the rolling identifier via the streaming-like encryption algorithm (e.g., AES-CTR) with the selected wireless identity transmitter's initial nonce or counter and first secret key (K) to find a decoded device identifier (M'), similar to as described above with reference to FIG. 33. In determination block 3776, the central server may determine whether the decoded device identifier (M') matches the selected wireless identity transmitter's deviceID. If the identifiers do not match (i.e., determination block 3776="No"), the central server may continue with the operations in determination block 3470. However, if the identifiers match (i.e., determination block 3776="Yes"), in block 3778 the central server may identify the received messages as originating from the selected wireless identity transmitter, and may continue with the operations in block 3772.

Figure 37C:
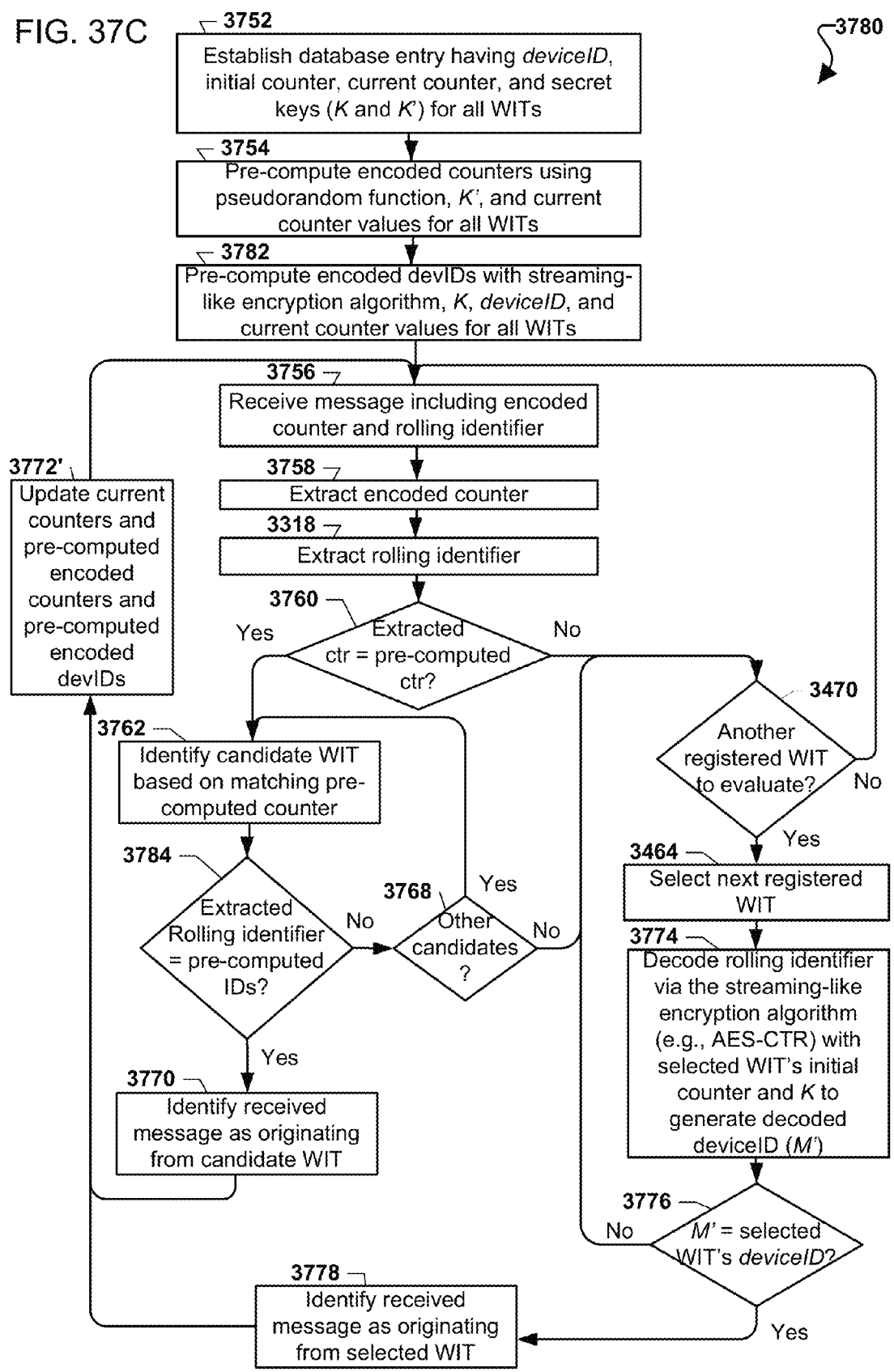

FIG. 37C illustrates an embodiment method 3780 for a central server receiving and handling messages including rolling identifiers and encoded nonces or counters. The operations of method 3780 are similar to the operations of method 3750, except that rather than perform a two pass process as discussed above in FIG. 37B, the central server may perform method 3780 as a one pass process. In particular, the central server may generate both a plurality of central server encrypted nonce or counter values for each registered wireless identity transmitter and a plurality of central server-encrypted device identifiers (i.e., deviceID).

The central server may use the data stored in the database for each wireless identity transmitter (e.g., deviceID, K, K', initial nonce or counter, and current nonce or counter) and the plurality of pre-computed nonce or counter values for each device to encode a plurality of central server encrypted nonce or counter values and a plurality of server encrypted device IDs. When the central server receives the sighting message including the rolling identifier and encoded nonce or counter, the central server may compare the plurality of central server encrypted nonce or counter values and the plurality of central server encoded device IDs to the rolling identifier and encoded nonce or counters obtained from the received sighting message. The device identifier of the wireless identity transmitter that originated the rolling identifier may then be identified based entirely on matching the pre-computed nonce or counter values and device identifiers without requiring actual decoding of the rolling identifier itself.

In block 3752, the central server may establish a database entry having a device identifier (i.e., deviceID), initial nonce or counter, current nonce or counter, and secret keys (K and K') for all wireless identity transmitters in the system. In block 3754, the central server may pre-compute encoded nonces or counters using a pseudo-random function, the second secret key (K'), and current nonce or counter values for all wireless identity transmitters. In block 3782, the central server may pre-compute encoded device identifiers with a streaming-like encryption algorithm (e.g., AES-CTR block cipher), the device identifier, current nonce or counter, and the first secret key (K) for all wireless identity transmitters. In other words, the central server may generate a plurality of encoded device identifiers for each registered wireless identity transmitter, such as by using the current nonce or counter and predefined offset nonce or counter values, or alternatively, only a single encoded device identifier based only on the current nonce or counter stored within the central server.

In block 3756, the central server may receive a message including an encoded nonce or counter and a rolling identifier, such as within a sighting message transmitted by a proximity broadcast receiver. In block 3758, the central server may extract an encoded nonce or counter from the received message, and in block 3318 may extract a rolling identifier from the received message. In determination block 3760, the central server may determine whether the extracted nonce or counter (or 'ctr') matches any of the pre-computed nonces or counters. If the extracted nonce or counter matches a pre-computed nonce or counter (i.e., determination block 3760="Yes"), in block 3762 the central server may identity a candidate wireless identity transmitter based on the matching pre-computed nonce or counter. In determination block 3784, the central server may determine whether the extracted rolling identifier matches any of the pre-computed identifiers, such as the pre-computing device identifiers for the candidate wireless identity transmitter.

If the extracted rolling identifier does match any of the pre-computed identifiers for the candidate wireless identity transmitter (i.e., determination block 3784="Yes"), in block 3770 the central server may identity the received message as originating from the candidate wireless identity transmitter. In block 3772', the central server may update current nonces or counters and pre-computed encoded nonces or counters and pre-computed encoded device identifiers. For example, the database entry for the wireless identity transmitter identified as the originator of the received message may be updated with new current nonce or counter information as well as new pre-computed encoded nonces or counters and pre-computed encoded device identifiers. Additionally, any stored lists of pre-computed encoded nonces or counters may have older pre-computed encoded nonces or counters or encoded device identifiers removed at the same time newly computed encoded nonces or counters or device identifiers corresponding to the identified wireless identity transmitter are added to the list. In another embodiment, if the wireless identity transmitter identified as the originator of the received message is indicated in the central server's database as "not activated" (i.e., a flag is not set), then the central server may also adjust the database to reflect that the identified wireless identity transmitter is now activated (e.g., set a flag). The central server may then continue with the operations in block 3756.

If the extracted rolling identifier does not match any of the pre-computed identifiers for the candidate wireless identity transmitter (i.e., determination block 3784="No"), in determination block 3768, the central server may determine whether there are other candidates, such as other registered wireless identity transmitters that have not been evaluated by the central server. If there are other candidates (i.e., determination block 3768="Yes"), the central server may continue with the operations in block 3762, such as by identifying the next wireless identity transmitter to evaluate regarding the rolling identifier.

If there are no other candidates (i.e., determination block 3768="No"), or if the extracted nonce or counter does not match the pre-computed nonce or counter (i.e., determination block 3760="No"), the central server may attempt to identify the originator of the received message by comparing the extracted rolling identifier to information associated with all registered wireless identity transmitters in the system. Thus, in determination block 3470 the central server may determine whether there is another registered wireless identity transmitter to evaluate. For example, the central server may iteratively use information of all registered wireless identity transmitters. If there is not another (i.e., determination block 3470="No"), the central server may continue with the operations in block 3756.

If there is another (i.e., determination block 3470="Yes"), in block 3464 the central server may select the next registered wireless identity transmitter. In block 3774, the central server may decode the rolling identifier via the streaming-like encryption algorithm (e.g., AES-CTR) with the selected wireless identity transmitter's initial nonce or counter and first secret key (K) to find a decoded device identifier (M'). In determination block 3776, the central server may determine whether the decoded device identifier (M') matches the selected wireless identity transmitter's deviceID. If the identifiers do not match (i.e., determination block 3776="No"), the central server may continue with the operations in determination block 3470. However, if the identifiers match (i.e., determination block 3776="Yes"), in block 3778 the central server may identify the received messages as originating from the selected wireless identity transmitter, and may continue with the operations in block 3772'.

Figure 38A:
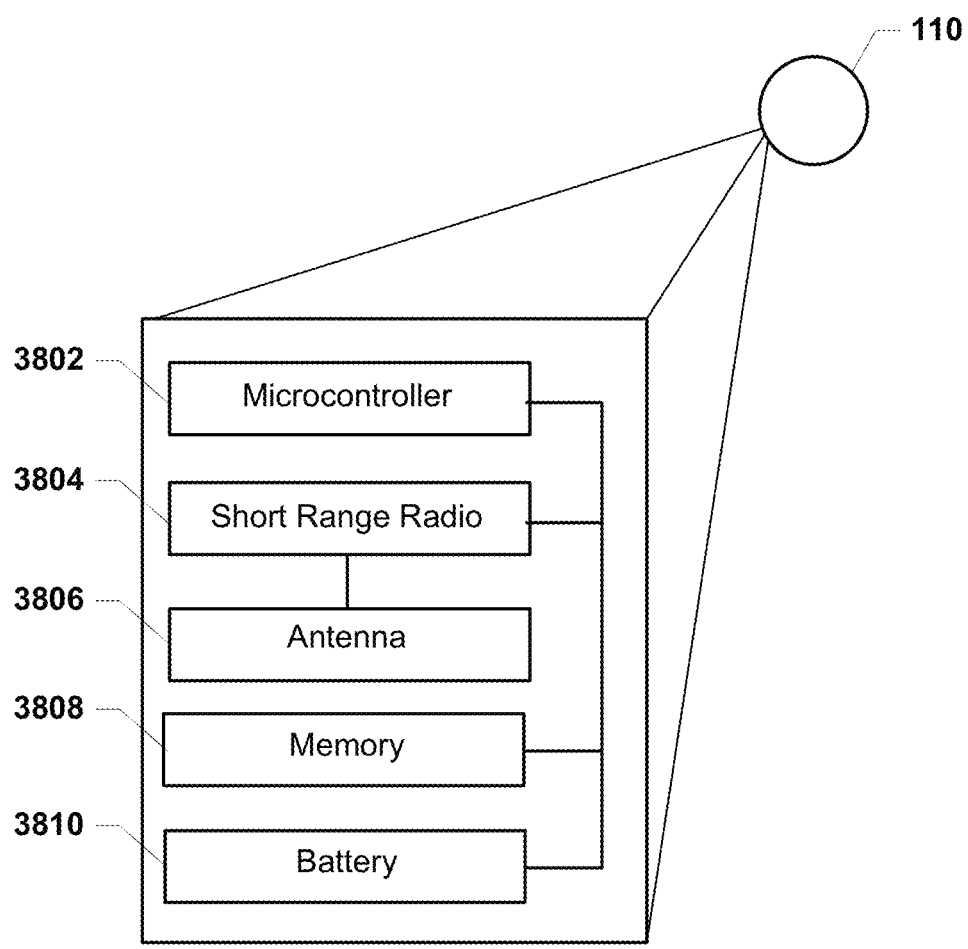
FIG. 38A is a component block diagram of a wireless identity transmitter in accordance with various embodiments.

FIG. 38A illustrates components of an exemplary wireless identity transmitter 110. The wireless identity transmitter 110 may include a microcontroller 3802, a short-range radio 3804 (e.g., a Bluetooth® radio or transceiver) coupled to an antenna 3806, a memory 3808, and a battery 3810. Although these components are shown linked by a common connection, they may be interconnected and configured in various ways. For example, a wireless identity transmitter 110 may be configured such that the microcontroller 3802 may determine when to transmit a message based on the contents of the memory 3808. In an embodiment, the microcontroller 3802 may be a Bluetooth system-on-chip unit. The memory 3808 may also include one or more messages or message portions to be transmitted by the short-range radio 3804 via the antenna 3806 based on commands from the microcontroller 3802. The battery 3810 may supply power as needed by the other components. Also, in some implementations the microcontroller 3802, the short-range radio 3804 and/or the memory 3808 may be integrated together as a single integrated circuit. Since these components may be microchips of standard or off-the-shelf configuration, they are represented in FIG. 38A as blocks consistent with the structure of an example embodiment.

The wireless identity transmitter 110 may be coupled with or built into various objects, such as a bracelet. For example, an exemplary wireless identity transmitter 110 may be in a form easily attached to a strap, such as a watchband or dog collar. Alternate embodiments may incorporate a wireless identity transmitter 110 into any other mobile objects that may need tracking.

The wireless identity transmitter 110 may conserve power by periodically entering a power saving mode or going to sleep, such as regularly alternating between sleeping and broadcasting of the packet with the wireless identity transmitter 110's identification code. Various embodiments may include different cycles of broadcasting and sleeping, such as some embodiments broadcasting more or less frequently, such as waking and broadcasting every few seconds or minutes between periods of sleep.

In an embodiment, the battery 3810 may be a replaceable coin cell battery. In another embodiment, the wireless identity transmitter 110 may utilize the antenna 3806 to receive update software, instructions, or other data for storage and use in configuration operations, such as configuring transmission intervals and/or transmissions power. The wireless identity transmitter 110 may also store and execute software, algorithms, instructions, code, or other routines for generating rolling codes or identifiers, as described above with reference to FIG. 3. In an embodiment, the wireless identity transmitter may not maintain time (e.g., UTC) information, but may instead use a 30 ppm 16 kHz crystal as a clock. Such use of a crystal as a clock may create a timing drift of approximately 40 seconds per year.

Figure 38B:
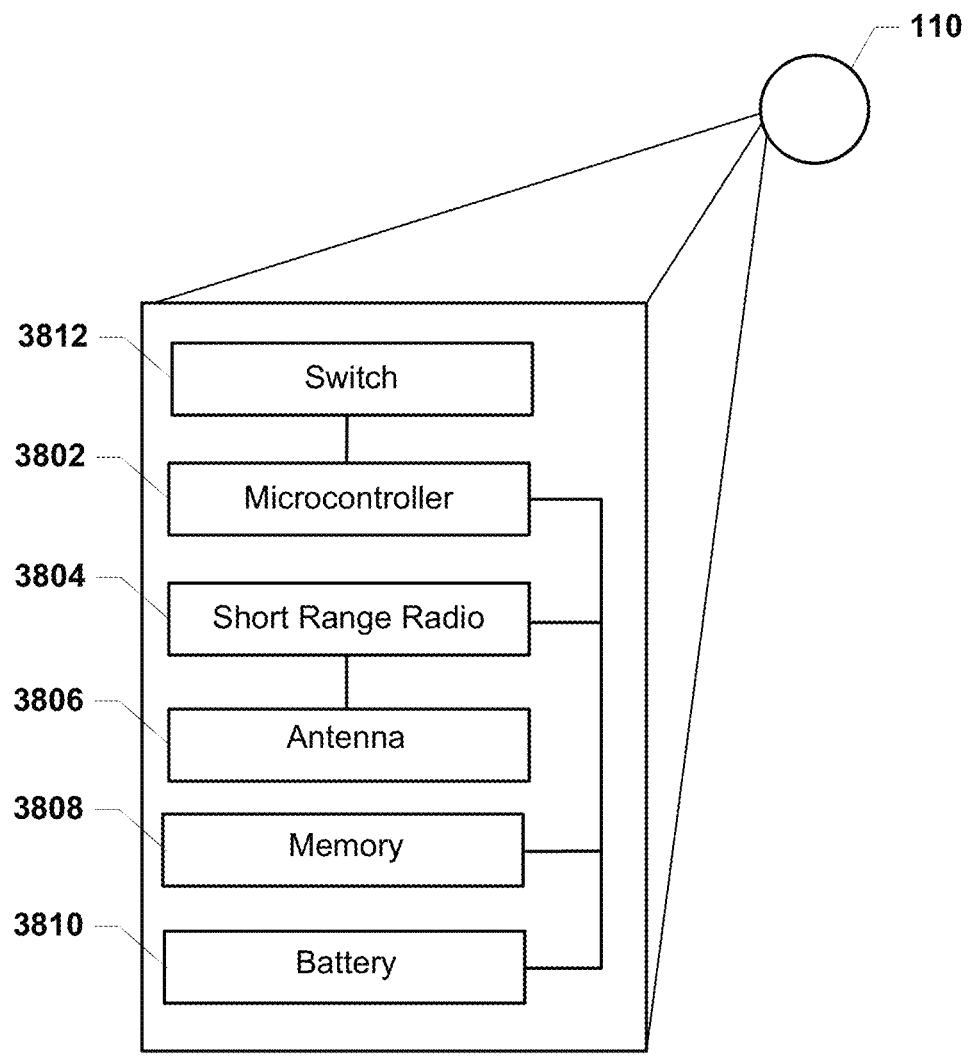
FIG. 38B is a component block diagram of a wireless identity transmitter with a switch in accordance with various embodiments.

FIG. 38B illustrates an embodiment wireless identity transmitter 110 which may include a microcontroller 3802, a short-range radio 3804 (e.g., a Bluetooth® radio or transceiver) coupled to an antenna 3806, a memory 3808, and a battery 3810 similar to the components discussed above with respect to FIG. 38A. In various embodiments, a wireless identity transmitter 110 may further include or be coupled with a switch 3812 or other means of activating the wireless identity transmitter 110 based on or in response to a triggering action. The switch 3812 may be any of a mercury switch, a mechanical switch, an electrical switch, a magnetic switch, a temperature-sensitive switch, an acceleration-activated switch, and a pressure-sensitive switch. Prior to the triggering action, the wireless identity transmitter 110 may remain off and conserve power.

In an embodiment, the switch 3812 may be an activation switch that is be coupled with one or more components, such as the microcontroller 3802, and configured to activate the wireless identity transmitter 110 in response to some action or event. The activation switch may be any of a mercury switch, a mechanical switch, an electrical switch, a magnetic switch, a temperature-sensitive switch, an acceleration-activated switch, and a pressure-sensitive switch. Once activated, the wireless identity transmitter 110 may begin broadcasting an identifier as described above. The switch 3812 may be configured so that it may be repositioned (e.g., opened) to deactivate the wireless identity transmitter 110 when it is located. Alternatively, the switch 3812 may be configured so that once activated the wireless identity transmitter 110 cannot be deactivated, at least not by means of the switch 3812.

As mentioned above, the switch 3812 may be any of a variety of switches designed to respond to a variety of different triggering events. Some examples of types of switches 3812 that may be implemented in this embodiment include: a mercury switch which may close in response to the device being moved or tilted; a magnetic switch that may be activated with the device is removed from a magnetic field (e.g., when the device is moved away from a magnet); a magnetic switch that may be activate when a magnetic field is applied to the device (e.g., when an electric motor is energized); a mechanical switch that may be activated in response to acceleration or physical movement; an accelerometer-activated switch configured to activate when the wireless identity transmitter 110 is accelerated beyond a pre-defined threshold acceleration; a pressure sensitive switch which may activate when the ambient pressure changes (e.g., if the wireless identity transmitter 110 is removed from or placed into water, taken up in an airplane, moved vertically in an elevator, etc.); a moisture-sensitive switch that activates when exposed to water; a strain gauge-activated switch configured to activate when strain across a portion of the device exceeds a predefined threshold (e.g., if a monitored structure begins to bend or breaks); and a temperature-sensitive switch configured to activate when temperature rises above and/or falls below a predefined threshold.

When activated by the switch 3812, the wireless identity transmitter 110 may broadcast a signal and thereby alert a user or other device about what happened. For example, a wireless identity transmitter 110 with a motion-sensitive switch 3812 could be attached to a valuable item so if the item is stolen, the motion switch may activate the wireless identity transmitter 110 to allow the item to be tracked. In another example, a wireless identity transmitter 110 with a temperature-sensitive switch 3812 could be attached to perishable food or medications during shipping and configured to activate to send an alert if the temperature reaches a point where spoilage may occur.

Alternately, the wireless identity transmitter 110 may be built into another device and receive a triggering action from that device. For example, a wireless identity transmitter 110 may be incorporated into an expensive appliance, such as a television. If the appliance is stolen, the loss of power when it was unplugged to be taken could trigger the switch 3812 and activate the wireless identity transmitter 110 to enable the police to track the stolen goods.

Due to the relative simplicity of wireless identity transmitters 110, embodiments of the wireless identity transmitters 110 may be applied to a variety of objects and assets that are subject to theft and used as disposable wireless identity transmitters 110 that are activate only if and when the object or asset is stolen or moved without authorization. Such wireless identity transmitters 110 may not need to be recharged nor have batteries replaced, enabling the devices to be configured in sealed packages for resistance to moisture and physical damage. Such embodiments may be used to affordably track assets of relatively low value, such as real estate signs, bicycles, garden elves, etc.

Figure 38C:
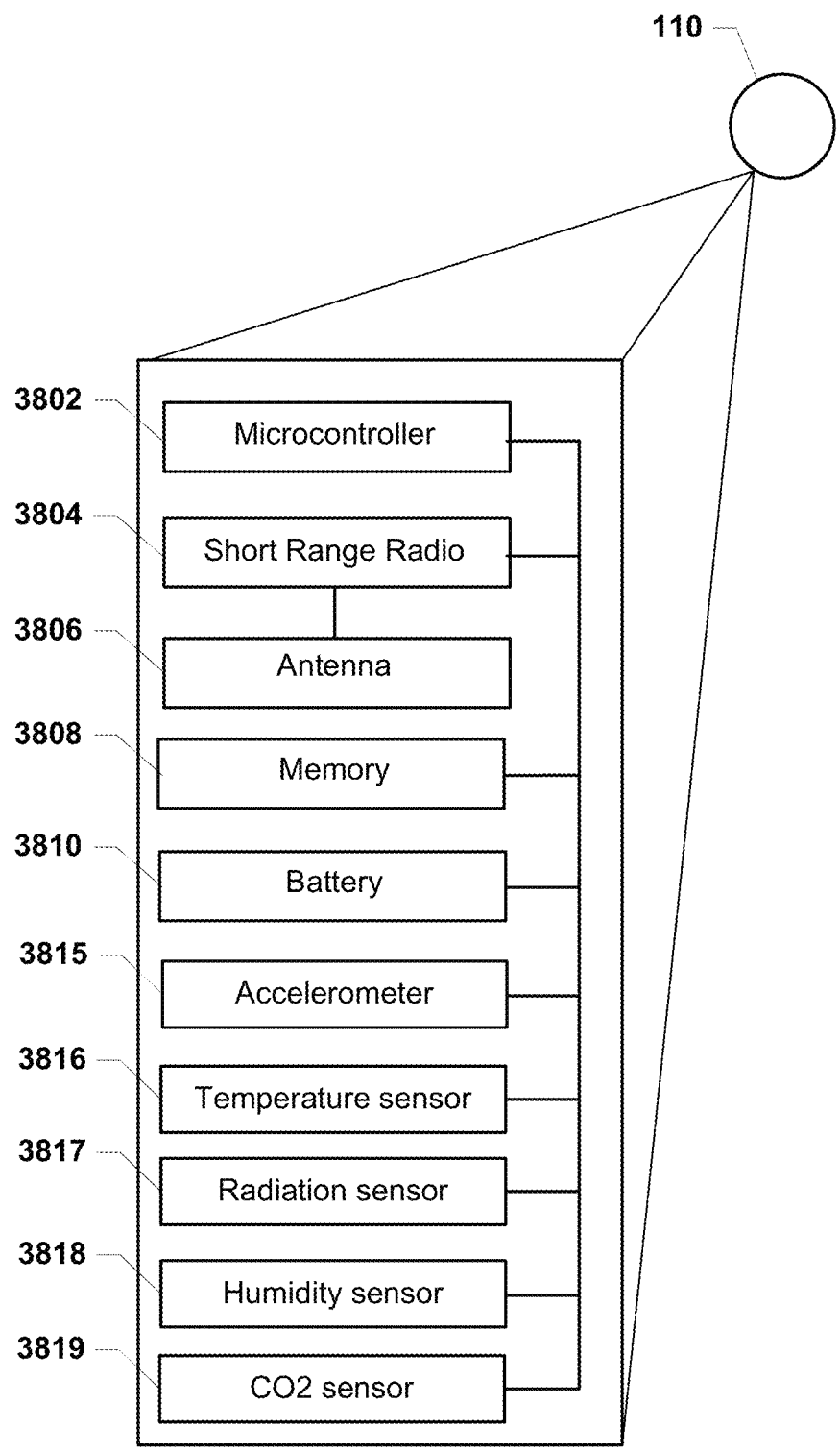
FIG. 38C is a component block diagram of an embodiment wireless identity transmitter.

FIG. 38C illustrates components of an embodiment wireless identity transmitter 110. Similar to the embodiment described above with reference to FIG. 38A, the wireless identity transmitter 110 may include a microcontroller 3802, a short-range radio 3804 (e.g., Bluetooth®, BTLE, Zigbee®, Peanut®, etc.) connected to an antenna 3806 and coupled to the microcontroller 3802, memory 3808, and a battery unit 3810. Alternatively the memory 3808 may be contained within the microcontroller 3802, which may also include a separate processing unit. The short-range radio 3804 may be a transmitter capable of broadcasting messages or signals including a device ID or, alternatively, a transceiver configured to transmit and receive RF signals, enabling communications with other devices utilizing a communication protocol. For example, the wireless identity transmitter 110 may be configured to communicate with other short-range radio enabled devices, such as smartphones. In an embodiment, the short-range radio 3804 may be configured to communicate via various low-energy, wireless communication protocols, such as LTE-D, peer-to-peer LTE-D, and WiFi-Direct.

In an embodiment, the wireless identity transmitter 110 may include a speaker (not shown) configured to emit a sound capable of being received by a proximity broadcast receiver and/or being heard by a heard by a user. For example, the wireless identity transmitter 110 may emit audible communications that may indicate its presence to listening proximity broadcast receivers. In another embodiment, the wireless identity transmitter 110 may be configured to transmit signals at varying signal strengths, as described above with reference to FIG. 5, thereby varying the range at which broadcasts from the wireless identity transmitter 110 may be received by proximity broadcast receivers.

Additionally, the wireless identity transmitter 110 may include one or more sensors for measuring various conditions and variables. In an embodiment, the wireless identity transmitter 110 may include an accelerometer 3815 (or any other motion sensor such as a gyroscope or gravitometer), which may collect data indicative of motion of an asset associated with the wireless identity transmitter 110. For example, the accelerometer 3815 may generate motion data describing the movements of a child carrying the wireless identity transmitter 110. Other sensors that may be included within the wireless identity transmitter 110 include a temperature sensor 3816 (such as a thermistor), a radiation sensor 3817, a humidity sensor 3818, and a carbon dioxide ($CO_2$) sensor 3819. In the various embodiments, the wireless identity transmitter 110 may include any combination of these and other sensors. These potential sensors are only examples of the types of sensors that may be integrated into wireless identity transmitters 110 and other types of sensors may be included. For example, the wireless identity transmitter 110 may also include sensors not shown in the various diagrams, such as a microphone, a camera, a heat sensor, a pressure sensor, and a light sensor.

In an exemplary embodiment, a proximity broadcast receiver may be placed within a yard or garden and may be configured to control a sprinkler system that waters the yard or garden. The wireless identity transmitter 110 that includes a humidity sensor 3818 may also be placed within the yard or garden, such as on top of (or under) dirt or vegetation within the yard or garden. The proximity broadcast receiver may periodically received broadcast messages from the wireless identity transmitter 110 that include humidity sensor data, and may transmit sighting messages to a central server that include the humidity sensor data. The proximity broadcast receiver may receive a return message from the central server having data indicating that the humidity sensor data from the wireless identity transmitter 110 indicates that the yard or garden is too dry, and in response the proximity broadcast receiver may activate the sprinkler system to water the yard or garden. Alternatively, the return message may contain instructions for the proximity broadcast receiver to perform that may initiate the sprinkler system.

Figure 38D:
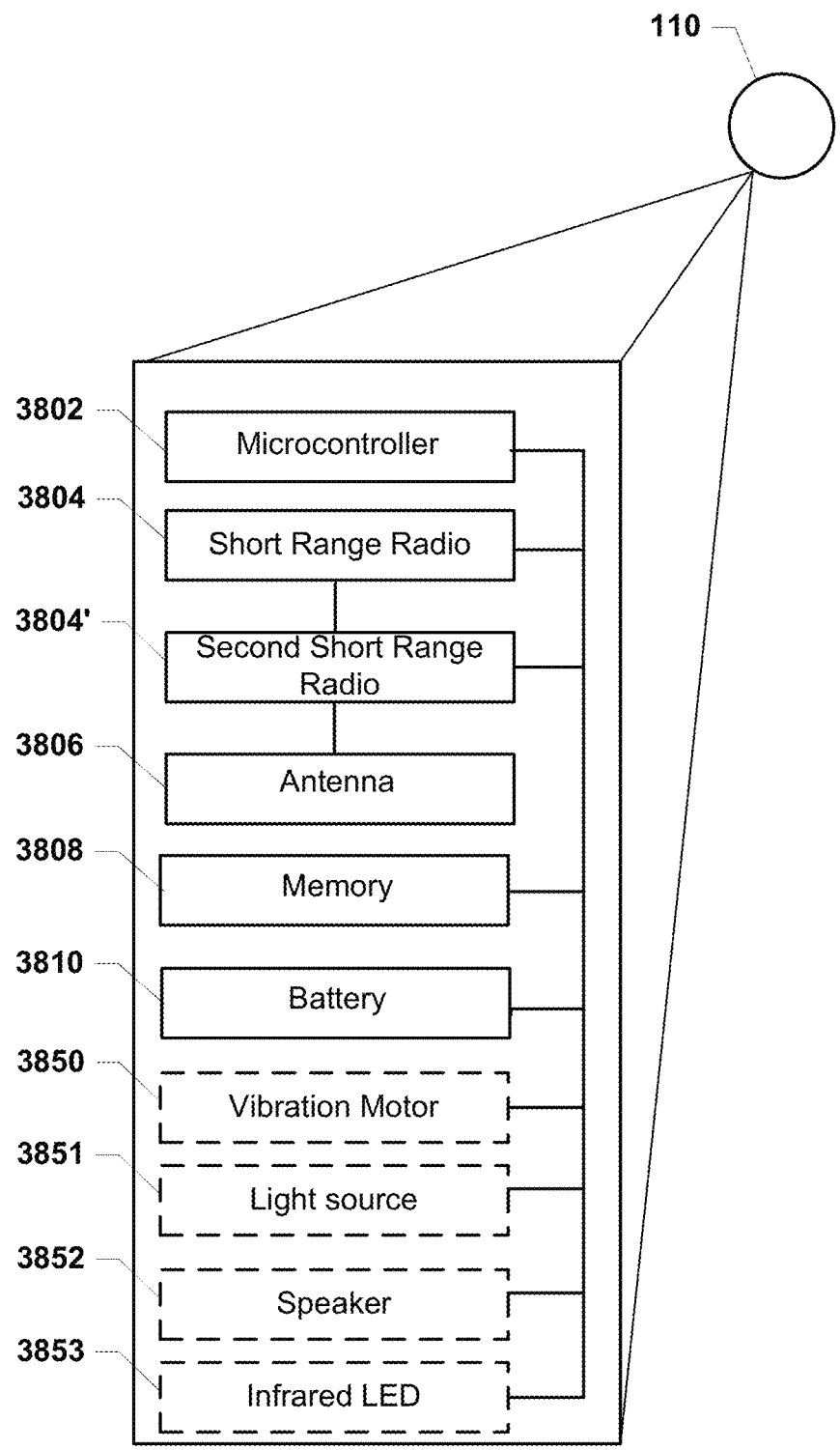
FIG. 38D is a component block diagram of an embodiment wireless identity transmitter.

FIG. 38D illustrates components of an embodiment wireless identity transmitter 110. Similar to the embodiment described above with reference to FIG. 38A, the wireless identity transmitter 110 may include a microcontroller 3802, a first short-range radio 3804 (e.g., Bluetooth®, BTLE, Zigbee®, Peanut®, etc.) connected to an antenna 3806 and coupled to the microcontroller 3802, memory 3808, and a battery unit 3810. Additionally, the wireless identity transmitter 110 may include a second short-range radio 3804'. For example, the wireless identity transmitter 110 may include a Bluetooth® transceiver as the first short-range radio 3804 and a Peanut® transceiver as the second short-range radio 3804'. The first short-range radio 3804 and second short-range radio 3804' may utilize the same antenna 3806, microcontroller 3802, memory 3808, and battery unit 3810.

The wireless identity transmitter 110 may also optionally include other components and related circuitry for broadcasting, emitting, rendering, or otherwise producing short-range wireless signals, such as a vibration motor 3850 for producing vibration signals, a light source 3851 (e.g., a LED, light bulb, etc.) for producing light signals, a speaker 3852 for producing sound signals, and/or an infrared LED 3853 for producing heat signals. The use of such signaling components to generate short-range wireless signals as alternatives to short-range radio signals for exchanging communications with proximity broadcast receivers is described above. In various embodiments, the wireless identity transmitter 110 may communicate data (e.g., identifying information, a rolling ID, etc.) using the various short-range wireless signal emitters by modulating or encoding the data into emitted signals as described above. For example, the wireless identity transmitter 110 may broadcast identification data by converting identity data into sequences of light signals that are periodically emitted by a flashing LED.

The two short-range radios 3804, 3804' may transmit RF signals with different reception ranges, thereby enabling a proximity broadcast receiver to recognize when it is very close to the wireless identity transmitter 110 when it can receive signals broadcast from both radios. Such a dual range capability may be useful in a variety of applications, particularly where proximity is important to a functionality that is activated based on receipt of broadcast signals. In an embodiment, the wireless identity transmitter 110 may broadcast wireless signals with both short-range radios 3804, 3804' independently or concurrently. For example, the wireless identity transmitter 110 may broadcast messages from both radios 3804, 3804'. As another example, the wireless identity transmitter 110 may broadcast signals with the first short-range radio 3804 for a first period of time and broadcast signals with the second short-range radio 3804' for a second period of time occurring directly after the first period. In another embodiment, similar to the signaling techniques described above with reference to FIG. 5, the wireless identity transmitter 110 may broadcast signals in cycles of predefined sequences or patterns in which the first short-range radio 3804 and second short-range radio 3804' are each utilized for varying periods and/or varying signal strengths. For example, the wireless identity transmitter 110 may broadcast messages with the first short-range radio 3804 for a few seconds followed by a few seconds of broadcasting by the second short-range radio 3804', followed by a few seconds of broadcasting by the first short-range radio.

Figure 38E:
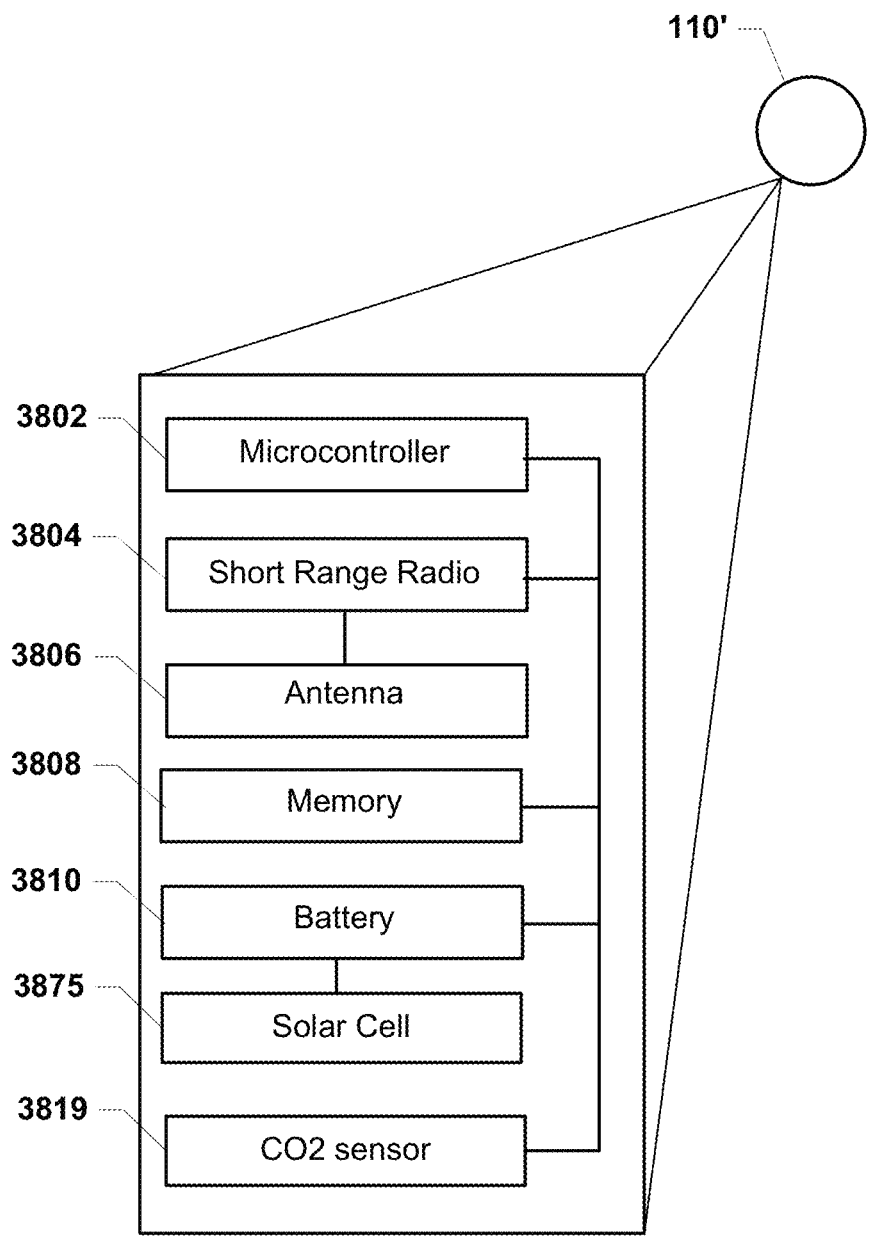
FIG. 38E is a component block diagram of another embodiment wireless identity transmitter.

FIG. 38E illustrates components of another embodiment of a wireless identity transmitter 110'. As described above, the wireless identity transmitter 110 may include components for processing and transmitting data, such as a microcontroller 3802, a short-range radio 3804 with connected antenna 3806, memory 3808, and a battery 3810. As described above, the wireless identity transmitter 110' may also include various sensor units, such as a $CO_2$ sensor 3819.

In addition, the wireless identity transmitter 110' may also include a solar cell 3875 connected to the battery 3810 and configured to generate power when exposed to light. The solar cell 3875 may be partially or wholly contained within the housing of the wireless identity transmitter 110', or alternatively, may be connected to the wireless identity transmitter 110 through a wired connection. The wireless identity transmitter 110' may collect supplemental power via the solar cell 3875 and be configured to utilize power stored in the battery differently based on power is being received from the solar cell 3875. For example, the wireless identity transmitter 110' may transmit signals at an increased strength while receiving power from the solar cell 3875. As another example, the wireless identity transmitter 110' may recharge the battery 3810 with power received from the solar cell 3875.

Figure 39:
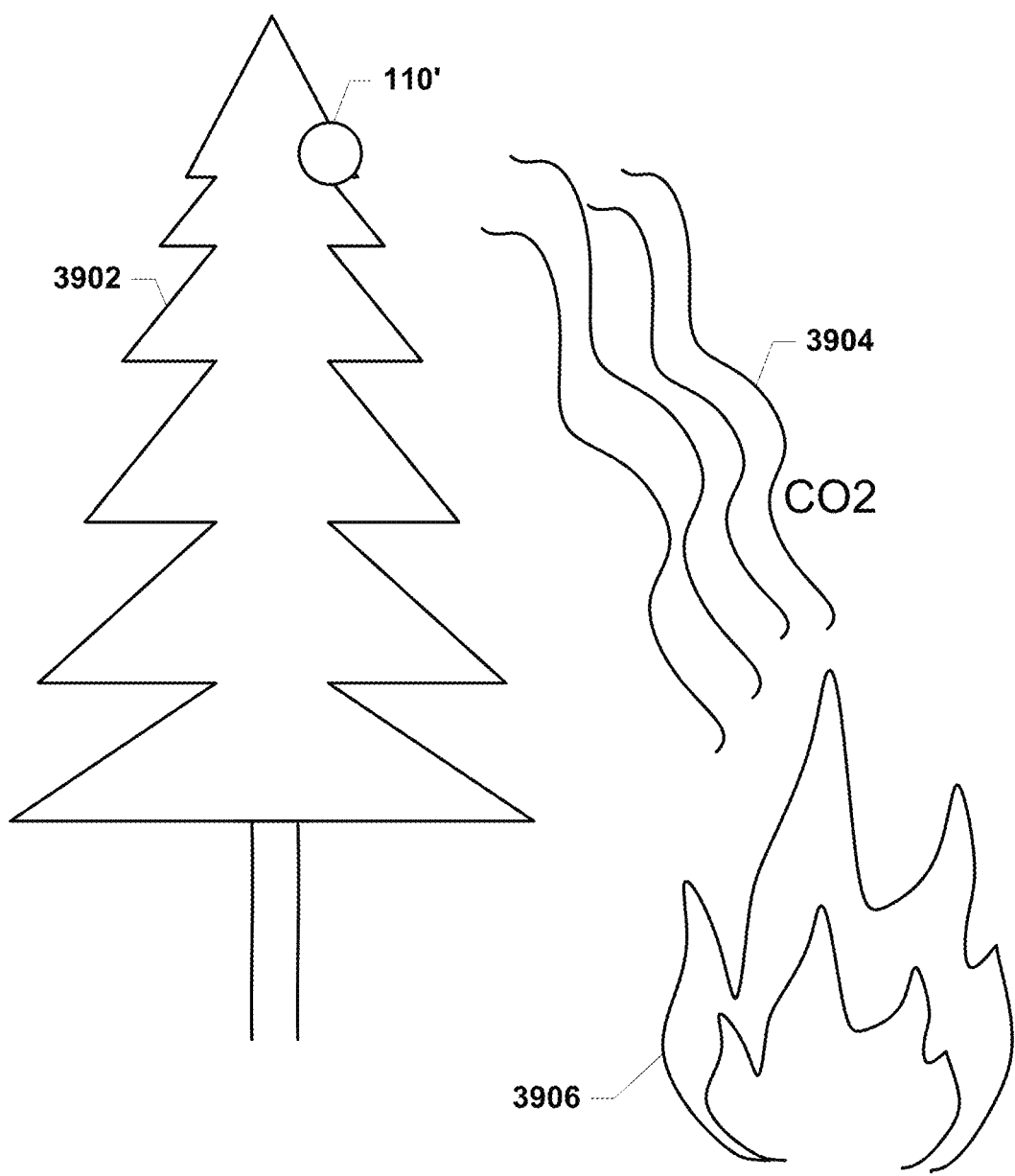
FIG. 39 is an illustration of an exemplary use of a wireless identity transmitter including a $CO_2$ sensor.

FIG. 39 illustrates an exemplary use of a wireless identity transmitter 110' including a $CO_2$ sensor. In this example use, the wireless identity transmitter 110' may be placed in various locations in a park, forest, campground, etc. For example, the wireless identity transmitter 110' may be affixed to a tree 3902 within a forest or other outside setting. The wireless identity transmitter 110' may be positioned such that it is exposed to solar rays for power collection via a solar cell, as well as exposed to the atmosphere. Numerous wireless identity transmitters 110 may be deployed throughout an area to provide extensive coverage and sensor data collection.

In one application, the wireless identity transmitter 110' may detect increased levels of $CO_2$ 3904 caused by a forest fire 3904. The wireless identity transmitter 110' may be configured to compare current levels of detected $CO_2$ to normal and/or historical $CO_2$ values for the area, and may broadcast messages indicating elevated or dangerous levels of $CO_2$ when the detected levels exceed a predetermined tolerance threshold. The broadcast messages may include the transmitter's identifier, sensor data, information and/or conclusions based on the sensor data (e.g., that there is a nearby forest fire, impending avalanche, dangerous levels of sunlight, etc.), warning statements, and information describing the affected areas.

Proximity broadcast receivers carried by users or located through the outside environment may receive the broadcast messages and may in turn display the sensor data or relay the data to a central server. In an embodiment, the broadcast messages may include instructions for receiving devices, such as indications as to whether subsequent messages should be transmitted to a server or an authority that may respond to the situation. For example, the broadcast messages may instruct receiving devices to warn users of the receiving device, a forestry authority, fellow campers, etc.

In an alternative embodiment, a wireless identity transmitter 110 may be configured to utilize other power sources, such as sugars. The wireless identity transmitter 110 may include components (not shown), such as a spike with attached tubing, that may enable the wireless identity transmitter 110 to be affixed to and draw fluids from a source of sugar (e.g., blood, sap, sugar water, etc.). For example, the wireless identity transmitter 110 may be connected to a tree via the spike and tubing such that the wireless identity transmitter 110 may access sap within the tree. As another example, the wireless identity transmitter 110 may be attached to an animal (e.g., human, pet, wildlife, etc.) via the spike and tubing such that the wireless identity transmitter 110 may access the animal's blood stream. As are well known, various conversion processes and components (not shown) may be included in the wireless identity transmitter 110 that enable the conversion of sugars into electrical energy. The wireless identity transmitter 110 may store the electrical energy in a battery and thus may be powered indefinitely. For example, utilizing the sap of a tree for energy, the wireless identity transmitter 110 may be powered even without access to solar energy, while buried under snow in the winter, etc. In an embodiment, proximity broadcast receivers may also be configured to convert sugars into electrical energy using similar techniques known in the arts. In another embodiment, proximity broadcast receivers may be placed at various locations, such as on trees in a wildlife preserve or national forest, and configured to receive broadcast messages from wireless identity transmitters 110 affixed to wildlife (e.g., moose, deer, elk, etc.), hikers, vehicles, trees, and/or any other object to be monitored.

Figure 40A:
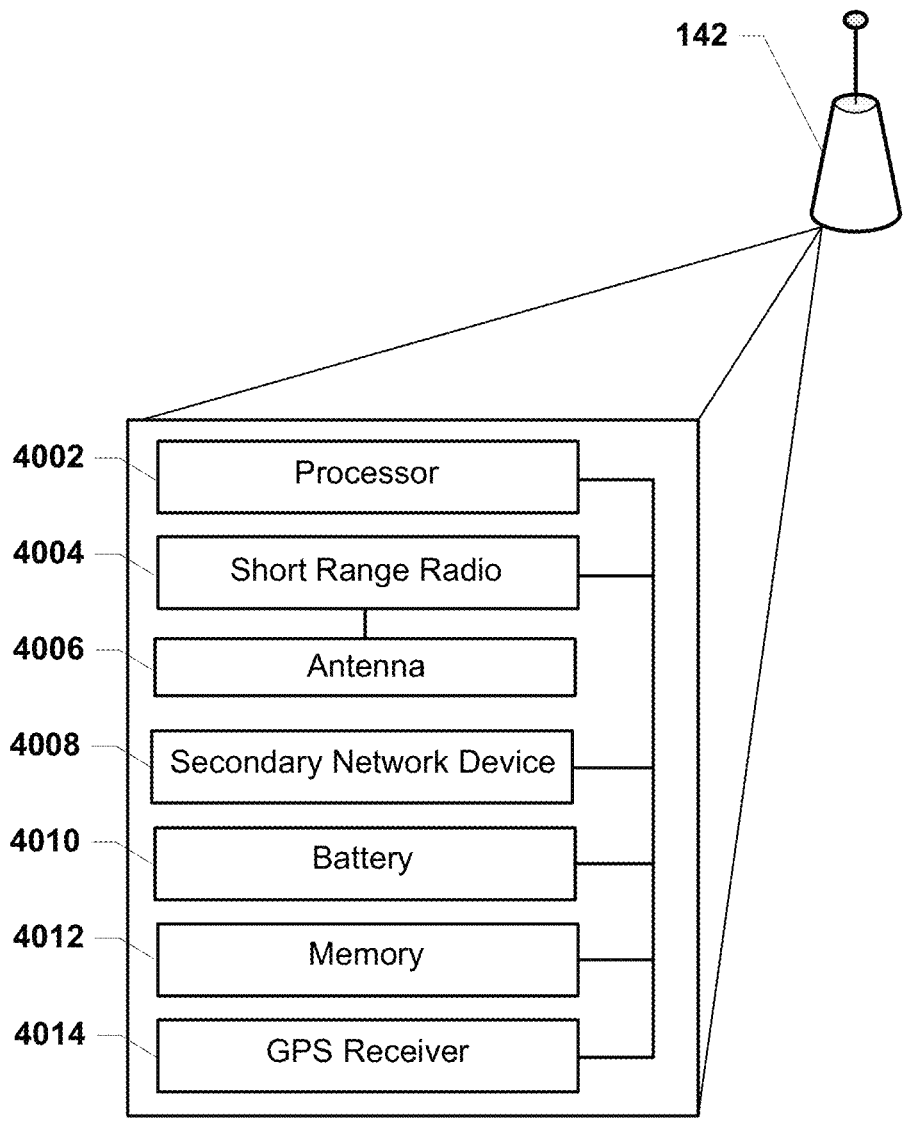
FIG. 40A is a component block diagram of a proximity broadcast receiver in accordance with various embodiments.

FIG. 40A illustrates primary components of an exemplary proximity broadcast receiver embodiment. The proximity broadcast receiver 142 may include a short-range radio 4004 (e.g., a Bluetooth radio or transceiver) capable of communicating with a short-range wireless radio (e.g., a Bluetooth radio in the wireless identity transmitter) coupled to an antenna 4006, and a secondary network device 4008 capable of communicating directly or indirectly back to a central server 120 via a network, such as the Internet. In some embodiments, the secondary network device 4008 may be a cellular or wireless radio or a modem or other wired network device. The proximity broadcast receiver 142 may also include a processor 4002, a memory 4012, and a battery 4010 either as the primary power supply or as a backup power supply in the case of proximity broadcast receiver 142 coupled to utility power. The proximity broadcast receiver 142 may include a GPS receiver 4014 or other type of location determining mechanism for determining a current location to associate with any message received from a wireless identity transmitter. If the proximity broadcast receiver is not mobile, it may not include a GPS receiver 4014 in some embodiments since the location may be known and constant. Although these components are shown linked by a common connection, they may interconnected and configured in various ways. Since these components may be microchips of standard or off-the-shelf configuration, they are represented in FIG. 40A as blocks consistent with the structure of an example embodiment.

Figure 40B:
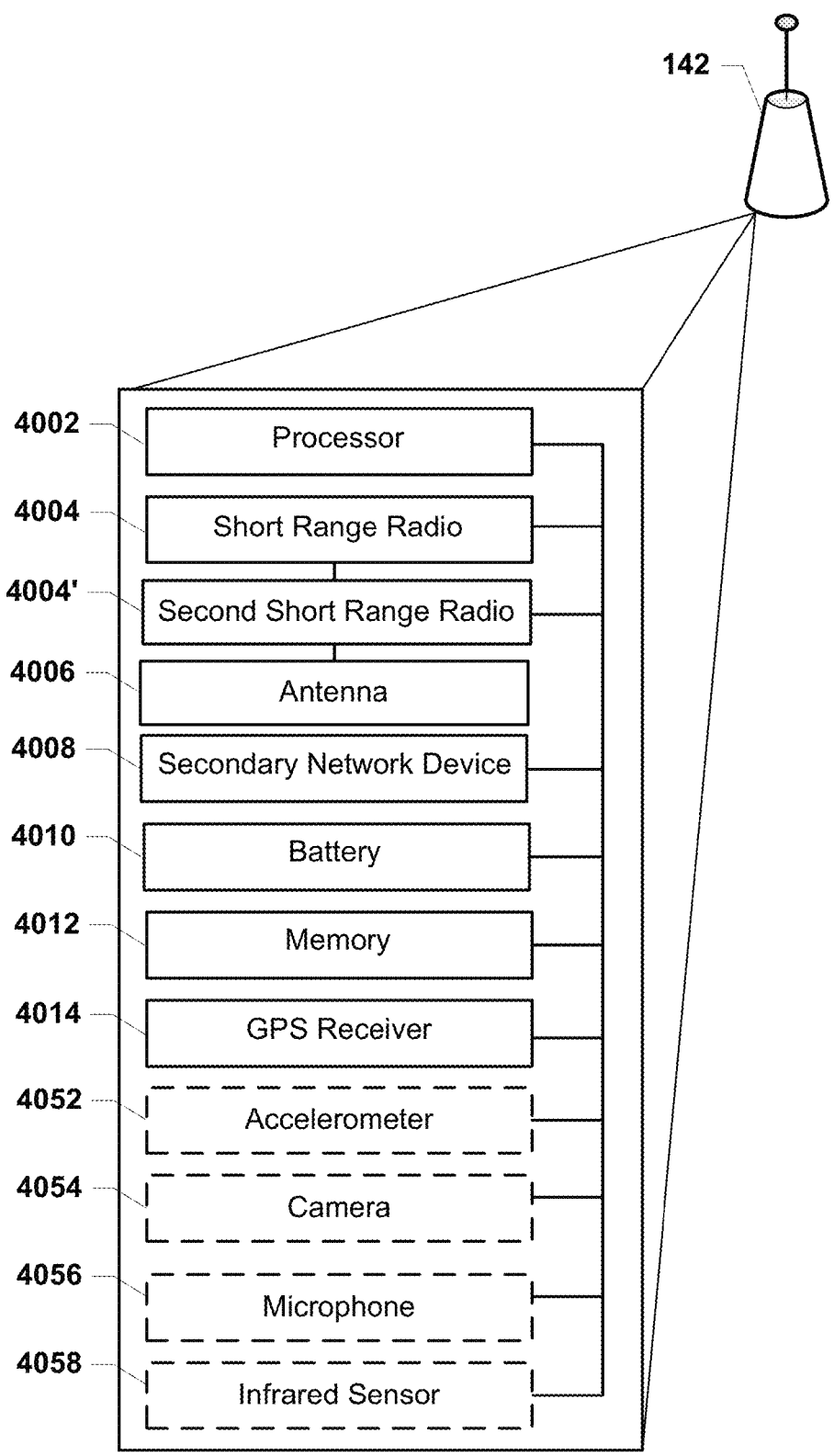
FIG. 40B is a component block diagram of an embodiment proximity broadcast receiver.

FIG. 40B illustrates components of an embodiment proximity broadcast receiver 142. Similar to as described above with reference to FIG. 40A, the proximity broadcast receiver 142 may include a first short-range radio 4004 (e.g., a Bluetooth®, Peanut®, Zigbee®, etc.) coupled to an antenna 4006, and a secondary network device 4008 capable of communicating directly or indirectly back to a central server via a network, such as the Internet. The proximity broadcast receiver 142 may also include a processor 4002, a memory 4012, and a battery 4010 either as the primary power supply or as a backup power supply in the case of proximity broadcast receiver 142 coupled to utility power. The proximity broadcast receiver 142 may include a GPS receiver 4014 or other type of location determining mechanism for determining a current location to associate with any message received from a wireless identity transmitter. Additionally, the proximity broadcast receiver 142 may include a second short-range radio 4004', such as a Peanut® transceiver. For example, the proximity broadcast receiver may include a Bluetooth® transceiver as the first short-range radio 4004 and a Peanut® transceiver as the second short-range radio 4004'. The first short-range radio 4004 and second short-range radio 4004' may utilize the same antenna 4006, processor 4002, memory 3808, and battery unit 4010. In various embodiments, the wireless identity transmitter may utilize the second short-range radio 4004' (i.e., the Peanut radio) and/or the first short-range radio 4004 (e.g., the Bluetooth radio) to broadcast messages capable of being received by proximity broadcast receivers equipped with corresponding radios. For example, the wireless identity transmitter may alternate broadcasting messages containing identification information with a Bluetooth® radio and a Peanut® radio.

The proximity broadcast receiver 142 may also optionally include other components and related circuitry for detecting, receiving, and otherwise processing short-range wireless signals, such as an accelerometer 4052 for detecting vibration signals, a camera 4054 for detecting light signals, a microphone 4056 for receiving sound signals, and an infrared sensor 4058 for detecting heat signals. These optional components may be used to receive light, sound, vibration, and heat short-range wireless signals instead of or in combination with receiving short-range radio signals.

In various embodiments, the proximity broadcast receiver 142 may communicate data using the various short-range wireless signal types by converting sequences of signals to data as described above. For example, the proximity broadcast receiver 142 may receive sequences of sound signals emitted by a speaker within a wireless identity transmitter and convert the signals to determine identification information of the wireless identity transmitter.

In various embodiments, wireless identity transmitters and proximity broadcast receivers 142 may each include components for transmitting and receiving the various forms of short-range wireless signals. For example, a wireless identity transmitter may include both a light bulb for rendering light signals and a camera for receiving light signals. As another example, a proximity broadcast receiver 142 may include both a microphone 4056 for receiving sound signals from a wireless identity transmitter and a speaker for rendering sound signals. By including both signal generating components and signal receiving components, proximity broadcast receivers and wireless identity transmitters may exchange two-way communications as described above with reference to FIGS. 4 and 10.

Figure 41A:
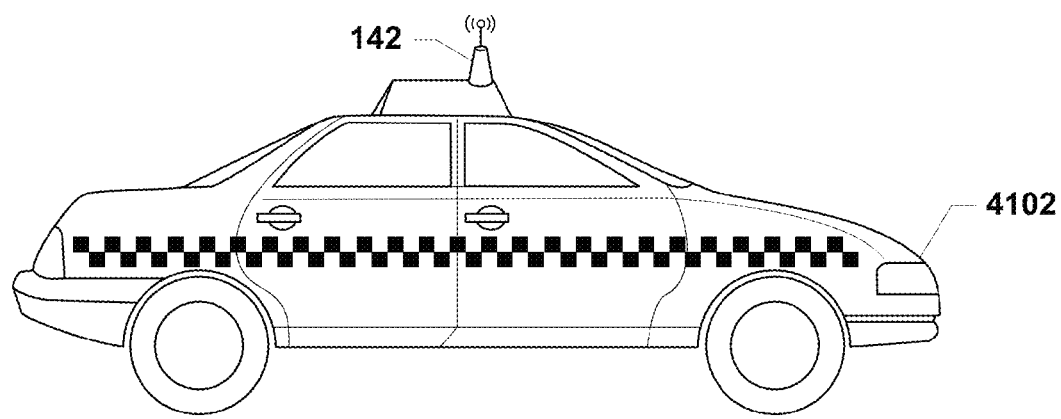
FIGS. 41A and 41B are illustrations of example mobile proximity broadcast receivers incorporated with different devices in accordance with various embodiments.
Figure 41B:
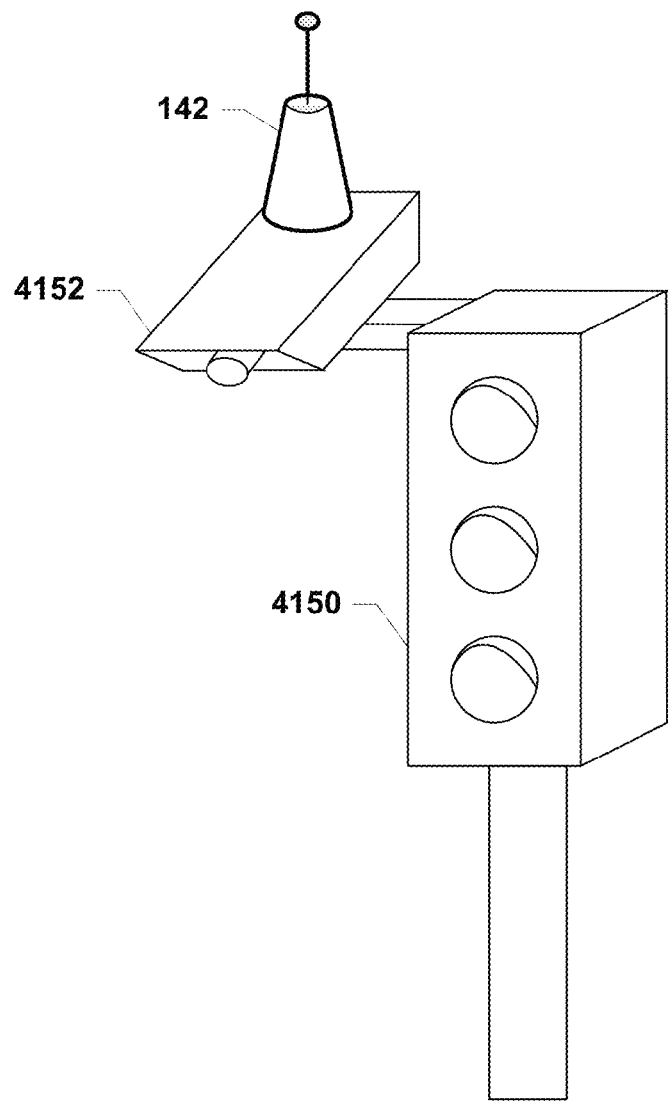

FIGS. 41A and 41B illustrate proximity broadcast receivers 142 placed in various high traffic locations where they are more likely to come within short communication range of wireless identity transmitters. For example, a proximity broadcast receiver 142 may be attached to taxicabs, buses, trains, screening devices in airports, and other commonly used form of transportation.

FIG. 41A illustrates a taxicab 4102 with a proximity broadcast receiver 142 affixed to the top. This proximity broadcast receiver 142 may exchange transmissions with any wireless identity transmitters of passengers within the taxicab 4102 as well as any wireless identity transmitters that come into range of the taxicab as it drives about.

FIG. 41B illustrates a proximity broadcast receiver 142 affixed on top of a traffic light 4150. The proximity broadcast receiver may receive broadcasts from any wireless identity transmitter passing in traffic below. Because the proximity broadcast receiver is stationary, it may not include a GPS receiver. In further embodiments, a proximity broadcast receiver 142 may be coupled with a traffic camera 4152. In this embodiment, when the proximity broadcast receiver 142 recognizes reception of a target device ID, it may trigger the traffic camera to begin taking pictures in order to provide an image or short video of vehicles in the intersection along with a sighting report transmitted to the central server. This embodiment may provide both a location and an image of a vehicle transporting the person or asset of interest, which may be very useful to police searching for the device.

In alternate embodiments, a proximity broadcast receiver 142 may be coupled with various transducers or sensors, such as cameras, microphones, thermocouples, etc., that may provide a signal or data to be associated with messages from wireless identity transmitters.

Various transducers or sensors may also be coupled with wireless identity transmitters and use embodiment systems to report a status or sensor data for machine-to-machine communications. For example, a street light may be coupled with a wireless identity transmitter and a sensor to determine whether the light bulb has burnt out (e.g., a fuse or circuit breaker coupled with a logic circuit). If the sensor determines the bulb is burnt out, then an alert broadcast may be made by the wireless identity transmitter, such as including a segment or data in a broadcast packet. This packet may be received by one or more proximity broadcast receivers, such as appropriately configured smartphones within communication range, and transmitted to a server via a wireless wide area network coupled to the Internet, for example. This embodiment could permit operators to offer a new class of connectivity service that is ad hoc in configuration with low quality of service and no time guarantee but cheap and opportunistic.

Various embodiments may rely on any combination of different types of proximity broadcast receivers, such as one or more cell phones, taxicab proximity broadcast receivers, traffic light proximity broadcast receivers, or other stationary or mobile proximity broadcast receivers.

Figure 42A:
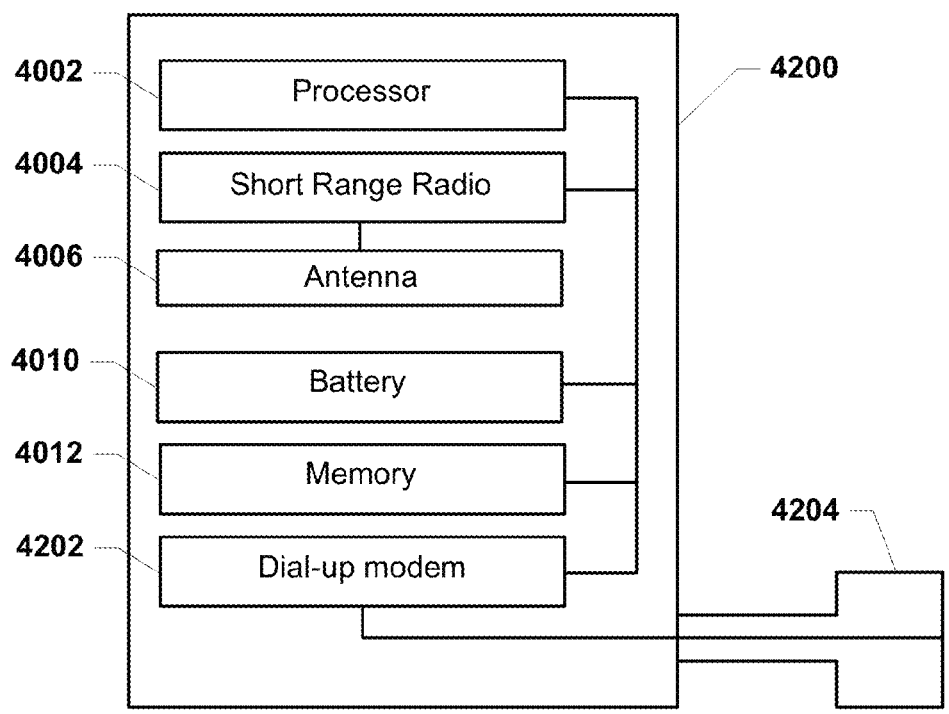
FIG. 42A is a component block diagram of an embodiment proximity broadcast receiver that can be plugged into a common phone jack.

FIG. 42A illustrates components of an embodiment proximity broadcast receiver 4200 that can be plugged into a common RJ-11 telephone jack. As described above, proximity broadcast receivers may be configured to listen for short-range radio broadcasts by wireless identity transmitters, and in response to receiving a broadcast, may relay the signal to a server, process the information within the signal, or ignore the signal entirely. In general, proximity broadcast receivers may be installed in various scenarios and places, such as on light posts, on vehicles, and in smartphones capable of receiving short-range radio broadcasts from wireless identity transmitters.

Configuring the proximity broadcast receiver 4200 to be connected to telephone communication wires via a common telephone jack (i.e., wall-mounted) enables received broadcast messages to be relayed to a central server over telephone lines, as well as receiving power from the telephone lines. Similar to the embodiment described above with reference to FIG. 40A, the proximity broadcast receiver 4200 may include a processor 4002, a battery 4010, a memory unit 4012, and a short-range radio 4004 (e.g., Bluetooth®, Bluetooth LE, LTE-D, peer-to-peer LTE-D, Zigbee®, Peanut®, etc.) connected to an antenna 4006. In addition, the proximity broadcast receiver 4200 may include a dialup-modem 4202 connected to the processor 401 and a telephone plug or physical connector 4204 that enables the dialup-modem 4202 to connect to telephone wires. For example, the physical connector 4204 may be an RJ-11 standard modular connector. The proximity broadcast receiver 4200 may receive power over telephone wiring via the physical connector 4204, as well as exchange communications processed by the dialup-modem 4202. For example, the proximity broadcast receiver 4200 may be configured to be powered by the battery 4010 or alternatively to receive power over the telephone wiring. In an embodiment, the proximity broadcast receiver 4200 may recharge the internal battery 4010 using power received from telephone wiring via the physical connector 4204.

Figure 42B:
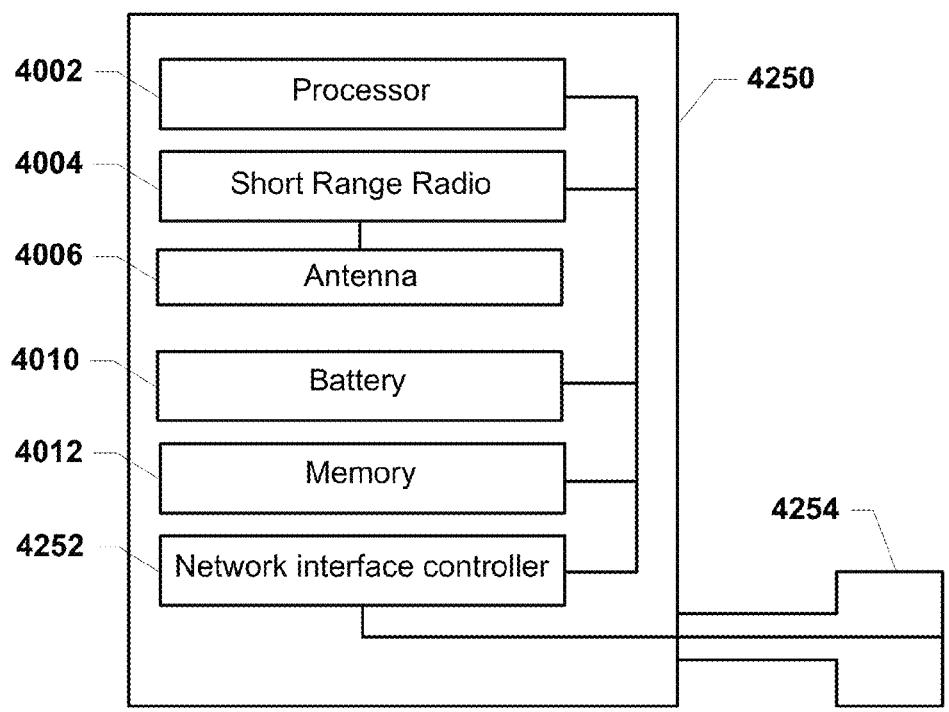
FIG. 42B is a component block diagram of an embodiment proximity broadcast receiver that can be plugged into an Ethernet jack.

FIG. 42B illustrates a proximity broadcast receiver 4250 that can be plugged into an Ethernet jack. The proximity broadcast receiver 4250 may be similar to the embodiment described above with reference to FIG. 42A, except that instead of a dial-up modem, the proximity broadcast receiver 4250 may include a network interface controller 4252 for exchanging data over an Ethernet data network (via Ethernet network wiring). Additionally, the proximity broadcast receiver 4250 may include a physical connector 4254 configured to connect the network interface controller 4252 with external wiring of the Ethernet network. For example, the physical connector 4254 may be an 8P8C (or RJ-45) modular connector. The proximity broadcast receiver 4250 may also receive power over Ethernet network wiring via the physical connector 4254, as well as exchange communications processed by the network interface controller 4252. For example, the proximity broadcast receiver 4250 may be powered by the battery 4010 or alternatively receive power over the Ethernet network wiring. In an embodiment, the proximity broadcast receiver 4250 may recharge the internal battery 4010 using power received from Ethernet network wiring via the physical connector 4254.

In an embodiment, a proximity broadcast receiver may be placed within a vehicle (e.g., a car, van, truck, airplane, etc.) and may be configured to utilize the battery or electrical system of the vehicle for power (e.g., additional power, primary power, or recharging power), employ available antennas, and access GPS, cellular modem, power-line communications (when recharging a vehicle) and other systems within the car to determine location coordinates of the proximity broadcast receiver and relay wireless identity transmitters' broadcast messages to a server.

In another embodiment, a proximity broadcast receiver may be placed within or connected to a wireless charging station. For example, a store or social area may provide charging stations for customers to recharge their smartphones that may also include proximity broadcast receivers configured to receive transmissions from wireless identity transmitters carried by the customers.

In another embodiment, proximity broadcast receivers may be placed within an electric vehicle and configured to utilize the electric vehicle's components. For example, the receiver may utilize an electric car's significant battery for transmissions, such as cellular network communications, and may gather location information from the car's GPS chip or receiver.

Figure 42C:
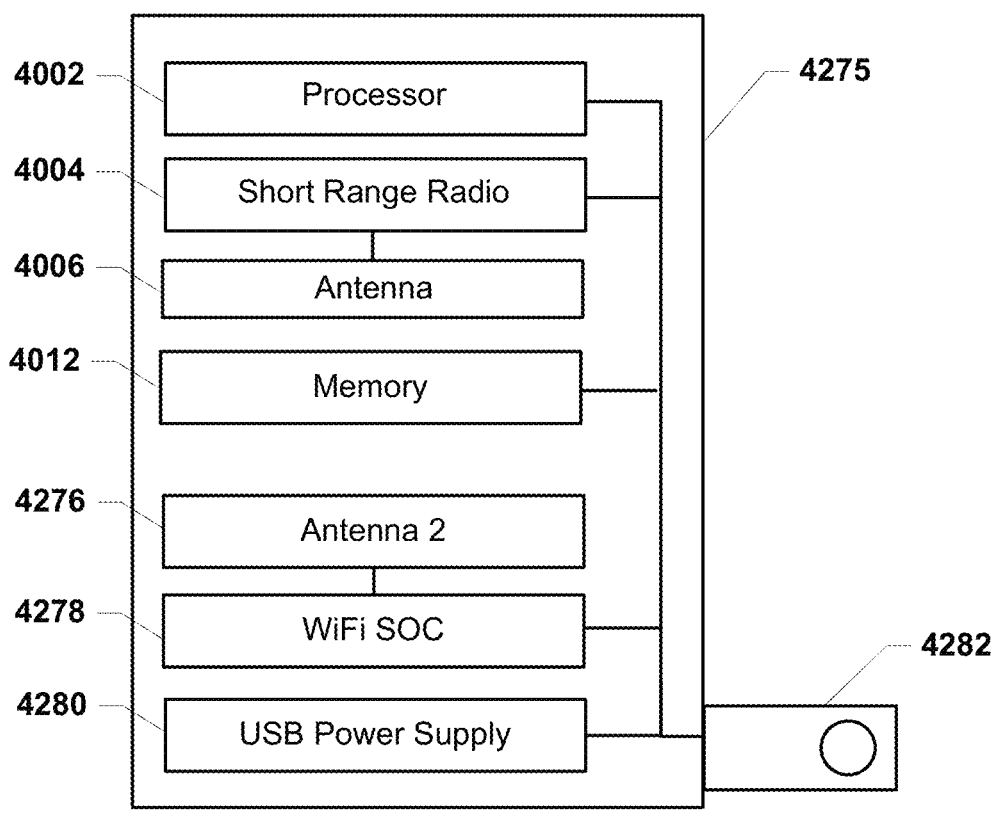
FIG. 42C is a component block diagram of an embodiment proximity broadcast receiver that can be plugged into a power outlet.

FIG. 42C illustrates an embodiment proximity broadcast receiver 4275 that can be plugged into a power outlet. Similar to the embodiment described above with reference to FIG. 40A, the proximity broadcast receiver 4275 may include a processor 4002, a memory unit 4012, and a short-range radio 4004 (e.g., Bluetooth®, Bluetooth LE, LTE-D, peer-to-peer LTE-D, Zigbee®, Peanut®, etc.) connected to an antenna 4006. The proximity broadcast receiver 4275 may also include a WiFi system-on-chip 4278 (referred to as "SOC" in FIG. 42C) coupled to a second antenna 4276. In another embodiment, the system-on-chip 4278 may be a Bluetooth Low Energy system-on-chip. The proximity broadcast receiver 4275 may utilize the system-on-chip 4278 to exchange data over a wireless local area network, such as by communicating with a WiFi router. Additionally, the proximity broadcast receiver 4275 may include a plug 4282 for interfacing with a power supply or otherwise receiving power, such as alternating current power (or "AC"). In various embodiments, the plug 4282 may be configured to connect with different power outlets standards (e.g., British Standards, National Electrical Manufacturers Association, etc.), and may include a grounding element (not shown). The plug 4282 may be coupled to a USB Power supply 4280 that provides power to the various components of the proximity broadcast receiver 4275, such as the processor 4002. In an alternative embodiment, the proximity broadcast receiver 4275 may recharge an internal battery (not shown) using power received from the plug 4282 and/or USB power supply 4280.

In an embodiment, the proximity broadcast receiver 4275 may store software instructions, such as within the memory 4012 or other circuitry that may be utilized by the processor 4002 and/or the system-on-chip 4278 to perform operations to transmit and/or receive short-range and long-range signals, respectively. In an embodiment, the proximity broadcast receiver 4275 may utilize the antennas 4006, 4276 to receive update software, instructions, or other data for storage and use in updating firmware, modifying operating parameters, and other configuration modifications.

Figure 43:
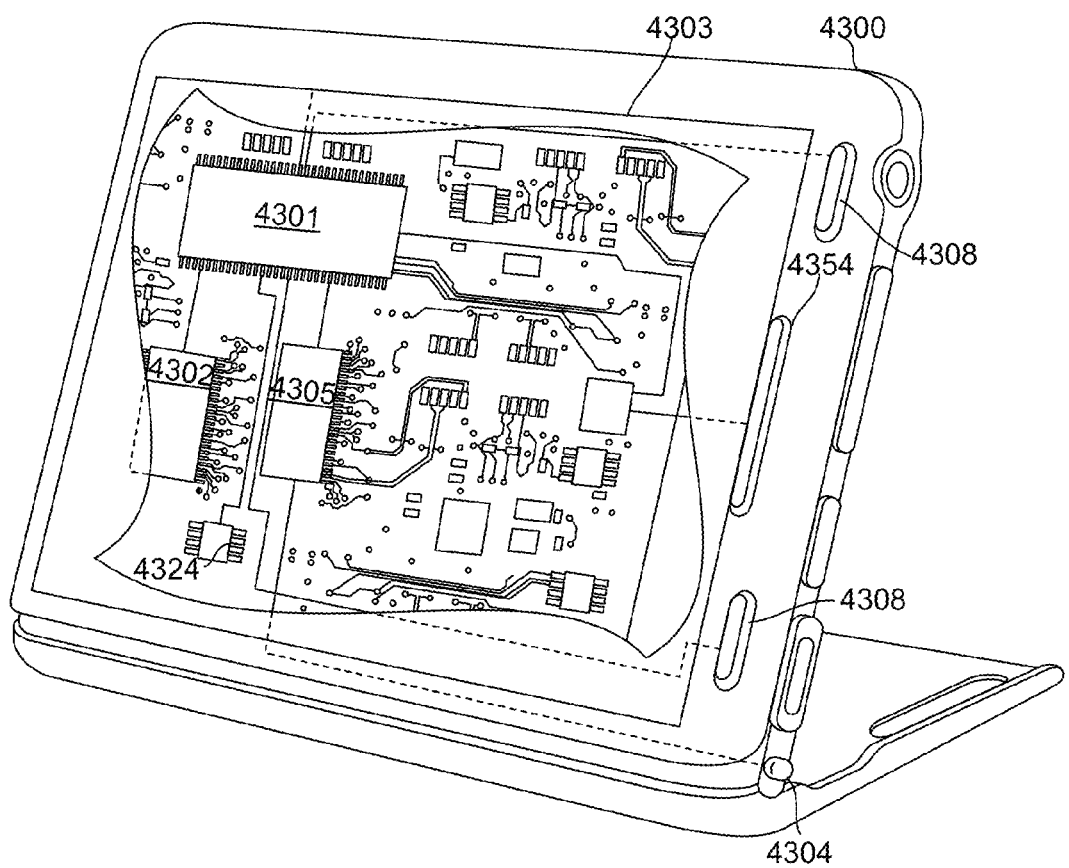
FIG. 43 is a component block diagram of a mobile device suitable for use in various embodiments.

FIG. 43 is a system block diagram of a smartphone type mobile device suitable for use with various embodiments. A smartphone 4300 may include a processor 4301 coupled to internal memory 4302, a display 4303, and to a speaker 4354. Additionally, the smartphone 4300 may include an antenna 4304 for sending and receiving electromagnetic radiation that may be connected to a wireless data link and/or cell telephone transceiver 4305 coupled to the processor 4301 and capable of communicating over a wide area wireless communication network. Smartphones may include a separate short-range radio transceiver 4324 capable of communicating or pairing with wireless identity transmitters. Smartphones 4300 typically may also include menu selection buttons or rocker switches 4308 for receiving user inputs.

Figure 44:
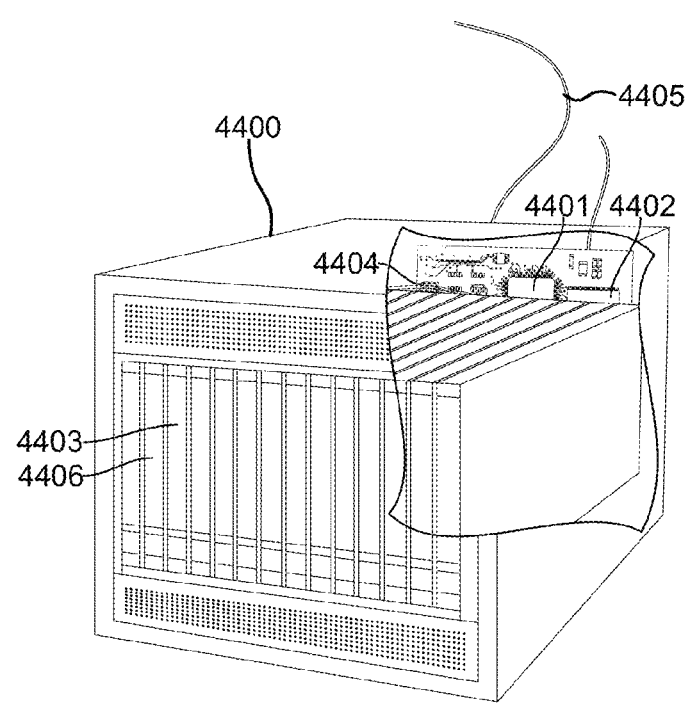
FIG. 44 is a component block diagram of a server device suitable for use in various embodiments.

FIG. 44 is a system block diagram of a server 4400 suitable for implementing the various embodiments of this disclosure. The server 4400 may be a commercially available server device. Such a server 4400 typically includes a processor 4401 coupled to volatile memory 4402 and a large capacity nonvolatile memory, such as a disk drive 4403. The server 4400 may also include a floppy disc drive, compact disc (CD) or DVD disc drive 4406 coupled to the processor 4401. The server 4400 may also include network access ports 4404 coupled to the processor 4401 for establishing data connections with a network 4405, such as a local area network coupled to other broadcast system computers and servers.

The processors 4301, 4401 may be any programmable microprocessor, microcomputer or multiple processor chip or chips that can be configured by software instructions (applications) to perform a variety of functions, including the functions of the various embodiments described below. In some mobile proximity broadcast receivers, multiple processors 4301 may be provided, such as one processor dedicated to wireless communication functions and one processor dedicated to running other applications. Typically, software applications may be stored in the internal memory 4302, 4402, 4403 before they are accessed and loaded into the processor 4301, 4401. The processor 4301, 4401 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module, which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for a proximity broadcast receiver to receive and relay messages including identification information corresponding to proximate wireless identity transmitters, comprising:
   receiving a short-range wireless broadcast message including a rolling identifier from a wireless identity transmitter within proximity;
   generating a sighting message in response to the received broadcast message, wherein the sighting message includes the rolling identifier and associated data that includes at least one of identification information corresponding to the proximity broadcast receiver, whether the sighting message is related to an alert or a registered service, information regarding software or applications executing on the proximity broadcast receiver, location information, proximity information with respect to known areas within a place, and timestamp data; and
   transmitting the sighting message via long-range communications to a server.

2. The method of claim 1, wherein the associated data also includes authentication information that confirms the identification information of the proximity broadcast receiver.

3. A proximity broadcast receiver configured to receive and relay messages including identification information corresponding to proximate wireless identity transmitters, comprising:
   means for receiving a short-range wireless broadcast message including a rolling identifier from a wireless identity transmitter within proximity;
   means for generating a sighting message in response to the received broadcast message, wherein the sighting message includes the rolling identifier and associated data that includes at least one of identification information corresponding to the proximity broadcast receiver, whether the sighting message is related to an alert or a registered service, information regarding software or applications executing on the proximity broadcast receiver, location information, proximity information with respect to known areas within a place, and timestamp data; and
   means for transmitting the sighting message via long-range communications to a server.

4. The proximity broadcast receiver of claim 3, wherein the associated data also includes authentication information that confirms the identification information of the proximity broadcast receiver.

5. A proximity broadcast receiver configured to receive and relay messages including identification information corresponding to proximate wireless identity transmitters, comprising:
   a memory;
   a transceiver configured to exchange short-range wireless signals with a wireless identity transmitter;
   a network device configured to exchange signals with a server;
   a processor coupled to the memory, the transceiver, and the network device, wherein the processor is configured with processor-executable software instructions to perform operations comprising:
      receiving a short-range wireless broadcast message including a rolling identifier from the wireless identity transmitter within proximity;
      generating a sighting message in response to the received broadcast message, wherein the sighting message includes the rolling identifier and associated data that includes at least one of identification information corresponding to the proximity broadcast receiver, whether the sighting message is related to an alert or a registered service, information regarding software or applications executing on the proximity broadcast receiver, location information, proximity information with respect to known areas within a place, and timestamp data; and
      transmitting the sighting message via long-range communications to the server.

6. The proximity broadcast receiver of claim 5, wherein the associated data also includes authentication information that confirms the identification information of the proximity broadcast receiver.

7. A non-transitory processor-readable storage medium having stored thereon processor-executable software instructions configured to cause a processor to perform operations for a proximity broadcast receiver to receive and relay messages including identification information corresponding to proximate wireless identity transmitters, comprising:
   receiving a short-range wireless broadcast message including a rolling identifier from a wireless identity transmitter within proximity;
   generating a sighting message in response to the received broadcast message, wherein the sighting message includes the rolling identifier and associated data that includes at least one of identification information corresponding to the proximity broadcast receiver, whether the sighting message is related to an alert or a registered service, information regarding software or applications executing on the proximity broadcast receiver, location information, proximity information with respect to known areas within a place, and timestamp data; and
   transmitting the sighting message via long-range communications.

8. The non-transitory processor-readable storage medium of claim 7, wherein the associated data also includes authentication information that confirms the identification information of the proximity broadcast receiver.

9. A method for a server to communicate with a system of devices that exchange short-range wireless transmissions when in proximity, comprising:
receiving registration information related to a wireless identity transmitter;
receiving a sighting message including a rolling identifier and associated data;
determining whether the rolling identifier matches information calculated using an algorithm and information shared with the wireless identity transmitter;
associating the rolling identifier with the received registration information of the wireless identity transmitter when the rolling identifier matches information calculated using the algorithm and information shared with the wireless identity transmitter;
storing data from the sighting message in relation to the wireless identity transmitter; and
performing an action in response to receiving the sighting message.

10. The method of claim 9, wherein the algorithm shared with the wireless identity transmitter is at least one of a streaming-like encryption algorithm and a pseudo-random function, and wherein the information shared with the wireless identity transmitter is at least a device identifier of the wireless identity transmitter and a shared secret key.

11. The method of claim 9, further comprising:
authenticating the received sighting message based on the associated data, wherein the associated data includes at least identification information and authentication information related to the a proximity broadcast receiver.

12. A server configured to communicate with a system of devices that exchange short-range wireless transmissions when in proximity, comprising:
means for receiving registration information related to a wireless identity transmitter;
means for receiving a sighting message including a rolling identifier and associated data;
means for determining whether the rolling identifier matches information calculated using an algorithm and information shared with the wireless identity transmitter;
means for associating the rolling identifier with the received registration information of the wireless identity transmitter when the rolling identifier matches information calculated using the algorithm and information shared with the wireless identity transmitter;
means for storing data from the sighting message in relation to the wireless identity transmitter; and
means for performing an action in response to receiving the sighting message.

13. The server of claim 12, wherein the algorithm shared with the wireless identity transmitter is at least one of a streaming-like encryption algorithm and a pseudo-random function, and wherein the information shared with the wireless identity transmitter is at least a device identifier of the wireless identity transmitter and a shared secret key.

14. The server of claim 12, further comprising:
means for authenticating the received sighting message based on the associated data, wherein the associated data includes at least identification information and authentication information related to the a proximity broadcast receiver.

15. A server configured to communicate with a system of devices that exchange short-range wireless transmissions when in proximity, comprising:
a server processor configured with server processor-executable software instructions to perform operations comprising:
receiving registration information related to a wireless identity transmitter;
receiving a sighting message including a rolling identifier and associated data;
determining whether the rolling identifier matches information calculated using an algorithm and information shared with the wireless identity transmitter;
associating the rolling identifier with the received registration information of the wireless identity transmitter when the rolling identifier matches information calculated using the algorithm and information shared with the wireless identity transmitter;
storing data from the sighting message in relation to the wireless identity transmitter; and
performing an action in response to receiving the sighting message.

16. The server of claim 15, wherein the algorithm shared with the wireless identity transmitter is at least one of a streaming-like encryption algorithm and a pseudo-random function, and wherein the information shared with the wireless identity transmitter is at least a device identifier of the wireless identity transmitter and a shared secret key.

17. The server of claim 15, wherein the server processor is configured with server processor-executable software instructions to perform operations further comprising:
authenticating the received sighting message based on the associated data, wherein the associated data includes at least identification information and authentication information related to the a proximity broadcast receiver.

18. A non-transitory processor-readable storage medium having stored thereon server processor-executable software instructions configured to cause a server processor to perform operations for a server to communicate with a system of devices that exchange short-range wireless transmissions when in proximity, comprising:
receiving registration information related to a wireless identity transmitter;
receiving a sighting message including a rolling identifier and associated data;
determining whether the rolling identifier matches information calculated using an algorithm and information shared with the wireless identity transmitter;
associating the rolling identifier with the received registration information of the wireless identity transmitter when the rolling identifier matches information calculated using the algorithm and information shared with the wireless identity transmitter;
storing data from the sighting message in relation to the wireless identity transmitter; and
performing an action in response to receiving the sighting message.

19. The non-transitory processor-readable storage medium of claim 18, wherein the algorithm shared with the wireless identity transmitter is at least one of a streaming-like encryption algorithm and a pseudo-random function, and wherein the information shared with the wireless identity transmitter is at least a device identifier of the wireless identity transmitter and a shared secret key.

20. The non-transitory processor-readable storage medium of claim 18, wherein the server processor-executable software instructions are configured to cause the server processor to perform operations further comprising:

authenticating the received sighting message based on the associated data, wherein the associated data includes at least identification information and authentication information related to the a proximity broadcast receiver.

21. A system, comprising:
a server;
a wireless identity transmitter; and
a proximity broadcast receiver,
wherein the wireless identity transmitter comprises:
   a first memory;
   a first transceiver configured to broadcast short-range wireless signals capable of being received by the proximity broadcast receiver; and
   a first processor coupled to the first memory and the first transceiver, and configured with processor-executable software instructions to perform operations comprising:
      generating a rolling identifier periodically via an algorithm known to the server that uses a unique device identifier of the wireless identity transmitter, a secret key shared with the server, and a counter; and
      periodically broadcasting via the first transceiver a short-range wireless message including the rolling identifier of the wireless identity transmitter,
wherein the proximity broadcast receiver comprises:
   a second memory;
   a second transceiver configured to exchange short-range wireless signals with the wireless identity transmitter;
   a network device configured to exchange signals with the server;
   a second processor coupled to the second memory, the second transceiver, and the network device and configured with processor-executable software instructions to perform operations comprising:
      receiving via the second transceiver the short-range wireless message including the rolling identifier broadcast by the wireless identity transmitter within proximity;
      generating a sighting message in response to the received message, wherein the sighting message includes the rolling identifier and associated data; and
      transmitting the sighting message via long-range communications using the network device,
wherein the server is configured with server-executable instructions to perform operations comprising:
   receiving the sighting message including the rolling identifier and the associated data;
   determining whether the rolling identifier matches information calculated using the algorithm and the secret key shared with the wireless identity transmitter;
   associating the rolling identifier with the wireless identity transmitter when the rolling identifier matches information calculated using the algorithm and the secret key;
   storing data from the sighting message in relation to the wireless identity transmitter; and
   performing an action in response to receiving the sighting message.

22. The system of claim 21, wherein the first processor is configured with processor-executable software instructions to perform operations such that generating a rolling identifier comprises generating the rolling identifier using at least one of a streaming-like encryption algorithm and a pseudorandom function.

23. The system of claim 21, wherein the short-range wireless message is a single packet with a size of 80 bits or less and wherein the secret key is 128bits.

24. The system of claim 21, wherein the short-range wireless message is broadcast using at least one of heat, vibration, light, and radio signals, and wherein the radio signals include Bluetooth Low Energy packets.

25. The system of claim 21, wherein the server is configured with server-executable instructions to perform operations such that associating the rolling identifier with the wireless identity transmitter when the rolling identifier matches information calculated using the algorithm and the secret key comprises:
   receiving registration information related to the wireless identity transmitter; and
   associating the rolling identifier with the received registration information.

26. The system of claim 21, wherein the server is configured with server-executable instructions to perform operations further comprising authenticating the received sighting message based on the associated data, wherein the associated data includes at least identification information and authentication information related to the proximity broadcast receiver.

* * * * *